United States Patent
Polo et al.

(10) Patent No.: US 12,492,372 B2
(45) Date of Patent: Dec. 9, 2025

(54) INDUCED STEM CELLS

(71) Applicant: Monash University, Clayton (AU)

(72) Inventors: Jose Polo, Clayton (AU); Xiaodong Liu, Clayton (AU); Jia Ping Tan, Clayton (AU)

(73) Assignee: Monash University, Clayton (AU)

( * ) Notice: Subject to any disclaimer, the term of this patent is extended or adjusted under 35 U.S.C. 154(b) by 763 days.

(21) Appl. No.: 17/534,594

(22) Filed: Nov. 24, 2021

(65) Prior Publication Data

US 2022/0162550 A1    May 26, 2022

(30) Foreign Application Priority Data

| Nov. 24, 2020 | (AU) | ................................. | 2020904340 |
| Mar. 10, 2021 | (AU) | ................................. | 2021900686 |
| Oct. 26, 2021 | (AU) | ................................. | 2021903429 |

(51) Int. Cl.
  *C12N 5/0735* (2010.01)
  *C12N 5/074* (2010.01)

(52) U.S. Cl.
  CPC ......... *C12N 5/0606* (2013.01); *C12N 5/0696* (2013.01); *C12N 2501/11* (2013.01); *C12N 2501/155* (2013.01); *C12N 2501/16* (2013.01); *C12N 2506/02* (2013.01); *C12N 2510/02* (2013.01)

(58) Field of Classification Search
  None
  See application file for complete search history.

(56) References Cited

U.S. PATENT DOCUMENTS

| 3,766,162 | A | 10/1973 | Spectors |
| 3,791,932 | A | 2/1974 | Schuurs et al. |
| 3,817,837 | A | 6/1974 | Rubenstein |
| 4,233,402 | A | 11/1980 | Maggio et al. |
| 5,384,253 | A | 1/1995 | Kryzyzek et al. |
| 5,580,859 | A | 12/1996 | Felgner et al. |
| 5,589,466 | A | 12/1996 | Felgner et al. |
| 5,656,610 | A | 8/1997 | Shuler et al. |
| 5,702,932 | A | 12/1997 | Hoy et al. |
| 5,736,524 | A | 4/1998 | Content et al. |
| 5,780,448 | A | 7/1998 | Davis |
| 5,789,215 | A | 8/1998 | Berns et al. |
| 5,945,100 | A | 8/1999 | Fick |
| 5,981,274 | A | 11/1999 | Tyrrell et al. |
| 5,994,624 | A | 11/1999 | Trolinder et al. |
| 6,730,293 | B1 | 5/2004 | Rothbard et al. |
| 8,058,065 | B2 | 11/2011 | Yamanaka et al. |
| 9,512,406 | B2 | 12/2016 | Zhu et al. |
| 10,240,126 | B2 | 3/2019 | Yamanaka et al. |
| 10,519,425 | B2 | 12/2019 | Yamanaka et al. |
| 12,060,581 | B2 | 8/2024 | Polo et al. |
| 2019/0060371 | A1 | 2/2019 | Mclean |
| 2020/0199538 | A1 | 6/2020 | Ng |
| 2022/0259566 | A1 | 8/2022 | Polo et al. |
| 2024/0209323 | A1 | 6/2024 | Polo et al. |

FOREIGN PATENT DOCUMENTS

| WO | WO 2005/084158 A2 | 9/2005 |
| WO | WO 2007/123667 A2 | 11/2007 |
| WO | WO 2009/101407 A2 | 8/2009 |
| WO | WO 2011/037270 A1 | 3/2011 |
| WO | WO 2011/055851 A1 | 5/2011 |
| WO | WO 2011/090221 A1 | 7/2011 |
| WO | WO 2011/091475 A1 | 8/2011 |
| WO | WO 2011/158967 A1 | 12/2011 |
| WO | WO 2012/036299 A1 | 3/2012 |
| WO | WO 2012/060473 A1 | 5/2012 |
| WO | WO 2014/065435 A1 | 5/2014 |
| WO | WO 2014/171824 A1 | 10/2014 |
| WO | WO 2014/200114 A1 | 12/2014 |
| WO | WO 2015/056804 A1 | 4/2015 |
| WO | WO 2016/143866 A1 | 9/2016 |
| WO | WO 2017/219232 A1 | 12/2017 |
| WO | WO 2018/046929 A1 | 3/2018 |
| WO | WO 2018/175691 A1 | 9/2018 |
| WO | WO 2019/073055 A1 | 4/2019 |
| WO | WO 2021/067854 A1 | 4/2021 |

OTHER PUBLICATIONS

Kilens et al., "Parallel derivation of isogenic human primed and naive induced pluripotent stem cells". Nature Communications. (Year: 2018).*
Chen et al., "Human pluripotent stem cell culture: considerations for maintenance, expansion, and therapeutics". Cell Stem Cell (Year: 2014).*
Dinella et al., "use of induced pluripotent stem cells in dermatological research". J Invest Dormatol (Year: 2014).*
Rajaran et al., "Reprogramming of mouse, rat, pig, and human fibroblasts inot iPS Cells". Cur Protoc Mol Biol. (Year: 2012).*
Xue et al., "Porcine pluripotent stem cells derived from IVF embryos contribute to chimeric development in vivo". PLoS One (Year: 2016).*
Blakeley et al., "Defining the three cell lineages of the human blastocyst by single-cell RNA-seq", Development, 2015, 142(20): 3613.
Boroviak, T. et al. "Single cell transcriptome analysis of human, marmoset and mouse embryos reveals common and divergent features of preimplantation development", Human Development, 2018, 145, 26 pages.

(Continued)

*Primary Examiner* — Robert M Kelly
*Assistant Examiner* — John David Moore
(74) *Attorney, Agent, or Firm* — Fenwick & West LLP; Matthew Pavao

(57) ABSTRACT

The present invention relates to stem cells derived from a multi-layered cellular structure or blastocyst structure, compositions comprising the same, and methods for obtaining the same.

18 Claims, 50 Drawing Sheets

(46 of 50 Drawing Sheet(s) Filed in Color)

Specification includes a Sequence Listing.

(56) References Cited

OTHER PUBLICATIONS

Butler, et al. "Integrating single-cell transcriptomic data across different conditions, technologies, and species", Nature Biotechnology, 2018, 36:411-420.
Chen et al., "Chemically defined conditions for human iPS cell derivation and culture", Nat Methods, 2011, 8(5): 424-429.
Deglincerti, A. et al. "Self-organization of the in vitro attached human embryo", Nature, 2016, 533:251-254.
Dobin, A. et al. "STAR: ultrafast universal RNA-seq aligner", Bioinformatics, 2013, 29: 15-21.
Durruthy-Durruthy et al., "Spatiotemporal Reconstruction of the Human Blastocyst by Single-Cell Gene-Expression Analysis Informs Induction of Naive Pluripotency", Dev Cell, 2016, 38: 100-115.
Fogarty et al., "Genome editing reveals a role for OCT4 in human embryogenesis", Nature, 2017, 550: 67-73.
Guo et al. "Naive Pluripotent Stem Cells Derived Directly from Isolated Cells of the Human Inner Cell Mass", Stem Cell Reports, 2016, 6:437-446.
Hafemeister C. & Satija, R. "Normalization and variance stabilization of single-cell RNA-seq data using regularized negative binomial regression", Genome Biology, 2019, 20-296, 15 pages.
Harrison et al., "Assembly of embryonic and extraembryonic stem cells to mimic embryogenesis in vitro", Science, 2017, 356(6334): eaal1810.
Huang et al. "Vireo: Bayesian demultiplexing of pooled single-cell RNA-seq data without genotype reference", Genome Biology, 2019, 20-273, 12 pages.
Hyun et al. "Toward Guidelines for Research on Human Embryo Models Formed from Stem Cells", Stem Cell Reports, 2020, 14:169-174.
Kime et al., "Induced 2C Expression and Implantation-Competent Blastocyst-like Cysts from Primed Pluripotent Stem Cells", Stem Cell Reports, 2019, 13: 485-498.
Kolde, R. & Vilo, J. Gosummaries: an R Package for Visual Functional Annotation of Experimental Data [version 1; peer review:2 approved], F1000Research, 2015, 4: 574, 23 pages.
Kovacic et al. "Developmental capacity of different morphological types of day 5 human morulae and blastocysts", Reproductive Biomedicine Online, 2004, 8(6): 687-694.
Kuijk, E. W. et al. "The roles of FGF and MAP kinase signaling in tle segregation of the epiblast and hypoblast cell lineages in bovine and human embryos", Development, 2012, 139: 871-882.
Lam, A. Q et al. "Rapid and Efficient Differentiation of Human Pluripotent Stem Cells into Intermediate Mesoderm That Forms Tubules Expressing Kidney Proximal Tubular Markers", J. Am. Soc. Nephrol., 2014, 25: 1211-1225.
Li et al., "Generation of Blastocyst-like Structures from Mouse Embryonic and Adult Cell Cultures", Cell, 2019, 179(3): 687-702.
Linneberg-Agerholm et al. "Naïve human pluripotent stem cells respond to Wnt, Nodal and LIF signalling to produce expandable naïve extra-embryonic endoderm", Development, 2019, 146, 15 pages.
Liu et al., "Modelling human blastocysts by reprogramming fibroblasts into iBlastoids", Nature, 2021, 591(7851), 627-632.
Liu X, et al. "Comprehensive characterization of distinct states of human naive pluripotency generatedby reprogramming", Nat Methods, 2017, 14: 1055-1062.
Liu et al. An integrated chromatin accessibility and transcriptome landscape of human pre-implantation embryos, Nature Communications, 2019, 10:364, 11 pages.
Liu et al., "Reprogramming roadmap reveals route to human induced trophoblast stem cells", Nature, 2020, 586:101-107.
Niakan et al. "Analysis ofhumanembryosfromzygotetoblastocystre vealsdistinctgene expression patternsrelativetothemouse", Developmental Biology, 2013, 375:54-64.
Nichols & Smith., "Naive and Primed Pluripotent States", Cell Stem Cell, 2009, 4: 487-492.
Okae et al., "Derivation of Human Trophoblast Stem Cells", Cell Stem Cell, 2018, 22, 50-63.
Petropoulos et al., "Single-Cell RNA-Seq Reveals Lineage and X Chromosome Dynamics in Human Preimplantation Embryos", Cell, 2016, 165(4): 1012-1026.
Qin et al., "YAP Induces Human Naive Pluripotency", Cell Reports, 2016, 14: 2301-2312.
Rivron et al., "Blastocyst-like structures generated solely from stem cells", Nature, 2018, 557(7703): 106-111.
Roode, et al. "Human hypoblast formation is not dependent on FGF signalling", Developmental biology, 2012, 361:358-363.
Rossant et al. "New Insights into Early Human Development: Lessons for Stem Cell Derivation and Differentiation", Cell Stem Cell, 2017, 20:18-28.
Scialdone, A et al. "Computational assignment of cell-cycle stage from single-cell transcriptome data", Methods, 2015, 85:54-61.
Shahbazi et al., "Self-organization of the human embryo in the absence of maternal tissues", Nat Cell Biol, 2016, 18: 700-708.
Sozen et al., "Self-assembly of embryonic and two extra-embryonic stem cell types into gastrulatingembryo-like structures", Nat Cell Biol, 2018, 20(8): 979-989.
Sozen et al., "Self-Organization of Mouse Stem Cells into an Extended Potential Blastoid", Dev Cell, 2019, 51(6): 698-712.
Stuart, T. et al. "Comprehensive Integration of Single-Cell Data", Cell 2019, 177, 1888-1902.e21.
Takahashi et al. "Induction of Pluripotent Stem Cells from Adult Human Fibroblasts by Defined Factors", Cell, 2007, 131: 861-872.
Takahashi et al. "Induction of pluripotency in human somatic cells via a transient state resembling primitive streak-like mesendoderm", Nature Communications, 2014, 5, 3678, 9 pages.
Tan et al., "Generation of human blastocyst-like structures by somatic cell reprogramming", protocol exchange, 2021, DOI:10.21203/rs.3.pex-1347/v1.
The International Stem Cell Initiative, "Characterization of human embryonic stem cell lines by the International Stem Cell Initiative", Nature Biotechnology, 2007, 25(7): 803-816.
Thermo Fisher Scientific, 'Culturing Pluripotent Stem Cells (PSCs) in Essential 8TM Medium', [retrieved from internet on Jan. 13, 2022]. <URL:https://tools.thermofisher.com/content/sfs/manuals/feeder_free_PSCs_in_essential8_medium.pdf> published on Sep. 27, 2015 as per Wayback Machine.
Thomson et al., "Embryonic Stem Cell Lines Derived from Human Blastocysts", Science, 1998, 282(5391): 1145-1147.
Tyser et al. "A spatially resolved single cell atlas of human gastrulation", Nature, 2020, 32 pages.
O'Rahilly et al. "Developmental stages in human embryos: revised and new measurements", Cells Tissues Organs, 2010, 192: 73-84.
Wamaitha, S. E. et al. "IGF1-mediated human embryonic stem cell self-renewal recapitulates the embryonic niche", Nature Communications, 2020, 11:764.
Warnock—Report of the Committee of Inquiry into Human Fertilisation and Embryology, Ir. Nurs. News, 1985, 5, 7-8.
Wu et al., "Comparative Analysis and Refinement of Human PSC-Derived Kidney Organoid Differentiation with Single-Cell Transcriptomics", Cell Stem Cell, 2018, 23: 869-881.
Xiang et al., "A developmental landscape of 3D-cultured human pre-gastrulation embryos", Nature, 2020, 577(7791): 537-542.
Yamaguchi "The Kyoto Collection of Human Embryos and Fetuses: History and Recent Advancements in Modern Methods", Cells Tissues Organs, 2018, 205:314-319.
Zhang et al., "Implantation initiation of self-assembled embryo-like structures generated using threetypes of mouse blastocyst-derived stem cells", Nat Commun, 2019, 10(1): 496.
"The Istanbul consensus workshop on embryo assessment: proceedings of an expert meeting", HumanReproduction, 2011, 26: 1270-1283.
Zheng et al. "Controlled modelling of human epiblast and amnion development using stem cells." Nature 573.7774 (2019), pp. 421-425.
Amita et al. "Complete and unidirectional conversion of human embryonic stem cells to trophoblast by BMP4." Proceedings of the National Academy of Sciences, vol. 110(13), Mar. 14, 2013, pp. E1212-E1221.
Bar, et al. "Human pluripotent stem cells: derivation and applications." Nat Rev Mol Cell Biol, vol. 10, Nov. 5, 2020.

(56) References Cited

OTHER PUBLICATIONS

Bredenkamp et al. "Wnt inhibition facilitates RNA-mediated reprogramming of human somatic cells to naive pluripotency." Stem cell reports, vol. 13(6), Dec. 2019, pp. 1083-1098.
Chen et al. "Roles of CDX2 and EOMES in human induced trophoblast progenitor cells." Biochemical and biophysical research communications, vol. 431(2), Feb. 8, 2013, pp. 197-202.
Eiselleova et al. "A complex role for FGF-2 in self-renewal, survival, and adhesion of human embryonic stem cells." Stem cells, vol. 27(8), Aug. 2009, pp. 1847-1857.
Elliott et al. "Intercellular trafficking and protein delivery by a herpesvirus structural protein." Cell, vol. 88(2); Jan. 24, 1997, pp. 223-233.
Frankel et al. "Cellular uptake of the tat protein from human immunodeficiency virus." Cell, vol. 55(6), Dec. 23, 1988, pp. 1189-1193.
Gafni et al, "Derivation of novel human ground state naive pluripotent stem cells," Nature, Dec. 12, 2013, vol. 504(7479), pp. 82-86.
Gao et al. "Establishment of porcine and human expanded potential stem cells." Nature Cell Biology, vol. 21(6), Jun. 2019, pp. 687-699.
Graham et al. "A new technique for the assay of infectivity of human adenovirus 5 DNA." Virology 52(2), Apr. 1973, pp. 456-467.
Green et al. "Autonomous functional domains of chemically synthesized human immunodeficiency virus tat trans-activator protein." Cell, vol. 55(6), Dec. 1988, pp. 1179-1188.
Gschwendt et al. "Inhibition of protein kinase C μ by various inhibitors. Inhibition from protein kinase c isoenzymes." FEBS letters 392(2), Aug. 26, 1996, pp. 77-80.
Irie et al. "SOX17 is a critical specifier of human primordial germ cell fate." Cell 160(1), Jan. 15, 2015, pp. 253-268.
Joliot et al. "a-2, 8-Polysialic acid is the neuronal surface receptor of Antennapedia homeobox peptide." New Biol, vol. 3(11), Nov. 1991, pp. 1121-11234.
Joliot et al. "Antennapedia homeobox peptide regulates neural morphogenesis." Proceedings of the National Academy of Sciences, vol. 88(5), Mar. 1991, pp. 1864-1868.
Kaneda et al. "Increased expression of DNA cointroduced with nuclear protein in adult rat liver." Science, vol. 243(4889), Jan. 20, 1989, pp. 375-378.
Kidder "Derivation and manipulation of trophoblast stem cells from mouse blastocysts." Stem Cell Transcriptional Networks: Methods and Protocols Published 2014, pp. 201-212.
Kinoshita et al. "Capture of mouse and human stem cells with features of formative pluripotency." bioRxiv, Dec. 2, 2020, pp. 2020-09.
Kuo et al. "Negligible-cost and weekend-free chemically defined human iPSC culture." Stem Cell Reports, vol. 14(2), Feb. 11, 2020, pp. 256-270.
Le Roux et al. "Neurotrophic activity of the Antennapedia homeodomain depends on its specific DNA-binding properties." Proceedings of the National Academy of Sciences, vol. 90(19), Oct. 1, 1993, pp. 9120-9124.
Lei et al. "Influences of extracellular matrix and of conditioned media on differentiation and invasiveness of trophoblast stem cells." Placenta, vol. 28(1), Jan. 2007, pp. 14-21.
Lindner et al. "The plasmid replicon of Epstein-Barr virus: mechanistic insights into efficient, licensed, extrachromosomal replication in human cells." Plasmid, vol. 58(1), Jul. 2007, pp. 1-12.
Moris et al. "An in vitro model of early anteroposterior organization during human development." Nature, vol. 582(7812), Jun. 2020, pp. 410-415.
Nabel et al. "An inducible transcription factor activates expression of human immunodeficiency virus in T cells." Nature vol. 326(6114), Apr. 16, 1987, pp. 711-713.
Neagu et al. "In vitro capture and characterization of embryonic rosette-stage pluripotency between naive and primed states." Nature cell biology, vol. 22(5), May 2020, pp. 534-545.
Niakan et al. "Analysis of human embryos from zygote to blastocyst reveals distinct gene expression patterns relative to the mouse." Developmental biology vol. 375(1), Mar. 2013, pp. 54-64.
Potter et al. "Enhancer-dependent expression of human kappa immunoglobulin genes introduced into mouse pre-B lymphocytes by electroporation." Proceedings of the National Academy of Sciences, vol. 81(22), Nov. 1984, pp. 7161-7165.
Rippe et al. "DNA-mediated gene transfer into adult rat hepatocytes in primary culture." Molecular and Cellular Biology, vol. 10(2), Feb. 1990, pp. 689-695.
Stadtfeld et al. "Without a trace? PiggyBac-ing toward pluripotency." Nature Methods, vol. 6(5), May 2009, pp. 329-330.
Theunissen et al. "Systematic identification of culture conditions for induction and maintenance of naive human pluripotency." Cell stem cell 15(4) Oct. 2, 2014, pp. 471-487.
Warmflash et al. "A method to recapitulate early embryonic spatial patterning in human embryonic stem cells." Nature methods, vol. 11(8) Aug. 2014, pp. 847-854.
Wilson et al. "Implantation of vascular grafts lined with genetically modified endothelial cells." Science, vol. 244(4910), Jun. 16, 1989, pp. 1344-1346.
Woltjen et al. "piggyBac transposition reprograms fibroblasts to induced pluripotent stem cells." Nature, vol. 458(7239), Apr. 9, 2009, pp. 766-770.
Yang et al., "Expanded potential: the key to synthetic embryo?", Current Opinion in Genetics & Development, Oct. 2020, vol. 64, pp. 72-77.
Yasuda et al. "Chemically defined and growth-factor-free culture system for the expansion and derivation of human pluripotent stem cells." Nature Biomedical Engineering, vol. 2(3), Mar. 2018, pp. 173-182.
Yusa et al. "Generation of transgene-free induced pluripotent mouse stem cells by the piggyBac transposon." Nature methods, vol. 6(5), Mar. 31, 2009, pp. 363-369.
Zhu et al. "Human pluripotent stem cells: an emerging model in developmental biology." Development, vol. 140(4), Feb. 2013, pp. 705-717.

* cited by examiner

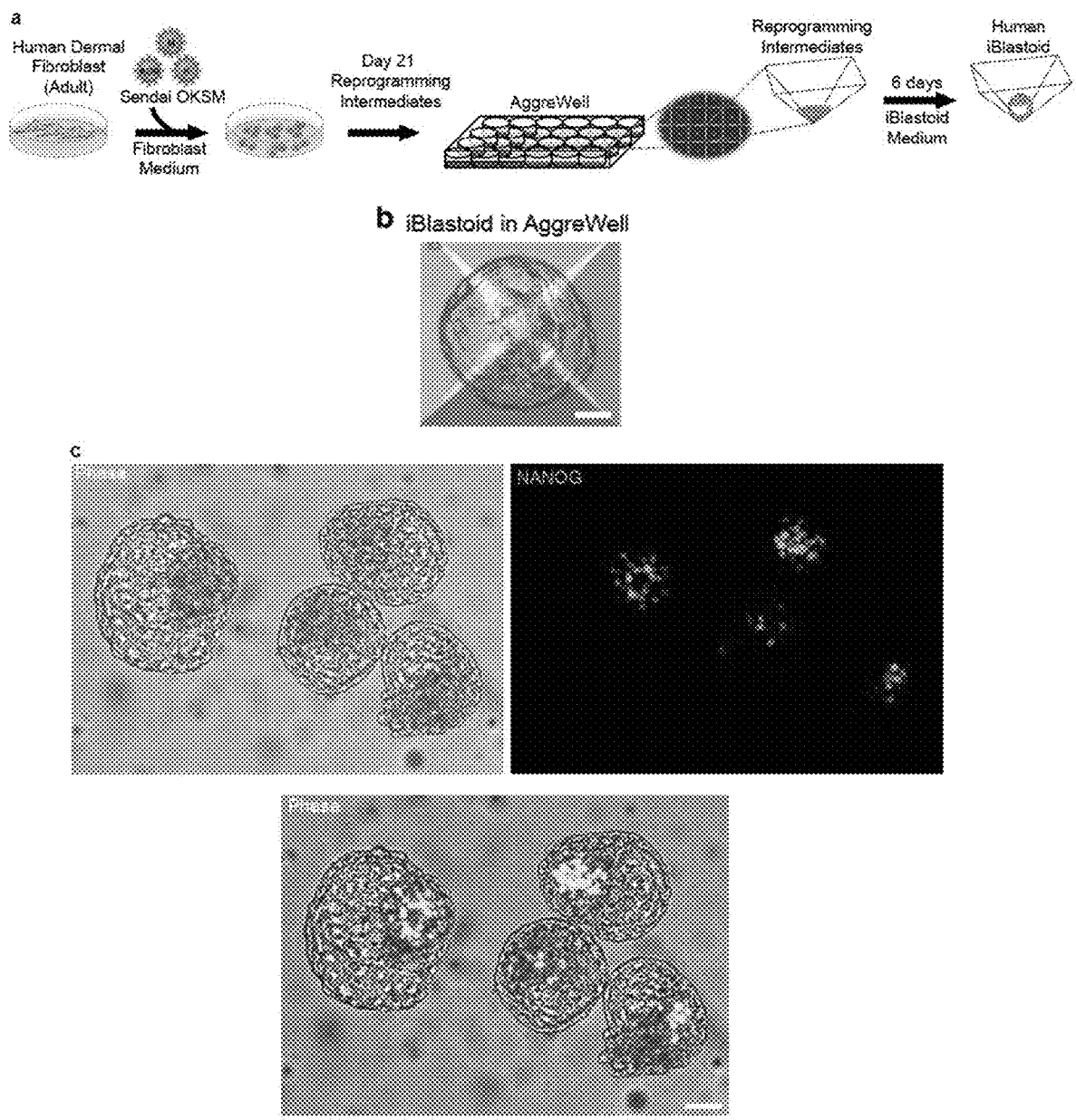

FIG. 2 continued

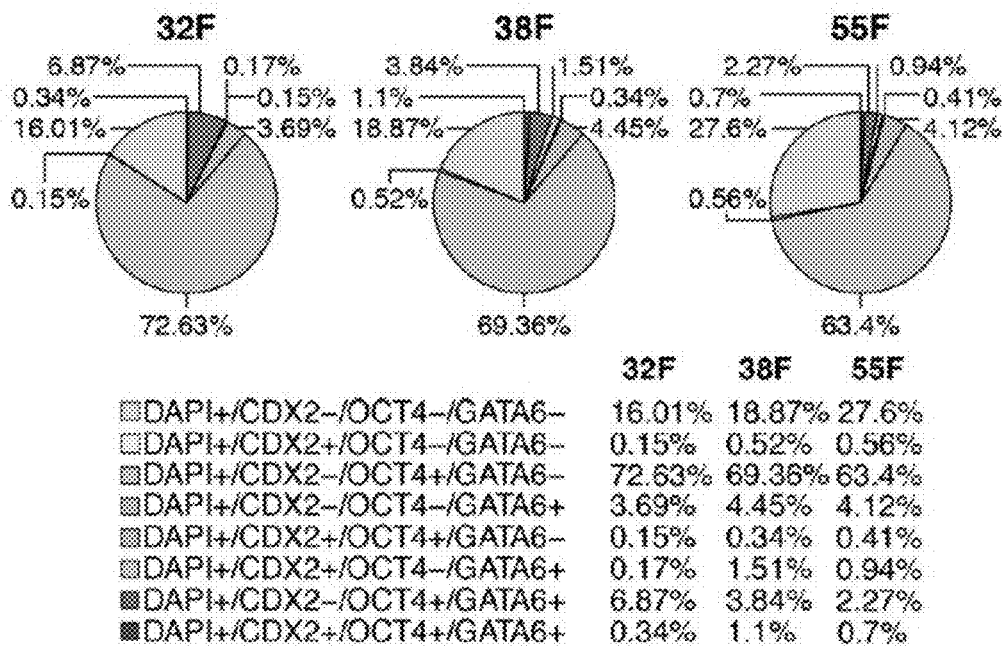

| | Grade | Rating | Description |
|---|---|---|---|
| Stage of development | 1 | | Early |
| | 2 | | Blastocyst |
| | 3 | | Expanded |
| | 4 | | Hatched/hatching |
| ICM | 1 | Good | Prominent, easily discernible, with many cells that are compacted and tightly adhered together |
| | 2 | Fair | Easily discernible, with many cells that are loosely grouped together |
| | 3 | Poor | Difficult to discern, with few cells |
| TE | 1 | Good | Many cells forming a cohesive epithelium |
| | 2 | Fair | Few cells forming a loose epithelium |
| | 3 | Poor | Very few cells | j k m c d e f g h

INDUCED STEM CELLS

RELATED APPLICATIONS

This application claims priority to, and the benefit of from Australian Patent Application No. 2020904340, filed Nov. 24, 2020, Australian Patent Application No. 2021900686, filed Mar. 10, 2021 and Australian Patent Application No. 2021903429, filed Oct. 26, 2021. the entire contents of all of which are hereby incorporated by reference. The contents of each of the aforementioned patent applications are incorporated herein by reference in their entireties.

SEQUENCE LISTING

The instant application contains a Sequence Listing which has been submitted in ASCII format via EFS-Web and is hereby incorporated by reference in its entirety. Said ASCII copy, created on Nov. 23, 2021, is named "FRPA-025_001US_SeqList.txt" and is about 2,514 bytes in size.

FIELD OF THE INVENTION

The present invention provides for methods of producing various induced stem cells, and those stem cells per se.

BACKGROUND OF THE INVENTION

Mammalian embryogenesis begins with the totipotent zygote that is capable of developing into the morula, followed by the formation of a blastocyst. As the embryo implants, cells of the epiblast (EPI) lineage within the blastocyst will develop into the embryo proper and amnion, whereas cells of the trophectoderm (TE) and primitive endoderm (PE) will eventually give rise to the placenta and yolk sac, respectively.

When isolated and cultured in vitro, cells of the epiblast give rise to human embryonic stem cells (hESCs). Alternatively, adult cells can be reprogrammed into human induced pluripotent stem cells (hiPSCs) by transcription factor-mediated reprogramming. These pluripotent in vitro cultured cells can be differentiated into all the cell types of the body and, as such, they have been pivotal for the development of human 'mini organs' or organoid models. Moreover, a number of in vitro models have been developed using hESCs/hiPSCs to study early human development, including micropatterned embryonic disc-like structures, embryonic sac-like structures, and human gastruloids. This technological and medical revolution has been of great importance for disease modelling, drug screening, and our understanding of the molecular mechanisms of several diseases, embryo and organ development.

The mouse embryo ~3.5 d after fertilization forms a blastocyst comprising three lineages: the extraembryonic trophectoderm (TE), the PE and the pluripotent EPI from which cognate ex vivo stem cells can be derived. Trophoblast stem cell (TS) cells are derived from the TE, extraembryonic endoderm stem (XEN) cells from the PE and ES cells from the EPI. Notably, each of these stem cell lines is a useful model of the blastocyst cell lineage that they represent. Mouse ES and TS cells have been used successfully for many years to model EPI or TE biology, including the mechanisms of pluripotency maintenance and placental development, respectively.

Identification of a readily available source of stem cells that can give rise to a desired cell morphology is important for therapeutic treatments, tissue engineering and research.

There is a need for new and/or improved methods for generating human stem cells, or cells displaying the characteristics of human stem cells.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect, the present invention provides a human induced or in vitro-derived extraembryonic endoderm stem (XEN) cell or XEN-like cell, wherein the cell expresses one or more of SALL4, GATA4, SOX17, GATA6 and SOX7. Optionally, the XEN cell or XEN-like cell expresses one or more or all of the markers of the PE lineage, as defined in Table 2 herein.

In this aspect, the present invention provides a population of XEN or XEN-like cells that can be maintained in culture for a period of at least 5, at least 10 or at least 15 passages. Typically, the XEN or XEN-like cells are maintained in a method as described herein.

In this aspect, the XEN or XEN-like cell is produced or isolated from blastocyst, or from an in vitro derived multi-layered cellular structure or blastocyst-like structure as described herein. The multi-layered cellular structure or blastocyst-like structure (such as blastoids or iBlastoids) may be produced by any method described herein.

In this aspect, the present invention provides a method of producing a human XEN or XEN-like cell, the method comprising;
  culturing single cells dissociated from a multi-layered cellular structure or blastocyst-like structure on a feeder layer in the presence of a culture medium comprising leukemia inhibitory factor (LIF), a GSK-3 inhibitor and Activin A,
  thereby producing a human XEN or XEN-like cell.

In this aspect, the present invention provides a method of producing a human XEN or XEN-like cell, the method comprising:
  dissociating a blastocyst or in vitro-derived multi-layered cellular structure or blastocyst-like structure as described herein into single cells,
  culturing those single cells on a feeder layer in the presence of a culture medium comprising leukemia inhibitory factor (LIF), a GSK-3 inhibitor and Activin A,
  thereby producing a human XEN or XEN-like cell.

In this aspect, the feeder layer may comprise or consist of fibroblast cells, for example irradiated mouse embryonic fibroblasts (iMEFs).

In this aspect, the single cells are cultured for a period of at least about 1, 2, 3, 4, 5, 6, 7, 8, 9 or 10 days. The single cells may be cultured for at least 5, at least 10, at least 15, at least 20, at least 25, at least 30, at least 40, at least 50 or more passages.

In this aspect, the culture medium may comprise 10 ng/ml human leukemia inhibitory factor, 3 μM CHIR99021 and 100 ng/ml Activin A.

In this aspect, the present invention provides a method of culturing or maintaining human XEN or XEN-like cells, the method comprising:
  dissociating XEN or XEN-like cells present on a feeder layer;

seeding the dissociated cells at a splitting ratio of between 1:4 to 1:10, onto a feeder layer in the presence of a culture medium comprising leukemia inhibitory factor (LIF), a GSK-3 inhibitor, Activin A and a ROCK inhibitor, thereby culturing or maintaining human XEN or XEN-like cells.

Preferably, the XEN or XEN-like cells are dissociated or passaged every 3, 4, 5 or 6 days. Preferably, the XEN-like for culturing or maintenance are obtained according to a method of the first aspect of the invention.

The XEN or XEN-like cells may be generated by culturing any in vitro-derived multilayered cellular structure or blastocyst-like structure obtained according to any method described herein, and allowing XEN or XEN-like cells to proliferate in culture medium comprising leukemia inhibitory factor (LIF), a GSK-3 inhibitor and Activin A.

In any embodiment of this aspect of the invention, the step of dissociating the XEN or XEN-like cells may comprise contacting the cells with an enzyme or enzyme composition. Any enzyme or enzyme composition comprising proteolytic and/or collagenolytic enzymes suitable for facilitating detachment of cells or for dissociating cells growing in an aggregated culture, may be used. In any embodiment, the enzyme composition may be Accutase®, TrypLE®, displase, collagenase, EDTA, trypsin, or Accumax®.

Preferably, the feeder layer comprises or consists of fibroblast cells, for example irradiated mouse embryonic fibroblasts (iMEFs).

Preferably, the ROCK inhibitor is present at a concentration of about 10 μM. Typically, the seeded cells are cultured in the culture medium comprising a ROCK inhibitor for 1 or 2 days, or until the seeded cells are attached to the feeder layer. After attachment, the culture medium comprising leukemia inhibitory factor (LIF), a GSK-3 inhibitor and Activin A (without a ROCK inhibitor) may be used and replaced every other day.

In this aspect, any method may further include the step of isolating the XEN or XEN-like cell.

Accordingly, in a further embodiment of this aspect, there is provided an isolated XEN or XEN-like cell obtainable, or obtained by any method of the first aspect of the invention.

In any method of this aspect, the method may further include the step of expanding the XEN or XEN-like cell to increase the proportion of XEN or XEN-like cells in the population. The step of expanding the cells may include culturing the cells for a sufficient time and under conditions for generating a population of cells as described below.

As used herein, a XEN-like cell may include a cell exhibiting at least one characteristic of a XEN cell. In this aspect, the present invention also provides a cell exhibiting at least one characteristic of a XEN cell produced by a method of the first aspect of the invention.

In further embodiments, the XEN or XEN-like cell or the cell exhibiting at least one characteristic of a XEN cell retains its undifferentiated state when maintained in subculture.

Preferably, the cell having at least one characteristic of a XEN cell retains the at least one characteristic of a XEN cell for at least 5, at least 10, at least 15, at least 20, at least 40 or more cell culture passages.

As used herein, a characteristic of a XEN cell or XEN-like cell will be understood to include:

flattened endodermal morphology;

expression of one or more of the markers GATA6 GATA4, PDGFRa, NID2 and BMP6, absence of the expression of pluripotency markers such as NANOG;

secretion of ECM such as fibronectin and lamin;

production of basement membrane components such as LAMA1, COL4A1 and FN1;

development into visceral endoderm, eg, characterised by unregulated expression of AFP and HFN4a with down-regulated expression of GATA6, GATA4, PDGFRa, NID2 and BMP6.

In further embodiments, a cell exhibiting at least one characteristic of a XEN cell is characterised by an absence of the markers characterising the somatic cell. In certain embodiments, the cell exhibiting at least one characteristic of a XEN cell does not express one or more of the following markers: OCT4 (also called POU5F1), NANOG, SOX2, KLF17, DPPA3, and DNMT3L.

In any embodiment, the XEN-like cells made according to the first aspect of the invention are characterised by at least one, at least two, at least three, at least four, or at least five characteristics of a XEN as herein described.

In this aspect, the present invention also provides a population of cells comprising a XEN or XEN-like cell obtained or obtainable by any method of the invention described herein. Preferably, at least 5% of cells exhibit at least one characteristic of a XEN-like cell and those cells are produced by a method as described herein. Preferably, at least 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% of the cells in the population exhibit at least one characteristic of a XEN cell and those XEN-like cells are obtained or obtainable by a method of the first aspect of the invention.

In this aspect, the present invention also provides a pharmaceutical composition comprising:

a XEN or XEN-like cell exhibiting at least one characteristic of a XEN cell, wherein the cell is obtained or obtainable according to the methods of the first aspect of the invention, and a pharmaceutically acceptable carrier or excipient.

In this aspect, the present invention also provides a composition, including a homeopathic, or dietary supplement comprising:

a cell or population of cells exhibiting at least one characteristic of a XEN cell, wherein the cell is obtained or obtainable according to the methods of the first aspect of the invention, and a pharmaceutically acceptable carrier or excipient.

In this aspect, the present invention further provides a composition, including a homeopathic, or dietary supplement derived from:

a cell or population of cells, exhibiting at least one characteristic of a XEN cell, wherein the cell is obtained or obtainable according to the methods of the first aspect of the invention.

As used herein, a XEN-like cell and cells having at least one characteristic of a XEN cell may also be referred to as an iBlastoid (B)-derived XEN (BXEN) cells or iXEN cells or in vitro-derived XEN cells.

The invention also provides for an organoid obtained from cells exhibiting at least one characteristic of a XEN or XEN-like cell obtained according to a method of the first aspect of the invention and/or differentiated cells obtained from cells exhibiting at least one characteristic of a XEN or XEN-like cell made according to a method of the second aspect of the invention.

In this aspect, the present invention also provides a chimeric organ or organoid obtained from, or derived from a XEN or XEN-like cell or differentiated cells generated from XEN or XEN-like cells, wherein the XEN or XEN-like cells are obtained or obtainable according to a method of the fourth aspect of the invention.

A XEN cell, XEN-like cell, BXEN, iXEN or in vitro-derived XEN cell, or populations thereof obtained according to the methods of the present invention may be integrated into trophoblast organoids to form a sophisticated extra-embryonic organoid system (artificial placenta and yolk sac) to support embryo growth in vitro. Accordingly, the present invention also provides for the use of a use of a XEN cell, XEN-like cell, BXEN, iXEN or in vitro-derived XEN cell obtained according to the methods of the present invention, or population or organoid thereof to:

form an extra-embryonic organoid;
model for understanding diseases/dysfunctions associated with development of extra-embryonic tissues;
screening for drugs and therapeutics for improving function of extra-embryonic tissues;
model/study embryo patterning, germ cell development and/or fetal haematopoietic stem cell formation.

In a second aspect, the present invention provides a cell exhibiting at least one characteristic of trophoblast stem cell (TSC) produced or isolated from an in vitro derived or generated multi-layered cellular structure or blastocyst-like structure (such as a blastoid or iBlastoid) as described herein. The multi-layered cellular structure or blastocyst-like structure may be produced by any method described herein.

In this aspect, the present invention provides a method of producing a human TSC, the method comprising;
culturing single cells dissociated from a multi-layered cellular structure or blastocyst-like structure, on a layer comprising one or more extracellular matrix (ECM) proteins in the presence of a TSC culture medium suitable for sustaining TSCs,
thereby producing a human TSC.

In this aspect, the present invention provides a method of producing a human TSC, the method comprising;
dissociating a multi-layered cellular structure or blastocyst-like structure as described herein into single cells,
culturing those single cells on a layer comprising one or more extracellular matrix (ECM) proteins in the presence of a TSC culture medium suitable for sustaining TSCs,
thereby producing a human TSC.

In this aspect, the single cells are cultured for a period of at least about 1, 2, 3, 4, 5, 6, 7, 8, 9 or 10 days.

In this aspect, the TSC culture medium may comprise a growth factor, preferably EGF, a ROCK inhibitor, an HDAC inhibitor, a TGF-β inhibitor and a GSK-3 inhibitor. Preferably the GSK-3 inhibitor comprises CHIR99021, the TGF-β inhibitor comprises SB431542 and A83-01 and the HDAC inhibitor comprises valproic acid.

In particularly preferred embodiments, the TSC medium is the media as described in Okae et al. (2018) Cell Stem Cell, 22: 50-63 as further described herein.

In this aspect, the present invention provides a method of culturing or maintaining human TSC cells, the method comprising
dissociating TS cells (TSCs) present on a layer comprising one or more EXM proteins;
seeding the dissociated cells at a splitting ratio of between 1:4 to 1:10 onto a layer comprising one or more extracellular matrix (ECM) proteins, in the presence of a TSC culture medium suitable for sustaining TSCs,
thereby culturing or maintaining human TSCs.

Preferably, the TSC cells are dissociated or passaged every 3, 4, 5 or 6 days. Preferably, the TSCs for culturing or maintenance are obtained according to a method of the second aspect of the invention.

In any embodiment of this aspect, the layer comprising one or more extracellular matrix (ECM) proteins may comprise or consist of a layer of collagen, fibronectin, matrigel, geltrex or lamin. Preferably, the collagen may comprise or consist of collagen IV.

The TSCs may be generated by culturing any in vitro-derived multilayered cellular structure or blastocyst-like structure obtained according to any method described herein, and allowing TSCs to proliferate in TSC culture medium.

In any embodiment of this aspect of the invention, the step of dissociating the TSCs comprises contacting the cells with an enzyme or enzyme composition. Any enzyme or enzyme composition comprising proteolytic and/or collagenolytic enzymes suitable for facilitating detachment of cells or for dissociating cells growing in an aggregated culture, may be used. In any embodiment, the enzyme composition may be Accutase®, TrypLE®, displase, collagenase, EDTA, trypsin, or Accumax®.

In this aspect, any method may further include the step of isolating the cell exhibiting at least one characteristic of the TSC.

Accordingly, in a further embodiment of this aspect, there is provided an isolated TSC obtainable, or obtained by any method of the second aspect of the invention described herein.

In this aspect, the present invention also provides a cell exhibiting at least one characteristic of a TSC produced by any method of the second aspect of the invention described herein.

In further embodiments, the cell exhibiting at least one characteristic of a TSC retains its undifferentiated state when maintained in subculture.

Preferably, the cell having at least one characteristic of a TSC retains the at least one characteristic of a TSC for at least 5, at least 10, at least 15, at least 20, at least 40 or more cell culture passages.

In this aspect, the invention also provides an isolated extravillous trophoblast (EVT) or syncytiotrophoblast (ST) derived or differentiated from a cell exhibiting at least one characteristic of a TSC, obtained according to the methods of the second aspect of the invention.

In any method of this aspect, the method may further include the step of differentiating the cells exhibiting at least one characteristic of a TSC to generate a cell exhibiting at least one characteristic of an EVT or an ST. The step of differentiating the cells may include culturing the cells for a sufficient time and under conditions for generating a cell having at least one characteristic of an EVT or ST as described herein.

Still further, the methods may further include differentiating a cell exhibiting at least one characteristic of a TSC, to an extra-placental cell type, for use in regenerative medicine.

As used herein, a characteristic of an ST includes one or more of: SDC1+ multinucleated cells, and increased expression of one or more of the markers CGA, CGB, PSG1, CSH1, HSD3B1, CYP19A1, SDC1 and INHA relative to a TSC. A further characteristic includes a round, multi-nucleated morphology.

As used herein, a characteristic of an EVT includes one or more of increased expression of one or more of the markers HLA-G, PRG2, PAPPA2, MMP2, ITGA5 and ATGA1 relative to a TSC. A further characteristic includes an elongated spindle-like morphology.

In any method of this aspect, the method may further include the step of expanding the cells exhibiting at least one characteristic of a TSC to increase the proportion of cells in the population exhibiting at least one characteristic of a TSC. The step of expanding the cells may include culturing the cells for a sufficient time and under conditions for generating a population of cells as described below.

In any method described herein, the method may further include the step of differentiating the cells exhibiting at least one characteristic of a TSC to generate a cell exhibiting at least one characteristic of an EVT or an ST. The step of differentiating the cells may include culturing the cells for a sufficient time and under conditions for generating a cell having at least one characteristic of an EVT or ST as described herein.

In this aspect, the present invention also provides a population of cells comprising a TSC obtained or obtainable by any method of the invention described herein. Preferably, at least 5% of cells exhibit at least one characteristic of a TSC and those cells are produced by a method as described herein. Preferably, at least 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% of the cells in the population exhibit at least one characteristic of a TSC and those TSCs are obtained or obtainable by a method of the second aspect of the invention as described herein.

In this aspect, the present invention also provides a population of cells, wherein at least 5% of the cells are STs or EVTs differentiated from cells that exhibit at least one characteristic of a TSC produced by a method as described herein. Preferably, at least 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% of the cells in the population are STs or EVTs obtained by differentiating a cell exhibiting at least one characteristic of a TSC obtained according to the present invention.

In any embodiment of the invention, the TSC culture media comprises the ROCK inhibitor trans-N-(4-pyridyl)-4-(1-aminoethyl)-cyclohexanecarboxamide (Y-27632), or a salt thereof.

In further embodiments, the TSC culture medium additionally comprises one or more of:
4-[4-(1,3-benzodioxol-5-yl)-5-(2-pyridyl)-1H-imidazol-2-yl] benzamide (SB 431542) or a salt thereof;
6-[[2-[[4-(2,4-dichlorophenyl)-5-(4-methyl-1H-imidazol_2-yl)-2-pyrmidinyl]amino]ethyl]amino]micotino-nitrile (CHIR 99021), or a salt thereof; and/or
A83-01 (3-(6-Methyl-2-pyridinyl)-N-phenyl-4-(4-quinolinyl)-1H-pyrazole-1-carbothioamide), or a salt thereof.

In further embodiments, the TSC medium also comprises an agent for stimulating Wnt and one or more inhibitors of TGFβ.

In preferred embodiments, the TSC culture is ASECRiAV as described herein, and comprises: A83-01, SB431542, EGF, CHIR, a ROCK inhibitor, ascorbic acid and valproic acid.

As used herein, a characteristic of a TSC will be understood to include:
an undifferentiated, bipotential state and the ability to differentiate into a cell exhibiting one or more characteristics of an extravillous trophoblast (EVT) or syncytiotrophoblast (ST);
cobblestone-shaped colony appearance;
a methylation pattern similar to a blastocyst-derived TSC, as determined by a bisulfite assay or genome-wide DNA methylation profiling techniques;
the expression of one or more biochemical markers of a TSC, as determined by an immunohistochemistry and/or PCR assay, preferably wherein the markers are selected from the group consisting of: CD249 (aminopeptidase A), CD49f (iTGA6); nuclear GATA2/3, TFAP2C, P6 and NR2F2;
the level of chromatin accessibility similar to blastocyst-derived TSC, as determined using ATAC-seq;
a histone modification profile similar to blastocyst-derived TSC, (eg, H3K4me3, H3K27ac gene modification);
a proteome or metabolome profile similar to blastocyst-derived TSC.

In further embodiments, a cell exhibiting at least one characteristic of a TSC is characterised by an absence of the markers characterising the somatic cell. In certain embodiments, the cell exhibiting at least one characteristic of a TSC does not express one or more of the following markers: OCT4 (also called POU5F1), NANOG, SOX2, SALL2, OTX2, BANCR, KLF17, DPPA3, ARGFX and DNMT3L.

In any embodiment, the TSCs made according to the present invention are characterised by at least one, at least two, at least three, at least four, or at least five characteristics of a TSC as herein described.

The invention also provides a pharmaceutical composition comprising:
a cell exhibiting at least one characteristic of a TSC, wherein the cell is obtained or obtainable according to the methods of the second aspect of the invention, and
a pharmaceutically acceptable excipient.

The invention also provides a pharmaceutical composition comprising:
a cell exhibiting at least one characteristic of an ST or EVT, wherein the cell is obtained or obtainable by differentiating a cell having at least one characteristic of a TSC obtained or obtainable according to the methods of the second aspect of the invention, and
a pharmaceutically acceptable carrier or excipient.

The invention also provides a composition, including a homeopathic, or dietary supplement comprising:
a cell or population of cells exhibiting at least one characteristic of a TSC, wherein the cell is obtained or obtainable according to the methods of the second aspect of the invention, and/or
a cell or population of cells exhibiting at least one characteristic of an ST or EVT, wherein the cell is obtained or obtainable by differentiating a cell having at least one characteristic of a TSC obtained or obtainable according to the methods of the second aspect of the invention, and/or
an organoid derived from a cell or population of cells exhibiting at least one characteristic of an ST or EVT, wherein the cell is obtained or obtainable by differentiating a cell having at least one characteristic of a TSC obtained or obtainable according to the methods of the second aspect of the invention;
and
a pharmaceutically acceptable carrier or excipient.

The invention further provides a composition, including a homeopathic, or dietary supplement derived from:
a cell or population of cells, exhibiting at least one characteristic of a TSC, wherein the cell is obtained or obtainable according to the methods of the second aspect of the invention, and a cell or population of cells exhibiting at least one characteristic of an ST or EVT, wherein the cell is obtained or obtainable by differentiating a cell having at least one characteristic of a TSC obtained or obtainable according to the methods of the second aspect of the invention, and an organoid derived from a cell or population of cells exhibiting at least one characteristic of an ST or EVT, wherein the cell is obtained or obtainable by differentiating a cell having at least one characteristic of a TSC obtained or obtainable according to the methods of the second aspect of the invention.

In any method of the second aspect of the invention described herein, the method may further include the step of administering:

a cell exhibiting at least one characteristic of a TSC made according to a method of the second aspect of the invention, or a cell population including a cell exhibiting at least one characteristic of a TSC made according to a method of the second aspect of the invention, or a differentiated cell or population of differentiated cells, obtained from a cell exhibiting at least one characteristic of a TSC made according to a method of the second aspect of the invention, to a subject in need thereof.

In some embodiments, there is provided a method of augmenting a placenta or blastocyst comprising introducing into a placenta or blastocyst:

a cell exhibiting at least one characteristic of a TSC generated according to a method of the second aspect of the invention;

a cell population including a cell exhibiting at least one characteristic of a TSC made according to a method of the second aspect of the invention, or a differentiated cell or population of differentiated cells, obtained from a cell exhibiting at least one characteristic of a TSC made according to a method of the second aspect of the invention.

The invention also provides for an organoid obtained from cells exhibiting at least one characteristic of a TSC made according to a method of the second aspect of the invention and/or differentiated cells (e.g. STs or EVTs) obtained from cells exhibiting at least one characteristic of a TSC made according to a method of the second aspect of the invention.

In this aspect, the present invention also provides a chimeric organ or organoid obtained from, or derived from a TSC or differentiated cells generated from TSCs, wherein the TSCs are obtained or obtainable according to a method of the fourth aspect of the invention.

In further aspects, there is provided a method of treating and/or preventing a disorder associated with the development and/or activity of trophoblasts in a subject in need thereof, the method comprising administering to the subject a therapeutically effective amount of a cell or population of cells exhibiting at least one characteristic of a TSC made according to a method of the second aspect of the invention as described herein, a differentiated ST or EVT obtained from cells exhibiting at least one characteristic of a TSC made according to a method of the second aspect of the invention as described herein, or pharmaceutical product according to the invention, thereby treating and/or preventing the disorder associated with the development and/or activity of trophoblasts in the subject.

The present invention also provides a use of a cell, or cell population including a cell produced according to a method of the second aspect of the invention, exhibiting at least one characteristic of a TSC, in the manufacture of a medicament for the treatment of a disease/disorder of the placenta. For example, the reprogrammed cells of the instant invention may be introduced (transplanted) to an individual in order to improve a disease or condition of the placenta. Alternatively, the cells exhibiting at least one characteristic of a TSC can be differentiated prior to use in the manufacture of a medicament as herein described.

In any embodiment of the second aspect of the invention, the disease is selected from the group consisting of: recurrent miscarriage, preeclampsia, fetal growth restriction (FGR), hydratiform mole and choriocarcinoma. The present aspect of the invention also provides a method of identifying an agent capable of modulating trophoblast development and/or activity, the method comprising:

contacting an isolated TSC or placenta made according to the present invention with a candidate agent;

comparing development and/or activity of the isolated TSC or placenta following the contacting with the agent, to the development and/or activity of the TSC or placenta without the agent wherein the effect of the agent on the development and/or activity of the TSC or placenta above a predetermined level relative to the development of the TSC or placenta without the agent is indicative that the agent modulates trophoblast development and/or activity.

In a further embodiment, there is a method for obtaining a compound produced by a trophoblast, the method comprising culturing a cell, or population of cells comprising at least one characteristic of a TSC obtained or obtainable according to a method of the second aspect of the invention, or a culture comprising the same, and isolating from the culture medium a compound secreted by the cells, thereby obtaining the compound produced by the trophoblast.

A further embodiment provides a method for obtaining a compound or particle secreted by an EVT or ST, the method comprising culturing an ST or EVT, or population of STs or EVTs obtained by differentiating a cell comprising at least one characteristic of a TSC obtained or obtainable according to a method of the second aspect of the invention, and isolating from the culture medium a compound or particle secreted by the cells, thereby obtaining the compound or particle produced by the EVT or ST.

The compound may be a hormone or growth factor. The particle secreted by the cell may be an extracellular vesicle, such as an exosome.

A further embodiment also relates to kits for producing a cell exhibiting at least one characteristic of a TSC as disclosed herein obtained or obtainable according to a method of the second aspect of the invention. The kit may comprise a somatic cell, reprogramming factors, and TSC culture medium as disclosed according to the second aspect of the invention. Preferably, the kit can be used to produce a cell exhibiting at least one characteristic of a TSC. Preferably, the kit can be used with a somatic cell that is a fibroblast. In some embodiments, the kit further comprises instructions for reprogramming a somatic cell to a cell exhibiting at least one characteristic of a TSC according to the methods as disclosed herein. Preferably, the present invention provides a kit when used in a method of the invention described herein.

The kit may also comprise one or more agents suitable for differentiating the TSCs towards an EVT or ST fate, or other non-placental differentiated cell type.

As used herein, a TSC may also be referred to as a TSC-like cell, iBlastoid (B)-derived TSC (BTSC) cell or an iTSC.

In a third aspect, the present invention provides a cell exhibiting at least one characteristic of a naïve pluripotent stem cell (nPSC) produced or isolated from an in vitro-derived or generated multi-layered cellular structure or blastocyst-like structure (such as a blastoid or iBlastoid) as described herein. The multi-layered cellular structure or blastocyst-like structure may be produced by any method described herein.

In this aspect, the present invention provides a method of producing a human nPSC, the method comprising;
    culturing single cells dissociated from a multi-layered cellular structure or blastocyst-like structure on a feeder layer in the presence of a culture medium for promoting cells to a naïve pluripotent state,
    thereby producing an nPSC.

In this aspect, the present invention provides a method of producing a human nPSC, the method comprising;
    dissociating a multi-layered cellular structure or blastocyst-like structure as described herein into single cells,
    culturing those single cells on a feeder layer in the presence of a culture medium for promoting cells to a naïve pluripotent state,
    thereby producing an nPSC.

In this aspect, the feeder layer may comprise or consist of fibroblast cells, for example irradiated mouse embryonic fibroblasts (iMEFs).

In this aspect, the single cells are cultured for a period of at least about 1, 2, 3, 4, 5, 6, 7, 8, 9 or 10 days.

In this aspect, the culture medium for promoting naïve pluripotent state comprises a MEK inhibitor, a PKC inhibitor, a GSK3 inhibitor, a STAT3 activator and a ROCK inhibitor. Exemplary, MEK inhibitors, PKC inhibitors, GSK3 inhibitors, STAT3 activators and ROCK inhibitors are described herein. In one embodiment, the culture medium for promoting naïve pluripotent state is t2iLGoY medium, for example as defined herein.

In this aspect, the present invention provides a method of culturing or maintaining human nPSC cells, the method comprising:
    dissociating nPSCs using present on a feeder layer;
    seeding the dissociated cells at a splitting ratio of between 1:10 to 1:20 onto a feeder layer in the presence of a culture medium for promoting cells towards a naïve pluripotent state,
    thereby culturing or maintaining human nPSCs.

Preferably, the nPSCs are dissociated or passaged every 3, 4, 5 or 6 days. Preferably, the nPSCs for culturing or maintenance are obtained according to a method of the third aspect of the invention.

Preferably, the feeder layer comprises or consists of fibroblast cells, for example irradiated mouse embryonic fibroblasts (iMEFs).

The nPSCs may be generated by culturing any in vitro-derived multilayered cellular structure or blastocyst-like structure obtained according to any method described herein, and allowing nPSCs to proliferate in nPSC culture medium.

In any embodiment of this aspect of the invention, step of dissociating the nPSCs comprises contacting the cells with an enzyme or enzyme composition. Any enzyme or enzyme composition comprising proteolytic and/or collagenolytic enzymes suitable for facilitating detachment of cells or for dissociating cells growing in an aggregated culture, may be used. In any embodiment, the enzyme composition may be Accutase®, TrypLE®, displase, collagenase, EDTA, trypsin, or Accumax®.

In this aspect, any method may further include the step of isolating the cell exhibiting at least one characteristic of nPSC.

Accordingly, in a further embodiment of this aspect, there is provided an isolated nPSC obtainable, or obtained by any method of the third aspect of the invention as described herein.

In this aspect, the present invention also provides a cell exhibiting at least one characteristic of an nPSC produced by a method of the third aspect of the invention as described herein.

In further embodiments, the cell exhibiting at least one characteristic of an nPSC retains its undifferentiated state when maintained in subculture.

As used herein, "naïve pluripotent state" or "naïve pluripotent phenotype" may also be understood to refer to a cell morphology or phenotype that includes cells that are round, dome-shaped. A naïve pluripotent state may also comprise the expression of 1, 2, 3, 4, 5, 6, 7, 8, 9, 10, 11, 12, 13, 14, 15, 16, 17, 18, 19, 20, 21, 22, 23 or all markers selected from: KLF2, KLF4, TFCP2L1, TBX3, REX1, GBX2, STELLA (DPPA3), KLF17, DPPA5, TFCP2L1, MAEL, UTF1, ZFP57, DNMT3L, FGF4, FOXR1, ARGFX, TRIM60, DDX43, BRDT, ALPPL2, KHDC3L, KHDC1L, PRAP1, SSEA-3, SSEA-4, TRA-1-60, TRA-1-81, TRA-2-49/6E, SOX2, E-cadherin, UTF-1, OCT4 (POU5F1), REX1, and NANOG or other marker of naïve pluripotency as described herein, including in Table 5. Any of these morphological, phenotypic or biochemical markers are herein referred to as characteristics of a nPSC.

In further embodiments, a cell exhibiting at least one characteristic of an nPSC is characterised by an absence of the markers characterising the somatic cell. In certain embodiments, the cell exhibiting at least one characteristic of a nPSC does not express one or more of the following markers: ANPEP, TWIST2, ZIC2, SFRP2, KRT7, ITGA2.

Preferably, the cell having at least one characteristic of an nPSC retains the at least one characteristic of an nPSC for at least 5, at least 10, at least 15, at least 20, at least 40 or more cell culture passages.

In any method of this aspect, the method may further include the step of expanding the cells exhibiting at least one characteristic of an nPSC to increase the proportion of cells in the population exhibiting at least one characteristic of an nPSC. The step of expanding the cells may include culturing the cells for a sufficient time and under conditions for generating a population of cells as described below.

In this aspect, the present invention also provides a population of cells comprising an nPSC obtained or obtainable by any method of the invention described herein. Preferably, at least 5% of cells exhibit at least one characteristic of an nPSC and those cells are produced by a method as described herein. Preferably, at least 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% of the cells in the population exhibit at least one characteristic of an nPSC and those nPSCs are obtained or obtainable by a method of the third aspect of the invention as described herein.

In any method of this aspect, the method further comprises a step of differentiating the nPSC obtained or obtainable by any method of the invention described herein. The step of differentiating the cells may include culturing the nPSCs for a sufficient time and under conditions for generating a cell having at least one characteristic of a differentiated cell or a cell that is not in a pluripotent state.

Accordingly, in a further embodiment of this third aspect of the invention, there is provided a differentiated cell produced from an nPSC, obtained or obtainable by any method of the third aspect of the invention described herein. In a further embodiment, there is provided an isolated differentiated cell produced from an nPSC, obtained or obtainable by any method of the invention described herein. Further still, the invention provides a population of cells comprising a differentiated cell produced from an nPSC, obtained or obtainable by any method of the third aspect of the invention described herein.

In a further preferred embodiment, there is provided a population of cells, wherein at least 5% of cells are differentiated cells and those differentiated cells are produced from nPSCs obtained or obtainable by a method of the third aspect of the invention as described herein. Preferably, at least 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% of the cells in the population are differentiated cells and those differentiated cells are produced from nPSCs obtained or obtainable by a method of the third aspect of the invention as described herein.

In a further embodiment of the third aspect of the invention, there is also provided an organoid or other organised collection of cells derived from a population of nPSCs/differentiated cells generated from nPSCs, wherein the nPSCs are obtained or obtainable according to a method of the third aspect of the invention.

In this aspect, the present invention also provides a chimeric organ or organoid obtained from, or derived from a nPSC or differentiated cells generated from nPSCs, wherein the nPSCs are obtained or obtainable according to a method of the fourth aspect of the invention.

In a further embodiment, there is provided a pharmaceutical composition comprising:
a cell exhibiting at least one characteristic of a nPSC, wherein the cell is obtained or obtainable according to the methods of the third aspect of the present invention, and
a pharmaceutically acceptable carrier or excipient.

In a further embodiment, there is provided a pharmaceutical composition comprising:
a cell or population of cells exhibiting at least one characteristic of a nPSC, wherein the cell is obtained or obtainable according to the methods of the third aspect of the present invention
an isolated nPSC or population of nPSCs obtained or obtainable according to a method of the third aspect of the present invention;
an isolated differentiated cell, or population of differentiated cells, derived from one or more nPSCs obtained or obtainable according to a method of the third aspect of the invention; or
an organoid derived from a population of nPSCs/differentiated cells generated from nPSCs, wherein the nPSCs are obtained or obtainable according to a method of the third aspect of the invention;
and a pharmaceutically acceptable carrier or excipient.

Further, there is provided a method of treating a disease or condition requiring administration of an nPSC or population of cells, comprising administering to a subject in need thereof:
an isolated nPSC or population of nPSCs obtained or obtainable according to a method of the third aspect of the present invention;
an isolated differentiated cell, or population of differentiated cells, derived from one or more nPSCs obtained or obtainable according to a method of the third aspect of the invention; or
an organoid derived from a population of nPSCs/differentiated cells generated from nPSCs, wherein the nPSCs are obtained or obtainable according to a method of the third aspect of the invention;

There is also provided a use of an nPSC obtained or obtainable according to a method of the third aspect of the present invention, in the manufacture of a medicament for treating a disease or condition requiring administration of a pluripotent stem cell, or differentiated cell derived therefrom.

A further embodiment relates to kits for producing a cell exhibiting at least one characteristic of a nPSC obtained or obtainable according to the third aspect, as disclosed herein. In some embodiments, a kit comprises a somatic cell, reprogramming factors, and culture medium for promoting a naïve pluripotent state as disclosed herein. Preferably, the kit can be used to produce a cell exhibiting at least one characteristic of a nPSC. Preferably, the kit can be used with a somatic cell that is a fibroblast. In some embodiments, the kit further comprises instructions for reprogramming a somatic cell to a cell exhibiting at least one characteristic of a nPSC according to the methods of the third aspect of the invention as disclosed herein. Preferably, the present invention provides a kit when used in a method of the third aspect of the invention described herein. Further still, the kit may comprise written instructions and/or reagents for differentiating an nPSC produced according to the methods of the third aspect of the invention.

As used herein, nPSC may also be referred to as a nPSC-like cell, iBlastoid (B)-derived nPSC (BnPSC or naïve BPSC) or inPSC.

In a fourth aspect, the present invention provides a cell exhibiting at least one characteristic of a primed pluripotent stem cell (pPSC) produced or isolated from an in vitro-derived or generated multi-layered cellular structure or blastocyst-like structure (such as a blastoids or iBlastoid) as described herein. The multi-layered cellular structure or blastocyst-like structure may be produced by any method described herein.

In this aspect, the present invention provides a method of producing a human pPSC, the method comprising;
culturing single cells dissociated from a multi-layered cellular structure or blastocyst-like structure on a vitronectin layer in the presence of a culture medium for promoting cells to a primed pluripotent state,
thereby producing a pPSC.

In this aspect, the present invention provides a method of producing a human pPSC, the method comprising;
dissociating a multi-layered cellular structure or blastocyst-like structure as described herein into single cells,
culturing those single cells on a layer comprising one or more extracellular matrix (ECM) proteins in the presence of a culture medium for promoting cells to a primed pluripotent state,
thereby producing a pPSC.

In this aspect, the layer comprising one or more extracellular matrix (ECM) proteins comprises vitronectin or culture matrix comprising basement membrane extract (BME), optionally matrigel or geltrex culture matrix.

In this aspect, the single cells are cultured for a period of at least about 1, 2, 3, 4, 5, 6, 7, 8, 9 or 10 days.

In this aspect, the culture medium for promoting primed pluripotent state comprises any medium described herein, including at Table 1.

In this aspect, there is provided a method of culturing or maintaining human pPSC cells, the method comprising
dissociating pPSCs present on an ECM layer;
seeding the dissociated cells at a splitting ratio of between 1:20 to 1:40 onto a layer comprising one or more extracellular matrix (ECM) proteins in the presence of a culture medium for promoting cells to a primed pluripotent state,
thereby culturing or maintaining human pPSCs.

Preferably, the pPSCs are dissociated or passaged every 3, 4, 5 or 6 days. Preferably, the pPSCs for culturing or maintenance are obtained according to a method of the fourth aspect of the invention.

Preferably, the layer comprising one or more extracellular matrix (ECM) proteins comprises vitronectin, or culture matrix comprising basement membrane extract (BME), optionally matrigel or geltrex.

The pPSCs may be generated by culturing any in vitro-derived multilayered cellular structure or blastocyst-like structure obtained according to any method described herein, and allowing pPSCs to proliferate in pPSC culture medium.

In any embodiment of this aspect of the invention, step of dissociating the pPSCs comprises contacting the cells with an enzyme or enzyme composition. Any enzyme or enzyme composition comprising proteolytic and/or collagenolytic enzymes suitable for facilitating detachment of cells or for dissociating cells growing in an aggregated culture, may be used. In any embodiment, the enzyme composition may be Accutase®, TrypLE®, displase, collagenase, EDTA, trypsin, or Accumax®.

In this aspect, any method may further include the step of isolating the cell exhibiting at least one characteristic of pPSC.

Accordingly, in a further embodiment of this aspect, there is provided an isolated pPSC obtainable, or obtained by any method described herein.

In this aspect, the present invention also provides a cell exhibiting at least one characteristic of a pPSC produced by a method as described herein.

In further embodiments, the cell exhibiting at least one characteristic of a pPSC retains its undifferentiated state when maintained in subculture.

As used herein, a "primed pluripotent state" or "primed pluripotent phenotype" typically refers to a cell phenotype or morphology characterised by the presence of flat cell colonies. In certain embodiments, a primed pluripotent state refers to a pluripotent cell that expresses one or more mRNAs of post-implantation epiblast specific transcription factors. For example, primed cells may express 1, 2, 3, 4, 5, 6, 7, 8, 9, 10, 11, 12, 13, 14, 15 or all of: SFP, EOMES, BRACHYURY, OTX2, ZIC2, ZIC3, ZIC5, DNMT3B, KDR, CDH2, CER1, COL2A1, DAZL, TCF7L1, SOX11, SALL2, SOX2, NANOG, KLF4, EPCAM, PRDM14, SSEA-3, SSEA-4, TRA-1-60, TRA-1-81, TRA-2-4916E, ALP, E-cadherin, UTF-1, OCT4 (POU5F1) and REX1, or other marker of primed pluripotent state as described herein, including in Table 5. Any of these morphological, phenotypic or biochemical markers are herein referred to as characteristics of a pPSC.

In further embodiments, a cell exhibiting at least one characteristic of a pPSC is characterised by an absence of the markers characterising the somatic cell. In certain embodiments, the cell exhibiting at least one characteristic of a pPSC does not express one or more of the following markers: ANPEP, TWIST2, KLF17, DNMT3L, KRT7, ITGA2

Preferably, the cell having at least one characteristic of a pPSC retains the at least one characteristic of a pPSC for at least 5, at least 10, at least 15, at least 20, at least 40 or more cell culture passages.

In any method of this aspect, the method may further include the step of expanding the cells exhibiting at least one characteristic of a pPSC to increase the proportion of cells in the population exhibiting at least one characteristic of a pPSC. The step of expanding the cells may include culturing the cells for a sufficient time and under conditions for generating a population of cells as described below.

In this aspect, the present invention also provides a population of cells comprising a pPSC obtained or obtainable by any method of the fourth aspect of the invention as described herein. Preferably, at least 5% of cells exhibit at least one characteristic of a pPSC and those cells are produced by a method as described herein. Preferably, at least 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% of the cells in the population exhibit at least one characteristic of a pPSC and those pPSCs are obtained or obtainable by a method of the fourth aspect of the invention as described herein.

In any method of this aspect, the method further comprises a step of differentiating the pPSC obtained or obtainable by any method of the fourth aspect of the invention described herein. The step of differentiating the cells may include culturing the pPSCs for a sufficient time and under conditions for generating a cell having at least one characteristic of a differentiated cell or a cell that is not in a pluripotent state.

Accordingly, a further embodiment provides a differentiated cell produced from a pPSC, obtained or obtainable by the fourth aspect of the method of the invention described herein. In a further embodiment, there is provided an isolated differentiated cell produced from a pPSC, obtained or obtainable by a method of the fourth aspect of the invention as described herein. Further still, there is provided a population of cells comprising a differentiated cell produced from a pPSC, obtained or obtainable by any method of the fourth aspect of the invention described herein. Preferably, there is provided a population of cells, wherein at least 5% of cells are differentiated cells and those differentiated cells are produced from pPSCs obtained or obtainable by a method of the fourth aspect of the invention as described herein. Preferably, at least 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% of the cells in the population are differentiated cells and those differentiated cells are produced from pPSCs obtained or obtainable by a method of the fourth aspect of the invention as described herein.

In this aspect, the present invention also provides an organoid or other organised collection of cells derived from a population of pPSCs/differentiated cells generated from pPSCs, wherein the pPSCs are obtained or obtainable according to a method of the fourth aspect of the invention.

Further, the present invention also provides a chimeric organ or organoid obtained from, or derived from a pPSC or differentiated cells generated from pPSCs, wherein the pPSCs are obtained or obtainable according to a method of the fourth aspect of the invention.

In a further embodiment of the fourth aspect of the invention, there is also provided a pharmaceutical composition comprising:
a cell exhibiting at least one characteristic of a pPSC, wherein the cell is obtained or obtainable according to the methods of the fourth aspect of the present invention, and
a pharmaceutically acceptable carrier or excipient.

In a further embodiment, there is provided a pharmaceutical composition comprising:
a cell or population of cells exhibiting at least one characteristic of a pPSC, wherein the cell is obtained or obtainable according to the methods of the fourth aspect of the present invention;
an isolated pPSC or population of pPSCs obtained or obtainable according to a method of the fourth aspect of the present invention;
an isolated differentiated cell, or population of differentiated cells, derived from one or more pPSCs obtained or obtainable according to a method of the fourth aspect of the invention; or
an organoid derived from a population of pPSCs/differentiated cells generated from pPSCs, wherein the pPSCs are obtained or obtainable according to a method of the fourth aspect of the invention;
and a pharmaceutically acceptable carrier or excipient.

Further, the present aspect of the invention provides a method of treating a disease or condition requiring administration of a pPSC or population of cells, comprising administering to a subject in need thereof:
an isolated pPSC or population of pPSCs obtained or obtainable according to a method of the fourth aspect of the present invention;
an isolated differentiated cell, or population of differentiated cells, derived from one or more pPSCs obtained or obtainable according to a method of the fourth aspect of the invention; or
an organoid derived from a population of pPSCs/differentiated cells generated from pPSCs, wherein the pPSCs are obtained or obtainable according to a method of the fourth aspect of the he invention;

The present invention also provides a use of a pPSC obtained or obtainable according to a method of the fourth aspect of the present invention, in the manufacture of a medicament for treating a disease or condition requiring administration of a pluripotent stem cell, or differentiated cell derived therefrom.

The present invention also relates to kits for producing a cell exhibiting at least one characteristic of a pPSC as disclosed herein. In some embodiments, a kit comprises a somatic cell, reprogramming factors, and culture medium for promoting a primed pluripotent state as disclosed herein. Preferably, the kit can be used to produce a cell exhibiting at least one characteristic of a pPSC. Preferably, the kit can be used with a somatic cell that is a fibroblast. In some embodiments, the kit further comprises instructions for reprogramming a somatic cell to a cell exhibiting at least one characteristic of a pPSC according to the methods of the fourth aspect of the invention as disclosed herein. Preferably, the present invention provides a kit when used in a method of the fourth aspect of the invention described herein. Further still, the kit may comprise written instructions and/or reagents for differentiating an pPSC produced according to the methods of the fourth aspect of the invention.

As used herein, pPSC may also be referred to as a pPSC-like cell, iBlastoid (B)-derived pPSC (BpPSC or primed BPSC) or ipPSC.

In any aspect herein, including in any of the first, second, third or fourth aspects, the methods further comprise a step of generating a multi-layered cellular structure or blastocyst-like structure (such as a blastoid or iBlastoid).

In any aspect herein, including in any of the first, second, third or fourth aspects, the methods of generating a multi-layered cellular structure or blastocyst-like structure include any method as further described herein.

In any aspect herein, including in any of the first, second, third or fourth aspects, the cells or population of cells derived from, isolated from, or obtained from a multicellular structure or blastocyst-like structure are capable of self-renewal. In other words, the cells or population of cells derived from, isolated from, or obtained from a multicellular structure or blastocyst-like structure are characterised in that they can be maintained in culture.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Immunostaining of Naïve iPSCs only assembled structures using pluripotency marker NANOG and a TSC marker CDX2. Scale bar 20 μm.

Figure 11:
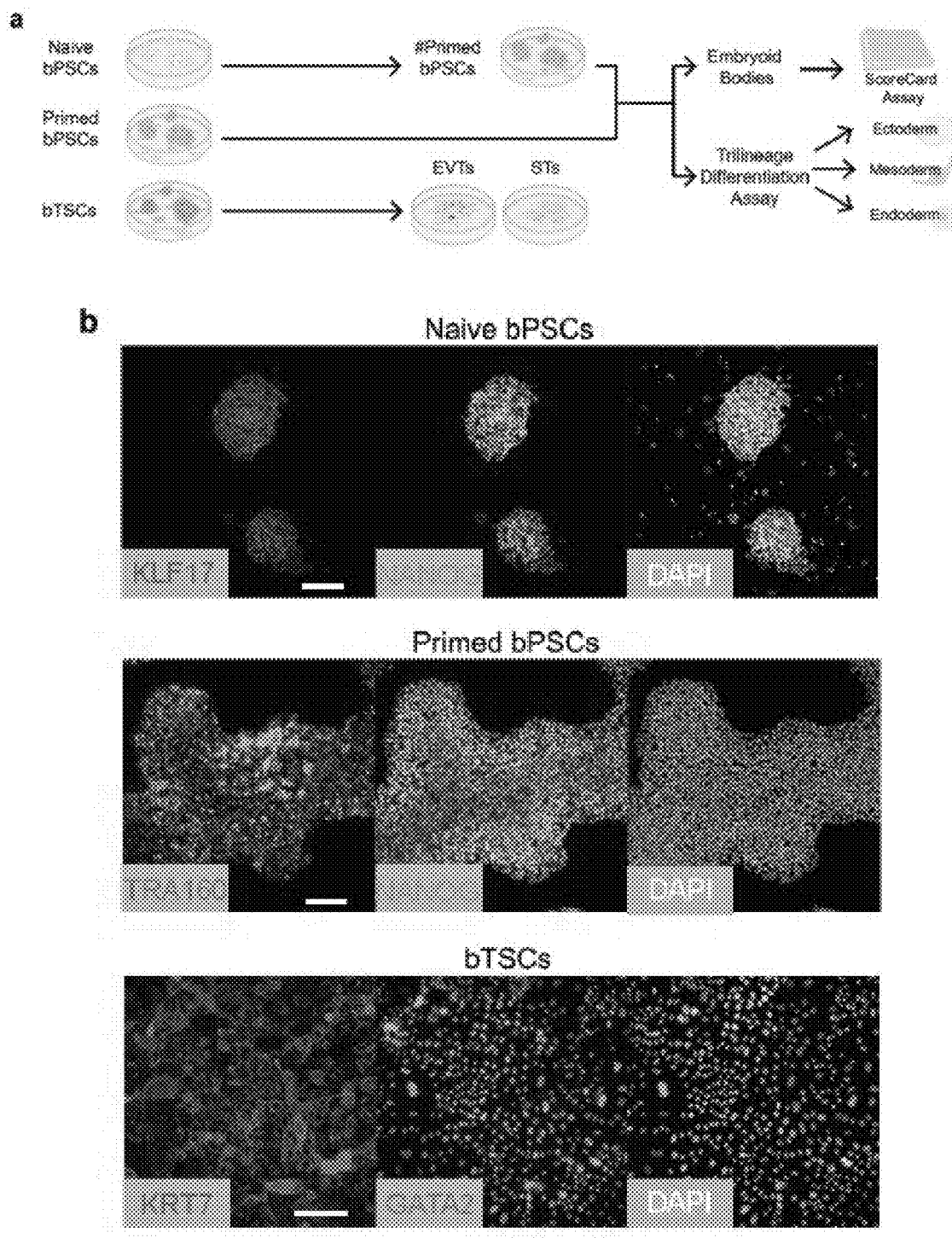
Figure 11:
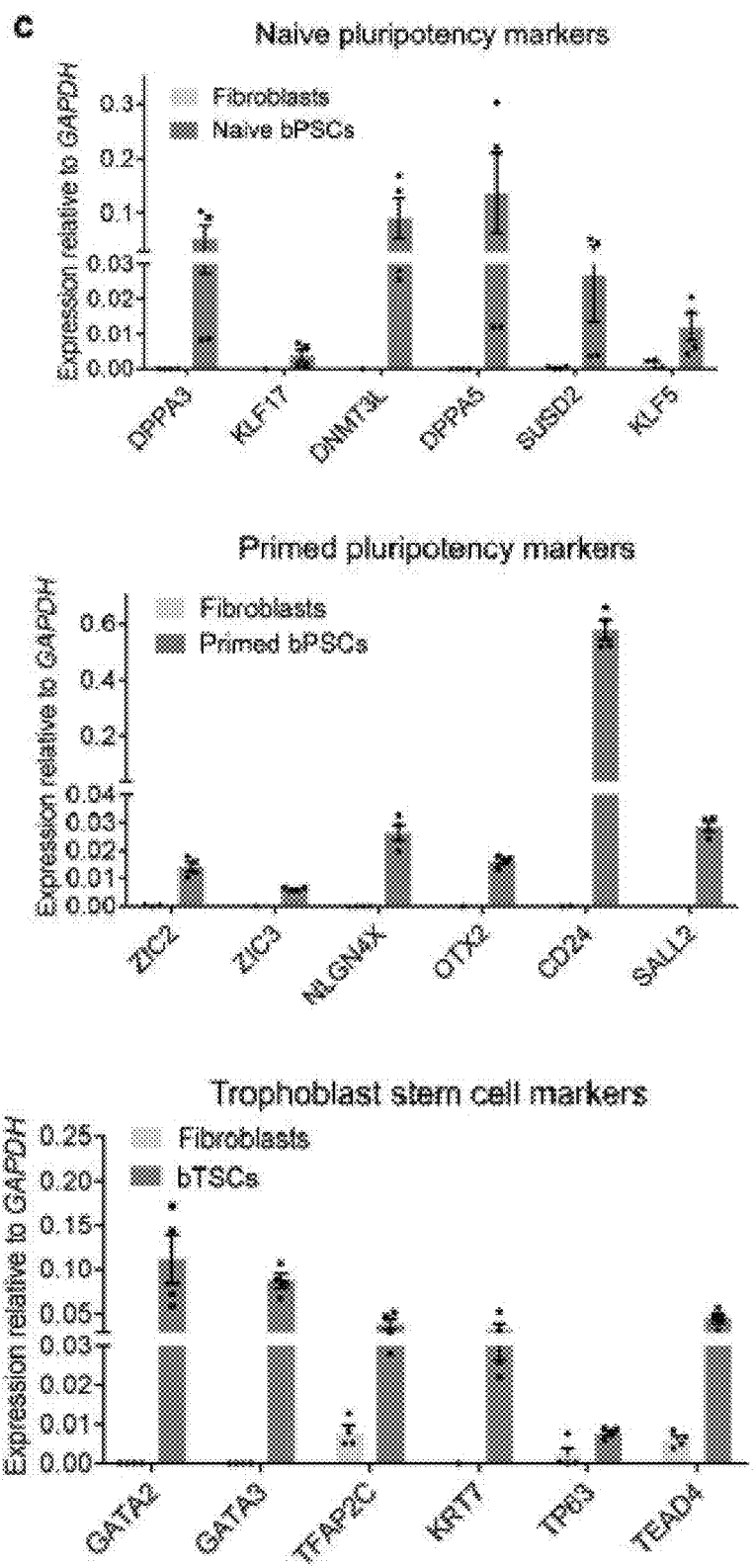
Figure 11:
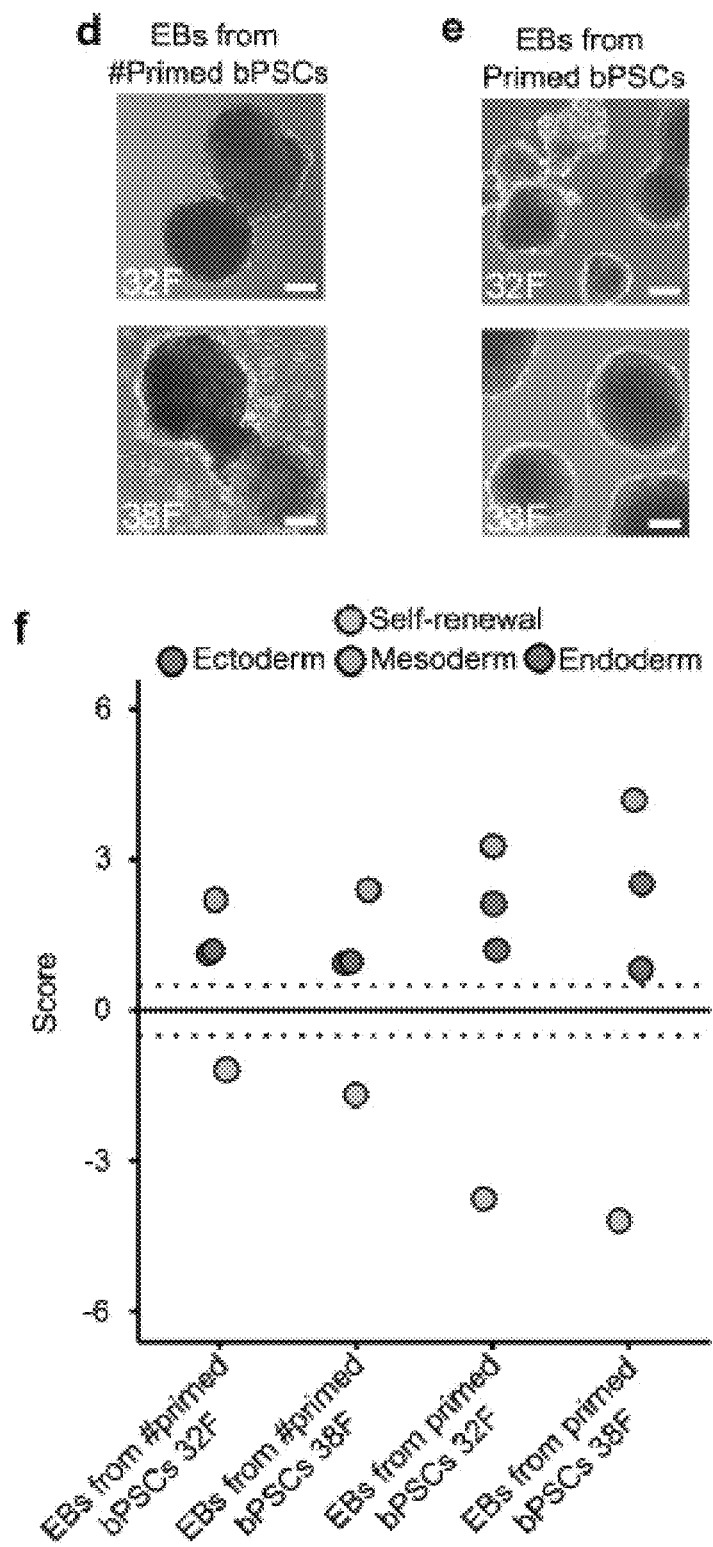
Figure 11:
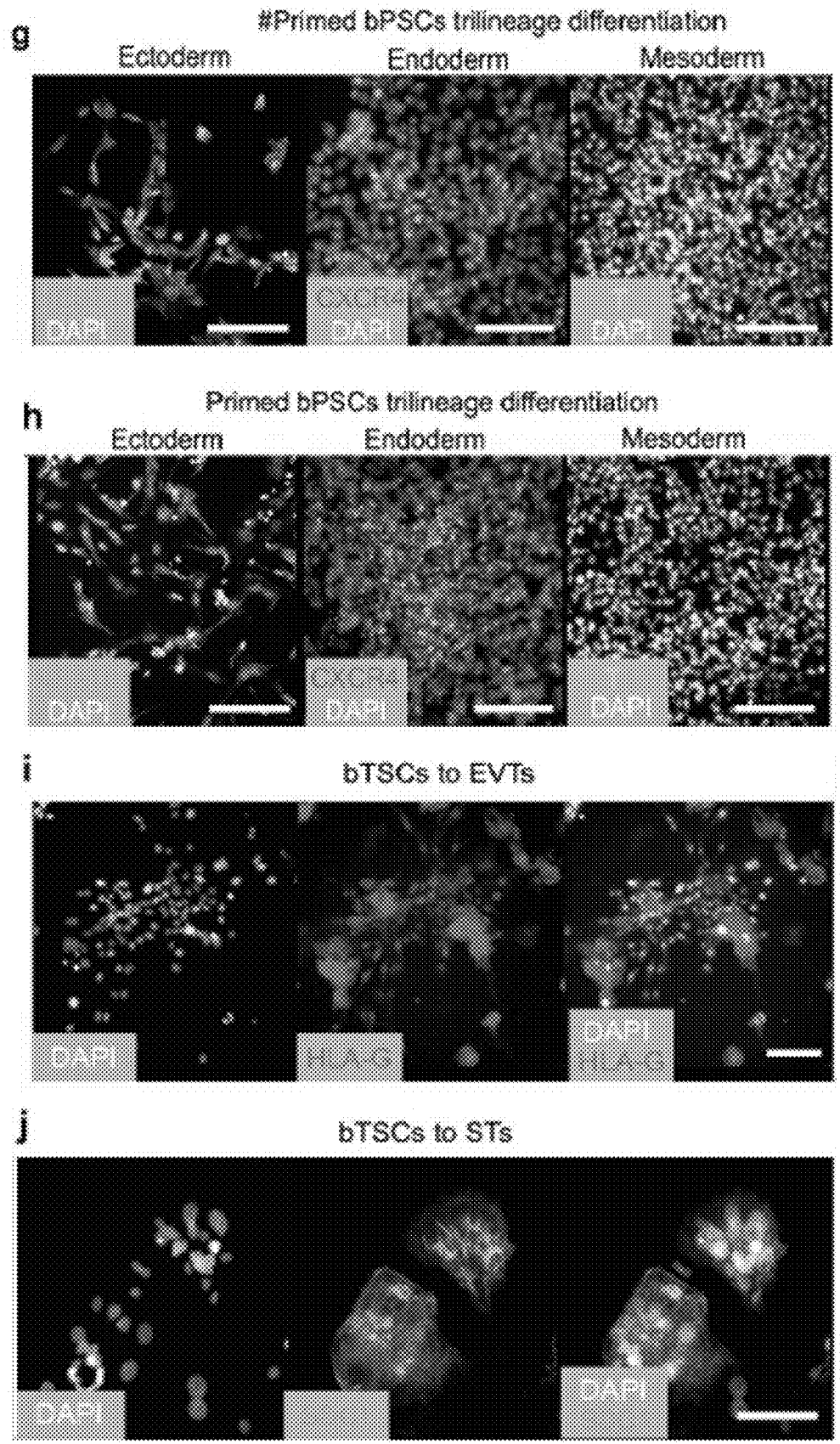
Figure 11:
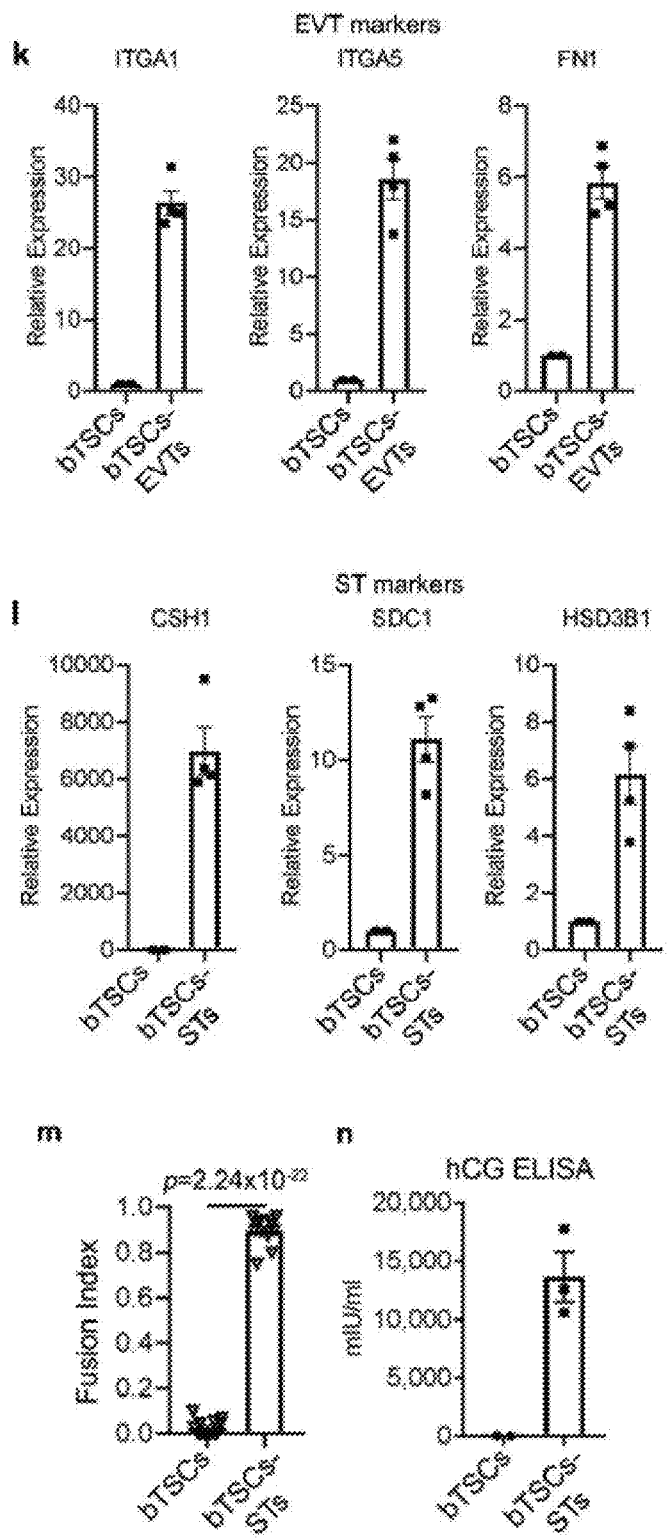

FIG. 11. Characterization of stem cells derived from iBlastoids. a, Schematic of the experimental design for characterization of naive bPSCs, primed bPSCs and bTSCs. b, Immunostaining of naive bPSCs for KLF17 and NANOG, primed bPSCs for TRA160 and NANOG and bTSCs for KRT7 and GATA2, n=2. c, qRT-PCR analysis of naive bPSCs for naive pluripotency markers, primed bPSCs for primed pluripotency markers and bTSCs for TSC markers, mean±s.e.m., n=4. d,e, EBs derived from #primed bPSCs and primed bPSCs, n=2. # indicates primed bPSCs generated from naive bPSCs. f, ScoreCard Assay analysis of EBs from #primed bPSCs and primed bPSCs, n=2. g,h, Differentiation of #primed bPSCs and primed bPSCs into ectoderm, endoderm and mesoderm lineages, n=2. i, Immunostaining of bTSCs-differentiated EVT for HLA-G (n=2 experimental replicates from 2 donors). J, Immunostaining of bTSCs-differentiated STs for SDC1, n=2. k, qRT-PCR analysis of bTSCs-differentiated EVTs for EVT markers (ITGA1, ITGA5, FN1), mean±s.e.m., n=4. l, qRT-PCR analysis of bTSCs-differentiated STs for ST markers (CSH1, SDC1, HSD3B1), mean±s.e.m., n=4. m, Fusion index of bTSCs-differentiated STs, mean±s.e.m., n=12, p values by two-tailed unpaired Student's t-test. n, hCG protein level detected by hCG ELISA using conditioned media collected from bTSCs-differentiated STs, mean±s.e.m., n=2-3. All Scale bars, 100 μm.

Figure 12:
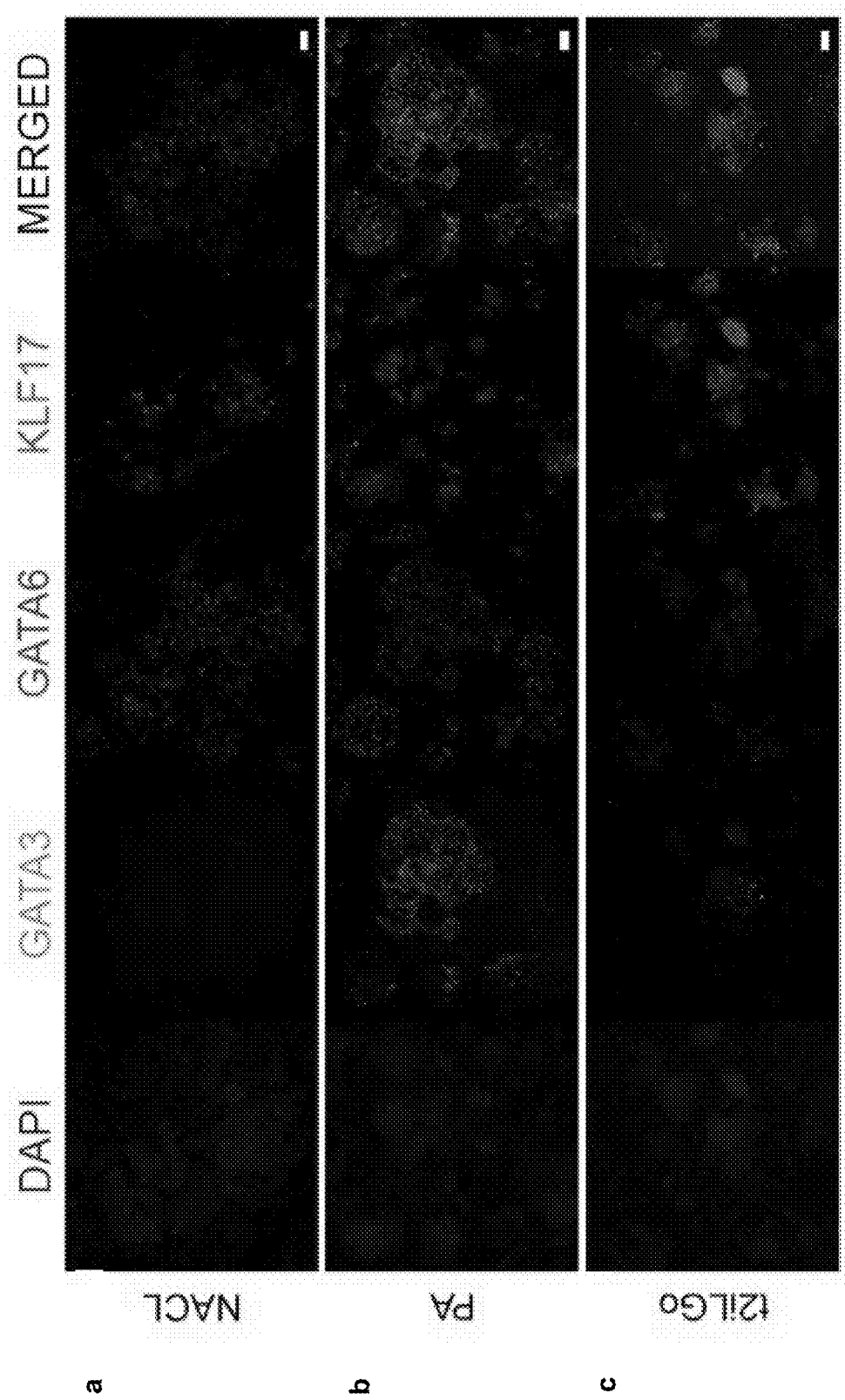

FIG. 12. Assessment of proportion of EPI, TE and PE-like cells when reprogramming in other culture conditions. D8 reprogramming intermediates were transitioned into a) NACL medium and b) PA medium and c) t2iLGo medium and assessed for proportion of EPI, TE and PE-like cells day 21 of reprogramming. GATA3 was chosen as the marker for TE-like cells, GATA6 for PE-like cells and KLF17 for EPI-like cells. Scale bar, 100 μm.

Figure 13:
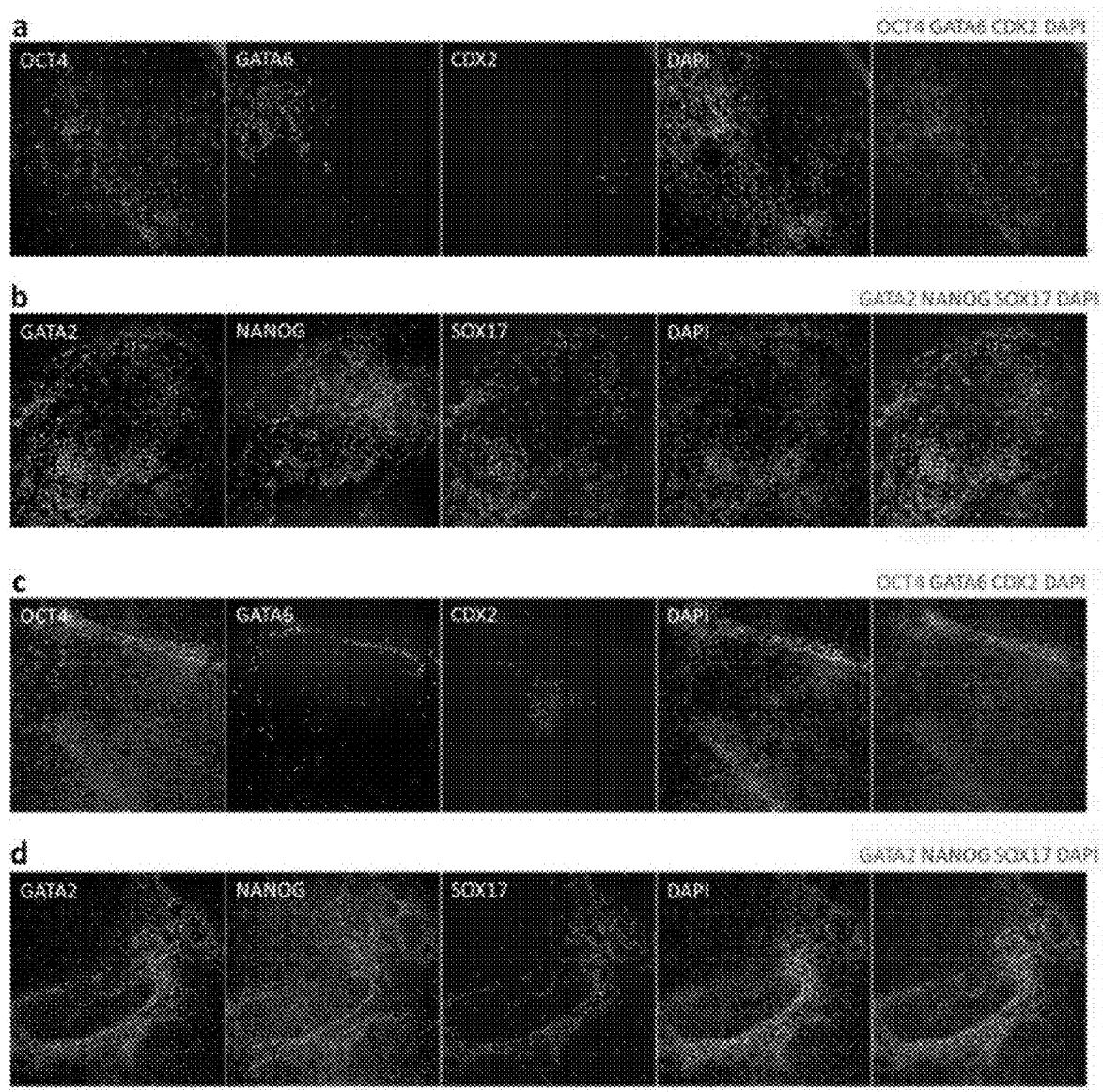

FIG. 13. Day 21 reprogrammed cells generated from human fibroblast via mRNA-mediated reprogramming. a, Immunostaining analysis of OCT4, GATA6 and CDX2 on day 21 reprogrammed cells generated from 4× OKSMNL mRNA transfection of human fibroblasts. b, Immunostaining analysis of GATA2, NANOG and SOX17 on day 21 reprogrammed cells generated from 4× OKSMNL mRNA transfection of human fibroblasts. c, Immunostaining analysis of OCT4, GATA6 and CDX2 on day 21 reprogrammed cells generated from 6× OKSMNL mRNA transfection of human fibroblasts. d, Immunostaining analysis of GATA2, NANOG and SOX17 on day 21 reprogrammed cells generated from 6× OKSMNL mRNA transfection of human fibroblasts.

Figure 14:
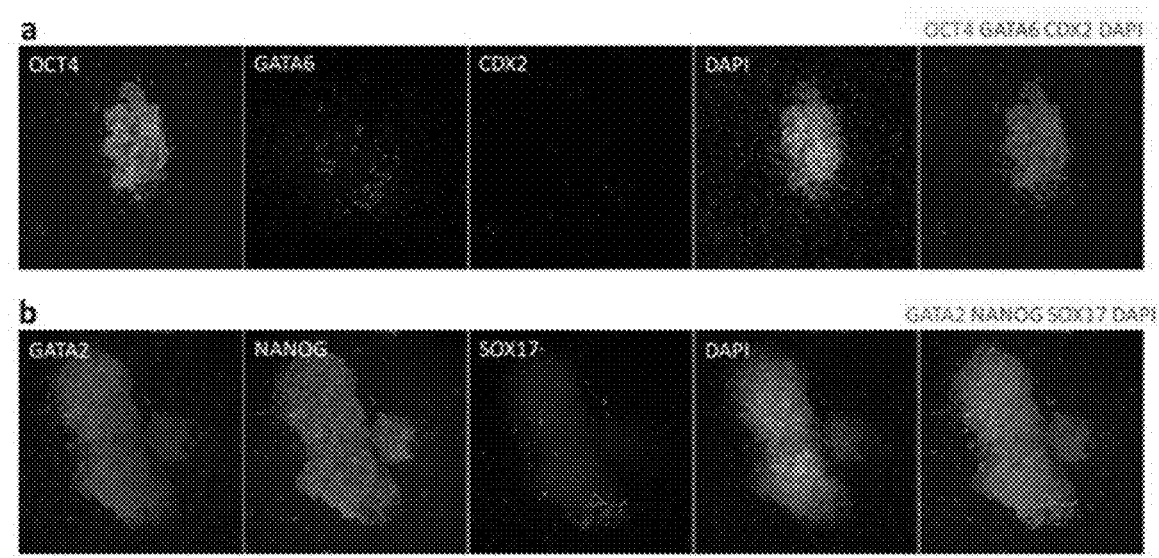

FIG. 14. Day 21 reprogrammed cells generated from human mesenchymal stem cells (hMSCs) via Sendai virus-mediated reprogramming. a, Immunostaining analysis of OCT4, GATA6 and CDX2 on day 21 reprogrammed cells generated from hMSCs. b, Immunostaining analysis of GATA2, NANOG and SOX17 on day 21 reprogrammed cells generated from hMSCs.

Figure 15:
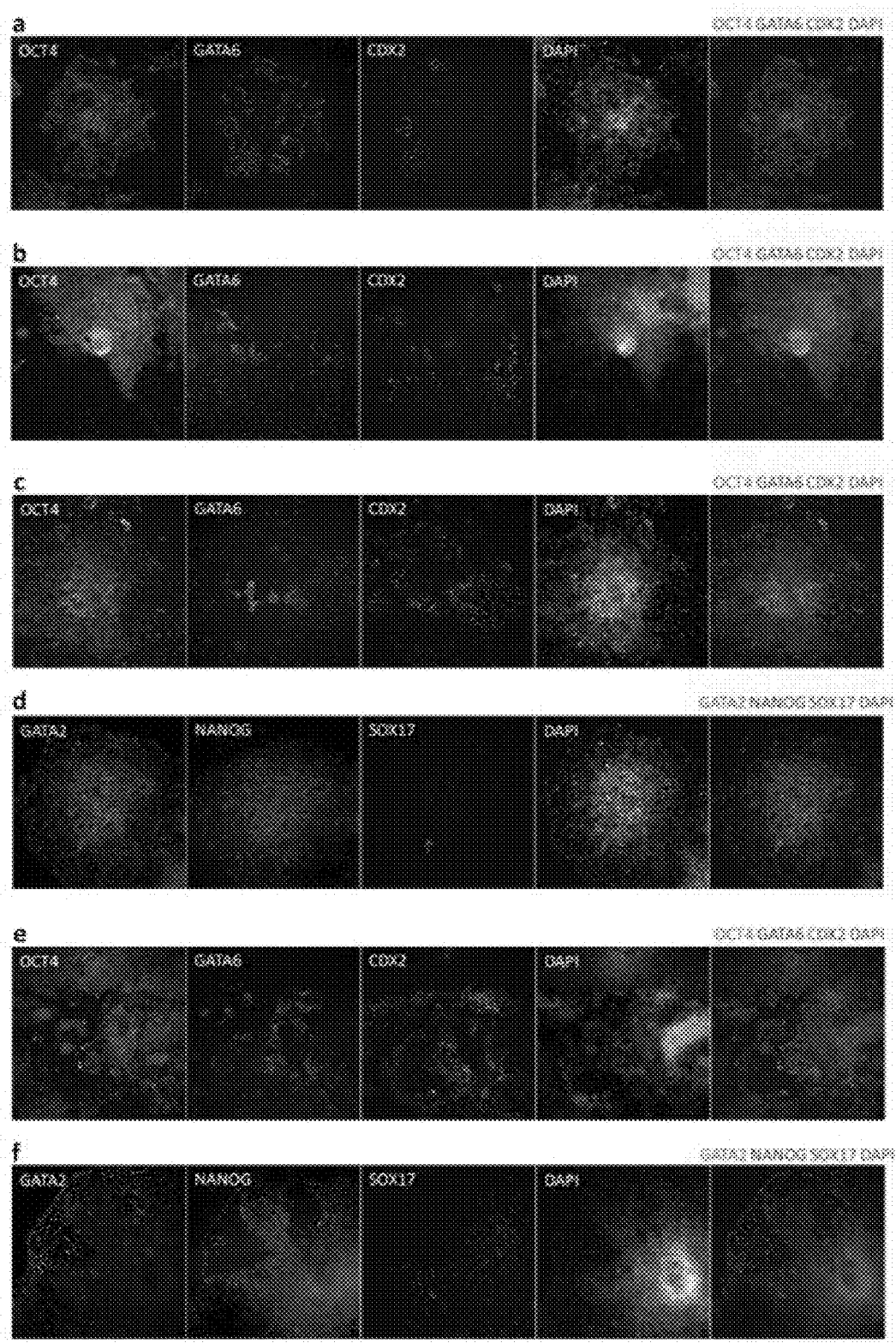

FIG. 15. Day 18 and day 21 reprogrammed cells generated from human peripheral blood mononuclear cells (hPBMCs) via Sendai virus-mediated reprogramming. a, Immunostaining analysis of OCT4, GATA6 and CDX2 on day 18 reprogrammed cells generated from hPBMCs in StemPro34 medium. b, Immunostaining analysis of OCT4, GATA6 and CDX2 on day 21 reprogrammed cells generated from hPBMCs in StemPro34 medium. c, Immunostaining analysis of OCT4, GATA6 and CDX2 on day 18 reprogrammed cells generated from hPBMCs in StemPro34 medium supplemented with 10% FBS. d, Immunostaining analysis of GATA2, NANOG and SOX17 on day 18 reprogrammed cells generated from hPBMCs in StemPro34 medium supplemented with 10% FBS. e, Immunostaining analysis of OCT4, GATA6 and CDX2 on day 21 reprogrammed cells generated from hPBMCs in StemPro34 medium supplemented with 10% FBS. f, Immunostaining analysis of GATA2, NANOG and SOX17 on day 21 reprogrammed cells generated from hPBMCs in StemPro34 medium supplemented with 10% FBS.

DETAILED DESCRIPTION OF THE EMBODIMENTS

Reference will now be made in detail to certain embodiments of the invention. While the invention will be described in conjunction with the embodiments, it will be understood that the intention is not to limit the invention to those embodiments. On the contrary, the invention is intended to cover all alternatives, modifications, and equivalents, which may be included within the scope of the present invention as defined by the claims.

One skilled in the art will recognize many methods and materials similar or equivalent to those described herein, which could be used in the practice of the present invention. The present invention is in no way limited to the methods and materials described. It will be understood that the invention disclosed and defined in this specification extends to all alternative combinations of two or more of the individual features mentioned or evident from the text or drawings. All of these different combinations constitute various alternative aspects of the invention.

For purposes of interpreting this specification, terms used in the singular will also include the plural and vice versa.

The inventors have developed a novel culturing method which derives from the unexpected finding that human somatic cells (e.g. fibroblasts) can be directly reprogrammed into human multi-layered cellular structures or blastocyst-like structures (hereon also termed iBlastoids) that faithfully recapitulate in vitro, the morphology, spatial interactions, and molecular makeup of the human blastocyst. Moreover, the iBlastoids made according to the inventors' approach, can be used to model many aspects of early human embryonic development as validated by an in vitro attachment assay using human embryo attachment culture.

Further, the inventors have developed methods to establish and maintain in culture, self-renewing cells that exhibit one or more characteristics of extraembryonic endoderm stem (XEN) cells, trophoblast stem cells (TSCs), naïve pluripotent stem cells (nPSCs) and primed pluripotent stem cells (pPSCs), derived from the multi-layered cellular structures or blastocyst-like structures.

Advantageously, obtaining XEN cells, TSCs, nPSCs and pPSCs according to the methods of the present invention avoids the moral and ethical challenges associated with otherwise deriving these cell types from human embryos. Moreover, unlike other stem cells obtained from reprogrammed somatic cells, the stem cells made according to the methods of the present invention develop in a 3 dimensional context, surrounded by cells as they exist in normal human development, and in the correct spatial orientation. Consequently, the stem cells obtained according to the methods of the present invention more faithfully align with their naturally occurring counterparts than other reprogrammed cells prepared using other methods.

As used herein, a XEN-like cell may also be referred to as a XEN cell. Both XEN-like and XEN cells may also be referred to as an iBlastoid (B)-derived XEN (BXEN) cells or iXEN cells (BXEN) cells or iXEN cells provide nutrients and support for embryonic development, and are required for embryo patterning, germ cell development and fetal hematopoietic stem cells formation. Therefore, (BXEN) cells or iXEN cells and its derivatives can be integrated with trophoblast organoids to form a sophisticated extraembryonic organoid system (artificial placenta and yolk sac) to support embryo growth in vitro. iXEN cells can be derived from patients with genetic diseases associated with PE development and yolk sac functions, and it can serve as a model for disease modeling, drug screening and potential cell therapies. iXEN cells can be used to generate a stem-cell based integrated model of human blastocysts. Furthermore, the potential of XEN cells to give rise to fetal hematopoietic stem cells could be used, in theory, in the generation of hematopoietic cells for transplants.

Cells

A blastocyst consists of three cell lineages: epiblast, trophectoderm, and primitive endoderm. The epiblast develops into most of the embryo proper, the amnion, and the extraembryonic mesoderm of the yolk sac; the trophectoderm gives rise ultimately to the placenta; and the primitive endoderm forms the two extraembryonic endoderm lineages—the visceral endoderm and the parietal endoderm of the yolk sac. The extraembryonic endoderm provides nutritive support to the embryo, and is required for several inductive events such as anterior patterning and formation of endothelial cells and blood islands.

Stem cells that are derived from these three cell lineages include: pluripotent stem cells (naive and primed; nPSCs and pPSCs), derived from the epiblast, trophoblast stem cells (TSCs) derived from the trophectoderm, and extraembryonic endoderm stem cells (XEN cells), derived from the primitive endoderm. The conventional source of these cells is the blastocyst stage embryo, although various attempts have been made by researchers in the field to reprogram somatic cells into these different stem cell lines. The methods of the present invention enable the derivation of XEN cells, TSCs, nPSCs and pPSCs from an iBlastoid (as herein described). Up to now, the derivation of human XEN or XEN-like cells from a blastocyst has not been reported.

As used herein, the term "stem cell" refers to a cell which is not terminally differentiated, i.e., it is capable of differentiating into other cell types having a more particular, specialised function. The term encompasses embryonic stem cells, fetal stem cells, adult stem cells or committed/progenitor cells.

As used herein the term XEN cell or XEN-like cell refers to an extraembryonic endoderm stem cell or a cell having one or more characteristics of the same. XEN cells are useful for the investigation of signalling pathways of cells of the extraembryonic endoderm lineage and represent an in vitro model to identify patterning activities of the extraembryonic endoderm, such as factors involved in cardiac induction.

As used herein, a characteristic of a XEN cell will be understood to include expression of one or more of the markers: XEN markers such as SALL4, GATA4. GATA6 and SOX17. A characteristic of a XEN cell may also comprise expression of one or more or all of the markers of the PE lineage as set forth in Table 2.

As used herein, a characteristic of a XEN cell or XEN-like cell will be understood to include:

flattened endodermal morphology;
expression of one or more of the markers GATA6, GATA4, PDGFRa, NID2 and BMP6,
absence of the expression of pluripotency markers such as NANOG;
secretion of ECM such as fibronectin and lamin;
production of basement membrane components such as LAMA1, COL4A1 and FN1;
development into visceral endoderm, eg, characterised by unregulated expression of AFP and HFN4a with down-regulated expression of GATA6, GATA4, PDGFRa, NID2 and BMP6.

Human trophoblast stem cells (TSCs) derived from primary placental tissues or human blastocysts are difficult to access and are highly regulated. Accordingly, having stable self-renewing TSC lines that can be derived from adult cells provides a unique opportunity not only to study human trophoblast development, but also its relationship with pluripotent cells and its role in coordinating events associated with early human embryogenesis in an in vitro context where modern biochemical and molecular techniques can be applied at scale. The TSC lines can also be used for disease modelling, drug screening and regenerative medicine.

Cells produced according to the present invention may also find utility in a variety of other clinical applications, including for generating trophoblast organoids to investigate maternal-fetal transmission of xenobiotics, drugs and pathogens, proteins and hormones. Further, human TSCs/iTSCs and iPSCs derived from primary placental tissue or reprogrammed from somatic cells of the same healthy individual or patient may be used to assemble human blastocyst-like structures. This provides an unlimited source of synthetic human blastocyst-like organoids for large scale screening studies, including for the treatment of infertility and to improve the rate of success of IVF. Still further, the iTSCs produced according to the present invention can be used in regenerative medicine. For example, placental cells have recently been shown to be useful in regenerating heart tissue. The iTSCs of the present invention can be used to generate such placenta cells, without the need to obtain cells from placenta directly.

Compared to other published methods of deriving human TSCs from human placentas or human embryos, the approach of the present invention for generating human iTSCs is more accessible, labor and cost effective, with no ethical restrictions. This approach allows unlimited supply of isogenic iTSCs for large scale screening studies using disease-specific iTSCs generated from the patients.

In any aspect of the invention, a TSC characteristic may be determined by analysis of cell morphology, gene expression profiles, activity assay, protein expression profile, surface marker profile, differentiation ability or a combination thereof. Examples of characteristics or markers include those that are described herein and those known to the skilled person.

The one or more characteristics of a TSC may include up-regulation of any one or more trophoblast markers and/or changes in cell morphology. Typically, a cell that is converted to a TSC will display 1, 2, 3, 4, 5, 6, 7, 8 or more characteristics of the TSC.

As used herein, a cell exhibiting at least one characteristic of a TSC made according to the present invention, may also be referred to as an "induced trophoblast stem cell" or iTSC.

In any embodiment of the present invention, a protein marker which is characteristic of a TSC includes: nuclear CD49f (iTGA6), CD249 (aminopeptidase A), and nuclear NR2F2, TFAP2C, nuclear GATA2/3 and P63.

In further embodiments, a cell exhibiting at least one characteristic of a TSC does not express one or more of the following markers: OCT4 (POU5F1), NANOG, SOX2, SALL2, OTX2, BANCR, KLF17, DPPA3, and DNMT3L.

Further, a cell that has at least one characteristic of a TSC has the ability to differentiate into a cell exhibiting one or more characteristics of an EVT or an ST. The skilled person will be familiar with the characteristics of an EVT or an ST cell. For example, EVT cells are characterised by an elongated spindle-like morphology and express the marker genes: HLA-G, MMP2. ST cells are characterised by a round, multi-nucleated morphology and express marker genes: hCG and SDC1. Further, TSCs typically form large, cobblestone-shaped colonies.

Additional markers which can be used to determine whether a cell has one or more characteristics of a TSC will be known to the skilled person. Examples of suitable markers are disclosed for example in Okae et al., (2018) Cell Stem Cell 22: 50-63, Deglincerti et al., (2016) Nature, 533: 751-4, Shahbazi et al., (2016 Nature Cell Biology 18: 700-708 and Niakan & Eggan (2013) Dev Biol 375: 54-64), the entire contents of which are herein incorporated in their entirety.

The methods of the present invention also relate to methods for obtaining naïve and primer pluripotent stem cells (nPSCs and pPSCs).

As used herein, the term "pluripotent" or "pluripotency" refers to cells with the ability to give rise to progeny that can undergo differentiation, under the appropriate conditions, into cell types that collectively demonstrate characteristics associated with cell lineages from all of the three germinal layers (endoderm, mesoderm, and ectoderm). Pluripotent stem cells can contribute to many or all tissues of a prenatal, postnatal or adult animal. A standard test that is accepted in the art, such as the ability to form a teratoma in 8-12 week old SCID mice, can be used to establish the pluripotency of a cell population, however identification of various pluripotent stem cell characteristics can also be used to detect pluripotent cells.

As used herein, "naïve pluripotent state" or "naïve pluripotent phenotype" will be understood to refer to a cell phenotype that includes cells that are round, dome-shaped. As used herein, a naïve pluripotent state refers to a pluripotent states that more closely resembles the pre-implantation embryo.

As used herein, a "primed pluripotent state" or "primed pluripotent phenotype" typically refers to a cell phenotype characterised by the presence of flat cell colonies with clear borders. As used herein, a primed pluripotent state refers to a pluripotent states that more closely resembles the epiblast of the post-implantation embryo.

As used herein, reference to "pluripotent state", "pluripotent stem cell characteristics" or "one or more characteristics of a pluripotent cell", refers to characteristics of a cell that distinguish pluripotent stem cells from other cells. The ability to give rise to progeny that can undergo differentiation, under the appropriate conditions, into cell types that collectively demonstrate characteristics associated with cell lineages from all of the three germinal layers (endoderm, mesoderm, and ectoderm) is a pluripotent stem cell characteristic. Expression or non-expression of certain combinations of molecular markers are also pluripotent stem cell characteristics. For example, human pluripotent stem cells express at least one, two, or three, and optionally all, of the markers from the following non-limiting list: SSEA-3, SSEA-4, TRA-1-60, TRA-1-81, TRA-2-4916E, ALP, SO2, E-cadherin, UTF-1, OCT4 (POU5F1), REX1, and NANOG.

Cell morphologies associated with pluripotent stem cells are also pluripotent stem cell characteristics. Pluripotent cells are typically characterised by the capacity for self-renewal, the ability to give rise to cell type of the three germ layers and the expression of pluripotent markers such as OCT4 (POU5F1), NANOG and SOX2. Pluripotent cells typically grow in colonies which are flat with clear borders (when in the primed state) or dome-shaped (when in the naïve state). This can be contrasted with the morphology of somatic cells, for example, fibroblasts which are large and elongated. Markers expressed by both naïve and primed pluripotent cells include: OCT4 (POU5F1), SOX2, NANOG, KLF4, EPCAM, and PRDM14.

Markers which are expressed only by naïve pluripotent cells or only expressed by primed pluripotent cells are listed in Table 5 herein.

The skilled person will be familiar with the terms "naïve" and "primed" in respect of stem cells. These terms were identified more than a decade ago in order to describe early and late phases of epiblast ontogeny and to describe ESC and EpiSC derivatives. As used herein, a naïve pluripotent state refers to a pluripotent state that more closely resembles the pre-implantation embryo. In some circumstances, the term "naïve state" is used interchangeably with the term "ground state". Naïve state cells are a stable self-renewing culture of homogeneous pluripotent stem cells that are substantially epigenetically reset compared to somatic cells and have the developmental identity and functional capacity of pre-implantation epiblast.

In certain embodiments, a naïve pluripotent cell may express mRNA and protein of pre-implantation epiblast specific transcription factors. For example, naïve cells may express 1, 2, 3, 4, 5, 6, 7, 8, 9, 10, 11, 12, 13, 14, 15, 16, 17, 18, 19, 20, 21, 22, 23, 24, 25 or all of: KLF2, KLF4, TFCP2L1, TBX3, REX1, GBX2, STELLA (DPPA3), KLF17, DPPA3, DPPA5, TFCP2L1, MAEL, UTF1, ZFP57, DNMT3L, FGF4, FOXR1, ARGFX, TRIM60, DDX43, BRDT, ALPPL2, KHDC3L, KHDC1L and PRAP1. Other markers indicative of a naïve pluripotent state are shown in Table 5.

In certain embodiments, a primed pluripotent cell may express mRNA and protein of post-implantation epiblast specific transcription factors. For example, primed cells may express 1, 2, 3, 4, 5, 6, 7, 8, 9, 10, 11, 12, 13, 14, 15 or all of: SFP, EOMES, BRACHYURY, OTX2, ZIC2, ZIC3, ZIC5, DNMT3B, KDR, CDH2, CER1, COL2A1, DAZL, TCF7L1, SOX11, SALL2. Other markers indicative of a primed pluripotent state are shown in Table 5.

Since identifying naïve and primed pluripotent states, a number of different culture media have been developed which are suitable for sustaining pluripotent cells in either state. The skilled person will be familiar with such media, examples of which are provided further herein.

Still further, naïve cells may be characterised by their morphology. A naïve phenotype is typically characterised by tightly-packed, round, domed appearance. The cells may also be described as forming compact refractile colonies. In accordance with a preferred embodiment of the present invention, cells that are cultured in the second culture media have not developed a morphology that is typical of naïve cells when they are transitioned into the third culture medium.

As further described herein, the cells obtained according to the methods of the present invention can be differentiated into specific cell types, including any somatic cell known to the skilled person.

As used herein, a "somatic cell" refers to a terminally differentiated cell. The term "somatic cell" refers to any cell forming the body of an organism, as opposed to germline cells. In mammals, germline cells (also known as "gametes") are the spermatozoa and ova which fuse during fertilization to produce a cell called a zygote, from which the entire mammalian embryo develops. Every other cell type in the mammalian body—apart from the sperm and ova, the cells from which they are made (gametocytes) and undifferentiated stem cells—is a somatic cell: internal organs, skin, bones, blood, and connective tissue are all made up of somatic cells.

The somatic cells derived from the stem cells of the present invention can also be used to derive an organoid. As used herein, an organoid is a collection of organ-specific cell types that develops from stem cells or organ progenitors, self-organizes through cell sorting and spatially restricted lineage commitment in a manner similar to in vivo, and exhibits properties including: multiple organ-specific cell types; is capable of recapitulating some specific function of the organ (e.g. contraction, neural activity, endocrine secretion, filtration, excretion); its cells are grouped together and spatially organized, similar to an organ. Organoids may be used as a tool to study basic biological processes including various disease processes, drug screening, and response to different environmental stimuli.

Culturing of Cells

In the first and third aspects of the invention, the cells are cultured in contact with feeder cells. Exemplary feeder cells include, but are not limited to fibroblast cells, e.g., mouse embryonic fibroblast (MEF) cells. Methods of culturing cells on feeder cells is known in the art.

In some aspects of the invention, for example the second and fourth aspects, the cells are cultured in the absence of feeder cells. Cells, for example, can be attached directly to a solid culture surface (e.g., a culture plate), e.g., via a molecular tether. The inventors have found that culturing cells induced to pluripotency have a much greater efficiency of induction to pluripotency (i.e., a greater portion of cells achieve pluripotency) when the cells are attached directly to the solid culturing surface compared the efficiency of otherwise identically-treated cells that are cultured on feeder cells. Exemplary molecular tethers include, but are not limited to, matrigel, an extracellular matrix (ECM), ECM analogs, laminin, fibronectin, vitronectin or collagen. Those of skill in the art however will recognize that this is a non-limiting list and that other molecules can be used to attach cells to a solid surface. Methods for initial attachment of the tethers to the solid surface are known in the art.

As used herein, "feeder cells" or "feeders" are terms describing cells of one type that are co-cultured with cells of a second type to provide an environment in which the cells of the second type can grow, as the feeder cells provide growth factors and nutrients for the support of the second cell type. The feeder cells are optionally from a different species as the cells they are supporting. For example, certain types of human cells, including stem cells, can be supported by primary cultures of mouse embryonic fibroblasts, or immortalized mouse embryonic fibroblasts. The feeder cells may typically be inactivated when being co-cultured with other cells by irradiation or treatment with an anti-mitotic agent such as mitomycin to prevent them from outgrowing the cells they are supporting. Feeder cells may include endothelial cells, stromal cells (for example, epithelial cells or fibroblasts), and leukemic cells. Without limiting the foregoing, one specific feeder cell type may be a human feeder, such as a human skin fibroblast. Another feeder cell type may be mouse embryonic fibroblasts (MEF). In general, various feeder cells can be used in part to maintain pluripotency, direct differentiation towards a certain lineage and promote maturation to specialized cell types, such as an effector cell.

As used herein, a "dissociated" cell refers to a cell that has been substantially separated or purified away from other cells or from a surface (e.g., a culture plate surface). For example, cells can be dissociated from an animal or tissue by mechanical or enzymatic methods. Alternatively, cells that aggregate in vitro can be dissociated from each other, such as by dissociation into a suspension of clusters, single cells or a mixture of single cells and clusters, enzymatically or mechanically. In yet another alternative embodiment, adherent cells are dissociated from a culture plate or other surface. Dissociation thus can involve breaking cell interactions with extracellular matrix (ECM) and substrates (e.g., culture surfaces), or breaking the ECM between cells.

Culture Medium—PSCs

The skilled person will be familiar with the culture medium composition and culture conditions for
  promoting reprogramming of a cell towards a dedifferentiated or pluripotent state;
  promoting a naïve pluripotent state; and
  promoting a primed pluripotent state.

In one embodiment, the medium for promoting a naïve pluripotent state and for use in accordance with the methods described herein, comprises a MEK inhibitor, a PKC inhibitor, a GSK3 inhibitor, a STAT3 activator and a ROCK inhibitor.

Reference to a MEK inhibitor refers to MEK inhibitors in general. A MEK inhibitor may inhibit any member of the MEK family of protein kinases, including MEK1, MEK2, and MEK5. Examples of suitable MEK inhibitors are known in the art and include PD184352 and PD98059, inhibitors of MEK1 and MEK2 U0126 and SL327. In particular, PD184352 and PD0325901 have been found to have a high degree of specificity and potency compared to other known MEK inhibitors.

Examples of protein kinase C (PKC) inhibitors include, Gö6983 (3-[1-[3-(dimethylamino)propyl]-5-methoxy-1H-indol-3-yl]-4-(1H-indol-3-yl)-1H-pyrrole-2,5-dione (Gschwendt et al., 1996 FEBS Lett 392:77-80). Another preferred PKC inhibitor is Ro-31-8425. Preferably the PKC inhibitor is present in the medium at a concentration of between 0.01 to 10 µM, 0.1 to 5 µM, preferably 1 to 4 µM.

Reference to GSK3 inhibition refers to inhibition of one or more GSK3 enzymes. The family of GSK3 enzymes is well known and a number of variants have been described. In certain embodiments, GSK3β is inhibited. GSK3-α inhibitors may also be used. A wide range of GSK3 inhibitors is known, by way of examples, the inhibitors CHIR 98014, CHIR 99021, AR-A0144-18, TZD-8, SB21676763 and SB415286.

Inhibitors may be provided or obtained by those skilled in the art by convention means or from conventional sources. The inhibitor may be a small molecule inhibitor or an interfering RNA (RNAi). The skilled person will also be familiar with various methods and assays for identifying kinase inhibitors.

Examples of STAT3 activators include LIF, preferably hLIF.

The combination of a MEK inhibitor, a GSK3 inhibitor and LIF may be referred to as 2iL.

As used herein, a ROCK inhibitor refers to an inhibitor of Rho-binding kinase. Examples of such inhibitors include ((1R,4r)-4-((R)-1-aminoethyl)-N-(pyridin-4-yl)cyclohexane carboxamide, Abcam), also known as trans-N-(4-(1-aminoethyl)-cyclohexanecarboxamide, 1-(5-isoquinolunyl) (sulfonyl) homopiperazine (1-(5-isoquinolinylsulfonyl)homopiperazine. Typically the amount of ROCK inhibitor will be between about 0.1 to 50 µM, preferably about 1 to 10 µM.

"Inhibitors," "activators," and "modulators" of expression or of activity are used to refer to inhibitory, activating, or modulating molecules, respectively, identified using in vitro and in vivo assays for expression or activity of a described target protein, e.g., ligands, agonists, antagonists, and their homologs and mimetics. The term "modulator" includes inhibitors and activators. Inhibitors are agents that, e.g., inhibit expression or bind to, partially or totally block stimulation or protease inhibitor activity, decrease, prevent, delay activation, inactivate, desensitize, or down regulate the activity of the described target protein, e.g., antagonists. Activators are agents that, e.g., induce or activate the expression of a described target protein or bind to, stimulate, increase, open, activate, facilitate, enhance activation or protease inhibitor activity, sensitize or up regulate the activity of described target protein (or encoding polynucleotide), e.g., agonists. Modulators include naturally occurring and synthetic ligands, antagonists and agonists (e.g., small chemical molecules, antibodies and the like that function as either agonists or antagonists). Such assays for inhibitors and activators include, e.g., applying putative modulator compounds to cells expressing the described target protein and then determining the functional effects on the described target protein activity, as described above. Samples or assays comprising described target protein that are treated with a potential activator, inhibitor, or modulator are compared to control samples without the inhibitor, activator, or modulator to examine the extent of effect. Control samples (untreated with modulators) are assigned a relative activity value of 100% Inhibition of a described target protein is achieved when the activity value relative to the control is about 80%, optionally 50% or 25, 10%, 5% or 1%. Activation of the described target protein is achieved when the activity value relative to the control is 110%, optionally 150%, optionally 200, 300%, 400%, 500%, or 1000-3000% or more higher.

As used herein, "inhibit," "prevent" or "reduce," or "inhibiting," "preventing" or "reducing" are used interchangeably herein. These terms refer to the decrease in a measured parameter (e.g., activity, expression, mitochondrial respiration, mitochondrial oxidation, oxidative phosphorylation) in a treated cell (tissue or subject) in comparison to an untreated cell (tissue or subject). A comparison can also be made of the same cell or tissue or subject between before and after treatment. The decrease is sufficient to be detectable. In some embodiments, the decrease in the treated cell is at least about 10%, 20%, 30%, 40%, 50%, 60%, 70%, 80%, 90%, or completely inhibited in comparison to an untreated cell. In some embodiments the measured parameter is undetectable (i.e., completely inhibited) in the treated cell in comparison to the untreated cell.

Examples of suitable culture medium are summarised in Table 1 below:

TABLE 1

Cell culture media that can be used to culture pluripotent stem cells of the invention.

| Cell | Media | Cat#: | Company/Reference |
|---|---|---|---|
| Naïve media | T2iLGoY | N/A | Guo et al., (2016) Stem Cell Reports, 6(4): P437-446 |
| | 5iLAF | N/A | Theunissen et al., (2014) Cell Stem Cell, 15: 471-487 |

TABLE 1-continued

Cell culture media that can be used to culture pluripotent stem cells of the invention.

| Cell | Media | Cat#: | Company/Reference |
|---|---|---|---|
| | RSeT | #05978 | StemCell Technologies |
| | PXGL | N/A | Bredenkamp et al., (2019) Stem Cell Reports, https://doi.org/10.1016/j.stemcr.2019.10.009 |
| | NHSM | N/A | Gafi et al., (2013) Nature, 504(7479): 282-6 |
| | hPGCLC Induction medium | N/A | Irie et al (2015) Cell, 160: 253-268 |
| Primed media | KSR/FGF2 | N/A | Eiselleovat et al., (2009) Stem Cells, 27: 1847-57 |
| | Essential 8 | #A151-7001 | ThermoFisher |
| | mTeSR | #85850 | StemCell Technologies |
| | AKIT | N/A | Yasuda et al., (2018) Nature Biomedical Engineering, 2: 173-182 |
| | B8 | N/A | Kuo et al., (2019) http://dx.doi.org/10.1101/685503. |
| rosette-stage pluripotency | | | https://pubmed.ncbi.nlm.nih.gov/32367046/ |
| formative pluripotency | | | https://www.biorxiv.org/content/10.1101/2020.09.04.283218v1 |
| Expanded pluripotency | | | https://www.nature.com/articles/s41556-019-0333-2 |

As used herein, hPGCLC induction medium refers to human primordial germ cell-like cells induction medium.

RSeT™ Medium is a defined cell culture medium used for the maintenance of naïve-like hPSCs under feeder-dependent and hypoxic conditions. RSeT™ Medium contains pre-screened quality components and does not contain bFGF or TGFβ. It is compatible with human embryonic stem (ES) cells and human induced pluripotent stem (iPS) cells.

hPSCs cultured in RSeT™ Medium exhibit features of a naïve-like state such as tightly packed, domed colonies with refractive edges. Key transcripts associated with naïve-like hPSCs such as KLF2, KLF4, and TFCP2L1 show increased expression in hPSCs cultured in RSeT™ Medium. RSeT™ hPSCs can be converted back to a primed state by culture in mTeSR™1 and can then be differentiated using standard techniques.

Exemplary t2iLGoY medium:
a 50:50 mixture of DMEM/F-12 (Gibco) and Neurobasal medium (Gibco), supplemented with 2 mM L-glutamine (Gibco),
0.1 mM 2-mercaptoethanol (Gibco),
0.5% N2 supplement (Gibco),
1% B27 supplement (Gibco),
1% Pen-strep (Gibco),
10 ng/ml human LIF (made in house),
250 µM L-ascorbic acid (Sigma),
10 µg/ml recombinant human insulin (Sigma),
1 µM PD0325901 (Miltenyi Biotec),
1 µM CHIR99021 (Miltenyi Biotec),
2.5 µM Gö6983 (Tocris),
10 µM Y-27632 (abcam).

Culture Medium—TSCs

A culture medium that is suitable for supporting TSC and proliferation thereof is preferably a culture medium as described in Okae (2018) Cell Stem Cell, and WO 2016/143866, the contents of which are hereby incorporated by reference.

The base media composition of the TSC may be any base medium typically used, including DMEM, MEM, RPMI 1640 and the like. Serum, growth factors, pyruvate, amino acids, antibiotics and the like can be appropriately included in the medium.

The TSC culture preferably comprises at least one growth factor and at least one ROCK inhibitor.

As used herein, a growth factor may be any growth factor, but is preferable one selected from Epidermal Growth Factor (EGF), insulin, transforming growth factor (TGF). The amount of growth factor may be any amount, for example 0.1 to 1000 ng/ml, preferably 10-100 ng/ml.

As used herein, a ROCK inhibitor refers to an inhibitor of Rho-binding kinase. Examples of such inhibitors include ((1R,4r)-4-((R)-1-aminoethyl)-N-(pyridin-4-yl)cyclohexane carboxamide, Abcam), also known as trans-N-(4-(1-aminoethyl)-cyclohexanecarboxamide, 1-(5-isoquinolunyl) (sulfonyl) homopiperazine (1-(5-isoquinolinylsulfonyl)homopiperazine. Typically the amount of ROCK inhibitor will be between about 0.1 to 50 µM, preferably about 1 to 10 µM.

In certain preferred embodiments, the TSC culture is the ASECRiAV medium described in Okae et al., and comprises: A83-01, SB431542, EGF, CHIR, a ROCK inhibitor, ascorbic acid and valproic acid.

Most preferably the TSC media comprises:
DMEM/F-12,
GlutaMAX™ (ThermoFisher) supplemented with 0.3% BSA (Sigma),
0.2% FBS (ThermoFisher),
1% ITS-X supplement (ThermoFisher),
0.1 mM 2-mercaptoethanol (ThermoFisher),
0.5% Pen-Strep (ThermoFisher),
1.5 µg/ml L-ascorbic acid (Sigma),
5 µM Y27632 ((1R,4r)-4-((R)-1-aminoethyl)-N-(pyridin-4-yl)cyclohexane carboxamide, Abcam),
2 µM CHIR99021 (6-((2-((4-(2,4-Dichlorophenyl)-5-(4-methyl-1H-imidazol-2-yl)pyrimidin-2-yl)amino)ethyl) amino) nicotinonitrile Miltenyi Biotec),
0.5 µM A83-01 (3-(6-Methyl-2-pyridinyl)-N-phenyl-4-(4-quinolinyl)-1H-pyrazole-1-carbothioamide, Sigma),
1 µM SB431542 (4-[4-(1,3-benzodioxol-5-yl)-5-(2-pyridinyl)-1H-imidazol-2-yl]benzamide)
50 ng/ml EGF (Peprotech) and
0.8 mM Valproic acid (VPA, Sigma).

Culture Medium—XEN Cells

A culture medium useful in the establishment of XEN or XEN-like cells of the invention comprises leukemia inhibitory factor (LIF), a GSK-3 inhibitor, Activin A and a ROCK inhibitor.

Preferably, the ROCK inhibitor is present at a concentration of about 10 µM. Typically, the seeded cells are cultured in the culture medium comprising a ROCK inhibitor for 1 or 2 days, or until the seeded cells are attached to the feeder layer. After attachment, the culture medium comprising leukemia inhibitory factor (LIF), a GSK-3 inhibitor and Activin A (without a ROCK inhibitor) may be used and replaced every other day. Therefore, a culture medium that is useful in the maintenance of XEN or XEN-like cells of the invention comprises leukemia inhibitory factor (LIF), a GSK-3 inhibitor, Activin A, wherein the culture medium does not contain a ROCK inhibitor.

Most preferably the XEN or XEN-like media, or medium for the establishment and/or maintenance of XEN or XEN-like cells comprises:

50:50 mixture of DMEM/F-12 (ThermoFisher) and Neurobasal medium (ThermoFisher),
2 mM L-Glutamine (ThermoFisher),
0.1 mM 2-mercaptoethanol (ThermoFisher),
0.5% N2 supplement (ThermoFisher),
1% B27 supplement (ThermoFisher),
1% Penicillin-streptomycin (ThermoFisher),
10 ng/ml human leukemia inhibitory factor (LIF),
3 µM CHIR99021 (Miltenyi Biotec) and
100 ng/ml Activin A (Peprotech),
Optionally with a ROCK inhibitor, as described herein, at about 10 µM The methods of the present invention may further comprise the step of differentiating. For example, the methods may comprise differentiating the cells exhibiting at least one characteristic of a TSC to a cell exhibiting at least one characteristic of an EVT or an ST. Further, the methods may comprise differentiating an nPSC or pPSC made according to the invention, comprising culturing the PSCs to generate a cell having at least one characteristic of a differentiated cell or a cell that is not in a pluripotent state. As used herein, the term "differentiating" refers to converting a progenitor cell (e.g., a bipotential or multipotent cell) in conditions for enabling the cell to reach a designated, specialised cell fate that is not multi or pluripotent. Such methods generally include increasing the levels of various factors that are associated with the specialised (differentiated) cell.

According to specific embodiments, the TSC cells made according to the present invention, can be used to isolate lineage-specific cells, for example ST and EVTs. The skilled person will be familiar with standard methods for differentiating the TSCs generated according to the present invention. Briefly, TSCs can be differentiated to syncytiotrophoblasts (STs) by subjecting the TSCs to MEFBAP treatment (MEF conditioned media, BMP4, TGFβi, FGFRi, as described in Amita et al., 2013 PNAS, 110: E1212-1221). Alternatively, exposure of TSCs to forskolin treatment can also be used to differentiate TSCs towards ST fate.

Further methods for differentiation are disclosed in Kidder (2014) Methods Mol Biol, 1150-201-12; Lei et al., (2017) Placenta, 28: 14-12; and Chen et al., (2013) Biochemical and Biophysical Research Communications, 431; 179-202. The methods may include culturing cells in a medium devoid of GFG4 and heparin. The methods may also involve genetic modification of the cells in media comprising differentiation factors.

Successful differentiation to STs can be determined by measuring basal β-hCG (human chorionic gonadotropin) secretion as well as expression of human placental lactogen genes. Alternatively, successful differentiation to STs can be determined by the presence of SDC1+ multinucleated cells. Successful differentiation to EVT fate can be confirmed by determining protein expression of one or more markers selected from: HLA-G, PRG2 and PAPP2.

Similarly, methods for differentiation of PSCs is generally well known in the art. Such methods are well described for example in Zhu et al., (2013) Development, 140: 705-717; and Bar and Benvenisty (2020) Nature Reviews Molecular Biology, 5 Nov. 2020.

Successful differentiation of PSCs into a terminally differentiated cell fate can be confirmed by determining the protein expression of one or more markers or morphological features that are characteristic of the differentiated cell type. Morphological and gene expression markers characteristic of somatic cells will be known to the skilled person. In certain examples, where the differentiated cell is a dermal fibroblast, morphological characteristics include a flattened shape and markers include: CD13 (ANPEP), CD44, TWIST1 and ZEB1.

Where the differentiated cell is a keratinocyte, relevant markers include keratin1, keratin14 and involucrin and the cell morphology is cobblestone appearance. Endothelial cell markers include CD31 (Pe-CAM), VE-Cadherin and VEGFR2 and the cell morphology may be a capillary-like structure. Markers of an epithelial cell include cytokeratin 15 (CK15), cytokeratin 3 (CK3), involucrin and connexin 4. Preferably the observed morphology is a cobblestone appearance. Markers of haemaotopoietic stem cells may comprise CD45 (pan haematopoietic marker), CD19/20 (B-cell markers), CD14/15 (myeloid), CD34 (progenitor/SC markers), CD90 (SC). Markers of mesenchymal stem cells comprise: CD13, CD29, CD90, CD105, CD10, CD45.

Multi-Layered Cellular Structures or Blastocyst-Like Structures

In any aspect, the in vitro-derived or in vitro-generated multi-layered cellular structure or blastocyst-like structures for use in accordance with the methods of the present invention, comprises an inner cell layer and an outer cell layer, the inner cell layer comprises cells that exhibit one or more characteristics of cell of the epiblast and/or the primitive endoderm lineage, and the outer cell layer comprises cells that exhibit one or more characteristics of a cell of the trophectoderm. Preferably the characteristic may be determined by analysis of cell morphology, gene expression profiles, activity assay, protein expression profile, surface marker profile, differentiation ability or a combination thereof. Examples of characteristics or markers include those that are described herein and those known to the skilled person.

In any aspect, the inner cell layer further comprises a cluster of cells that exhibit one or more characteristics of the PE. Preferably the cells that exhibit one or more characteristics of the PE are, or are predominantly, peripheral to the cells that exhibit one or more characteristics of a cell of the epiblast.

In any aspect, the inner cell layer is an inner cell mass-like tissue that behaves essentially as a naturally-formed inner cell mass.

In any aspect, the outer cell layer is a trophectoderm-like tissue that behaves essentially as a naturally-formed trophectoderm.

The multi-layered cellular structure or blastocyst-like structure may also be referred to as an artificial blastocyst comprising a trophectoderm-like tissue that surrounds a blastocoel and an inner cell mass-like tissue.

In any aspect, the characteristic of an EPI cell is presence of any one or more of the markers NANOG, OCT4 (also known as POU5F1) or SOX2. In one embodiment, more cells in the multi-layered cellular structure or blastocyst-like structure express OCT4 than NANOG.

In any aspect, the characteristic of an EPI cell is the morphology of a rounded columnar appearance.

In any aspect, the characteristic of a TE cell is presence of one or more of the markers CDX2 and GATA2.

In any aspect, the characteristic of a TE cell is a flattened or elongated epithelial morphology.

In any aspect, the characteristic of a PE cell is presence of the marker SOX17 or GATA6.

TABLE 2

EPI, TE and PE transcriptional signatures

| Lineage | Marker (gene that is expressed) |
|---|---|
| EPI | ACE, ARGFX, ASH2L, BTLA, CASP8, CFLAR, CPT1A, DPPA2, DPPA4, DPPA5, FOXD3-AS1, HEY2, ITFG3, KLF17, LAPTM4B, LDLRAP1, MT1X, NGEF, PBX3, PLA2G4F, POU5F1, PRDM14, PSORS1C2, SERPINB6, SH3PXD2A, SHPK, SLC25A12, SOX2, SUSD2, TNFRSF8, UBTD1, AARS2, ABHD12B, ANKRD45, APOBEC3C, APOBEC3D, ATP8B2, BCOR, CAMKV, CAPG, CBFA2T2, CCDC80, CDHR1, CHST2, CREBL2, CXCL12, DND1, DOCK6, ESRG, ETV1, ETV4, FAM124A, FAM46B, FBP1, FGF4, GDF3, GGT1, GK, GPRC5C, GUCA1A, IFITM1, IGSF1, IL23A, LIM2, LINC01108, LRP4, MAN1C1, MAP4K1, MEG3, MIAT, MUC4, NANOG, NLRP9, NODAL, NRBP2, PIM2, PITPNM2, PRUNE2, RASD1, RRAD, SAT1, SEPT6, SERINC5, SLC16A9, ST6GALNAC3, TBC1D16, TDGF1, TDGF1P3, TRIM56, UNC5B, UPP1, USP28, UTF1, VASH2, VENTX, VSNL1, WNT3, ZIC3, ZSCAN10, ZYG11A |
| PE | BMP6, CELA3A, CELA3B, DEPDC7, DPP4, DYNLT3, FN1, GATA6, GCNT3, HNF4A, OTX2, P4HA1, RGS5, SERPINE2, ABHD6, ADD3, ALDH1A1, AMBN, AMOTL1, APOA1, APOA2, BMP2, CACHD1, CADM1, CAMK2D, CCAT1, CDH11, CDH2, CERS6, CMBL, CNIH3, COL4A1, COL4A2, CPN1, CTSE, DENND2C, DUSP4, EDEM1, FLRT3, FOXA2, FRMD6, FRZB, FST, GATA4, GNA13, GPC3, HMGCR, HNF1B, ID2, IGF1, KCNJ16, KIFAP3, KIT, LEPRE1, LINC00261, LOC101929344, LOC101929767, LOC400043, LRRC16A, MAP2K6, MARCKS, MYL4, NID1, NID2, NOG, PAPSS1, PDGFRA, PDPN, PGM1, PHLDB2, PIK3R1, PITX2, POMC, PRCP, PROS1, PTK2B, RNASE1, ROBO1, RSPO3, SALL1, SLCO2A1, SMAD9, SP8, TMEM123, TMEM88, TRIM2, VIL1, VWA5A, ANKRD1, CALCR, COL18A1, FAM198B, FGG, GCKR, GPR161, HABP2, ITIH5, MTTP, SYT13, TNIP3, SOX17 |
| TE | FRMD4B, GLIPR2, HSPB11, MYC, MYLPF, OSBPL6, PDLIM1, PIP5K1B, SYBU, TMEM171, VAMP8, ABCG2, ADAM15, ADK, ALPP, ANKRD6, ANXA6, ARHGAP23, ARHGEF26, ATP8B1, BASP1, C4BPB, CAST, CD24, CD53, CITED4, CLDN3, DAB2, DNAJC6, ELOVL6, EMP2, ENPEP, FABP3, FAM101B, FASN, FBXL18, FHL2, GAB2, GALNT10, GATA2, GM2A, GREB1L, HIP1, JDP2, KRT19, LAD1, LRP2, LRRFIP1, MYCT1, MYO6, NIM1K, NPC2, OLFML1, PALLD, PLAC8, PPME1, PPT1, PWWP2B, S100A6, SH3GL3, SLC19A3, SLC28A3, SLC34A2, SLC7A2, SLC7A4, TACSTD2, TAGLN2, TCF7L1, TEAD1, TFRC, TMEM106C, TMPRSS13, TMPRSS2, TSPAN15, WNT7A, ACTN1, ATP6V0A4, ATP6V1B1, CLDN10, CLDN4, CYP26A1, EFNA1, FOLR1, GATA3, GPRC5A, GRHL2, GYLTL1B, KRT18, KRT8, MYOF, PDGFA, PRSS8, PTGES, RAB25, S100A16, SLC12A3, SLC7A5, SUN3, TET2, TGFBR3 |

In any aspect, the multi-layered cellular structure or blastocyst-like structure may further comprises GATA6 positive cells (optionally with low or weak CDX2 staining) neighbouring OCT4 positive cells.

In any aspect, the multi-layered cellular structure or blastocyst-like structure exhibits the main morphological features of human blastocysts at E5-7, preferably E6-7. The main morphological features of human blastocysts at E5-7, and E6-7 are known to the skilled person. Such features may include a spherical or predominantly spherical layered cell aggregate or structure comprising at least two radially positioned layers, and comprising an inner cell layer (as defined herein) and an outer cell layer (as defined herein) with a zona pellucida and a fluid-filled cavity, called the blastocoel. The blastocyst has a diameter of approximately 0.1-0.2 mm and typically comprises about 200-300 cells. Generally the cells that exhibit one or more characteristics of cell of the epiblast and/or the primitive endoderm lineage are present in a single cluster located on the inside of the aggregate or structure, while that exhibit one or more characteristics of a cell of the trophectoderm are present on the outside.

Further characteristics and features of human blastocysts are described for example, in Blakeley, P. et al. (2015) Development 142, 3613; Petropoulos, S. et al. (2016) Cell 165, 1012-1026; Shahbazi, M. N. et al. (2016) Nat. Cell Biol. 18, 700-708: Xiang, L. et al. (2020) Nature 577, 537-542; Qin, H. et al. (2016) Cell Rep. 14, 2301-2312; Liu, L. et al. (2019) Nat. Commun. 10, 364; Durruthy-Durruthy, J. et al. (2016) Dev. Cell 38, 100-115; Fogarty, N. M. E. et al. (2017) Nature 550, 67-73.

Further, the multi-layered cellular structure or blastocyst-like structure may also comprise cells that exhibit one or more characteristics of cell of the epiblast, primitive endoderm and trophectoderm, where those cells adopt the same or similar relative spatial arrangement as epiblast, primitive endoderm and trophectoderm cells, respectively, in human blastocysts at E5-7, preferably E6-7. As used herein, "the same or similar relative spatial arrangement" with respect to human blastocysts shall be taken to mean having at least two radially positioned layers, and comprising an inner cell layer (as defined herein) and an outer cell layer (as defined herein). There may be more than two cell layers but it generally holds that the cells that exhibit one or more characteristics of cell of the epiblast and/or the primitive endoderm lineage are present in a single cluster located on the inside of the aggregate or structure, while that exhibit one or more characteristics of a cell of the trophectoderm are present on the outside. In other words, the outer layer of cells in the structure are typically cells of the TE (and express TE markers such as CDX2 and GATA2), while cells indicative of the epiblast (and which express markers such as NANOG and OXT4 and SOX2) are found in the ICM-like compartments within the structure.

In any aspect, the multi-layered cellular structure or blastocyst-like structure also comprises a cell free cavity, or blastocoel-like cavity. The multi-layered cellular structure or blastocyst-like structure may undergo cavitation, thereby allowing the blastocoel to form. Following the formation of the blastocoel-like cavity, the inner mass-like tissue may position itself in one portion of the inner cavity, while the rest of the cavity is filled with fluid.

The multi-layered cellular structure or blastocyst-like structures for use in the methods of the present invention generally differ from naturally arising human blastocysts in that the structures of the present invention do not form or comprise a zona pellucida.

As used herein, the term "zona pellucida" refers to the glycoprotein layer that surrounds the plasma membrane of mammalian oocytes. Following fertilisation of an oocyte, the zona pellucida remains intact and thus, naturally occurring blastocysts comprise a zona pellucida up to around five days following fertilisation, at which time the blastocysts performs so-called "zona hatching" wherein the zona pellucida degenerates and decomposes as part of implantation.

The structures for use according to the invention may also be differentiated from naturally occurring blastocysts, including from stem cells obtained from naturally occurring blastocysts, in that the structures may comprise cells having an overall gene signature not found in cells of a blastocyst (which is typically a mixed gene expression profile) such that the cells express genes that are characteristic of both the PE and TE, both the PE and EPI, both the TE and EPI, or a combination of the PE, TE and EPI. In other words, some cells in the structures of the invention may have mixed transcription signatures that are characteristic of more than one lineage. One or more individual cells may have mixed transcription signatures that are characteristic of more than one lineage The transcriptional signatures associated with each lineage are described further herein, for example above at [0248]-[0252] and Table 2.

In any aspect, the multi-layered cellular structure or blastocyst-like structure has an x- and y-axis diameter, x:y aspect ratio and/or projection area of a comparable size to previously published measurements of human blastocysts at embryonic day 5-7 (E5-7) post-fertilization. For example, the x- and/or y-axis diameter of the multi-layered cellular structure or blastocyst-like structure is from about 100 to about 300 µm. Preferably, the x/y axis ratio is about 1. The projection area of the multi-layered cellular structure or blastocyst-like structure is about 10,000 to about 40,000 µm$^2$, preferably about 20,000 to about 40,000 µm$^2$.

As used herein, a "comparable" x- and y-axis diameter or x:y aspect ratio to previously published measurements of human blastocysts at E5-7 may comprise x- and y-axis diameter or x:y aspect ratios that are between about 50% to 200% of the previously published measurements, preferably at least about 50%, at least about 60%, at least about 70%, at least about 80%, at least about 90%, at least about 100%, at least about 110%, at least about 1200%, at least about 120%, at least about 130%, at least about 140%, at least about 150%, at least about 160%, at least about 170%, at least about 180%, at least about 190% or at least about 200% of previously published measurements.

As used herein, a "comparable" projection area to previously published measurements of human blastocysts at E5-7 may comprise projection areas that are between about 50% to 200% of the previously published measurements for human blastocysts. Preferably, comparable projection areas comprise areas that are at least about 50%, at least about 60%, at least about 70%, at least about 80%, at least about 90%, at least about 100%, at least about 110%, at least about 1200%, at least about 120%, at least about 130%, at least about 140%, at least about 150%, at least about 160%, at least about 170%, at least about 180%, at least about 190% or at least about 200% of values ranging from 5,000 to about 40,000 µm$^2$. In other words, a comparable projection area may be an area that is between about 5,000 to about 10,000 µm$^2$, about 10,000 to about 40,000 µm$^2$, about 40,000 µm$^2$ to about 60,000 µm$^2$, preferably about 20,000 to about 40,000 µm$^2$.

In the context of the invention, the multi-layered cellular structure or blastocyst-like structure is a layered cell aggregate or structure comprising at least two radially positioned layers. Preferably, it is a spherical, or predominantly spherical cell aggregate or structure comprising an inner cell layer (as defined herein) and an outer cell layer (as defined herein). There may be more than two cell layers but it generally holds that the cells that exhibit one or more characteristics of cell of the epiblast and/or the primitive endoderm lineage are present in a single cluster located on the inside of the aggregate or structure, while that exhibit one or more characteristics of a cell of the trophectoderm are present on the outside.

In any aspect, the multi-layered cellular structure or blastocyst-like structure may comprise between about 100 to 400 total cells.

The multi-layered cellular structures or blastocyst-like structures for use according to the methods of the present invention typically exhibit characteristics that mimic many aspects of early human embryonic development. In certain embodiments, the structures mimic the characteristics of human embryos in in vitro attachment assays, which may be utilised to study embryo implantation. For example, when cultured in IVC1 media (as defined herein) for 1 day and subsequently cultured in IVC2 media (as defined herein) from day 2 to day 4.5, the multi-layered cellular structure or blastocyst-like structure may exhibit one of more of the following:
a) increases in size, flattens and progresses to form an outgrowth;
b) an increase in the number of NANOG and OCT4/SOX2 positive cells;
c) a spread of CDX2 and GATA2 positive cells;
d) SOX17 and GATA6 positive cells localize to the perimeter of the NANOG or OCT4 positive cells;
e) expression of keratin KRT7 or other trophoblast marker in the outer cell layer or cells exhibiting at least one characteristic of a TE cell;
f) presence of cells which morphologically resemble syncytiotrophoblast (ST) and extravillous cytotrophoblasts (EVT) (e.g. ST and EVT-like cells, respectively), for example a multi-nucleated phenotype and spindle-like morphology;
g) presence of cells expressing hCG (an exemplary ST marker), and MMP2 (an exemplary EVT marker); and
h) presence of cells exhibiting upregulation of the ST marker CSH1 and EVT marker ITGA1.

It will be appreciated that an "increase" as used herein, whether in relation to an increase in size or an increase in number of cells positive for a particular marker, refers to a change of greater than about 5%. As such an "increase", in the context of size of a multi-layered cellular or blastocysts-like structure, will be understood to include an increase in size of at least 5%, at least 10%, at least 20%, at least 30%, at least 40%, at least 50%, at least 60%, at least 70%, at least 80%, at least 90%, at least 100%, at least 150%, at least 200%, at least 250%, at least 300% or more, compared to the size of the structure prior to being cultured in an in vitro-attachment assay (such as described herein. Similarly, an "increase" in the number of cells positive for particular markers (such as NANOG and OCT4/SOX2) may be a an increase in the number of cells that is at least %, at least 10%, at least 20%, at least 30%, at least 40%, at least 50%, at least 60%, at least 70%, at least 80%, at least 90%, at least 100%, at least 150%, at least 200%, at least 250%, at least 300% or more, compared to the number of marker positive cells in the structure prior to being cultured in an in vitro-attachment assay In preferred embodiments, an in vitro-derived or generated blastocyst or blastoid structure (i.e., a multi-layered cellular structure or blastocyst-like structure) for use according to the invention, has 1, 2, 3, 4, 5, 6, 7, 8, 9, 10, 11, 12 or 13 of the following characteristics:
a spherical or predominantly spherical layered cell aggregate or structure comprising at least two radially positioned layers, and comprising an inner cell layer and an outer layer with no zona pellucida;
the inner cell layer comprising cells that exhibit one or more characteristics of cell of the epiblast (EPI) the characteristic of an EPI cell being the presence of any one or more of the markers NANOG, OCT4 (also known as POU5F1) or SOX2 and a rounded columnar appearance;
the inner cell layer also comprising a cluster of cells that exhibit one or more characteristics of the primitive endoderm (PE) lineage, wherein the cells that exhibit one or more characteristics of the PE are, or are predominantly, peripheral to the cells that exhibit one or more characteristics of a cell of the epiblast; the characteristic of a PE cell being the presence of the marker SOX17 or GATA6.
the outer cell layer comprising cells that exhibit one or more characteristics of a cell of the trophectoderm (TE), the characteristic of a TE cell being the presence of one or more of the markers CDX2 and GATA2 and a flattened or elongated epithelial morphology;
a diameter of approximately 0.1-0.2 mm;
about 100-400 cells;
wherein more cells in the multi-layered cellular structure or blastocyst-like structure express OCT4 than NANOG;
GATA6 positive cells (optionally with low or weak CDX2 staining) neighbouring OCT4 positive cells;
an x- and/or y-axis diameter of the multi-layered cellular structure or blastocyst-like structure is from about 100 to about 300 µm;
an x/y axis ratio of about 1;
a projection area of about 5,000 to about 10,000 µm$^2$, about 10,000 to about 40,000 µm$^2$, about 40,000 µm$^2$ to about 60,000 µm$^2$, preferably about 20,000 to about 40,000 µm$^2$;
optionally, a fluid-filled cavity, called the blastocoel; and
optionally wherein the cells that exhibit one or more characteristics of cell of the epiblast and/or the primitive endoderm lineage are present in a single cluster located on the inside of the aggregate or structure, while those that exhibit one or more characteristics of a cell of the trophectoderm are present on the outside.

Methods for Generating Multi-Layered Cellular Structures or Blastocyst-Like Structures The multi-layered cellular structures or blastocyst-like structures required for the methods of the invention can be obtained by any of the methods described herein, such as the use of "aggregation" methods for obtaining multi-layered cellular structures or blastocyst-like structures from reprogramming intermediates, or by assembly of artificially derived pluripotent and trophoblast stem cells (iPSCs and iTSCs).

It will be understood that the methods of the present invention relate to methods of deriving and expanding cells (XEN-like cells, TSCs, pPSCs and nPSCs), from structures resembling blastocysts and which are artificially derived. In other words, the methods of the present invention generally exclude the use and manipulation of blastocysts obtained directly from a human individual.

In one embodiment, a method of producing a multi-layered cellular structure comprises:
a) obtaining a cell population of reprogrammed somatic cells exhibiting epiblast (EPI), trophectoderm (TE), and primitive endoderm (PE) transcriptional signatures; and
b) culturing the reprogrammed somatic cells under conditions that allow aggregation to obtain a multi-layered cellular structure;
thereby producing a multi-layered cellular structure.

In one embodiment, a method of producing a blastocyst-like structure comprises:
a) obtaining a cell population of reprogrammed somatic cells exhibiting epiblast (EPI), trophectoderm (TE), and primitive endoderm (PE) transcriptional signatures; and
b) culturing the reprogrammed somatic cells under conditions that allow aggregation to obtain a blastocyst-like structure;
thereby producing a blastocyst-like structure.

In any aspect, the population of cells exhibiting transcriptional signatures of the epiblast (EPI), trophectoderm (TE), and/or primitive endoderm (PE) lineages preferably exhibits transcriptional signature of each of the epiblast (EPI), trophectoderm (TE), and primitive endoderm (PE) lineages.

Obtaining a cell population of reprogrammed somatic cells exhibiting epiblast (EPI), trophectoderm (TE), and primitive endoderm (PE) transcriptional signatures preferably comprises:
increasing the protein expression or amount of one or more factors in a population of somatic cells, wherein the factors are for reprogramming the somatic cells towards a dedifferentiated or pluripotent state; and
culturing the cells for a sufficient time and under conditions to allow the reprogramming of the cells towards a dedifferentiated or pluripotent state.

Preferably, the step of culturing the cells for a sufficient time and under conditions to allow the reprogramming of the cells towards a dedifferentiated or pluripotent state comprises culturing the cells in media for maintaining the somatic cells in culture. Preferably, this step comprises culturing the cells in media which is not intended for promoting pluripotency.

Still further, in one embodiment, a method of producing a blastocyst-like structure comprises the following steps in order:
a) increasing the protein expression or amount of one or more factors in a population of somatic cells, wherein the factors are for reprogramming the somatic cells towards a dedifferentiated or pluripotent state;
b) culturing the cells for a sufficient time and under conditions to allow the reprogramming of the cells towards a dedifferentiated or pluripotent state;
c) contacting the cells with a culture medium comprising an activator of WNT pathway signalling (optionally a GSK-3 inhibitor), at least one, preferably two, TGF-β inhibitors, a HDAC inhibitor, EGF, and BMP4 under conditions that allow aggregation;
d) culturing the cells in the culture medium for a sufficient time and under conditions to allow the cells to exhibit at least one characteristic of a blastocyst-like structure as described herein,
thereby producing a blastocyst-like structure.

Preferably, the culture medium in step c) further comprises a Rho-kinase (ROCK) inhibitor. Preferably, the cells are contacted with the culture medium comprising the ROCK inhibitor for a period of at least about 6 hours, at least about 12 hours, or at least about 24 hours before the cells are subsequently contacted with the culture medium without the ROCK inhibitor.

It will be understood that any method for reprogramming a somatic cell towards a de-differentiated or pluripotent state can be used in accordance with the methods of the present invention. As such, the present invention is not limited by the particular method for increasing the protein expression or amount of relevant factors, or culturing conditions to allow the somatic cell to commence reprogramming towards plasticity or pluripotency. Such methods are known in the art and are further described herein.

In preferred embodiments, the factors for reprogramming the somatic cell towards a dedifferentiated or pluripotent state are transcription factors. The transcription factors may comprise one or more of, or consist or consist essentially of the factors: OCT4, SOX2, KLF4 and MYC (OSKM); SOX2, KLF4 and OCT4 (SKO); OCT4, SOX2, KLF4 and GLIS1 (OSKG); OCT4, SOX2, NANOG and LIN28 (OSNL); or OCT4, SOX2, KLF4, c-MYC, NANOG and LIN28 (OKSMNL). In particularly preferred embodiments, the transcription factors comprise all four of the factors OCT4, SOX2, KLF4 and MYC (OSKM), or variants thereof. In another embodiment, the transcription factors comprise, consist or consisting essentially of SOX2, KLF4 and OCT4 (SKO). In another embodiment, the transcription factors comprise, consist or consisting essentially of OCT4, SOX2, KLF4 and GLIS1 (OSKG). In another embodiment, the transcription factors comprise, consist or consisting essentially of OCT4, SOX2, NANOG and LIN28 (OSNL). In another embodiment, the transcription factors comprise, consist or consist essentially of OCT4, SOX2, KLF4, c-MYC, NANOG and LIN28 (OKSMNL).

Accordingly, in any aspect, a method of producing a blastocyst-like structure, the method comprising the following steps in order
a) increasing the protein expression or amount of one or more of the transcription factors OCT4, SOX2, KLF4 and MYC (OSKM), SOX2, KLF4 and OCT4 (SKO), OCT4, SOX2, KLF4 and GLIS1, or OCT4, SOX2, NANOG and LIN28 (OSNL), or any other combination of transcription factors described herein, in a population of somatic cells;
b) culturing the cells for a sufficient time and under conditions to allow the reprogramming of the cells towards a pluripotent state;
c) contacting the cells with a culture medium comprising a WNT activator, at least one, preferably two, TGF-β inhibitors, a HDAC inhibitor, a GSK-3 inhibitor, EGF, and BMP4 under conditions that allow aggregation;
d) culturing the cells in the culture medium for a sufficient time and under conditions to allow the cell to exhibit at least one characteristic of a blastocyst-like structure as described herein,
thereby producing a blastocyst-like structure.

Typically, the protein expression, or amount, of a transcription factor as described herein is increased by contacting the cells with an agent which increases the expression of the transcription factor. Preferably, the agent is selected from the group consisting of: a nucleotide sequence, a protein, an aptamer and small molecule, ribosome, RNAi agent and peptide-nucleic acid (PNA) and analogues or variants thereof. In some embodiments, the agent is exogenous. The present invention also contemplates the use of a transcriptional activation system (e.g., a gRNA for use in a gene activation system such as CRISPR/Cas9 or TALEN) for increasing the expression of the one or more transcription factors.

Typically, the protein expression, or amount, of a transcription factor as described herein is increased by introducing at least one nucleic acid (eg an mRNA molecule) comprising a nucleotide sequence encoding a transcription factor, or encoding a functional fragment thereof, in the cell. The at least one nucleic acid encoding a transcription factor may be transfected into the population of somatic cells multiple time, for example 2, 3, 4, 5 or 6 times, for example each day for 2, 3, 4, 5 or 6 days, respectively.

In a preferred embodiment, the nucleic acid sequence encoding a transcription factor protein is introduced into a cell by a plasmid. One or more nucleic acids encoding one or more transcription factors may be used. Therefore, it is apparent that one or more plasmids may be used for the purpose of increasing the expression or amount of the required one or more transcription factors. In other words, the nucleic acid sequences may be in or on a single plasmid, or provided to the somatic cell in two or more plasmids.

In any embodiment, the plasmid containing the nucleic acid encoding the one or more transcription factors for use according to the invention may be an episomal plasmid.

Preferably, the nucleic acid further includes a heterologous promoter. Preferably, the nucleic acid is in a vector, such as a viral vector or a non-viral vector. Preferably, the vector is a viral vector comprising a genome that does not integrate into the host cell genome. The viral vector may be a retroviral vector, a lentiviral vector, an adenovirus or Sendai virus.

In certain embodiments, the protein expression or amount of the factors is increased in the somatic cell by transduction or transfection of the somatic cell with one or more vectors encoding said transcription factors. The vector may be a viral vector, including an integrating or non-integrating viral vector. In further embodiments, the vector may be an episomal vector.

It will also be understood that the somatic cell does not need to have completed reprogramming to the pluripotent state prior to the step of contacting the cell with the culture medium in step c). In other words, the cell is preferably at an intermediate state, transitioning from differentiated state to pluripotent state when it is contacted with the culture medium. Therefore, the cells at the end of step b) and before culturing in step c) may be referred to as reprogramming intermediates.

In certain embodiments, the period of time for culturing the cell to commence reprogramming towards a dedifferentiated or pluripotent state is at least 1 day following increasing the protein expression, or amount of the one or more factors or starting from when the cells are contacted with an agent to increase protein expression, or amount of the one or more factors. The period of time may be 2, 3, 4, 5, 6, 7, 8, 9, 10, 11, 12, 13, 14, 15, 16, 17, 18, 19, 20 or 21 or more days after increasing the protein expression, or amount of the one or more factors. In any embodiment, the period of time for culturing the cell to commence reprogramming towards a dedifferentiated or pluripotent state may be any period of time provided that it enables the reduction of markers associated with the somatic cell and/or causes a reduction or loss of somatic cell identify and gain of cell plasticity.

In further embodiments of the invention, the methods above include culturing the cells towards a dedifferentiated or pluripotent state in a medium that induces upregulation of the EPI, TE and PE lineage transcriptional signatures. Preferably, the medium is a fibroblast medium, for example the fibroblast medium defined herein, including in Table 1.

As used herein, the culture medium for contacting the reprogramming intermediates (i.e., the medium comprising an activator of WNT pathway signalling (preferably a GSK-3 inhibitor), at least one, preferably two, TGF-β inhibitors, a HDAC inhibitor, EGF, and BMP4 under conditions that allow aggregation, as described above, may also be referred to as a blastocyst promoting medium or iBlastoid medium. Preferably, the blastocyst promoting medium or iBlastoid medium is any as defined herein. In any embodiment, the cells are cultured in the culture medium in step c) for a period of at least about 1, at least about 2, at least about 3, at least about 4, at least about 5, at least about 6, at least about 7, at least about 9, at least about 12, at least about 14, at least about 16, at least about 20, at least about 24, or at least about 28 or more days.

In any embodiment, the period of time between increasing the protein expression or amount of the factors and contacting the cell with the culture medium in step c) may be any period of time provided that it enables the reduction of markers associated with the somatic cell. In further examples, the period of time between increasing the protein expression or amount of the factors and contacting the cell with the culture medium in step c) may be any period of time provided that it enables the cell to proceed through mesenchymal to epithelial transition states. In further or alternative embodiments, the period of time can be any period provided that it enables the expression of epiblast (EPI), trophectoderm (TE), and primitive endoderm (PE) transcriptional signatures.

In any aspect, conditions that allow aggregation may comprise culturing on any culture plate, culture vessel or culture system that allows three-dimensional aggregation of cells. For example, the cells may be seeded at a density of at or about 0.5 to $2\times10^5$ cells per well, at or about 0.6 to $2\times10^5$ cells per well, at or about 0.8 to $2\times10^5$ cells per well, at or about 1 to $2\times10^5$ cells per well, at or about $0.6\times10^5$ cells per well, at or about $0.8\times10^5$ cells per well, at or about $1\times10^5$ cells per well, at or about $1.2\times10^5$ cells per well, at or about $1.4\times10^5$ cells per well, at or about $1.6\times10^5$ cells per well, at or about $1.8\times10^5$ cells per well, or at or about $2\times10^5$ cells per well. In one embodiment, the culture plate or culture vessel is any one described herein.

A somatic cell may be any cell type described herein, including a diseased cell. The somatic cell may be an adult cell or a cell derived from an adult which displays one or more detectable characteristics of an adult or non-embryonic cell. The diseased cell may be a cell displaying one or more detectable characteristics of a disease or condition, for example aneuploidy, Hydatidiform mole, or Cornelia de Lange syndrome. Further, the somatic cells may have been gene edited, for example by CRISPR technology (e.g. CRISPR-Cas9, -Cas12a, -Cas13 or related CRISPR/nuclease systems).

In preferred embodiments, the somatic cell is a fibroblast (preferably a dermal fibroblast), a keratinocyte (preferably epidermal keratinocyte), a monocyte or an endothelial cell or a mesenchymal stem cell. Preferably, the somatic cells for use in the methods of the present invention comprise only fibroblast cells. Alternatively, the somatic cells for use in the methods of the present invention may be peripheral blood mononuclear cells (PBMCs), preferably human. Alternatively, the somatic cells for use in the methods of the present invention may be mesenchymal stem cells (MSCs), preferably human. Morphological and gene expression markers characteristic of somatic cells will be known to the skilled person. Consequently, it will be within the purview of the skilled person to test for and observe the reduction of markers characteristic of a somatic cell during the course of performing the methods of the present invention. In certain examples, where the somatic cell is a dermal fibroblast, morphological characteristics include a flattened shape and markers include: CD13 (ANPEP), CD44, TWIST1 and ZEB.

Keratinocyte markers include keratin1, keratin14 and involucrin and the cell morphology is cobblestone appearance. Endothelial cell markers include CD31 (Pe-CAM), VE-Cadherin and VEGFR2 and the cell morphology may be a capillary-like structure. Markers of an epithelial cell include cytokeratin 15 (CK15), cytokeratin 3 (CK3), involucrin and connexin 4. Preferably the observed morphology is a cobblestone appearance. Markers of haemaotopoietic stem cells may comprise CD45 (pan haematopoietic marker), CD19/20 (B-cell markers), CD14/15 (myeloid), CD34 (progenitor/SC markers), CD90 (SC). Markers of mesenchymal stem cells comprise: CD13, CD29, CD90, CD105, CD10, CD45.

The multi-layered cellular structure or blastocyst-like structure may alternatively be generated by assembly of an iPSC and iTSC, or population of iPSCs and iTSCs. For example, a method of producing a multi-layered cellular structure comprises:
  culturing an iPSC and iTSC cell under conditions that allow aggregation to obtain a multi-layered cellular structure;
  thereby producing a multi-layered cellular structure.

Alternatively, there is a method of producing an in vitro-derived blastocyst-like structure, the method comprising:
  culturing an iPSC and iTSC cell under conditions that allow aggregation to obtain a blastocyst-like structure;
  thereby producing a blastocyst-like structure.

Methods for generating iPSCs and iTSCs are known in the art. Exemplary methods for generating iPSCs are described for example in: Takahashi et al., (2007) Cell, 131: 861-872, WO 2017/219232, WO 2014/200114, WO 2014/065435, WO 2019/073055, Liu et al., (2017) Nat. Methods, 14: 1055-1062; the entire contents of which are hereby incorporated by reference in their entirety. Exemplary methods for generating iTSCs are described further herein (Example 11) and in Liu et al., (2020) Nature, 586: 101-107, the contents of which are also incorporated herein by reference.

In one embodiment, the iPSC and iTSC may be co-cultured in any culture vessel described herein, for example, a 24-well AggreWell™400 plate. Preferably, the cells are cultured in any culture medium for promoting cells (e.g. a blastocyst promoting medium or iBlastoid medium) to exhibit at least one characteristic of a blastocyst-like structure as described herein. Preferably, the culture medium is an iBlastoid medium as shown in Table 4.

Preferably, the iPSC and iTSC are co-cultured in the same well at respective 1:2.5 ratio with a total number of $1.2 \times 10^5$ cells per well.

ROCKi are preferably included in the cell culture at the first day of co-culture to enhance cell survival and the cells cultured for 3, 4, 5, 6 days, preferably 6 days, in any culture vessel described herein, for example, a 24-well AggreWell™400 plate.

In any aspect, the multi-layered cellular structure or blastocyst-like structure comprises an inner cell layer and an outer cell layer, the inner cell layer comprises cells that exhibit one or more characteristics of cell of the epiblast and/or the primitive endoderm lineage, and the outer cell layer comprises cells that exhibit one or more characteristics of a cell of the trophectoderm. Preferably the characteristic may be determined by analysis of cell morphology, gene expression profiles, activity assay, protein expression profile, surface marker profile, differentiation ability or a combination thereof. Examples of characteristics or markers include those that are described herein and those known to the skilled person.

In any aspect, the inner cell layer further comprises a cluster of cells that exhibit one or more characteristics of the PE. Preferably the cells that exhibit one or more characteristics of the PE are, or are predominantly, peripheral to the cells that exhibit one or more characteristics of a cell of the epiblast.

In any aspect, the characteristic of an EPI cell is the presence of any one or more of the markers NANOG, OCT4 (also known as POU5F1) or SOX2. In one embodiment, more cells in the multi-layered cellular structure or blastocyst-like structure express OCT4 than NANOG.

In any aspect, the characteristic of an EPI cell is the morphology of a rounded columnar appearance.

In any aspect, the characteristic of a TE cell is the presence of one or more of the markers CDX2 and GATA2.

In any aspect, the characteristic of a TE cell is a flattened or elongated epithelial morphology.

In any aspect, the characteristic of a PE cell is the presence of the marker SOX17 or GATA6.

In any aspect, a marker of the EPI, PE or TE lineage is as described in Petropoulos et al., Cell 165, 1012-1026 (2016) or as set forth in Table 2 herein.

In any aspect, the multi-layered cellular structure or blastocyst-like structure may further comprises GATA6 positive cells (optionally with low or weak CDX2 staining) neighbouring OCT4 positive cells.

In any aspect, the multi-layered cellular structure or blastocyst-like structure exhibits the main morphological features of human blastocysts at E5-7, preferably E6-7. Further, the multi-layered cellular structure or blastocyst-like structure may also comprise cells that exhibit one or more characteristics of cell of the epiblast, primitive endoderm and trophectoderm cells where those cells adopt the same or similar relative spatial arrangement as epiblast, primitive endoderm and trophectoderm cells, respectively, in human blastocysts at E5-7, preferably E6-7.

In any aspect, the multi-layered cellular structure or blastocyst-like structure also comprises a cell free cavity, or blastocoel-like cavity.

In any aspect, the multi-layered cellular structure or blastocyst-like structure has an x- and y-axis diameter, x:y aspect ratio and/or projection area of a comparable size to previously published measurements of human blastocysts at embryonic day 5-7 (E5-7) post-fertilization. For example, the x- and/or y-axis diameter of the multi-layered cellular structure or blastocyst-like structure is from about 100 to about 300 μm. Preferably, the x/y axis ratio is about 1. The projection area of the multi-layered cellular structure or blastocyst-like structure is about 10,000 to about 40,000 $\mu m^2$, preferably about 20,000 to about 40,000 $\mu m^2$.

In any aspect, the multi-layered cellular structure or blastocyst-like structure comprises at least about 100 to 400 total cells, or at least about 300 to about 600 cells.

In any aspect, when cultured in IVC1 media (as defined herein) for 1 day and subsequently cultured in IVC2 media (as defined herein) from day 2 to day 4.5, the multi-layered cellular structure or blastocyst-like structure may attach to a surface (such as a glass surface) and exhibit one of more of the following:
  i) increases in size, flattens and progresses to form an outgrowth;
  j) an increase in the number of NANOG and OCT4/SOX2 positive cells;
  k) a spread of CDX2 and GATA2 positive cells;
  l) SOX17 and GATA6 positive cells localize to the perimeter of the NANOG or OCT4 positive cells;
  m) expression of keratin KRT7 or other trophoblast marker in the outer cell layer or cells exhibiting at least one characteristic of a TE cell;
  n) presence of cells which morphologically resemble syncytiotrophoblast (ST) and extravillous cytotrophoblasts (EVT) (e.g. ST and EVT-like cells, respectively), for example a multi-nucleated phenotype and spindle-like morphology;
  o) presence of cells expressing hCG (an exemplary ST marker), and MMP2 (an exemplary EVT marker); and
  p) presence of cells exhibiting upregulation of the ST marker CSH1 and EVT marker ITGA1.

A culture medium for promoting cells (e.g. a blastocyst promoting medium or iBlastoid medium) to exhibit at least one characteristic of a blastocyst-like structure may comprise:
an agent for activating signalling of the WNT pathway, optionally a GSK-3 inhibitor,
at least one, preferably two, TGF-β inhibitors,
a HDAC inhibitor,
EGF, and
BMP4.

Preferably, the WNT activator, TGF-β inhibitor(s), HDAC inhibitor and GSK-3 inhibitor may be any one known in the art, including any one described herein.

Preferably, the culture medium further comprises:
ITS-X;
L-Glutamine;
N-acetyl-L-cysteine;
B-estradiol;
Progesterone;
2-mercaptoethanol;
L-ascorbic acid;
Transferrin (e.g. human),
Insulin (e.g. human),
N2 supplement; and
B27 supplement.

Preferably, the progesterone, transferrin and insulin are provided in a N2 supplement as described herein, further including putrescine and selenite.

Preferably, the B27 supplement comprises biotin, DL alpha tocopherol acetate, DL alpha tocopherol, Vitamin A (Acetate), BSA, catalase, Insulin (human), superoxide dismutase, corticosterone, D-galactose, Ethanolamine HCL, Glutathione, L-Carnitine HCL, Linoleic Acid, Linolenic Acid, Progesterone, Putrescine 2HCl, Sodium Selenite, T3 (triodo-l-thyronine).

The culture medium further comprises an antibiotic, for example penicillin-streptomycin.

In one embodiment, the culture medium comprises:
IVC1 medium, N2B27 basal medium and TSC basal medium as defined herein in a respective 2:1:1 ratio,
an activator of WNT pathway signalling (optionally a GSK-3 inhibitor),
at least one, preferably two, TGF-β inhibitors,
a HDAC inhibitor,
EGF, and
BMP4.

In any aspect herein, an agent for activating WNT pathway signalling may include any small molecule that directly or indirectly activates WNT signalling. In certain embodiments, the agent for activating WNT pathway signalling may be a GSK-3 inhibitor.

Preferably the TGF-β pathway inhibitor is selected from SB431542 and A83-01, the histone deacetylase (HDAC)1 inhibitor is VPA (Valproic Acid), the GSK-3 Inhibitor is CHIR99021.

Preferably, the GSK-3 Inhibitor is at a concentration of, or about, 2 μM, the TGF-β pathway inhibitor is at a concentration of, or about, 0.5 μM or 1 μM, histone deacetylase (HDAC)1 inhibitor is at a concentration of, or about, 0.8 mM, EGF is at a concentration of, or about, 50 ng/ml, and BMP4 is at a concentration of, or about, 10 ng/ml.

Typically, the culture medium further comprises a ROCK inhibitor. Preferably, the ROCK inhibitor is Y-27632. Preferably, the ROCK inhibitor is at a concentration of, or about, 10 μM.

In any aspect, the culture medium for use in step c) comprises or consists of the Fibroblast medium, the N2B27 basal medium, the TSC basal medium, the IVC1 medium, the IVC2 medium or the Human iBlastoid medium as defined in Table 4.

In any aspect, the culture medium defined in step c) of any method of the invention may be any culture medium of the invention, including but not limited to the Human iBlastoid medium as defined herein, including in Table 4.

In any aspect, the somatic cells have a disease genotype. For example, the somatic cells may be derived from an individual having a genetic disease, preferably an early developmental disease. Examples of early developmental diseases are Aneuploidy, many monogenic disorders, Hydatidiform mole, and Cornelia de Lange syndrome.

Reprogramming Cells to Generate Multi-Layered Cellular Structures or Blastocyst-Like Structures Various methods for reprogramming a somatic cell towards a pluripotent state are known in the art. Reprogramming of somatic cells typically involves the expression of reprogramming factors (including transcription factors), followed by culture in particular conditions for promoting the loss of markers of differentiation, and the gain of markers of plasticity.

In accordance with the methods of the present invention, somatic cells are reprogrammed towards a dedifferentiated or pluripotent state, in order to obtain a population of cells exhibiting transcriptional signatures of the EPI, TE or PE lineages, prior to being subjected to culturing conditions for promoting formation of a multi-layered cellular structure or blastocyst-like structure. Accordingly, it will be appreciated that the population of cells comprise reprogramming intermediates at the time of being subjected to culturing conditions for promoting formation of a multi-layered cellular structure or blastocyst-like structure. The reprogramming intermediates exhibit transcriptional signatures of the EPI, TE and/or PE lineages. Preferably the population of intermediates exhibits transcriptional signatures of all three of the EPI, TE and PE lineages.

In any aspect, a population of cells exhibiting transcriptional signatures of the EPI, TE or PE lineage comprises a population of cells expressing at least one of the markers listed in Table 2 herein.

Preferably, a transcriptional signature of the EPI lineage comprises expression of at least 2, at least 3, at least 4, at least 5, at least 10, at least 15, at least 20, at least 30, at least 40, at least 50, at least 60, at least 70 or more or all of the markers of the EPI lineage as listed in Table 2 herein. More preferably, a transcriptional signature of the TE lineage comprises expression of at least 2, at least 3, at least 4, at least 5, at least 10, at least 15, at least 20, at least 30, at least 40, at least 50, at least 60, at least 70 or more or all of the markers of the TE lineage as listed in Table 2 herein. More preferably, a transcriptional signature of the PE lineage comprises expression of at least 2, at least 3, at least 4, at least 5, at least 10, at least 15, at least 20, at least 30, at least 40, at least 50, at least 60, at least 70 or more or all of the markers of the PE lineage as listed in Table 2 herein.

In particular preferred embodiments, a transcriptional signature of the EPI lineage comprises expression of any one, two, three, four, five, six, seven, eight or nine, or of all of the markers: ARGFX, NANOG, GDF3, SUSD2, DPPA5, POU5F1, UTF1, TDGF1, PDLIM1 and USP28; a transcriptional signature of the TE lineage comprises expression of any one, two, three, four, five, six, seven, eight or nine, or of all of the markers: KRT18, KRT8, NODAL, UPP1, TAGLN2, KRT19, SLC7A5, FAM101B, CDX2, and GATA2; and a transcriptional signature of the PE lineage is expression of any one, two, three, four, five, six, seven, eight or nine, or of all of the markers: PALLD, FST, NOG, CLDN10, SERPINB6, MIAT, CHST2, VSNL1, MT1X, PDPN, SOX17, and GATA6.

Examples of suitable methods for reprogramming somatic cells are replete in the art, and are exemplified in WO 2009/101407, WO 2014/200030, WO 2015/056804, WO 2014/200114, WO 2014/065435, WO 2013/176233, WO 2012/060473, WO 2012/036299, WO 2011/158967, WO 2011/055851, WO 2011/037270, WO 2011/090221, the contents of which are hereby incorporated by reference. Typically, such methods comprise increasing the amount one or more factors or agents, that are capable of (or for the purposes of) reprogramming the cell towards a pluripotent state, in a starting cell type (or source cell).

In certain embodiments, the factors or agents for reprogramming the somatic cell, or which are capable of reprogramming the somatic cell are transcription factors. Alternatively, the factors or agents indirectly increase the levels of one or more transcription factors in a cell, as further described herein. Particularly preferred transcription factors, and nucleic acid sequences thereof, that may be used to reprogram a somatic cell (e.g., a fibroblast) in accordance with the methods of the invention are shown below in Table 3. In accordance with the present invention, it will be understood that one or more, two or more, three or more, four or more, five or more, or all 6 of the transcription factors listed in Table 3 may be used in order to reprogram a somatic cell. It will be understood however that the present invention is not limited to the use of the transcription factors recited in Table 3 in order to reprogram a somatic cell.

The transcription factors and other protein factors referred to herein are referred to by the HUGO Gene Nomenclature Committee (HGNC) Symbol. Table 3 provides exemplary Ensemble Gene ID and Uniprot IDs for the transcription factors recited herein. The nucleotide sequences are derived from the Ensembl database (Flicek et al. (2014). Nucleic Acids Research Volume 42, Issue D1. Pp. D749-D755) version 83. Also contemplated for use in the invention is any variant, homolog, ortholog or paralog of a transcription factor referred to herein.

Preferably, only a single cell type is subjected to reprogramming in accordance with the methods of the invention. In other words, preferably the population of cells that is subjected to reprogramming, is a homogenous or substantially homogenous population of cells. For example preferably, the population of cells is comprised only of, or predominantly comprised of fibroblasts, or of keratinocytes, or of any other somatic cell type as described herein. As such, it will be understood that only one starting cell type needs to be considered when determining relevant factors suitable for reprogramming the somatic cell towards a pluripotent state.

The skilled person will appreciate that this information may be used in performing the methods of the present invention, for example, for the purposes of providing increased amounts of transcription factors in somatic cells, or providing nucleic acids or the like for recombinantly expressing a transcription factor in a somatic cell.

TABLE 3

Accession numbers identifying exemplary nucleotide sequences and amino acid sequences of transcription factors referred to herein.

| Transcription factor Associated Gene Name | Ensembl Gene ID | Uniprot ID |
| --- | --- | --- |
| OCT4 (also called POU5F1) | ENSG00000204531 | Q01860 |
| SOX2 | ENSG00000181449 | P48431 |
| cMYC | ENSG00000136997 | P01106 |
| KLF4 | ENSG00000136826 | O43474 |
| LIN28 | ENSG00000131914 | Q9H9Z2 |
| NANOG | ENSG00000111704 | Q9H9S0 |

The term a "variant" in referring to a polypeptide that is at least 70%, 80%, 85%, 90%, 95%, 98%, or 99% identical to the full length polypeptide. The present invention contemplates the use of variants of the transcription factors described herein. The variant could be a fragment of full length polypeptide or a naturally occurring splice variant. The variant could be a polypeptide at least 70%, 80%, 85%, 90%, 95%, 98%, or 99% identical to a fragment of the polypeptide, wherein the fragment is at least 50%, 60%, 70%, 80%, 85%, 90%, 95%, 98%, or 99% as long as the full length wild type polypeptide or a domain thereof has a functional activity of interest such as the ability to promote conversion of a somatic cell type to a target cell type. In some embodiments the domain is at least 100, 200, 300, or 400 amino acids in length, beginning at any amino acid position in the sequence and extending toward the C-terminus. Variations known in the art to eliminate or substantially reduce the activity of the protein are preferably avoided. In some embodiments, the variant lacks an N- and/or C-terminal portion of the full length polypeptide, e.g., up to 10, 20, or 50 amino acids from either terminus is lacking. In some embodiments the polypeptide has the sequence of a mature (full length) polypeptide, by which is meant a polypeptide that has had one or more portions such as a signal peptide removed during normal intracellular proteolytic processing (e.g., during co-translational or post-translational processing). In some embodiments wherein the protein is produced other than by purifying it from cells that naturally express it, the protein is a chimeric polypeptide, by which is meant that it contains portions from two or more different species. In some embodiments wherein a protein is produced other than by purifying it from cells that naturally express it, the protein is a derivative, by which is meant that the protein comprises additional sequences not related to the protein so long as those sequences do not substantially reduce the biological activity of the protein. One of skill in the art will be aware of, or will readily be able to ascertain, whether a particular polypeptide variant, fragment, or derivative is functional using assays known in the art. For example, the ability of a variant of a transcription factor to convert a somatic cell to a target cell type can be assessed using the assays as disclosed herein in the Examples. Other convenient assays include measuring the ability to activate transcription of a reporter construct containing a transcription factor binding site operably linked to a nucleic acid sequence encoding a detectable marker such as luciferase. In certain embodiments of the invention a functional variant or fragment has at least 50%, 60%, 70%, 80%, 90%, 95% or more of the activity of the full length wild type polypeptide.

The term "increasing the amount of" with respect to increasing an amount of a factor for reprogramming a cell towards a pluripotent state, refers to increasing the quantity of the factor (e.g., a transcription factor) in a cell of interest (e.g., a somatic cell such as a fibroblast). In some embodiments, the amount of factor is "increased" in a cell of interest (e.g., a cell into which an expression cassette directing expression of a polynucleotide encoding one or more factors has been introduced) when the quantity of factor is at least 10%, 20%, 30%, 40%, 50%, 60%, 70%, 80%, 90%, or more relative to a control (e.g., a fibroblast into which none of said expression cassettes have been introduced). However, any method of increasing an amount of a factor is contemplated including any method that increases the amount, rate or efficiency of transcription, translation, stability or activity of a factor (or the pre-mRNA or mRNA encoding it). In addition, down-regulation or interference of a negative regulator of transcription expression, increasing efficiency of existing translation (e.g. SINEUP) are also considered.

The term "agent" as used herein means any compound or substance such as, but not limited to, a small molecule, nucleic acid, polypeptide, peptide, drug, ion, etc. The agent may be any compound or substance which increases the amount of a factor including a transcription factor as described herein. An "agent" can be any chemical, entity or moiety, including without limitation synthetic and naturally-occurring proteinaceous and non-proteinaceous entities. In some embodiments, an agent is nucleic acid, nucleic acid analogues, proteins, antibodies, peptides, aptamers, oligomer of nucleic acids, amino acids, or carbohydrates including without limitation proteins, oligonucleotides, ribozymes, DNAzymes, glycoproteins, siRNAs, lipoproteins, aptamers, and modifications and combinations thereof etc. In certain embodiments, agents are small molecules having a chemical moiety. For example, chemical moieties included unsubstituted or substituted alkyl, aromatic, or heterocyclic moieties including macrolides, leptomycins and related natural products or analogues thereof. Compounds can be known to have a desired activity and/or property, or can be selected from a library of diverse compounds.

The term "exogenous," when used in relation to a protein, gene, nucleic acid, or polynucleotide in a cell or organism refers to a protein, gene, nucleic acid, or polynucleotide that has been introduced into the cell or organism by artificial or natural means; or in relation to a cell, refers to a cell that was isolated and subsequently introduced to other cells or to an organism by artificial or natural means. An exogenous nucleic acid may be from a different organism or cell, or it may be one or more additional copies of a nucleic acid that occurs naturally within the organism or cell. An exogenous cell may be from a different organism, or it may be from the same organism. By way of a non-limiting example, an exogenous nucleic acid is one that is in a chromosomal location different from that of natural cells, or is otherwise flanked by a different nucleic acid sequence than that found in nature. An exogenous nucleic acid may also be extra-chromosomal, such as an episomal vector.

Suitable detection means include the use of labels such as radionucleotides, enzymes, coenzymes, fluorescers, chemiluminescers, chromogens, enzyme substrates or co-factors, enzyme inhibitors, prosthetic group complexes, free radicals, particles, dyes, and the like. Such labelled reagents may be used in a variety of well-known assays, such as radio-immunoassays, enzyme immunoassays, e.g., ELISA, fluorescent immunoassays, and the like. See, for example, U.S. Pat. Nos. 3,766,162; 3,791,932; 3,817,837; and 4,233,402.

The method of the disclosure may be "miniaturized" in an assay system through any acceptable method of miniaturization, including but not limited to multi-well plates, such as 24, 48, 96 or 384-wells per plate, microchips or slides. The assay may be reduced in size to be conducted on a micro-chip support, advantageously involving smaller amounts of reagent and other materials.

Culture Vessels for Generating Multi-Layered Cellular Structures or Blastocyst-Like Structures Forming a multilayered cell structure of blastocyst-like structure occurs in a suitable container, plate, system or vessel that allows aggregation. Typically, culturing occurs on any culture plate, culture vessel or culture system that allows three-dimensional aggregation of cells.

A suitable container, plate, system or vessel preferably has a non-adherent surface. A non-adherent surface is a surface on which the cells are placed, and which has little or no adhesion tendency to the cells. Thus, the cells do essentially not adhere to this surface. Without wishing to be bound by theory, use of a non-adherent surface provides a driving force for the cells to not adhere to the surface, but instead adhere to each other, thus forming a cell structure for use in the present invention.

A non-adherent surface may be formed by coating a material with a non-adherent biological or artificial material, or a non-adherent surface may be obtained by suitably shaping a non-adherent material, or by other means known in the art. A container on or in which the cell aggregate can be formed will from hereon be called a scaffold.

Scaffolds with a non-adherent surface are made of or are coated with, for example, ethylene oxide, propylene oxide, polyethylene glycol, (PEG)-(co)polymers (for instance PLL-g-(PEG)), poly(ethylene oxide) (PEO) (co)polymers, agarose hydrogels, temperature-responsive materials below their Lower Critical Solution Temperatures (LCST) (for example Poly(N-isopropylacrylamide)), hydrophobic materials (for example olefin polymers), cell-repellent micro- and nanotopographies.

Thus, forming a cell aggregate according to the present invention is preferably achieved in a non-adherent scaffold. A non-adherent scaffold has at least one surface that does not essentially allow for the adherence of cells. Preferably, this is the side on or in which cells to form the aggregate are placed. A non-adherent scaffold can be formed from a non-adhering material, or can be formed from another material coated with a non-adherent material. A non-adherent petri dish or tube may for example be used as scaffold, but preferably, the scaffold has a plate-like shape, such as for instance a more or less hexagonal, pentagonal, square, rectangular, triangular, oval or round shape.

More preferably, the scaffold comprises at least one suitable cavity or channel. Preferably, multiple cavities or channels are present on a scaffold. It is preferred if these cavities or channels are somewhat larger than the size of the cell aggregate to be formed. Suitable cavities and channels are small, such as for instance 20-5000 μm in diameter, more preferably 100-1000 μm, and most preferred are cavities of 100-500 μm, especially approximately 200 μm in diameter. Suitable cavities or channels may be obtained by any means known in the art. The diameter is defined as the longest possible straight-line distance between any two opposite points on the circumference of the opening of the cavity or channel. The channel or cavity has a closed bottom, and at least the surface of the inside of the cavity or channel comprises a non-adherent material.

Preferably, a cavity has a shape in which the length and breadth are of approximately similar order of magnitude. The depth, also, is of approximately the same order of magnitude. Such a cavity is called a microwell. For the present invention, it is preferred if the non-adherent scaffold comprises microwells. A microwell is preferably a cavity the length of which is up to about 5 times, preferably 3 times and more preferably approximately equal to its breadth, and which depth is no more than 10 times, preferably no more than 5 times, and more preferably up to 3 times its breadth.

The length of a microwell is defined as the longest possible straight-line distance between any two opposite points on the circumference of the opening of the microwell. Thus, the length of the microwell is considered its diameter, which is preferably for instance 20-5000 µm, more preferably 100-1000 µm, and most preferably 100-500 µm, especially approximately 200 µm. The breadth of a microwell is defined as the longest straight-line distance between any two opposite points on the circumference of the opening of the microwell perpendicular to its length.

The various cross-sectional areas of a microwell, among which those perpendicular and parallel to the surface of the scaffold, may be of any shape, including irregular shapes, but preferably, possible cross-sectional areas of a microwell are independently square or approximately square, rectangular or approximately rectangular, triangular or approximately triangular, oval or approximately oval or round or approximately round. However, it is preferred if the microwell is cylindrical, and has an approximately round opening in the surface of the scaffold. Suitable microwells are for instance present on microwell plates, such as commonly used in the art.

In case a non-adherent scaffold comprises microwells, it is advantageous to have multiple microwells arranged on a single scaffold. Preferably, these microwells are arranged in a regular pattern. This allows for high-throughput preparation of large numbers of blastoids.

In one aspect, the culture vessel is a culture plate with an array of inverse pyramidal microwells of, or of about, 400 µm or 800 µm or between about 400 µm to 800 µm. An exemplary culture plate is an AggreWell™ plate, for example an AggreWell™ 400 or 800. Within each well of an AggreWell plate, there are a number of microwells (e.g., in each well a 24-well Aggrewell, there are 1200 microwells).

Cells can be seeded or added to the microwells by adding a well-dispersed suspension of single cells of known density into the plate well and centrifuging the plate gently to force cells evenly into the microwells.

The conditions that allows three-dimensional aggregation of cells include seeding cells at a density of at or about 0.5 to $2 \times 10^5$ cells per well, at or about 0.6 to $2 \times 10^5$ cells per well, at or about 0.8 to $2 \times 10^5$ cells per well, at or about 1 to $2 \times 10^5$ cells per well, at or about $0.6 \times 10^5$ cells per well, at or about $0.8 \times 10^5$ cells per well, at or about $1 \times 10^5$ cells per well, at or about $1.2 \times 10^5$ cells per well, at or about $1.4 \times 10^5$ cells per well, at or about $1.6 \times 10^5$ cells per well, at or about $1.8 \times 10^5$ cells per well, or at or about $2 \times 10^5$ cells per well (e.g., when seeding cells in an AggreWell plate as described herein; seeding can be between 1-1000 cells per microwell). Preferably the cells are a single cell suspension before seeding. Preferably, the cells are a cell population of reprogrammed somatic cells exhibiting epiblast (EPI), trophectoderm (TE), and primitive endoderm (PE) transcriptional signatures, or cells in steps c) and/or d) in a method described herein.

Culture Media and Conditions for Generating Multi-Layered Cellular Structures or Blastocyst-Like Structures from Somatic Cells The term "cell culture medium" (also referred to herein as a "culture medium" or "medium") as referred to herein is a medium for culturing cells containing nutrients that maintain cell viability and support proliferation. The cell culture medium may contain any of the following in an appropriate combination: salt(s), buffer(s), amino acids, glucose or other sugar(s), antibiotics, serum or serum replacement, and other components such as peptide growth factors, etc. Cell culture media ordinarily used for particular cell types are known to those skilled in the art. Exemplary cell culture medium for use in methods of the invention are described herein, including those shown in Table 1.

The somatic cells for use in accordance with the methods of the present invention, do not need to have completed reprogramming to the pluripotent state prior to the step of being contacted with the culture medium in step c), as described herein. In other words, the cell is preferably at an intermediate state, transitioning from differentiated state to pluripotent state when it is contacted with the culture medium for enabling aggregation to obtain a blastocyst-like structure or multi-cellular structure. Therefore, the cells at the end of step b) and before culturing in step c), as described herein, may be referred to as reprogramming intermediates.

In certain embodiments, the period of time for culturing the cell to commence reprogramming towards a pluripotent state is at least 1 day following increasing the protein expression, or amount of the one or more factors or starting from when the cells are contacted with an agent to increase protein expression, or amount of the one or more factors. The period of time may be 2, 3, 4, 5, 6, 7, 8, 9, 10, 11, 12, 13, 14, 15, 16, 17, 18, 19, 20 or 21 or more days after increasing the protein expression, or amount of the one or more factors. In any embodiment, the period of time for culturing the cell to commence reprogramming towards a pluripotent state may be any period of time provided that it enables the reduction of markers associated with the somatic cell.

In further embodiments of the invention, the methods above include culturing the cells towards a pluripotent state in a medium that induces upregulation of the EPI, TE and PE lineage transcriptional signatures. Preferably, the medium is fibroblast medium, for example the fibroblast medium defined herein, including in Table 1.

As used herein, the culture medium in step c) may also be referred to as a blastocyst promoting medium or iBlastoid medium. Preferably, the blastocyst promoting medium or iBlastoid medium is any as defined herein. In any embodiment, the cells are cultured in the culture medium in step c) for a period of at least about 1, 2, 3, 4, 5 or 6 days.

In any embodiment, the period of time between increasing the protein expression or amount of the factors for reprogramming the somatic cells towards a pluripotent state, and contacting the cell with the culture medium in step c), may be any period of time provided that it enables the reduction of markers associated with the somatic cell. In further examples, the period of time between increasing the protein expression or amount of the factors and contacting the cell with the culture medium in step c) may be any period of time provided that it enables the cell to proceed through mesenchymal to epithelial transition states. In further or alternative embodiments, the period of time can be any period provided that it enables the expression of epiblast (EPI), trophectoderm (TE), and primitive endoderm (PE) transcriptional signatures.

In any aspect, a culture medium for promoting cells to exhibit at least one characteristic of a blastocyst-like structure, the culture medium comprising
  an agent for activating signalling of the WNT pathway (optionally a GSK-3 inhibitor);
  at least one, preferably 2, TGF-β inhibitors,
  a HDAC inhibitor,
  a growth factor (preferably EGF), and
  a BMP (preferably BMP4).

In this aspect, the WNT activator, TGF-β inhibitor(s), HDAC inhibitor and GSK-3 inhibitor may be any one known in the art, including any one described herein.

Preferably, the culture medium further comprises:
ITS-X;
L-Glutamine;
N-acetyl-L-cysteine;
B-estradiol;
Progesterone;
2-mercaptoethanol;
L-ascorbic acid;
Transferrin (e.g. human),
Insulin (e.g. human),
N2 supplement; and
B27 supplement.

Preferably, the progesterone, transferrin and insulin are provided in a N2 supplement as described herein, further including putrescine and selenite.

Preferably, the B27 supplement comprises biotin, DL alpha tocopherol acetate, DL alpha tocopherol, Vitamin A (Acetate), BSA, catalase, Insulin (human), superoxide dismutase, corticosterone, D-galactose, Ethanolamine HCL, Glutathione, L-Carnitine HCL, Linoleic Acid, Linolenic Acid, Progesterone, Putrescine 2HCl, Sodium Selenite, T3 (triodo-l-thyronine).

In any embodiment, the culture medium further comprises an antibiotic, for example penicillin-streptomycin.

In one embodiment, the culture medium comprises:
IVC1 medium, N2B27 basal medium and TSC basal medium as defined herein in a respective 2:1:1 ratio,
an activator or WNT pathway signalling (optionally a GSK-3 inhibitor),
at least one, preferably 2, TGF-β inhibitors,
a HDAC inhibitor,
a GSK-3 inhibitor,
a growth factor (preferably EGF), and
a BMP (preferably BMP4).

Preferably the TGF-β pathway inhibitor is selected from SB431542 and A83-01, the histone deacetylase (HDAC)1 inhibitor is VPA (Valproic Acid), the GSK-3 Inhibitor is CHIR99021.

Preferably, the GSK-3 Inhibitor is at a concentration of, or about, 2 μM, the TGF-β pathway inhibitor is at a concentration of, or about, 0.5 μM or 1 μM, histone deacetylase (HDAC)1 inhibitor is at a concentration of, or about, 0.8 mM, EGF is at a concentration of, or about, 50 ng/ml, and BMP4 is at a concentration of, or about, 10 ng/ml.

As used herein, a growth factor may be any growth factor, but is preferable one selected from Epidermal Growth Factor (EGF), insulin, transforming growth factor (TGF). The amount of growth factor may be any amount, for example 0.1 to 1000 ng/ml, preferably 10-100 ng/ml, preferably 50 ng/ml.

As used herein, a ROCK inhibitor refers to an inhibitor of Rho-binding kinase. Examples of such inhibitors include ((1R,4r)-4-((R)-1-aminoethyl)-N-(pyridin-4-yl)cyclohexane carboxamide, Abcam), also known as trans-N-(4-(1-aminoethyl)-cyclohexanecarboxamide, 1-(5-isoquinolunyl) (sulfonyl) homopiperazine (1-(5-isoquinolinylsulfonyl)homopiperazine. Typically the amount of ROCK inhibitor will be between about 0.1 to 50 μM, preferably about 1 to 10 μM.

Preferably, the ROCK inhibitor is Y-27632. Preferably, the ROCK inhibitor is at a concentration of, or about, 10 μM.

In another aspect, the culture medium comprises or consists of the Fibroblast medium, the N2B27 basal medium, the TSC basal medium, the IVC1 medium, the IVC2 medium or the Human iBlastoid medium as defined in Table 4.

In any aspect, the culture medium defined in step c) of any method of the invention may be any culture medium of the invention, including but not limited to the Human iBlastoid medium as defined herein, including in Table 4.

TABLE 4

Cell culture media that can be used during the methods described herein for generating a multi-layered cellular structure or blastocyst-like structure (e.g. iBlastoid)

| Media | Components | Company/Reference |
|---|---|---|
| Fibroblast medium | DMEM | ThermoFisher |
| | 10% Fetal Bovine Serum (FBS) | ThermoFisher |
| | 1% Nonessential amino acids | ThermoFisher |
| | 1 mM GlutaMAX | ThermoFisher |
| | 1% Penicillin-streptomycin | ThermoFisher |
| | 55 μM 2-mercaptoethanol | ThermoFisher |
| | and 1 mM sodium pyruvate | ThermoFisher |
| N2B27 basal medium | 50:50 mixture of DMEM/F-12 and Neurobasal medium supplemented with: | All components from ThermoFisher |
| | 2 mM L-Glutamine | |
| | 0.1 mM 2-mercaptoethanol | |
| | 0.5% N2 supplement | |
| | 1% B27 supplement | |
| | 1% Penicillin-streptomycin | |
| TSC basal medium | DMEM/F-12, GlutaMAX supplemented with: | ThermoFisher |
| | 0.3% BSA | Sigma |
| | 0.2% FBS | ThermoFisher |
| | 1% ITS-X supplement | ThermoFisher |
| | 0.1 mM 2-mercaptoethanol | ThermoFisher |
| | 0.5% Penicillin-streptomycin | ThermoFisher |
| | 1.5 μg/ml L-ascorbic acid | Sigma |
| IVC1 medium | Advanced DMEM/F-12 | ThermoFisher |
| | 1% ITS-X supplement | ThermoFisher |
| | 2 mM L-Glutamine | ThermoFisher |
| | 0.5% Penicillin-streptomycin | ThermoFisher |
| | 20% Fetal Bovine Serum (FBS) | ThermoFisher |
| | 25 μM N-acetyl-L-cysteine | Sigma |
| | 8 nM β-estradiol | Sigma |
| | 200 ng/ml progesterone | Sigma |
| IVC2 medium | Advanced DMEM/F-12 | ThermoFisher |
| | 1% ITS-X supplement | ThermoFisher |
| | 2 mM L-Glutamine | ThermoFisher |
| | 0.5% Penicillin-streptomycin | ThermoFisher |
| | 30% Knockout Serum Replacement (KSR) | ThermoFisher |
| | 25 μM N-acetyl-L-cysteine | Sigma |
| | 8 nM β-estradiol | Sigma |
| | 200 ng/ml progesterone | Sigma |
| Human iBlastoid medium | IVC1 medium, N2B27 basal medium and TSC basal medium (as above) in a respective 2:1:1 ratio supplemented with: | Miltenyi Biotec |
| | 2 μM CHIR99021 | Sigma |
| | 0.5 μM A83-01 | |
| | 1 μM SB431542 | |
| | 0.8 mM Valproic acid (VPA) | Sigma |
| | 50 ng/ml EGF | Peprotech |
| | 10 ng/ml BMP4 | Miltenyi Biotec |
| | Optionally with: | Selleckchem |
| | 10 μM Y-27632 | |
| NACL medium | N2B27 basal medium supplemented with: | |
| | 3 μM CHIR99021 | |
| | 100 ng/ml Activin A | Miltenyi Biotec |
| | 10 ng/ml human LIF | Peprotech |
| | | Made in house/ Peprotech |
| PA medium | N2B27 basal medium supplemented with: | |
| | 1 μM PD0325901 | Miltenyi Biotec |
| | 1 μM A83-01 | Sigma |

TABLE 4-continued

Cell culture media that can be used during the methods described herein for generating a multi-layered cellular structure or blastocyst-like structure (e.g. iBlastoid)

| Media | Components | Company/Reference |
|---|---|---|
| t2iLGo medium | N2B27 basal medium supplemented with: | |
| | 1 µM PD0325901 | Miltenyi Biotec |
| | 1 µM CHIR99021 | Miltenyi Biotec |
| | 2.5 µM Go6983 | Tocris |
| | 250 µM Ascorbic Acid | Sigma |
| | 10 ng/ml human LIF | Made in house/ Peprotech |
| | 10 µM Y27632 | Selleckchem |

Nucleic Acids and Vectors for Generating Multi-Layered Cellular Structures or Blastocyst-Like Structures A nucleic acid or vector comprising a nucleic acid as described herein may include one or more of the sequences referred to in Table 3. The nucleic acid or vector may comprise a sequence encoding one or more of the factors for reprogramming the somatic cells towards a pluripotent state.

The term "expression" refers to the cellular processes involved in producing RNA and proteins and as appropriate, secreting proteins, including where applicable, but not limited to, for example, transcription, translation, folding, modification and processing.

The term "isolated" or "partially purified" as used herein refers, in the case of a nucleic acid or polypeptide, to a nucleic acid or polypeptide separated from at least one other component (e.g., nucleic acid or polypeptide) that is present with the nucleic acid or polypeptide as found in its natural source and/or that would be present with the nucleic acid or polypeptide when expressed by a cell, or secreted in the case of secreted polypeptides. A chemically synthesized nucleic acid or polypeptide or one synthesized using in vitro transcription/translation is considered "isolated".

The term "vector" refers to a carrier DNA molecule into which a DNA sequence can be inserted for introduction into a host or somatic cell. Preferred vectors are those capable of autonomous replication and/or expression of nucleic acids to which they are linked. Vectors capable of directing the expression of genes to which they are operatively linked are referred to herein as "expression vectors". Thus, an "expression vector" is a specialized vector that contains the necessary regulatory regions needed for expression of a gene of interest in a host cell. In some embodiments the gene of interest is operably linked to another sequence in the vector. Vectors can be viral vectors or non-viral vectors. Should viral vectors be used, it is preferred that the viral vectors are replication defective, which can be achieved for example by removing all viral nucleic acids that encode for replication. A replication defective viral vector will still retain its infective properties and enter the cells in a similar manner as a replicating adenoviral vector, however once admitted to the cell a replication defective viral vector does not reproduce or multiply. Vectors also encompass liposomes and nanoparticles and other means to deliver DNA molecule to a cell.

The term "operably linked" means that the regulatory sequences necessary for expression of the coding sequence are placed in the DNA molecule in the appropriate positions relative to the coding sequence so as to affect expression of the coding sequence. This same definition is sometimes applied to the arrangement of coding sequences and transcription control elements (e.g. promoters, enhancers, and termination elements) in an expression vector. The term "operatively linked" includes having an appropriate start signal (e.g. ATG) in front of the polynucleotide sequence to be expressed, and maintaining the correct reading frame to permit expression of the polynucleotide sequence under the control of the expression control sequence, and production of the desired polypeptide encoded by the polynucleotide sequence.

The term "viral vectors" refers to the use of viruses, or virus-associated vectors as carriers of a nucleic acid construct into a cell. Constructs may be integrated and packaged into non-replicating, defective viral genomes like Adenovirus, Adeno-associated virus (AAV), or Herpes simplex virus (HSV) or others, including retroviral and lentiviral vectors, for infection or transduction into cells. The vector may or may not be incorporated into the cell's genome. The constructs may include viral sequences for transfection, if desired. Alternatively, the construct may be incorporated into vectors capable of episomal replication, e.g EPV and EBV vectors.

As used herein, the term "adenovirus" refers to a virus of the family Adenovirida. Adenoviruses are medium-sized (90-100 nm), nonenveloped (naked) icosahedral viruses composed of a nucleocapsid and a double-stranded linear DNA genome.

As used herein, the term "non-integrating viral vector" refers to a viral vector that does not integrate into the host genome; the expression of the gene delivered by the viral vector is temporary. Since there is little to no integration into the host genome, non-integrating viral vectors have the advantage of not producing DNA mutations by inserting at a random point in the genome. For example, a non-integrating viral vector remains extra-chromosomal and does not insert its genes into the host genome, potentially disrupting the expression of endogenous genes. Non-integrating viral vectors can include, but are not limited to, the following: adenovirus, alphavirus, picornavirus, and vaccinia virus. These viral vectors are "non-integrating" viral vectors as the term is used herein, despite the possibility that any of them may, in some rare circumstances, integrate viral nucleic acid into a host cell's genome. What is critical is that the viral vectors used in the methods described herein do not, as a rule or as a primary part of their life cycle under the conditions employed, integrate their nucleic acid into a host cell's genome.

The vectors described herein can be constructed and engineered using methods generally known in the scientific literature to increase their safety for use in therapy, to include selection and enrichment markers, if desired, and to optimize expression of nucleotide sequences contained thereon. The vectors should include structural components that permit the vector to self-replicate in the somatic cell type. For example, the known Epstein Barr oriP/Nuclear Antigen-1 (EBNA-I) combination (see, e.g., Lindner, S. E. and B. Sugden, The plasmid replicon of Epstein-Barr virus: mechanistic insights into efficient, licensed, extrachromosomal replication in human cells, Plasmid 58:1 (2007), incorporated by reference as if set forth herein in its entirety) is sufficient to support vector self-replication and other combinations known to function in mammalian, particularly primate, cells can also be employed. Standard techniques for the construction of expression vectors suitable for use in the present invention are well-known to one of ordinary skill in the art and can be found in publications such as Sambrook J, et al., "Molecular cloning: a laboratory manual," (3rd ed. Cold Spring harbor Press, Cold Spring Harbor, N. Y. 2001), incorporated herein by reference as if set forth in its entirety.

In the methods of the invention, genetic material encoding the relevant transcription factors required for a conversion is delivered into the somatic cells via one or more reprogramming vectors. Each transcription factor can be introduced into the somatic cells as a polynucleotide transgene that encodes the transcription factor operably linked to a heterologous promoter that can drive expression of the polynucleotide in the somatic cell.

Suitable reprogramming vectors are any described herein, including episomal vectors, such as plasmids, that do not encode all or part of a viral genome sufficient to give rise to an infectious or replication-competent virus, although the vectors can contain structural elements obtained from one or more virus. One or a plurality of reprogramming vectors can be introduced into a single somatic cell. One or more transgenes can be provided on a single reprogramming vector. One strong, constitutive transcriptional promoter can provide transcriptional control for a plurality of transgenes, which can be provided as an expression cassette. Separate expression cassettes on a vector can be under the transcriptional control of separate strong, constitutive promoters, which can be copies of the same promoter or can be distinct promoters. Various heterologous promoters are known in the art and can be used depending on factors such as the desired expression level of the transcription factor. It can be advantageous, as exemplified below, to control transcription of separate expression cassettes using distinct promoters having distinct strengths in the v cells. Another consideration in selection of the transcriptional promoters is the rate at which the promoter(s) is silenced. The skilled artisan will appreciate that it can be advantageous to reduce expression of one or more transgenes or transgene expression cassettes after the product of the gene(s) has completed or substantially completed its role in the reprogramming method. Exemplary promoters are the human EF1α elongation factor promoter, CMV cytomegalovirus immediate early promoter and CAG chicken albumin promoter, and corresponding homologous promoters from other species. In human somatic cells, both EF1α and CMV are strong promoters, but the CMV promoter is silenced more efficiently than the EF1α promoter such that expression of transgenes under control of the former is turned off sooner than that of transgenes under control of the latter. The transcription factors can be expressed in the somatic cells in a relative ratio that can be varied to modulate reprogramming efficiency. Preferably, where a plurality of transgenes is encoded on a single transcript, an internal ribosome entry site is provided upstream of transgene(s) distal from the transcriptional promoter. Although the relative ratio of factors can vary depending upon the factors delivered, one of ordinary skill in possession of this disclosure can determine an optimal ratio of factors.

The skilled artisan will appreciate that the advantageous efficiency of introducing all factors via a single vector rather than via a plurality of vectors, but that as total vector size increases, it becomes increasingly difficult to introduce the vector. The skilled artisan will also appreciate that the position of a transcription factor on a vector can affect its temporal expression, and the resulting reprogramming efficiency. As such, Applicants employed various combinations of factors on combinations of vectors. Several such combinations are here shown to support reprogramming.

After introduction of the reprogramming vector(s) and while the somatic cells are being reprogrammed, the vectors can persist in target cells while the introduced transgenes are transcribed and translated. Transgene expression can be advantageously downregulated or turned off in cells that have been reprogrammed to a target cell type. The reprogramming vector(s) can remain extra-chromosomal. At extremely low efficiency, the vector(s) can integrate into the cells' genome. The examples that follow are intended to illustrate but in no way limit the present invention.

Suitable methods for nucleic acid delivery for transformation of a cell, a tissue or an organism for use with the current invention are believed to include virtually any method by which a nucleic acid (e.g., DNA) can be introduced into a cell, a tissue or an organism, as described herein or as would be known to one of ordinary skill in the art (e.g., Stadtfeld and Hochedlinger, Nature Methods 6(5):329-330 (2009); Yusa et al., Nat. Methods 6:363-369 (2009); Woltjen, et al., Nature 458, 766-770 (9 Apr. 2009)). Such methods include, but are not limited to, direct delivery of DNA such as by ex vivo transfection (Wilson et al., Science, 244:1344-1346, 1989, Nabel and Baltimore, Nature 326: 711-713, 1987), optionally with a lipid-based transfection reagent such as Fugene6 (Roche) or Lipofectamine (Invitrogen), by injection (U.S. Pat. Nos. 5,994,624, 5,981,274, 5,945,100, 5,780,448, 5,736,524, 5,702,932, 5,656,610, 5,589,466 and 5,580,859, each incorporated herein by reference), including microinjection (Harland and Weintraub, J. Cell Biol., 101:1094-1099, 1985; U.S. Pat. No. 5,789,215, incorporated herein by reference); by electroporation (U.S. Pat. No. 5,384,253, incorporated herein by reference; Tur-Kaspa et al., Mol. Cell Biol., 6:716-718, 1986; Potter et al., Proc. Nat'l Acad. Sci. USA, 81:7161-7165, 1984); by calcium phosphate precipitation (Graham and Van Der Eb, Virology, 52:456-467, 1973; Chen and Okayama, Mol. Cell Biol., 7(8):2745-2752, 1987; Rippe et al., Mol. Cell Biol., 10:689-695, 1990); by using DEAE-dextran followed by polyethylene glycol (Gopal, Mol. Cell Biol., 5:1188-1190, 1985); by direct sonic loading (Fechheimer et al., Proc. Nat'l Acad. Sci. USA, 84:8463-8467, 1987); by liposome mediated transfection (Nicolau and Sene, Biochim. Biophys. Acta, 721:185-190, 1982; Fraley et al., Proc. Nat'l Acad. Sci. USA, 76:3348-3352, 1979: Nicolau et al., Methods Enzymol., 149:157-176, 1987; Wong et al., Gene, 10:87-94, 1980; Kaneda et al., Science, 243:375-378, 1989; Kato et al., J Biol. Chem., 266:3361-3364, 1991) and receptor-mediated transfection (Wu and Wu, Biochemistry, 27:887-892, 1988: Wu and Wu, J. Biol. Chem., 262:4429-4432, 1987); and any combination of such methods, each of which is incorporated herein by reference.

A number of polypeptides capable of mediating introduction of associated molecules into a cell have been described previously and can be adapted to the present invention. See, e.g., Langel (2002) Cell Penetrating Peptides: Processes and Applications, CRC Press, Pharmacology and Toxicology Series. Examples of polypeptide sequences that enhance transport across membranes include, but are not limited to, the *Drosophila* homeoprotein antennapedia transcription protein (AntHD) (Joliot et al., New Biol. 3: 1121-34, 1991; Joliot et al., Proc. Natl. Acad. Sci. USA, 88: 1864-8, 1991; Le Roux et al., Proc. Natl. Acad. Sci. USA, 90: 9120-4, 1993), the herpes simplex virus structural protein VP22 (Elliott and O'Hare, Cell 88: 223-33, 1997); the HIV-1 transcriptional activator TAT protein (Green and Loewenstein, Cell 55: 1179-1188, 1988: Frankel and Pabo, Cell 55: 1 289-1193, 1988): Kaposi FGF signal sequence (kFGF); protein transduction domain-4 (PTD4); Penetratin, M918, Transportan-10; a nuclear localization sequence, a PEP-1 peptide; an amphipathic peptide (e.g., an MPG peptide); delivery enhancing transporters such as described in U.S. Pat. No. 6,730,293 (including but not limited to an peptide sequence comprising at least 5-25 or more contiguous arginines or 5-25 or more arginines in a contiguous set of 30, 40, or 50 amino acids: including but not limited to an peptide having sufficient e.g., at least 5, guanidino or amidino moieties); and commercially available Penetratin™ 1 peptide, and the Diatos Peptide Vectors ("DPVs") of the Vectocell® platform available from Daitos S. A. of Pads, France. See also, WO/2005/084158 and WO/2007/123667 and additional transporters described therein. Not only can these proteins pass through the plasma membrane but the attachment of other proteins, such as the transcription factors described herein, is sufficient to stimulate the cellular uptake of these complexes.

TABLE 5

Marker genes expressed only in either the primed or naïve pluripotent states.

| Pluripotency state | Gene ID | Gene name |
|---|---|---|
| Primed | ENSG00000156687 | UNC5D |
| Primed | ENSG00000146938 | NLGN4X |
| Primed | ENSG00000144724 | PTPRG |
| Primed | ENSG00000248605 | AC022140.1 |
| Primed | ENSG00000172554 | SNTG2 |
| Primed | ENSG00000133424 | LARGE1 |
| Primed | ENSG00000008083 | JARID2 |
| Primed | ENSG00000162105 | SHANK2 |
| Primed | ENSG00000176406 | RIMS2 |
| Primed | ENSG00000183166 | CALN1 |
| Primed | ENSG00000184408 | KCND2 |
| Primed | ENSG00000179915 | NRXN1 |
| Primed | ENSG00000152284 | TCF7L1 |
| Primed | ENSG00000170579 | DLGAP1 |
| Primed | ENSG00000139364 | TMEM132B |
| Primed | ENSG00000261115 | TMEM178B |
| Primed | ENSG00000228222 | AC073050.1 |
| Primed | ENSG00000150907 | FOXO1 |
| Primed | ENSG00000078295 | ADCY2 |
| Primed | ENSG00000175161 | CADM2 |
| Primed | ENSG00000185274 | GALNT17 |
| Primed | ENSG00000147601 | TERF1 |
| Primed | ENSG00000151150 | ANK3 |
| Primed | ENSG00000213468 | FIRRE |
| Primed | ENSG00000231698 | AP002856.2 |
| Primed | ENSG00000254277 | AC009446.1 |
| Primed | ENSG00000237515 | SHISA9 |
| Primed | ENSG00000203279 | AL590705.1 |
| Primed | ENSG00000185261 | KIAA0825 |
| Primed | ENSG00000182050 | MGAT4C |
| Primed | ENSG00000175497 | DPP10 |
| Primed | ENSG00000237742 | AL365259.1 |
| Primed | ENSG00000106278 | PTPRZ1 |
| Primed | ENSG00000198626 | RYR2 |
| Primed | ENSG00000254934 | LINC00678 |
| Primed | ENSG00000156049 | GNA14 |
| Primed | ENSG00000134769 | DTNA |
| Primed | ENSG00000183098 | GPC6 |
| Primed | ENSG00000011201 | ANOS1 |
| Primed | ENSG00000183230 | CTNNA3 |
| Primed | ENSG00000102290 | PCDH11X |
| Primed | ENSG00000076716 | GPC4 |
| Primed | ENSG00000171724 | VAT1L |
| Primed | ENSG00000243709 | LEFTY1 |
| Primed | ENSG00000137285 | TUBB28 |
| Primed | ENSG00000174469 | CNTNAP2 |
| Primed | ENSG00000176728 | TTTY14 |
| Primed | ENSG00000176049 | JAKMIP2 |
| Primed | ENSG00000229335 | DANT1 |
| Primed | ENSG00000251680 | AC008591.1 |
| Primed | ENSG00000197462 | AC003975.1 |
| Primed | ENSG00000245573 | BDNF-AS |
| Primed | ENSG00000154277 | UCHL1 |
| Primed | ENSG00000150471 | ADGRL3 |
| Naïve | ENSG00000154645 | CHODL |
| Naïve | ENSG00000167634 | NLRP7 |
| Naïve | ENSG00000112394 | SLC16A10 |
| Naïve | ENSG00000171794 | UTF1 |
| Naïve | ENSG00000125144 | MT1G |

TABLE 5-continued

Marker genes expressed only in either the primed or naïve pluripotent states.

| Pluripotency state | Gene ID | Gene name |
|---|---|---|
| Naïve | ENSG00000267383 | AC011447.3 |
| Naïve | ENSG00000203995 | ZYG11A |
| Naïve | ENSG00000078699 | CBFA2T2 |
| Naïve | ENSG00000205358 | MT1H |
| Naïve | ENSG00000232790 | LINC01162 |
| Naïve | ENSG00000227330 | AF130417.1 |
| Naïve | ENSG00000189190 | ZNF600 |
| Naïve | ENSG00000131016 | AKAP12 |
| Naïve | ENSG00000179046 | TRIML2 |
| Naïve | ENSG00000198554 | WDHD1 |
| Naïve | ENSG00000100033 | PRODH |
| Naïve | ENSG00000174718 | RESF1 |
| Naïve | ENSG00000170542 | SERPINB9 |
| Naïve | ENSG00000260364 | AC009055.1 |
| Naïve | ENSG00000022556 | NLRP2 |
| Naïve | ENSG00000204929 | AC007389.1 |
| Naïve | ENSG00000091592 | NLRP1 |
| Naïve | ENSG00000234423 | LINC01250 |
| Naïve | ENSG00000162174 | ASRGL1 |
| Naïve | ENSG00000249988 | AC092546.1 |
| Naïve | ENSG00000237764 | RP11-3B12.1 |
| Naïve | ENSG00000237136 | C4orf51 |
| Naïve | ENSG00000251027 | LINC01950 |
| Naïve | ENSG00000251567 | AC018680.1 |
| Naïve | ENSG00000251574 | AC099520.1 |
| Naïve | ENSG00000234948 | LINC01524 |
| Naïve | ENSG00000254101 | LINC02055 |
| Naïve | ENSG00000249174 | AC106744.1 |
| Naïve | ENSG00000165186 | PTCHD1 |
| Naïve | ENSG00000122912 | SLC25A16 |
| Naïve | ENSG00000142182 | DNMT3L |
| Naïve | ENSG00000100181 | TPTEP1 |
| Naïve | ENSG00000153253 | SCN3A |
| Naïve | ENSG00000237534 | RP11-501G6.1 |
| Naïve | ENSG00000196350 | ZNF729 |
| Naïve | ENSG00000188822 | CNR2 |
| Naïve | ENSG00000233067 | PTCHD1-AS |
| Naïve | ENSG00000105717 | PBX4 |
| Naïve | ENSG00000137948 | BRDT |
| Naïve | ENSG00000122025 | FLT3 |
| Naïve | ENSG00000163435 | ELF3 |
| Naïve | ENSG00000163286 | ALPG |

EXAMPLES

Example 1—Ethics Statement

This research was performed with the approval of the Institutional Monash University Human Research Ethics Committee (First by MUHREC 2020-22909-39935 and later by MUHREC 2020-27147-51995). MUHREC 2020-22909-39935 covered the experimental work involving functional and molecular characterization of human fibroblasts undergoing reprogramming and to characterise these cells using 3D-organoid based culture systems. MUHREC 2020-27147-51995 covered the generation, molecular and functional characterization of iBlastoids Furthermore, since there is currently no precedent to working with human blastoid models, beside seeking approval the inventors' Institutional Human Research Ethics Committee, the inventors performed all experiments in concordance with published recommendations (Hyun et al. Stem Cell Reports 14, 169-174 (2020)), as well as adhering to the international consensus for culturing human embryos up to 14 days post-fertilization and/or formation of primitive streak (PS), whichever is first (Warnock, Ir. Nurs. News 5, 7-8 (1985)).

Given that the "14-day rule" is not easy to apply to iBlastoids given that the starting material is not from embryonic origin, HDFs were derived from adult tissues, the inventors focused on culturing the iBlastoids for the minimal time necessary, in this case a maximum of 5 additional days (equivalent to ~E11), and terminating the experiments before morphological evidence of PS so as to remain well within international guidelines (Hyun and Warnock, supra).

Figure 8:
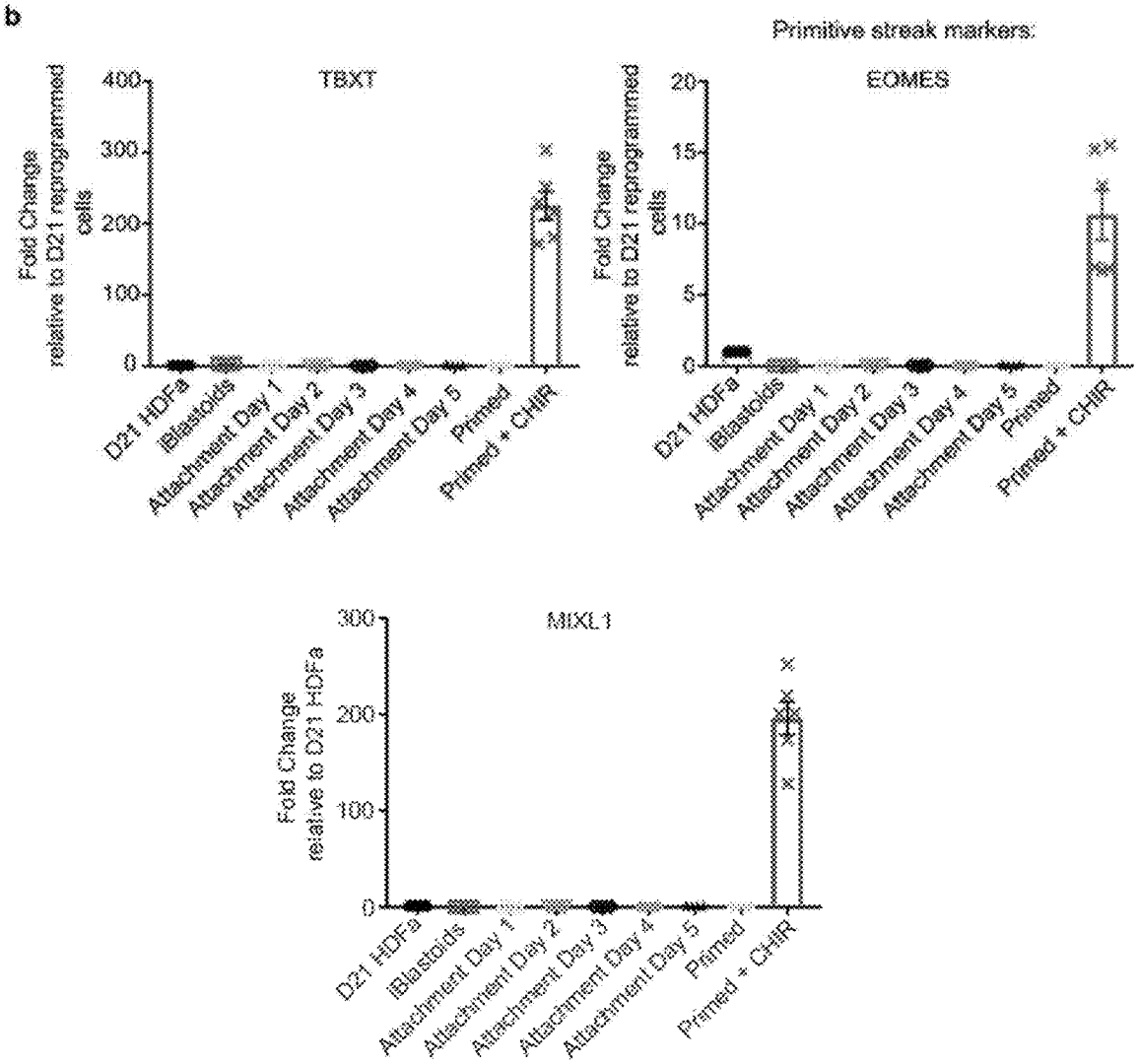
FIG. 8. Assessment of epiblast development in attached iBlastoids. a, Schematic of the experimental design for iBlastoid in vitro attachment assay. b, Time-course qRT-PCR analysis of primitive streak markers (TBXT, EOMES, and MIXL1) in iBlastoids for up to day 5 in the attachment assay. Positive control for TBXT, EOMES, and MIXL1 was generated using a previously published mesoderm differentiation protocol (Lam et al., 2014, J. Am. Soc. Nephrol) (n=6) c, Attached iBlastoids stained for CDX2 and NANOG (n=5). d, Attached iBlastoids stained for GATA2, OCT4, and SOX2 (n=3). e, Zoom-in view of attached iBlastoids stained for NANOG, and SOX17 (n=2). f, Zoom-in view of attached iBlastoids stained for OCT4, and GATA6 (n=2). Scale bar for c-f, 100 μm. g, Z-section series of attached iBlastoids stained with F-actin, OCT4 and aPKC with the zoom-in view of pro-amniotic cavity, n=2. Scale bar, 20 μm. h, Immunostaining of iBlastoids, day 1 attached iBlastoids and day 3 attached iBlastoids for F-actin, OCT4 and aPKC, n=2. Scale bar, 20 μm. The appearance of the pro-amniotic-like cavity is marked by the arrows. i, Immunostaining of iBlastoids and attached iBlastoids for KRT7 and NANOG, n=4. j, Attached iBlastoids stained for F-actin and NANOG, n=2. k, Immunostaining of iBlastoids and attached iBlastoids for MMP2 and hCG, n=2.
Figure 8:
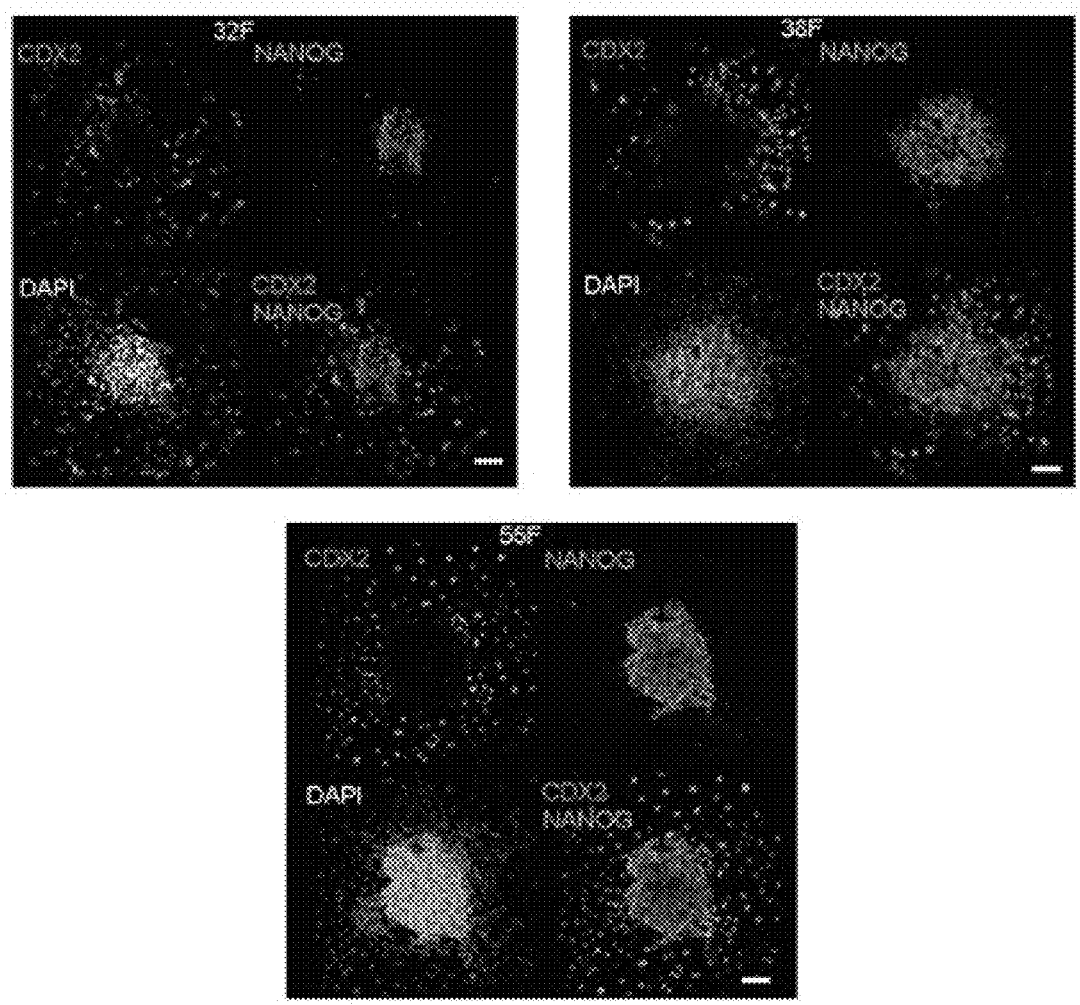
Figure 8:
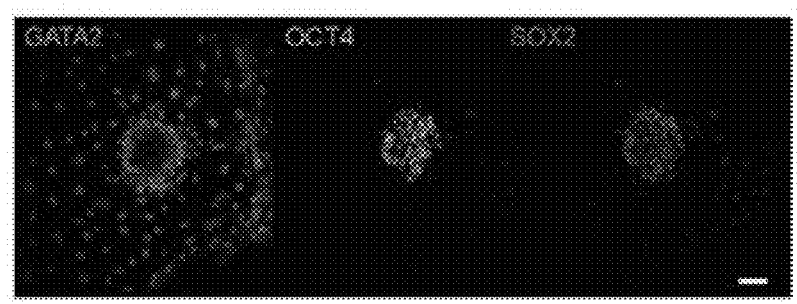
Figure 8:
Figure 8:
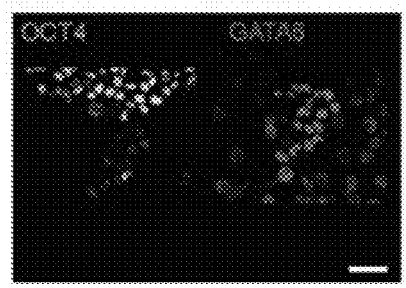
Figure 8:
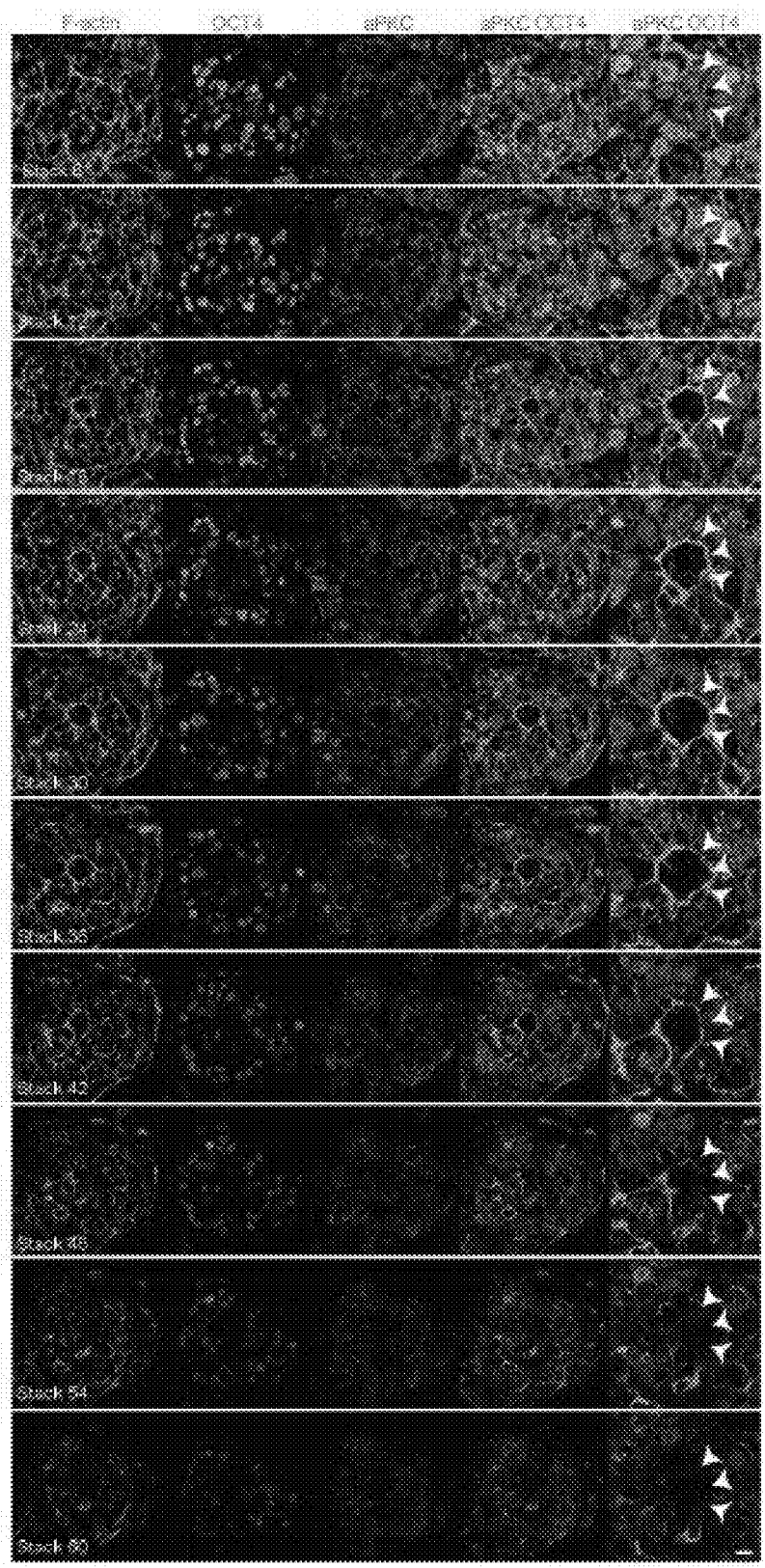
Figure 8:
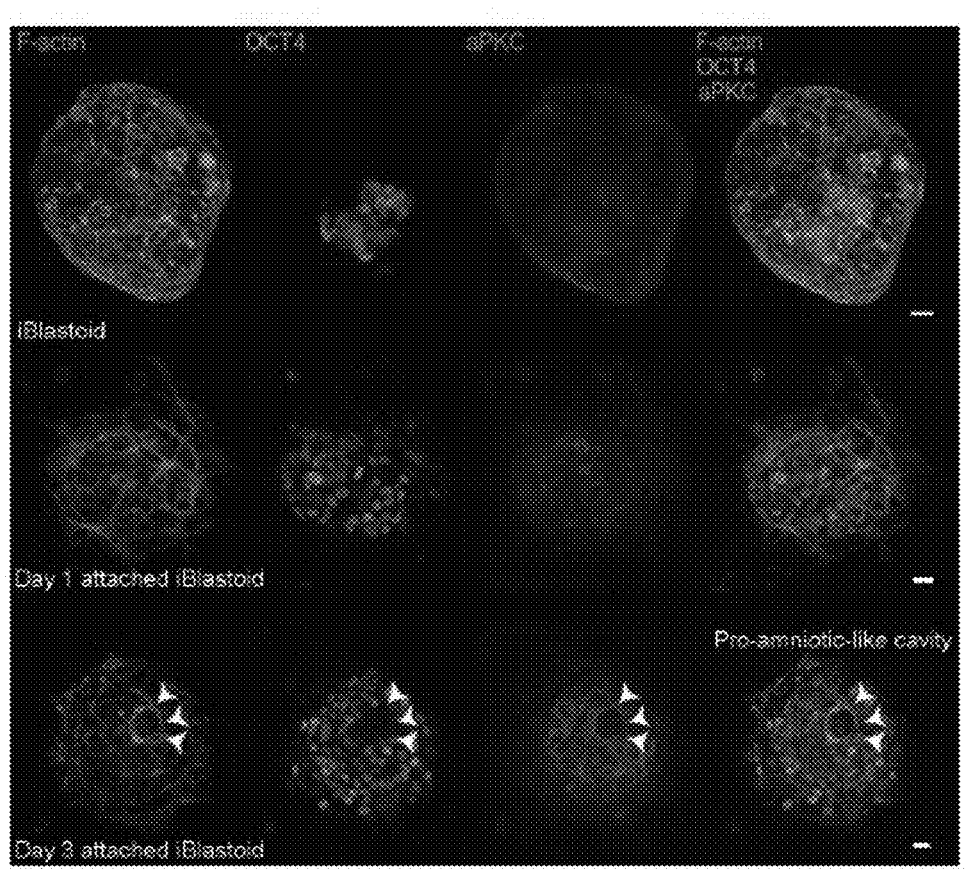
Figure 8:
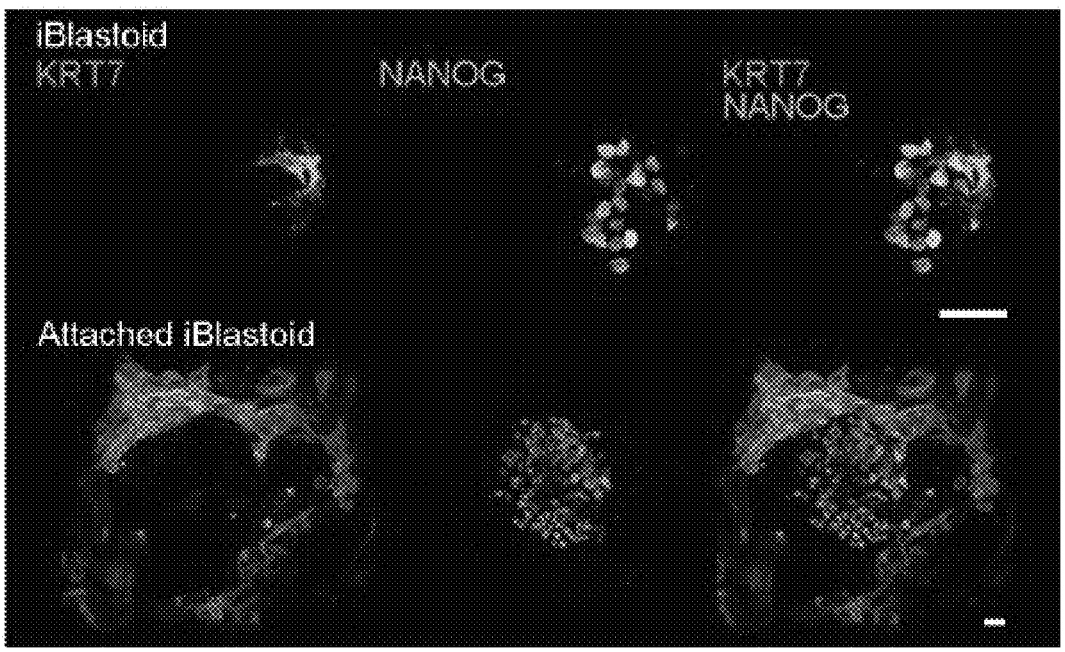
Figure 8:
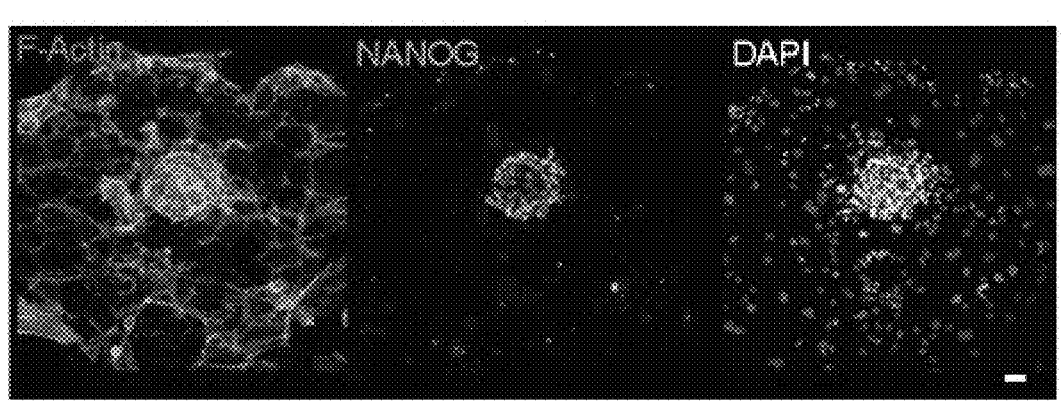
Figure 8:
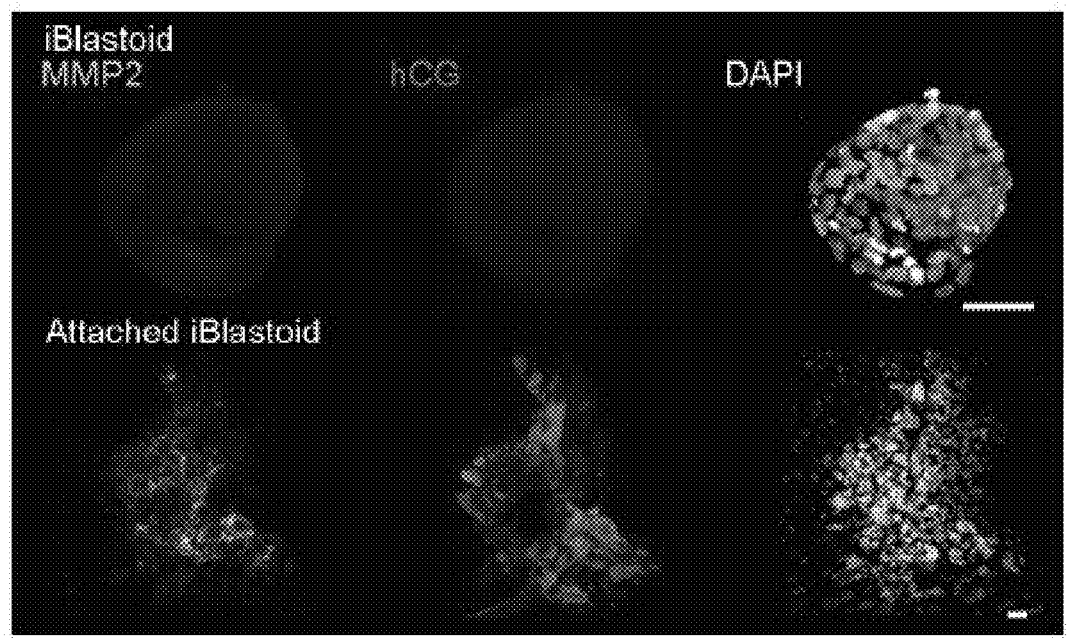

To rule-out molecular evidence of PS formation, the inventors performed a qRT-PCR 24 hr-time course of several key primitive streak markers (Xiang, L. et al. Nature 577, 537-542 (2020); Takahashi, K. et al. Nat. Commun. 5, 3678 (2014); Tyser, et al. bioRxiv (2020)) during the 5-day embryo attachment culture and did not observe up-regulation of TBXT, EOMES or MIXL1 or any morphological changes indicative of gastrulation (Tyser, Supra; O'Rahilly, R. & Müller, F. Developmental stages in human embryos: revised and new measurements. Cells Tissues Organs 192, 73-84 (2010); Yamaguchi, Y. & Yamada, S. Cells Tissues Organs 205, 314-319 (2018)) (FIG. 8b, FIG. 8a). Therefore, with 5-days of iBlastoid attachment culture, the EPI compartment did not progress to formation of a PS. Nevertheless, by stringently adhering to the above parameters, all subsequent human iBlastoid attachment culture experiments were performed for a total of 4.5 days after iBlastoid formation (FIG. 8a).

Example 2—Cell Culture Medium

Fibroblast medium: DMEM (ThermoFisher), 10% Fetal Bovine Serum (FBS, Hyclone), 1% Nonessential amino acids (ThermoFisher), 1 mM GlutaMAX (ThermoFisher), 1% Penicillin-streptomycin (ThermoFisher), 55 µM 2-mercaptoethanol (ThermoFisher) and 1 mM sodium pyruvate (ThermoFisher).

N2B27 basal medium: 50:50 mixture of DMEM/F-12 (ThermoFisher) and Neurobasal medium (ThermoFisher), supplemented with 2 mM L-Glutamine (ThermoFisher), 0.1 mM 2-mercaptoethanol (ThermoFisher), 0.5% N2 supplement (ThermoFisher), 1% B27 supplement (ThermoFisher), 1% Penicillin-streptomycin (ThermoFisher).

TSC basal medium: DMEM/F-12, GlutaMAX (ThermoFisher) supplemented with 0.3% BSA (Sigma), 0.2% FBS (ThermoFisher), 1% ITS-X supplement (ThermoFisher), 0.1 mM 2-mercaptoethanol (ThermoFisher), 0.5% Penicillin-streptomycin (ThermoFisher), 1.5 µg/ml L-ascorbic acid (Sigma).

IVC1 medium: Advanced DMEM/F-12 (ThermoFisher), 1% ITS-X supplement (ThermoFisher), 2 mM L-Glutamine (ThermoFisher), 0.5% Penicillin-streptomycin (ThermoFisher), 20% Fetal Bovine Serum (FBS, Hyclone), 25 M N-acetyl-L-cysteine (Sigma), 8 nM β-estradiol (Sigma) and 200 ng/ml progesterone (Sigma). IVC2 medium: Advanced DMEM/F-12 (ThermoFisher), 1% ITS-X supplement (ThermoFisher), 2 mM L-Glutamine (ThermoFisher), 0.5% Penicillin-streptomycin (ThermoFisher), 30% Knockout Serum Replacement (KSR, ThermoFisher), 25 µM N-acetyl-L-cysteine (Sigma), 8 nM R-estradiol (Sigma) and 200 ng/ml progesterone (Sigma).

Human iBlastoid medium: IVC1 medium, N2B327 basal medium and TSC basal medium in a respective 2:1:1 ratio supplemented with 2 µM CHIR99021 (Miltenyi Biotec), 0.5 µM A83-01 (Sigma). 1 µM SB431542, 0.8 mM Valproic acid (VPA, Sigma), 50 ng/ml EGF (Peprotech) and 10 ng/ml BMP4 (Miltenyi Biotec).

| Media | Components | Company/Reference |
|---|---|---|
| Fibroblast medium | DMEM | ThermoFisher |
| | 10% Fetal Bovine Serum (FBS) | ThermoFisher |
| | 1% Nonessential amino acids | ThermoFisher |
| | 1 mM GlutaMAX | ThermoFisher |
| | 1% Penicillin-streptomycin | ThermoFisher |
| | 55 µM 2-mercaptoethanol | ThermoFisher |
| | and 1 mM sodium pyruvate | ThermoFisher |
| MSC medium | MEM-alpha | ThermoFisher |
| | 16.67% Fetal Bovine Serum (FBS) | ThermoFisher |
| | 2 mM L-Glutamine | ThermoFisher |
| | 1% Penicillin-streptomycin | ThermoFisher |
| PBMC medium | StemPro-34 medium | ThermoFisher |
| | 2 mM L-Glutamine | ThermoFisher |
| | 1% Penicillin-streptomycin | ThermoFisher |
| | 100 ng/ml SCF | Miltenyi Biotec |
| | 100 ng/ml FLT-3L | Miltenyi Biotec |
| | 20 ng/ml IL-3 | Miltenyi Biotec |
| | 20 ng/ml IL-6 | Miltenyi Biotec |

Example 3—iBlastoids Generation by Reprogramming

All cell lines used in this study were authenticated, mycoplasma tested as described in the Reporting Summary. Primary human adult dermal fibroblasts (HDFa) from three different female donors were obtained from ThermoFisher (Catalogue number C-013-5C and lot #1029000 for 38F, lot #1528526 for 55F and lot #1569390 for 32F), cells were recovered and plated in medium 106 (ThermoFisher) supplemented with low serum growth supplement (LSGS) (ThermoFisher) for expansion.

Figure 1:
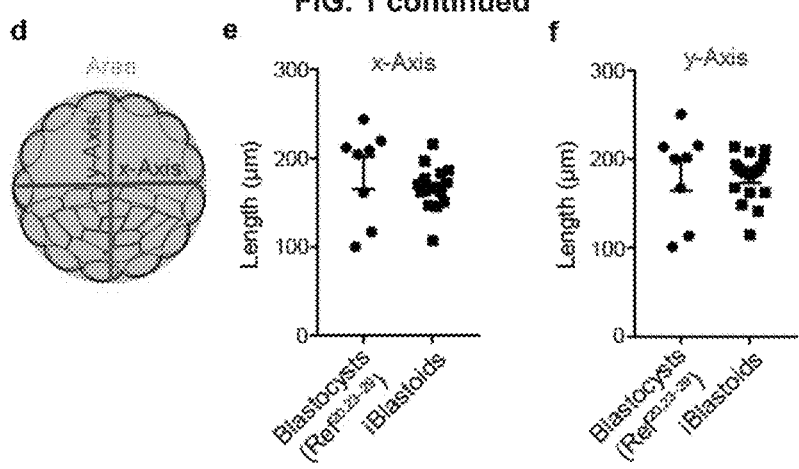
FIG. 1. Generation of human iBlastoids by reprogramming. a, Experimental design for reprogramming and iBlastoid derivation. b, Phase-contrast image of iBlastoid (n=5). Scale bar, 50 µm. c, Phase-contrast and immunostaining images of iBlastoids for NANOG (n=5). Scale bar, 50 µm. d-h, Measurement of x- and y-axis diameter, x/y aspect ratio, projection area of iBlastoids (n=18) compared to human blastocysts (Shahbazi, M. N. et al. Nat. Cell Biol. 18, 700-708 (2016); Blakeley, P. et al. Development 142, 3613 (2015): Petropoulos, S. et al. Cell 165, 1012-1026 (2016); Xiang, L. et al. Nature 577, 537-542 (2020); Qin, H. et al. Cell Rep. 14, 2301-2312 (2016); Liu, L. et al. Nat. Commun. 10, 364 (2019); Durruthy-Durruthy, J. et al. Dev. Cell 38, 100-115 (2016): Fogarty, N. M. E. et al. Nature 550, 67-73 (2017)) (n=8). i, Total cell number estimation of iBlastoids (n=14). j, 3D and 2D representation of iBlastoids stained for CDX2 and NANOG (n=5). Scale bar, 20 µm. k-l, Representative DIC representation and CDX2, NANOG immunostaining of iBlastoids (n=5) illustrating the blastocoel-like cavity as indicated by the arrowhead. Scale bar, 10 µm. m, Immunostaining of iBlastoids for GATA2, OCT4 and SOX2 (n=3). Scale bar, 20 µm. n, iBlastoid stained for GATA2, NANOG and SOX17 with ICM-like compartment-zoom showing SOX17 positive PE-like cells (n=2). o, iBlastoids stained for CDX2, OCT4 and GATA6 with ICM-like compartment-zoom showing CDX2 low and GATA6 positive PE-like cells (n=2). Scale bar for n-o=10 µm. p-q, Representative images of iBlastoids stained for F-actin and NANOG with EPI-like and TE-like cells zoom-in (q) highlighting their morphological differences (n=2). r, 3D segmentation of the iBlastoids in (p) based on F-actin (light blue) and NANOG (orange). Scale bar for p-r=10 μm for whole iBlastoids, 2 μm for ICM zoom. s, F-actin, OCT4 and KRT8 co-staining, n=2.
Figure 1:
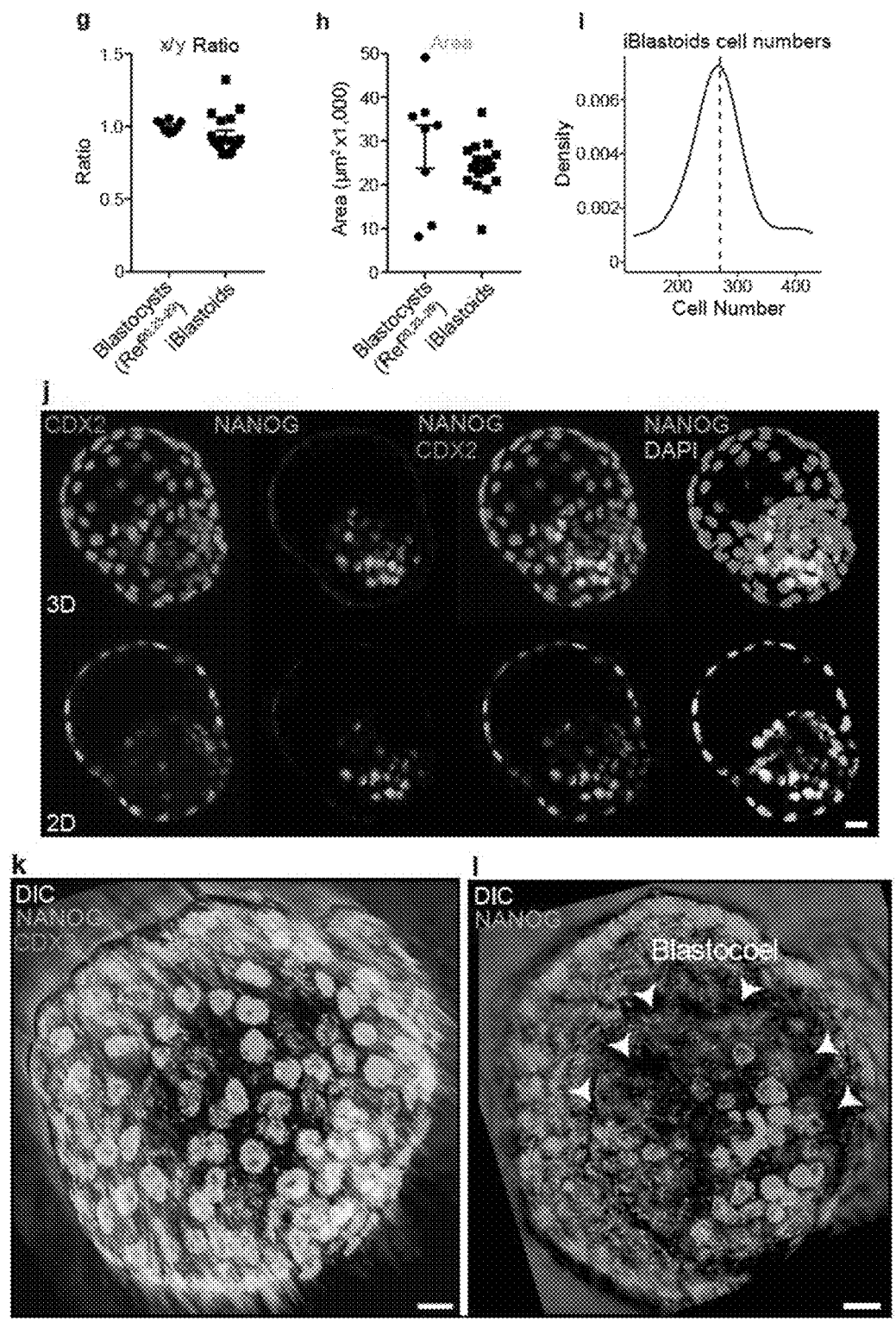
Figure 1:
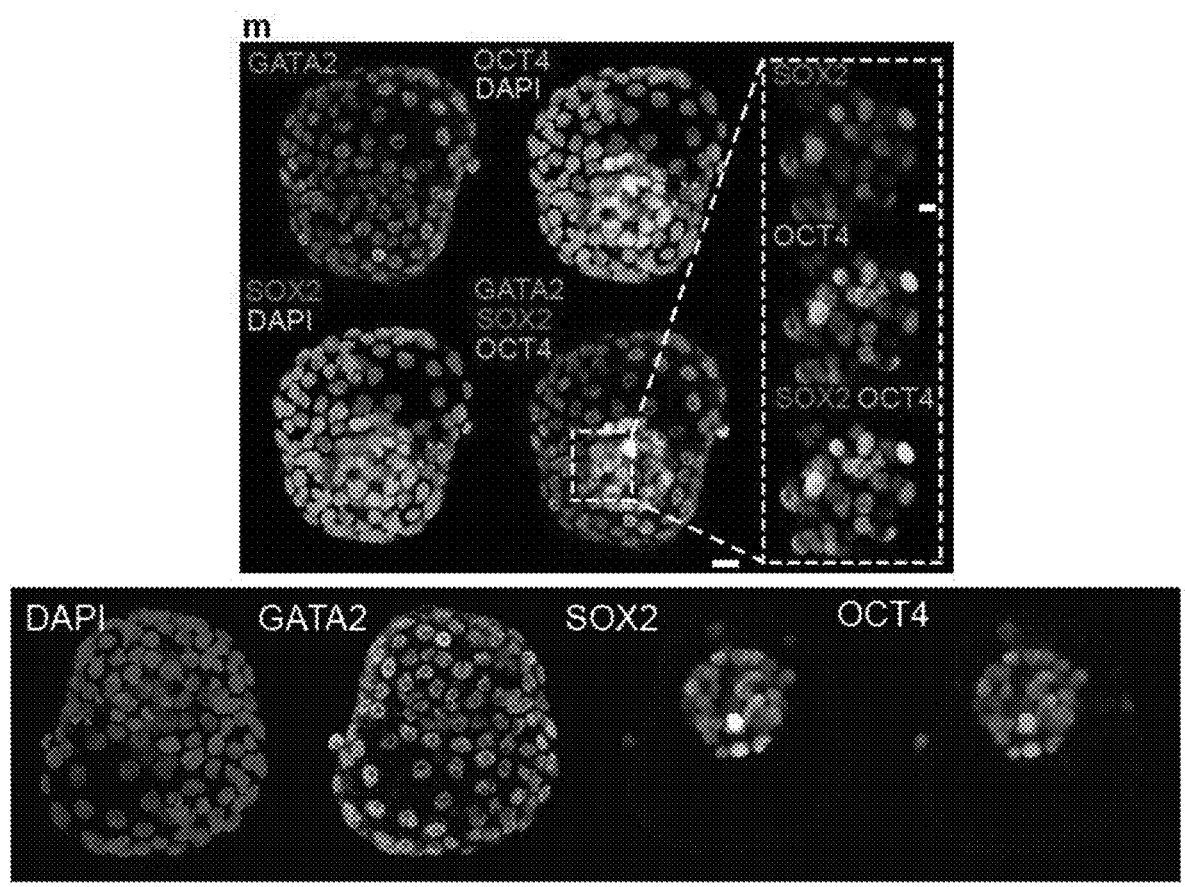
Figure 1:
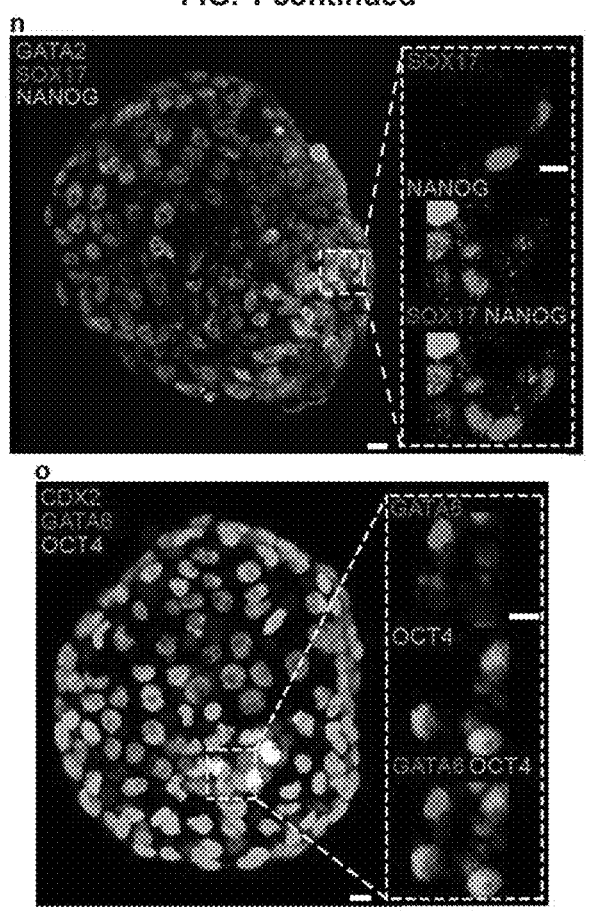
Figure 1:
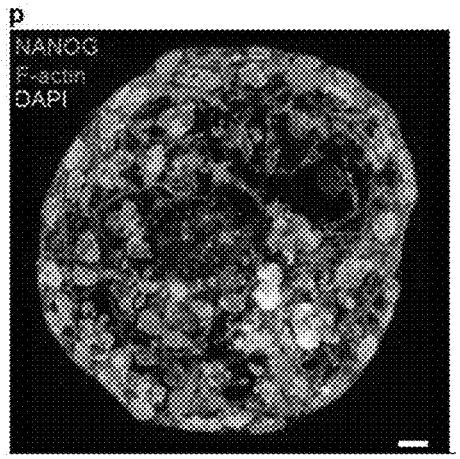
Figure 1:
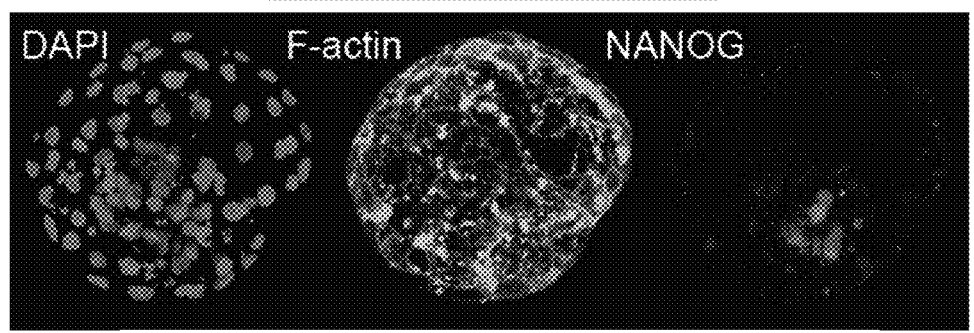
Figure 1:
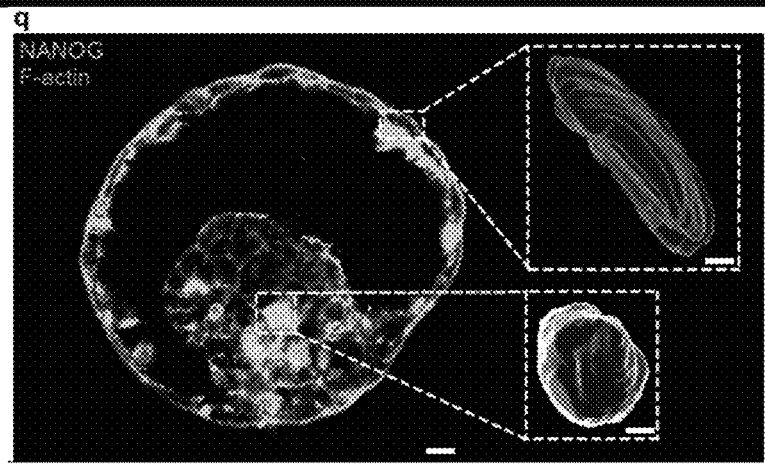
Figure 1:
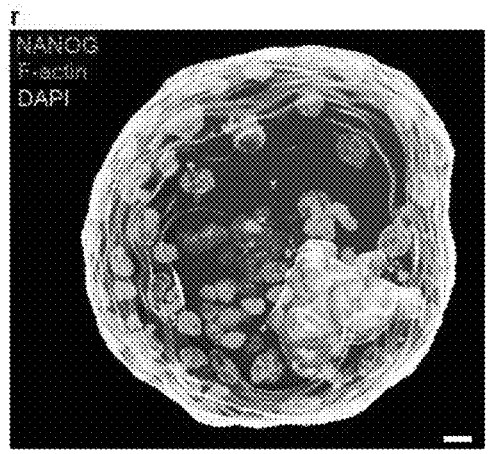
Figure 1:
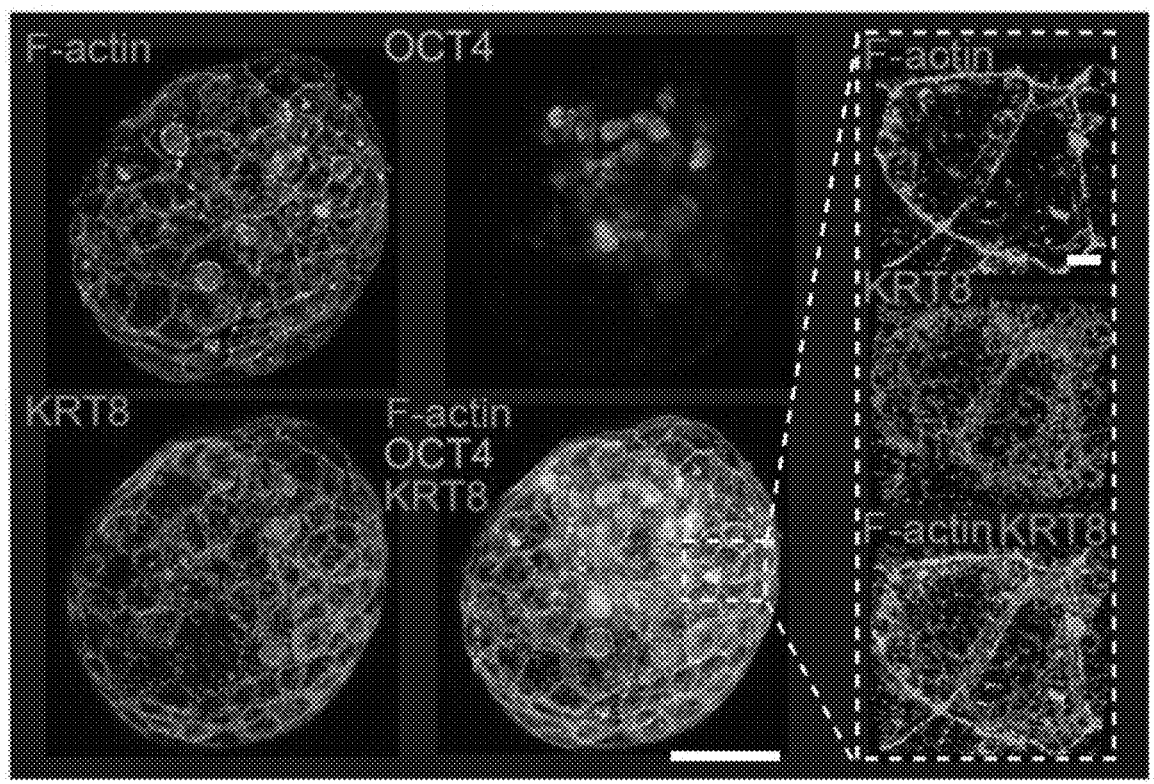

Human somatic cell reprogramming was performed as previously described (Liu, X. et al. Nat. Methods 14, 1055-1062 (2017)) to obtain the d21 reprogramming intermediates. Briefly, reprogramming of human fibroblasts was conducted using CytoTune-iPS 2.0 Sendai reprogramming kit according to the manufacturer's instructions (ThermoFisher, lot #2170052). Primary HDFa were seeded at a density of ~5-10×10$^4$ cells in fibroblast medium. As shown in FIG. 1a, cells were transduced with Sendai viruses in FM at the multiplicity of infection (MOI) as follows, KOS (KLF4-OCT4-SOX2) MOI=5, c-MYC MOI=5, KLF4 MOI=6. Media replacement was done every other day starting from day 1 following transduction and every day from day 8 onwards. On day 21 of reprogramming, cells were dissociated and seeded at a density of 1.2×10$^5$ cells per well onto a 24-well Aggrewell plate (Stem Cell Technologies) in human iBlastoid medium supplemented with 10 µM Y-27632 (ROCK inhibitor, Selleckchem) according to the manufacturers instructions. The cells were cultured in the incubators at 37° C., 5% 02 and 5% CO2. After 24 hours, the cells were replenished with fresh human iBlastoid medium without ROCK inhibitors. On day 6 of iBlastoid formation in the Aggrewell, the iBlastoids were collected for subsequent analysis or in vivo attachment assay. Details of the culture medium used in the generation of iBlastoids are summarised in Example 2 above.

The inventors performed somatic cell reprogramming as previously described (Liu, X. et al. Nat. Methods 14, 1055-1062 (2017)), using integration-free Sendai viruses to deliver the OCT4/POU5F1, KLF4, SOX2, and c-MYC (OKSM) transcription factors (TFs) to obtain day 21 reprogramming intermediates. Alternatively, the inventors performed somatic cell reprogramming via mRNA transfection of transcription factors, as further described herein in Example 14. The inventors also demonstrated that alternative somatic cells can be reprogrammed using similar approaches, as described in Examples 15 and 16, thus establishing that reprogramming intermediates can be obtained from various somatic cells, and for use in the methods of the present invention.

Figure 2:
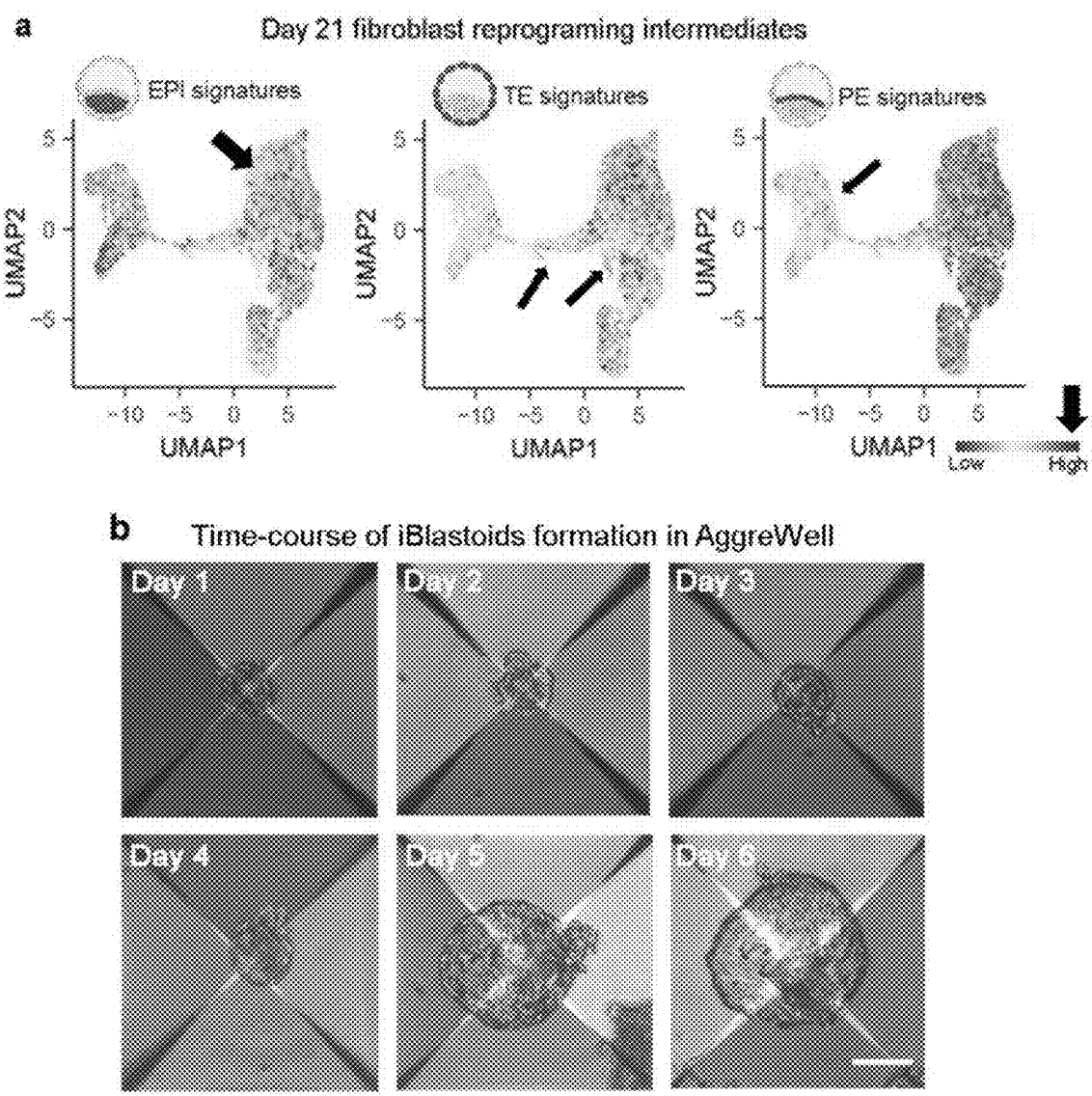
FIG. 2. Generation and characterization of iBlastoids. a, scRNA-seq analysis of day 21 reprogramming intermediates showing the presence of EPI, TE, and PE-like populations. b, Time-course phase-contrast images of iBlastoid formation (n=5). Scale bar, 100 μm. c, Quantification of iBlastoids with cavity formation (n=100). Scale bar, 20 μm. d, Representative phase-contrast images of the refractory HDFa adhering to the microwell edges during iBlastoid formation, which propagated in fibroblast medium with a classic fibroblast morphology (n=2). Scale bar, 100 μm. e, 3D and 2D representation of iBlastoids stained for CDX2 and NANOG (n=5). Scale bar, 20 μm. f, iBlastoid stained for GATA2, NANOG, and SOX17 (n=2). g, iBlastoids stained for CDX2, OCT4, and GATA6 (n=2). Scale bar, 20 μm for f-g. h, Quantification of different existing cell populations in day 21 reprogrammed cells; n=3. i, Assessment criteria used for scoring of iBlastoids. j, Phase-contrast images of iBlastoids included for scoring assessment, n=24. Scale bar, 100 μm. k, Average grade of ICM and TE for iBlastoids in (i) according to (h), n=24.
Figure 2:
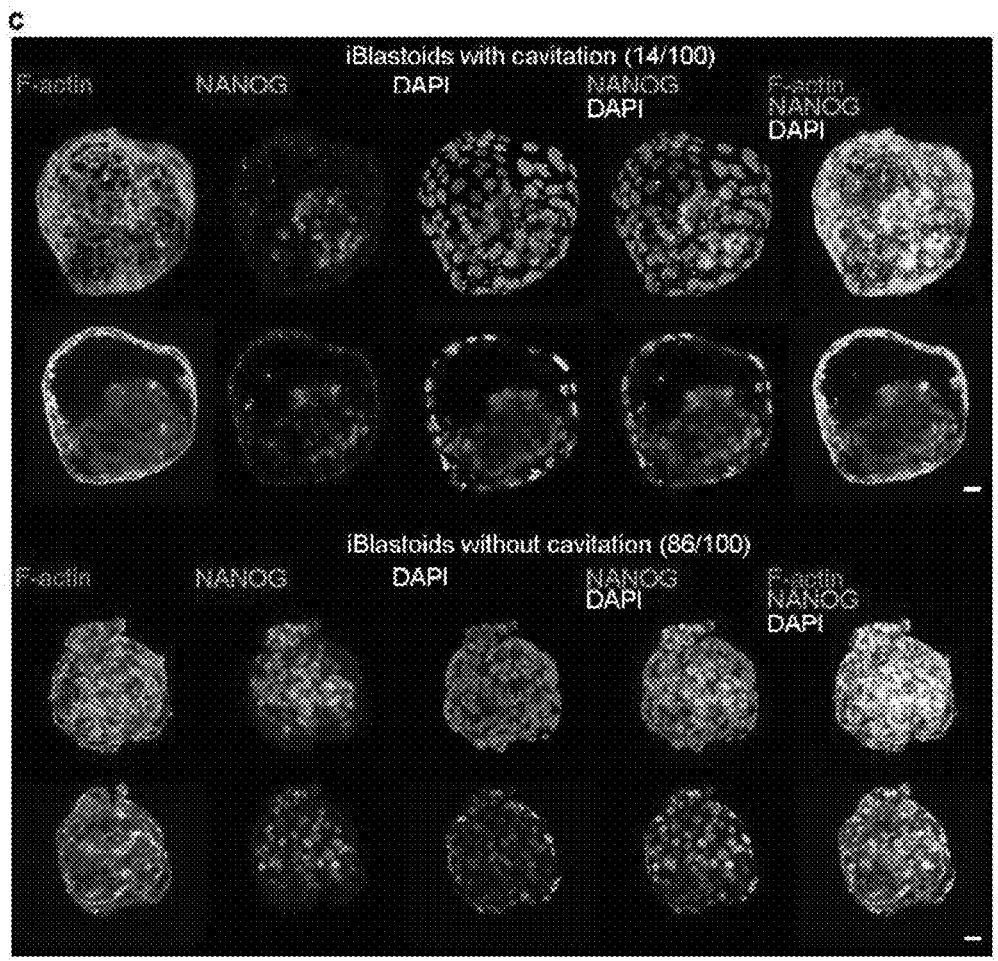
Figure 2:
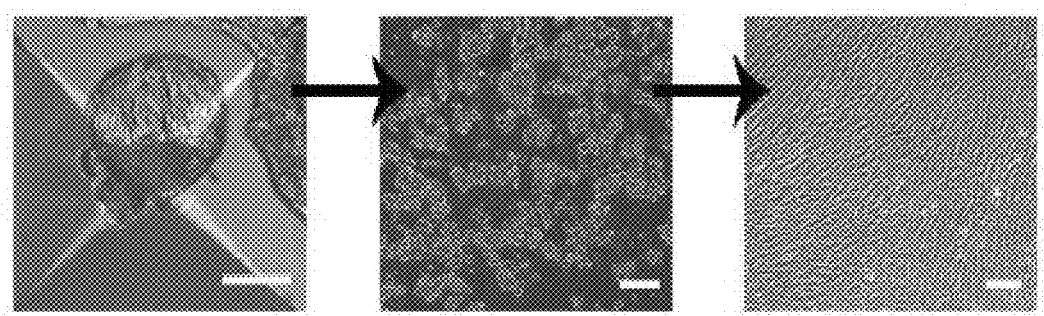
Figure 2:
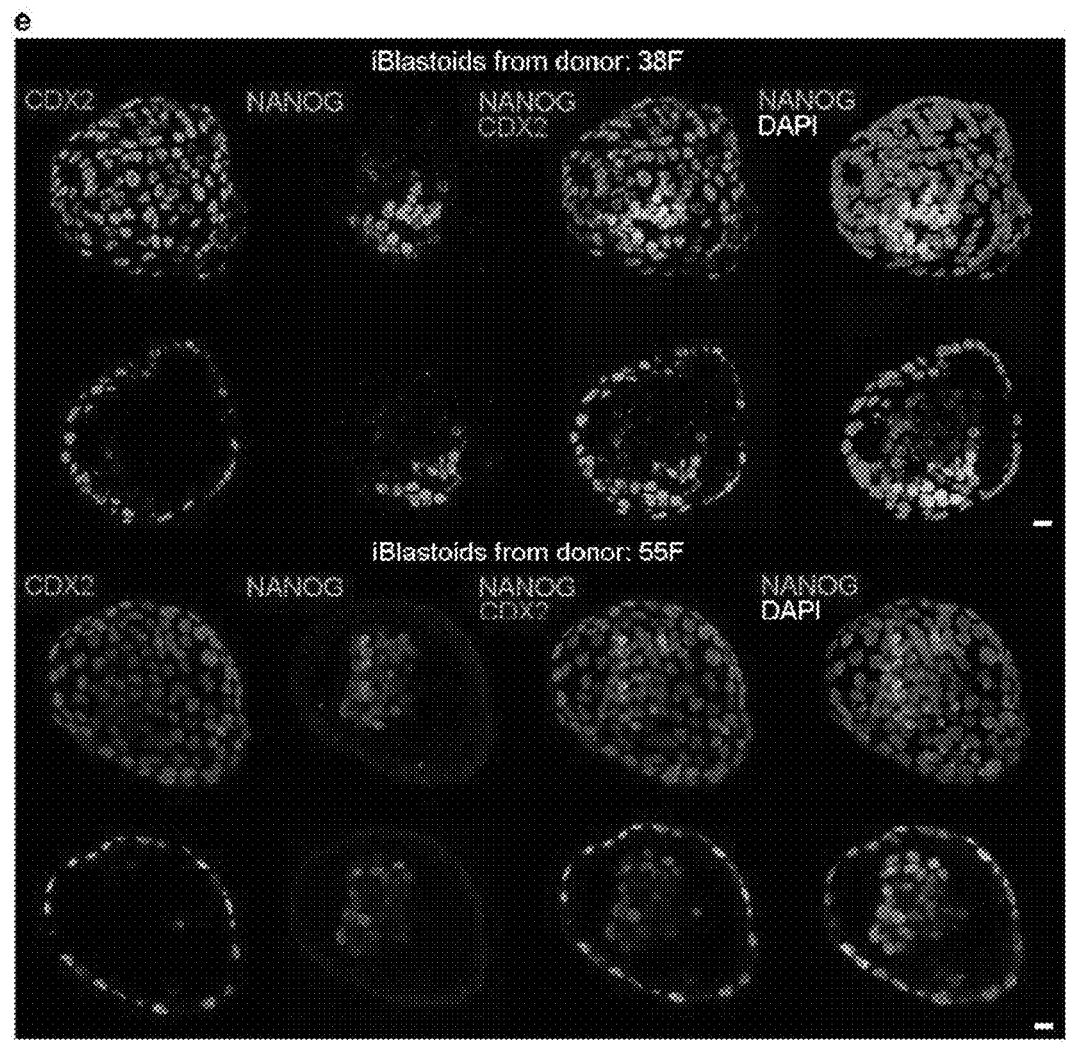
Figure 2:
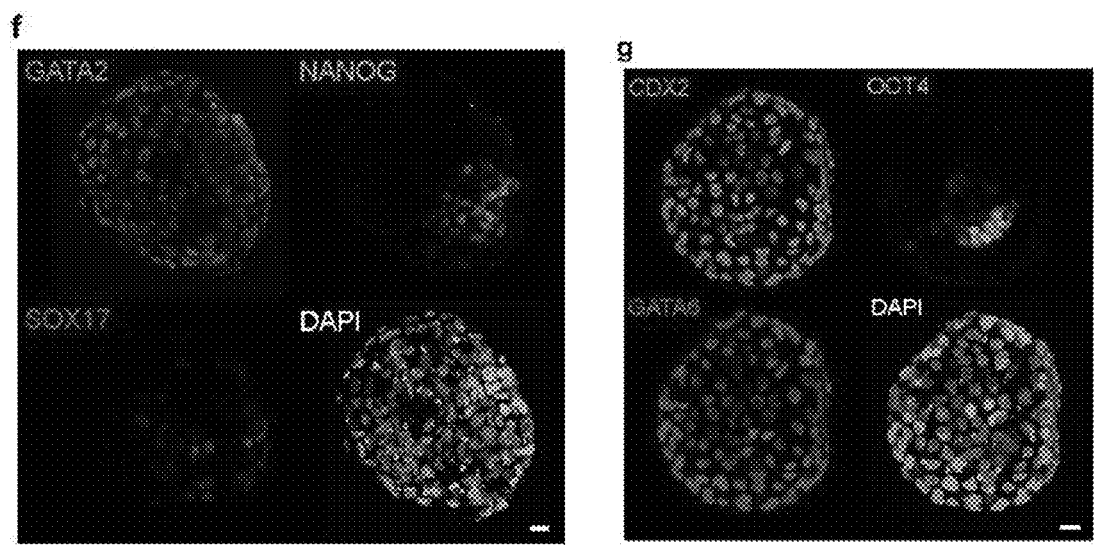
Figure 2:
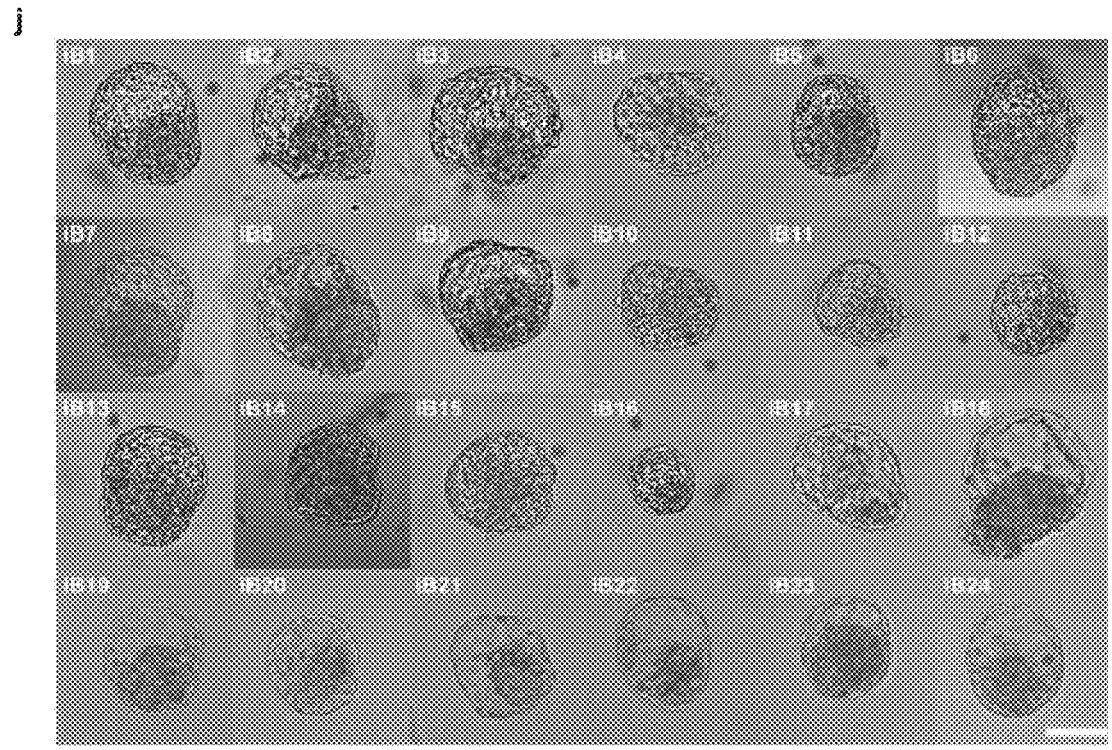
Figure 2:
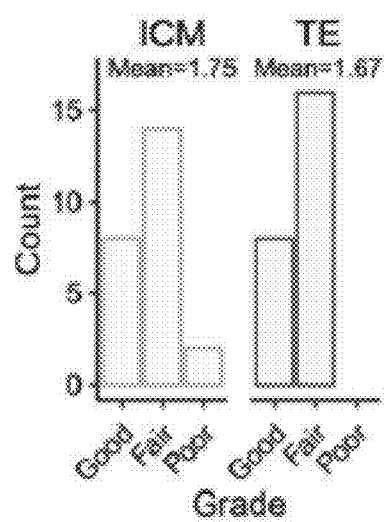

When the intermediates were transferred to the AggreWell system in a medium containing WNT activators, TGF-β inhibitors, HDAC inhibitors, EGF, and BMP4 (see Methods) (FIG. 1a), the intermediates started to form aggregates, and from day 3 cavitated and gradually enlarged (FIG. 2b). Blastocyst-like structures became evident by day 5 to 6 (FIG. 1b) and immunofluorescence staining of the structures for NANOG revealed an inner cell mass (ICM)-like cellular compartment with NANOG-positive cells, with a blastocoel-like cavity surrounded by an outer layer of NANOG-negative cells (FIG. 1c). Since these structures were directly derived via reprogramming of somatic cells, they were termed "human induced blastoids" (iBlastoids). Moreover, measurements of x- and y-axis diameter, x:y aspect ratio as well as projection area of the iBlastoids revealed that they had a comparable size to previously published measurements of human blastocysts at embryonic day 5-7 (E5-7) post-fertilization (FIG. 1d-h). In addition, the cell number in the iBlastoids ranged from 100 to 400, with a median of approximately 280 cells. Although the median cell number is slightly greater than the reported (approximated average of 240 cells) for human blastocysts at E5-7, it is still within the range previously reported for E5-7 blastocysts (FIG. 1i). In order to quantify the efficiency of iBlastoid formation, 100 random structures were counted and 14% were found to exhibit the typical blastocyst-like morphology including a blastocoel cavity (FIG. 2c). During iBlastoid formation in the AggreWell system, adhering cell clusters, that were not part of the iBlastoids, were consistently observed along the edge of microwells. It was hypothesized that these were refractory fibroblasts from the reprogramming culture (FIG. 2d). To validate this, those cell clusters were isolated and cultured in fibroblast medium, resulting in the propagation of cells with a classic fibroblast morphology (FIG. 2d). This suggested that these reprogramming-refractory fibroblasts did not contribute to the iBlastoid formation. Scoring of the iBlastoids using the IVF blastocyst quality criteria (Good=1, Fair=2 or Poor=3) (in accordance with the approach described in The Istanbul consensus workshop on embryo assessment: proceedings of an expert meeting. *Hum. Reprod.* 26, 1270-1283 (2011), indicated iBlastoids were graded as good or fair with an average score of 1.75 for ICM and 1.67 for TE (FIG. 2 i-k).

In summary, these data demonstrate that reprogramming intermediates can be used to directly generate human blastocyst-like structures, named 'iBlastoids' that are structurally similar to blastocysts.

Example 4—iBlastoid Characterisation Materials and Methods

Immunofluorescence Staining iBlastoids/cells were fixed in 4% Paraformaldehyde (PFA, Sigma), permeabilized with 0.5% Triton X-100 (Sigma) in DPBS (ThermoFisher) and blocked with blocking buffer (3% bovine serum albumin (BSA) (Sigma)+0.1% Tween-20 (Sigma) in DPBS (ThermoFisher)). All antibodies used in this study are listed in the Table 6 below.

TABLE 6

Antibodies use to characterise iBlastoids

| Antibody name | Supplier | Catalog # |
|---|---|---|
| Mouse anti-GATA2 IgG2 + A4 + A2:A24 | Sigma-Aldrich | Cat#WH0002624M1 |
| Rabbit anti-CK7 (KRT7) IgG | abcam | Cat#ab181598 |
| Mouse anti-CDX2 IgG1 | abcam | Cat#ab157524 |
| Rabbit anti-CDX2 IgG | Cell Signaling Technology | Cat#12306 |
| Rabbit anti-NANOG polyclonal | abcam | Cat#ab21624 |
| Mouse anti-NANOG IgG1 | Invitrogen | Cat#14-5768-82 |
| Mouse anti-OCT3/4 IgG2b | Santa Cruz Biotechnology | Cat#sc-5279 |
| Mouse anti-SOX17 IgG1 | abcam | Cat#ab84490 |
| Rat anti-SOX2 IgG2a | Invitrogen | Cat#14-9811-82 |
| Goat anti-GATA6 polyclonal | R&D Systems | Cat#AF1700 |
| Rabbit anti-MMP2 IgG | Cell Signaling Technology | Cat#40994 |
| Mouse anti-hCG IgG1 | abcam | Cat#ab9582 |
| Alexa Fluor™ 488 Phalloidin | ThermoFisher | Cat# A-12379 |
| Goat anti-rat IgG AF555 secondary | ThermoFisher | Cat#A-21434 |
| Goat anti-rabbit IgG AF555 secondary | ThermoFisher | Cat#A-21428 |
| Goat anti-mouse IgG2b AF647 secondary | ThermoFisher | Cat#A-221242 |
| Goat anti-mouse IgG-AF488 secondary | ThermoFisher | Cat#A-11029 |
| Goat anti-mouse IgG1-AF488 secondary | ThermoFisher | Cat#A-21121 |
| Goat anti-mouse IgG2a-AF488 secondary | ThermoFisher | Cat#A-21131 |
| Goat anti-mouse IgG2a-AF647 secondary | ThermoFisher | Cat#A-21241 |
| Donkey anti-mouse IgG-488 secondary | ThermoFisher | Cat#A-21202 |
| Donkey anti-goat IgG-555 secondary | ThermoFisher | Cat#A-21432 |
| Donkey anti-rabbit IgG-647 secondary | ThermoFisher | CatA-31573 |

For example, primary antibodies used: rabbit anti-NANOG polyclonal (1:100, Abcam), mouse anti-CDX2 IgG1 (1:50, Abcam) prepared in a blocking buffer. Primary antibody incubation was conducted overnight at 4° C. on shakers followed by rtp incubation with secondary antibodies (1:500 in blocking buffer) for 3 hours. Secondary antibodies used in this study were goat anti-rabbit IgG AF555 (1:500, ThermoFisher) or goat anti-rabbit IgG AF647 (1:500, Invitrogen) for NANOG, goat anti-mouse IgG AF488 (1:400, ThermoFisher) or goat anti-mouse IgG AF488 (1:500, ThermoFisher) for CDX2. After labeling, iBlastoids/cells were stained with 4',6-Diamidino-2-Phenylindole, Dihydrochloride (DAPI, ThermoFisher) at a concentration of 5 μg/ml in a blocking buffer for 1 hour. Images were taken using a SP8 inverted confocal microscope (Leica) or LSM780 multiphoton confocal microscope (Zeiss).

Confocal Imaging and Analysis

Immunostained iBlastoids were imaged using a SP8 inverted confocal microscope (Leica) or a laser scanning confocal (LSM 780 microscope, Zeiss) with a water UV-VIS-IR Apochromat 40× 1.2 NA objective and highly sensitive avalanche photodiode light detectors of the Confocor 3 module (Zeiss). 3D visualizations of iBlastoids were performed using Imaris 9.5 software (Bitplane AG). The manual surface rendering module was used for cell and iBlastoid segmentation. Final images were processed and assembled using Adobe Photoshop or ImageJ.

Fluorescence-Activated Cell Sorting (FACS)

iBlastoids were dissociated with TryPLE Express (ThermoFisher), and DPBS (ThermoFisher) supplemented with 2% FBS (Hyclone) and 10 µM Y-27632 (Selleckchem) was used for final resuspension of the samples. Dissociated cells were pelleted at 400× g for 5 mins and then resuspended in a final volume of 500 µl with propidium iodide (PI) (Sigma) added to a concentration of 2 µg/ml. Cell sorting was carried out with a 100 µm nozzle on an Influx instrument (BD Biosciences).

Quantitative RT-PCR

RNA was extracted from cells using RNeasy micro kit (Qiagen) or RNeasy mini kit (Qiagen) and QIAcube (Qiagen) according to the manufacturer's instructions. Reverse transcription was then performed using SuperScript III cDNA Synthesis Kit (ThermoFisher) or QuantiTect reverse transcription kit (Qiagen, Cat no. 205311), real-time PCR reactions were set up in triplicates using QuantiFast SYBR Green PCR Kit (Qiagen) and then carried out on the 7500 Real-Time PCR system (ThermoFisher). The qRT-PCR primers used in this study are shown in Table 7 below.

TABLE 7 qRT-PCR primers

| Gene name | Primer name | Sequence |
| --- | --- | --- |
| hGAPDH | Forward | CTGGGCTACACTGAGCACC |
|  | Reverse | AAGTGGTCGTTGAGGGCAATG |
| CSH1 | Forward | CATGACTCCCAGACCTCCTTCT |
|  | Reverse | ATTTCTGTTGCGTTTCCTCCAT |
| ITGA1 | Forward | GCTCCTCACTGTTGTTCTACG |
|  | Reverse | CGGGCCGCTGAAAGTCATT |
| TBXT | Forward | TATGAGCCTCGAATCCACATAGT |
|  | Reverse | CCTCGTTCTGATAAGCAGTCAC |
| EOMES | Forward | GTGCCCACGTCTACCTGTG |
|  | Reverse | CCTGCCCTGTTTCGTAATGAT |
| MIXL1 | Forward | GGCGTCAGAGTGGGAAATCC |
|  | Reverse | GGCAGGCAGTTCACATCTACC |

Mesoderm Differentiation

Positive control for qRT-PCR of primitive streak markers was obtained by modifying a previously published mesoderm differentiation protocol (Lam, A. Q. et al. J. Am. Soc. Nephrol. 25, 1211-1225 (2014)). Briefly, human iPSCs grown in E8 Medium (ThermoFisher) at 50% confluency was replaced with a culture medium consisted of RPMI, GlutaMAX (ThermoFisher), 1% B27 supplement (ThermoFisher), 1% Penicillin-streptomycin (ThermoFisher) and 5 µM CHIR99021 (Miltenyi Biotec). After 48 hours, the differentiated cells were collected for qRT-PCR analysis, which highly expressed the primitive streak markers TBXT, EOMES and MIXL1 (FIG. 8b).

hCG ELISA

Generation of iBlastoids and in vitro attachment assay were performed as described in the 'in vitro attachment assay' Example, below. The medium was collected for both iBlastoids (day 6) and attached iBlastoids (day 6+4.5) and stored at −80° C. The hCG level within the media was measured using hCG ELISA kit (Abnova, ABNOKA4005) according to the manufacturer's instructions.

Single Cell RNA-Sequencing (scRNA-Sea) of iBlastoids

For scRNA-seq experiments, iBlastoids were dissociated to obtain single cell suspension for FACS as described in the above section. Cells subjected to FACS were sorted for PI-negative, non-debris live single cells for scRNA-seq. The collected cells were isolated, encapsulated and constructed using Chromium controller (10× Genomics) as per the manufacturer's instructions "Chromium Next GEM Single Cell 3' Reagent Kit V3.3 User Guide". Sequencing was done on an Illumina NovaSeq 6000 using a paired-end (R1 28 bp and R2 87 bp) sequencing strategy and aiming for 20,000 read-pairs per cell. Chromium barcodes were used for demultiplexing and FASTQ files were generated from the mkfastq pipeline using the Cellranger program (v3.1.0, http://software.10xgenomics.com/single-cell/overview/welcome). Alignment and UMI counting were performed using Cellranger, which utilises the STAR aligner (Dobin, A. et al. Bioinformatics 29, 15-21 (2013)) to map sequencing reads to a custom version of the Ensembl GRCh37.87 reference genome, which we expanded by sequences of the custom SENDAI KLF4, MYC, and SEV (KOS) vectors. This step results in 9060 unique cell barcodes.

iBlastoid scRNA-Seq Cell Donor Identification

To determine the individual donor identity of every cell, the Bayesian demultiplexing tool Vireo (v 0.3.2) was employed (Huang, Genome Biol. 20, 273 (2019)). Briefly, the inventors compiled expressed alleles in the single-cell data using cellSNP (v 0.3.0) to generate a list of single nucleotide polymorphisms (SNPs) with a minimum allele frequency (using the argument minMAF) of 0.1 and minimum unique molecular identifiers (using the argument minCOUNT) of 20. Furthermore, cellSNP requires a reference list of human variants to call the SNPs and the inventors used a pre-compiled list of SNPs from the 1000 genome project provided by the authors of Vireo (downloaded from https://sourceforge.net/projects/cellsnp/files/SNPlist/). In particular, the list of variants based on the hg19 genome with minor allele frequency >0.05, containing 7.4 million SNPs was used. Subsequently, Vireo was performed to demultiplex the single-cell library by separating the cells into two donor populations. Note that Vireo is only able to distinguish the cells with respect to the two donors, but is unable to assign the exact donor identity (32F or 38F) to each cell.

iBlastoid scRNA-Seq Cell Calling, Quality Control

Quality control was first performed at the cell level. Cells with (i) evidence for both or neither cell line donor, (ii) low number of expressed genes [nGene], or (iii) high percentage mitochondrial genes [pctMT] were discarded. Cutoffs nGene <1,300 pctMT >15 were applied to discard cells. Next, quality control was performed at the gene level. Genes were filtered if not presenting in at least 50 cells with at least 1 read each. All cutoffs were determined after investigating the distributions of each variable. After quality control, 6858 cells and 14224 genes remain for the scRNA-seq.

iBlastoid scRNA-Seq Analysis

Analyses in the remainder of the section were conducted using R (v3.6)55 with Seurat (v3.1.5) (Butler, et al. Nat. Biotechnol. 36, 411-420 (2018); Stuart, T. et al. Cell 177, 1888-1902.e21 (2019)). Bioinformatics plots were generated using ggplot2 (v3.3.1)58, and heatmaps with pheatmap (v1.0.12) (Kolde, R. & Vilo, J. F1000Research vol. 4 574 (2015)). The SCTransform function (Hafemeister, C. & Satija, R. Genome Biol. 20, 296 (2019)) in Seurat was used to scale and normalise the data. Following Principle component analysis (PCA), a uniform manifold approximation (UMAP) was generated using 20 dimensions. Unsupervised clustering was performed using the FindClusters function with a resolution of 0.2, resulting in 7 individual clusters. Differentially expressed genes between clusters (cluster markers) were identified with the FindAllMarkers function, employing a Wilcoxon rank sum test and a minimum up-regulation of 0.25 log-fold. Average over-expression of cell type signatures (EPI, TE, PE, non-reprogramming (NR)) were calculated with the AddModuleScore function and gene signatures published by Petropoulos, S. et al. Cell 165, 1012-1026 (2016) and Liu et al (Nature 2020 Sep. 16.doi: 10.1038/s41586-020-2734-6), respectively. Cell types were assigned to clusters manually using canonical markers, Petropoulos and Liu signatures as evidence. Remaining cell populations were labelled "intermediate" (IM) and enumerated (Rossant, J. & Tam, P. P. L. Cell Stem Cell vol. 20 18-28 (2017); Harrison, et al. Science 356, (2017); Sozen, B. et al. Nat. Cell Biol. 20, 979-989 (2018)). Finally, cell cycle scores were calculated using the cyclone function (Scialdone, A. et al. Methods 85, 54-61 (2015)) from the scran package, and cell phase assigned according to the highest probability.

Integrated scRNA-Seq Analysis

Previously published single cell data sets from Petropoulos, S. et al. Cell 165, 1012-1026 (2016) (Petropoulos) and Blakeley, P. et al. Development 142, 3613 (2015) (Blakeley) were integrated with the iBlastoids data published here. First, cells from the NR cluster are removed as irrelevant to this integration from the iBlastoid data. Petropoulos' 1529 cells total were filtered for blastocyst cells, removing the pre-blastocyst stages leaving 1096 E5-E7 EPI, TE, and PE cells. Petropoulos' data and Blakeley's 30 cells were processed using SCTransform. Both datasets were integrated into the iBlastoids data after identifying integration genes (FindIntegrationAnchors and IntegrateData) using 4000 anchor genes derived from the SCT assays. The integrated dataset has 7861 cells, 23308 genes, and 4000 integrated genes. PCA and UMAP (20 dimensions) are used for dimensionality reduction and FindClusters to identify clusters (resolution 0.2). Cluster identities for 5 individual clusters were assigned manually using co-localisation of cell identities from all three datasets as evidence, as well as marker and signature expression. Transcriptome correlation was calculated using the integrated gene expression values and Pearson correlation on mean values of gene expression across all cells of a) the same original cell identity (cluster id for iBlastoids, EPI, TE, PE for Blakeley, E5-7 EPI, TE, PE for Petropoulos), or b) the same cell type (aggregates of all EPI, TE, PE cells and, additionally, IM for iBlastoids).

In Vitro Attachment Assay

Generation of iBlastoids was performed as described in Example 3 above. The in vitro attachment assay (which is often used as a model of embryo implantation) was performed by adapting to a previously published protocol (Shahbazi, et al. Nat. Cell Biol. 18, 700-708 (2016); Deglincerti, A. et al. Nature 533, 251-254 (2016)). Briefly, iBlastoids derived were transferred onto optical-grade tissue culture plates (Eppendorf) and cultured in IVC1 media at 37° C., 5% $O_2$ and 5% $CO_2$ incubators. On day 2 of attachment assay, the culture media was switched to IVC2 media. iBlastoids were cultured up to day 4.5 in the attachment assay and collected for analysis. Details of the culture medium used in the in vitro attachment assay are summarised in Example 2.

Statistics and Reproducibility

The day 21 fibroblast reprogramming intermediates scRNA-seq data obtained from a previous study (Liu et al (Nature 2020 Sep. 16.doi: 10.1038/s41586-020-2734-6) was reanalysed for FIG. 2a, with 4,761 cells. For the iBlastoid scRNA-seq data, a total of 6858 cells obtained from n=2 biological replicates were included in all the analysis used in this study. For the scRNA-seq dataset of human blastocysts used in this study, a total of 1096 cells were adapted from Petropoulos dataset and a total of 30 cells were adapted from Blakeley dataset for analysis. For the iBlastoids and human blastocyst integrated dataset, a total of 7861 cells were used for analysis. For FIG. 1b, iBlastoids were generated from 3 different donor fibroblasts of 2 independent reprogramming experiments (n=5 biological replicates) and representative images were shown in the figure. For FIG. 1c, immunostaining was performed on iBlastoids from 3 different donors of 2 independent reprogramming experiments (n=5 biological replicates) with similar results obtained and representative images were shown in the figure. For FIG. 1e-h, data of human blastocysts was referenced from 8 publications (n=8) while the quantification of various parameters on iBlastoids was each done on 18 independent iBlastoids obtained from 3 different donors (n=18 biological replicates). For FIG. 1i, cell number quantification was performed on 14 independent iBlastoids obtained from 3 different donors (n=14 biological replicates). For FIG. 1j-l, immunostaining was performed on iBlastoids from 3 different donors of 2 independent reprogramming experiments (n=5 biological replicates) with similar results obtained and representative images were shown in the figure. For FIG. 1m, immunostaining was performed on iBlastoids from 3 different donors (n=3 biological replicates) with similar results obtained and representative images were shown in the figure. For FIG. 1n-r, immunostaining was performed on iBlastoids from 2 different donors (n=2 biological replicates) with similar results obtained and representative images were shown in the figure. A dense Keratin 8 (KRT8) filament network with the outer TE-like cells was also observed in the iBlastoids, consistent with what is typically observed in blastocysts (FIG. 1s).

Figure 7:
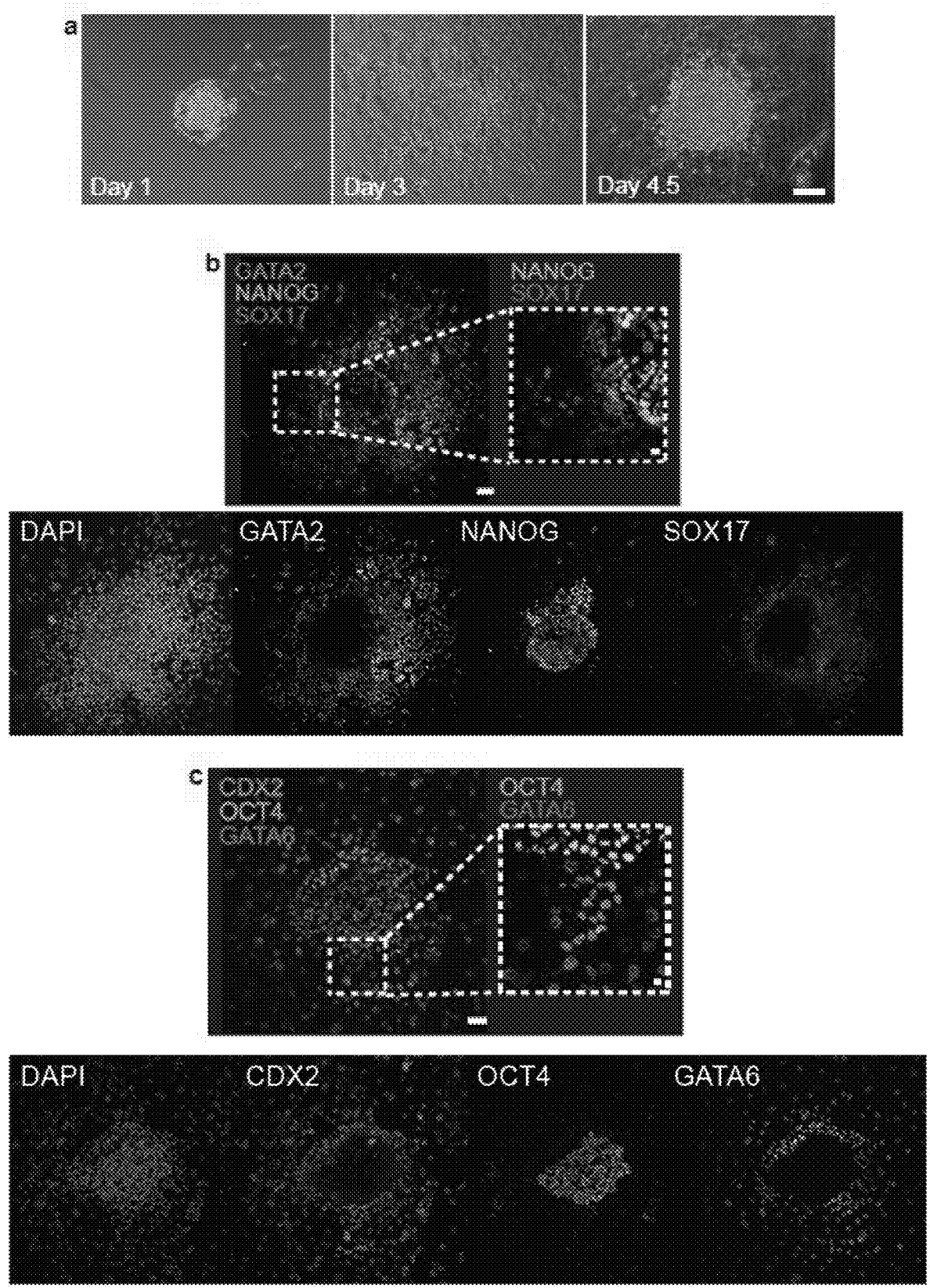
FIG. 7. Modeling human in vitro implantation using iBlastoids. a, Representative phase-contrast images of iBlastoid at day 1, 3, and 4.5 of attachment (n=5). Scale bar, 100 μm, b, GATA2, NANOG, and SOX17 co-staining, n=2. c, CDX2, OCT4, and GATA6 co-staining, n=2. d, F-actin, OCT4 and aPKC co-staining, with the pro-amniotic-like cavity indicated by arrowheads, n=2. e, KRT7 and NANOG co-staining, n=4. f, F-actin and NANOG co-staining, epiblast-like cells and putative STs, and EVTs are indicated, n=2. g, MMP2 and hCG co-staining, n=2. Scale bars, 50 μm; 10 μm for zoom-in. h, qRT-PCR analysis of ST and EVT marker in attached iBlastoids, mean±s.e.m, n=5. i, hCG protein level detected by hCG ELISA using conditioned media collected from attached iBlastoids, mean±s.e.m, n=4.
Figure 7:
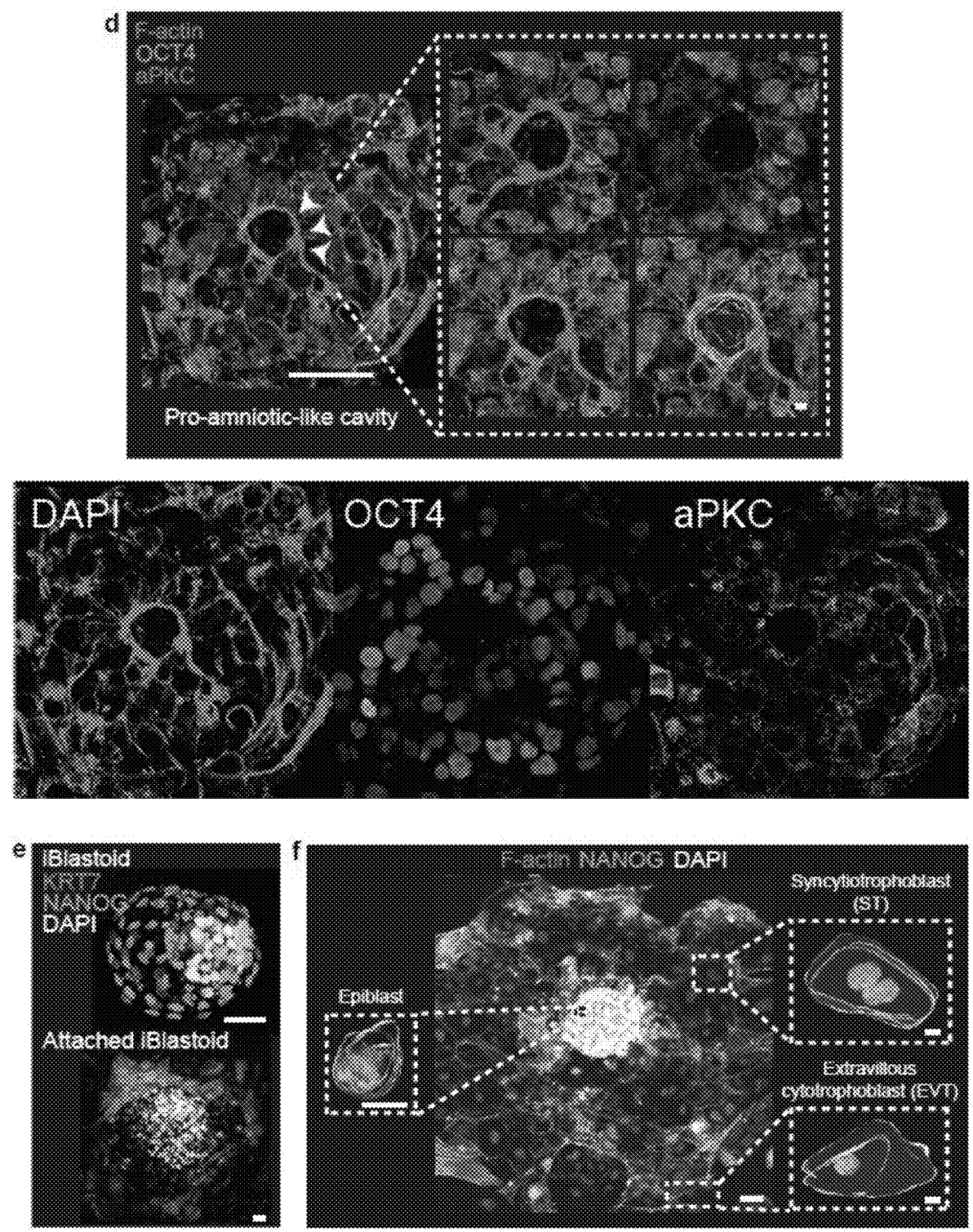
Figure 7:
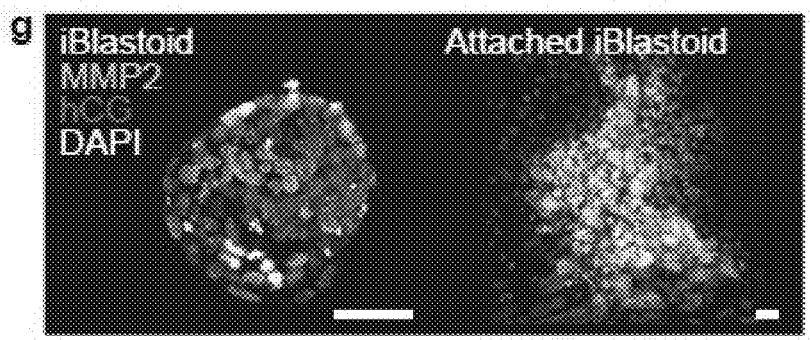
Figure 7:
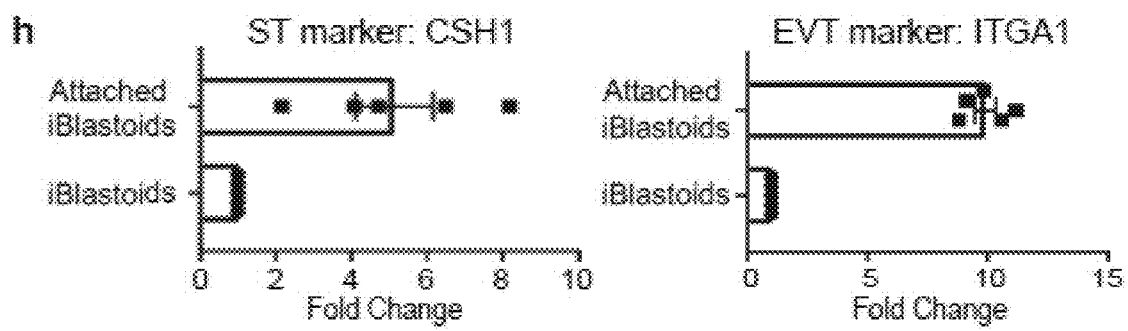
Figure 7:
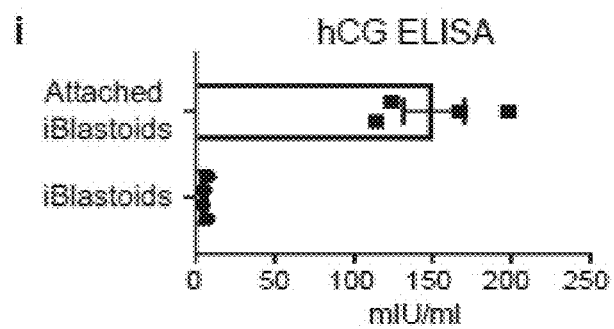

For FIG. 7a, an in vitro attachment assay was performed using iBlastoids derived from 3 different donor fibroblasts of 2 independent reprogramming experiments (n=5 biological replicates) and representative images were shown in the figure. For FIG. 7b-c, immunostaining was performed on iBlastoids from 2 different donors (n=2 biological replicates) with similar results obtained and representative images were shown in the figure. For FIG. 7e, immunostaining was performed on iBlastoids from 2 different donors of 2 independent reprogramming experiments (n=4 biological replicates) with similar results obtained and representative images were shown in the figure. For FIG. 7f-g, immunostaining was performed on iBlastoids from 2 different donors (n=2 biological replicates) with similar results obtained and representative images were shown in the figure. For FIG. 7h, fold change expression of CSH1 and ITGA1 were measured in n=5 independent experiments with technical replicates. Data are represented as mean±s.e.m. For FIG. 7i, hCG ELISA was done in n=4 independent experiments with technical replicates. Data are represented as mean±s.e.m. For FIG. 2b, iBlastoids were generated from three different donor fibroblasts of 2 independent reprogramming experiments (n=5 biological replicates) and representative images were shown in the figure. For FIG. 2c, quantification of the iBlastoid efficiency was done by counting 100 independent 3D structures obtained (n=100 biological replicates). For FIG. 2d, the experiment was performed with n=3 biological replicates from 3 different donors with similar results obtained and representative images were shown in the figure. For FIG. 2e, immunostaining was performed on iBlastoids from 3 different donors of 2 independent reprogramming experiments (n=5 biological replicates) with similar results obtained and representative images were shown in the figure. For FIG. 2f-g, immunostaining was performed on iBlastoids from 2 different donors (n=2 biological replicates) with similar results obtained and representative images were shown in the figure. For FIG. 8ba, fold change expression of TBXT, EOMES, MIXL1 were measured in n=6 independent experiments from 2 donors with technical replicates. Data are represented as mean±s.e.m. For FIG. 8c, immunostaining was performed on iBlastoids from 3 different donors of 2 independent reprogramming experiments (n=5 biological replicates) with similar results obtained and representative images were shown in the figure. For FIG. 8d, immunostaining was performed on iBlastoids from 3 different donors (n=3 biological replicates) with similar results obtained and representative images were shown in the figure. For FIG. 8e-f, immunostaining was performed on iBlastoids from 2 different donors (n=2 biological replicates) with similar results obtained and representative images were shown in the figure.

Example 5—iBlastoid Characterisation Results

To further confirm the identity and spatial localization of the cells within the iBlastoids, the inventors performed co-immunostaining of the EPI marker NANOG and the TE marker CDX2. They then applied confocal imaging and analysis to obtain a 3-dimensional (3D) representation of iBlastoids. The results indicate that NANOG positive cells are located exclusively in the ICM-like compartments, whereas CDX2 positive cells are found in the outer layer resembling the TE (FIG. 1j).

The 3D reconstruction and overlay of Differential Interference Contrast (DIC) and fluorescence images confirmed the spatial localization of NANOG positive and CDX2 positive cells, as well as confirming the existence of a blastocoel-like cavity formed in the iBlastoid structures similar to blastocysts (Shahbazi, M. N. et al. Nat. Cell Biol. 18, 700-708 (2016), Deglincerti, A. et al. Nature 533, 251-254 (2016); Xiang, L. et al. Nature 577, 537-542 (2020) (FIG. 1k, l). Importantly, the inventors were able to confirm these results from iBlastoids generated from two additional fibroblast donors in multiple rounds of iBlastoid generations (FIG. 2e).

To further characterize the EPI and TE-like cells of the iBlastoids, the inventors tested a combination of two additional EPI markers (OCT4, also called POU5F1, and SOX2) and a TE marker (GATA2) in the iBlastoids. As described for human blastocysts (Fogarty, N. M. E. et al. Nature 550, 67-73 (2017); Boroviak, T. et al. Development 145, (2018)), the outer TE-like cells were GATA2 positive whereas significant colocalization of OCT4 and SOX2 was found in the ICM-like compartments (FIG. 1m). To evaluate the presence of PE-like cells in the iBlastoids, the inventors first performed immunostaining of SOX17, a PE marker, alongside GATA2 (TE marker) and NANOG (EPI marker). Within the ICM-like compartment, the inventors identified SOX17 positive cells at the periphery of the NANOG positive cells (FIG. 1n, FIG. 2f), similar to what has previously been reported for E6-7 blastocysts (Xiang supra; Wamaitha, S. E. et al. Nat. Commun. 11, 764 (2020)).

For further validation, the inventors performed additional immunostaining using another PE marker, GATA6, in combination with CDX2 (TE marker) and OCT4 (EPI marker). They noticed a "salt and pepper" pattern in the TE-like compartment as indicated by the co-localization of GATA6 with CDX2 staining (FIG. 1o, FIG. 2g). Although initially puzzling, this pattern has previously been reported, where GATA6 has also been ubiquitously detected in E6-7 human blastocysts (Deglincerti, Supra; Roode, M. et al. Human hypoblast formation is not dependent on FGF signalling. Dev. Biol. 361, 358-363 (2012); Kuijk, E. W. et al. The roles of FGF and MAP kinase signaling in the segregation of the epiblast and hypoblast cell lineages in bovine and human embryos. Development 139, 871-882 (2012)). Importantly, upon closer examination, the inventors observed GATA6 positive cells (with low or weak CDX2 staining) neighbouring OCT4 positive cells in the ICM-like compartment, suggesting the possible presence of GATA6 positive PE-like cells in the iBlastoids (FIG. 1o).

In human blastocysts, cells of the TE and EPI lineages have a clear difference in cellular morphology, where TE cells show a "classic" elongated epithelial morphology whereas EPI cells are smaller and compacted due to the constraints of the ICM (Kovacic, B., Vlaisavljevic, V., Reljic, M. & Cizek-Sajko, M. Reprod. Biomed. Online 8, 687-694 (2004)). To examine whether there were any differences in the cellular morphology of EPI-like and TE-like cells in the iBlastoids, the inventors utilized the cell membrane marker F-Actin (also called Phalloidin) on the iBlastoids to visualize cellular architecture (FIG. 1p-r). The results indicate that the compact NANOG positive EPI-like cells had a more rounded columnar appearance, whereas the TE-like cells surrounding the blastocoel cavity were flattened, highlighting that this model is able to recapitulate differences in the cellular architecture of EPI and TE cells (FIG. 1q). Altogether, these results demonstrate that iBlastoids display the main morphological features of human blastocysts at E6-7, and can also model the key molecular and spatial aspects of EPI, TE and PE cells.

Example 6—Single-Cell Transcriptomic Profiling of iBlastoids

Figure 3:
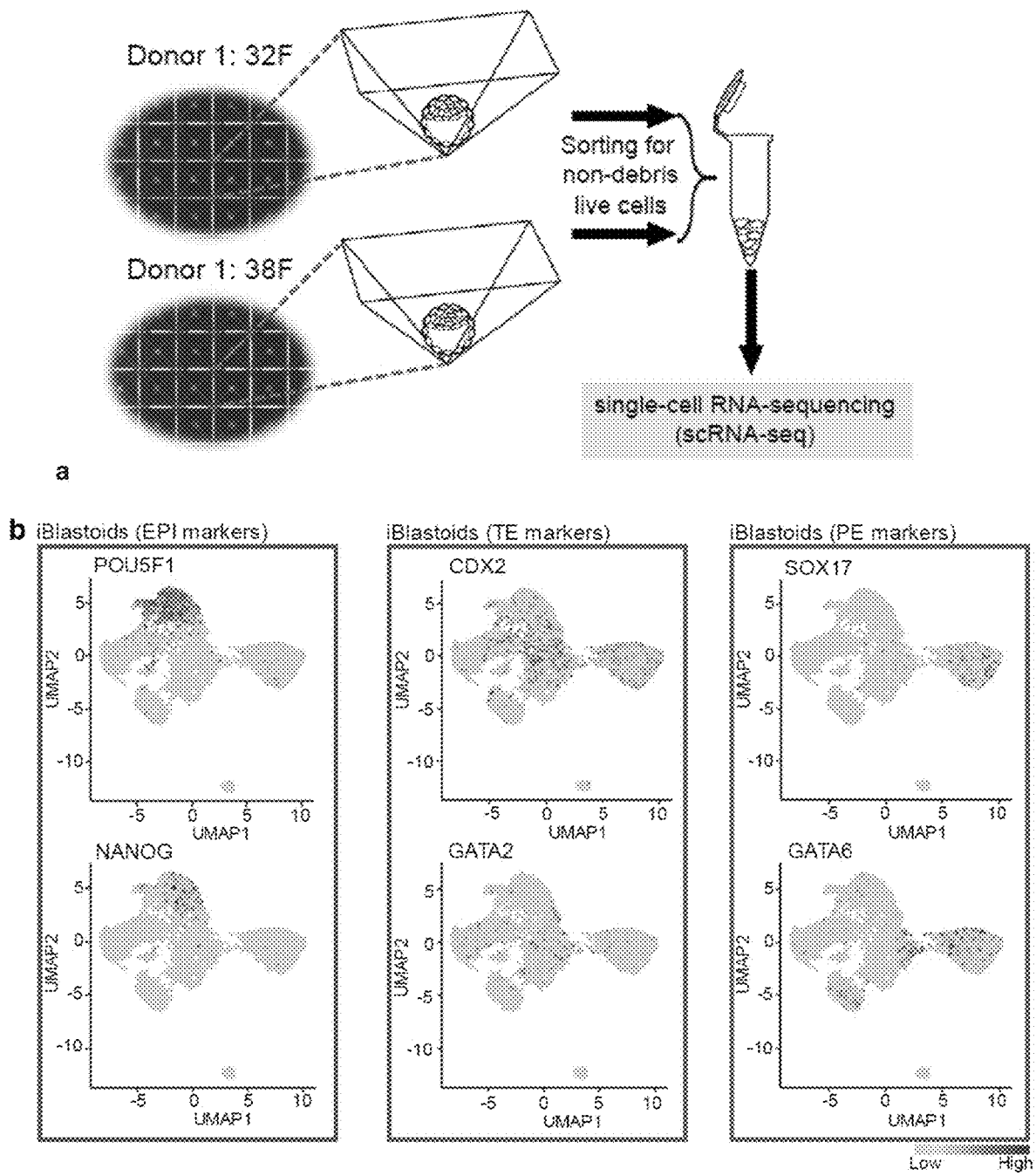
FIG. 3. Single-cell transcriptomic profiling of iBlastoids. a, Experimental design for scRNA-seq experiment using iBlastoids. b, Expression of EPI markers (POU5F1 and NANOG), TE markers (CDX2 and GATA2), and PE markers (SOX17 and GATA6) for 6858 cells from iBlastoid scRNA-seq library. c, Per cell expression score for EPI, TE, and EPI signatures on UMAP of iBlastoid scRNA-seq dataset. d, Unsupervised clustering of iBlastoid dataset with assigned cluster names. e, UMAP projection of integrated datasets showing iBlastoid EPI, TE, and PE cells together with EPI, TE, and PE cells from blastocysts (Blakeley and Petropoulos). f, Per cell expression score of EPI, TE, and PE signatures of integrated dataset. g, Unsupervised clustering of the integrated dataset with assigned cluster names. h, Proportion of cells for iBlastoids and human blastocyst datasets (Blakeley and Petropoulos) within each integrated cluster with respective original cell ID prior to integration analysis. i, Pearson correlation analysis of iBlastoid EPI, TE, and PE clusters with annotated EPI, TE, and PE clusters from blastocysts (Blakeley and Petropoulos). J, k, Per cell expression score of defined mural and polar TE signatures on iBlastoid scRNA-seq TE cluster. l, Binned subtype score for mural and polar TE signatures along UMAP component 1. m, Immunostaining of iBlastoids for CCR7, n=4. Scale bar, 20 μm. n, CCR7 fluorescence intensity of polar and mural TE on iBlastoids, n=4. The line within each box represents the median and the whiskers represent the maxima and minima respectively.
Figure 3:
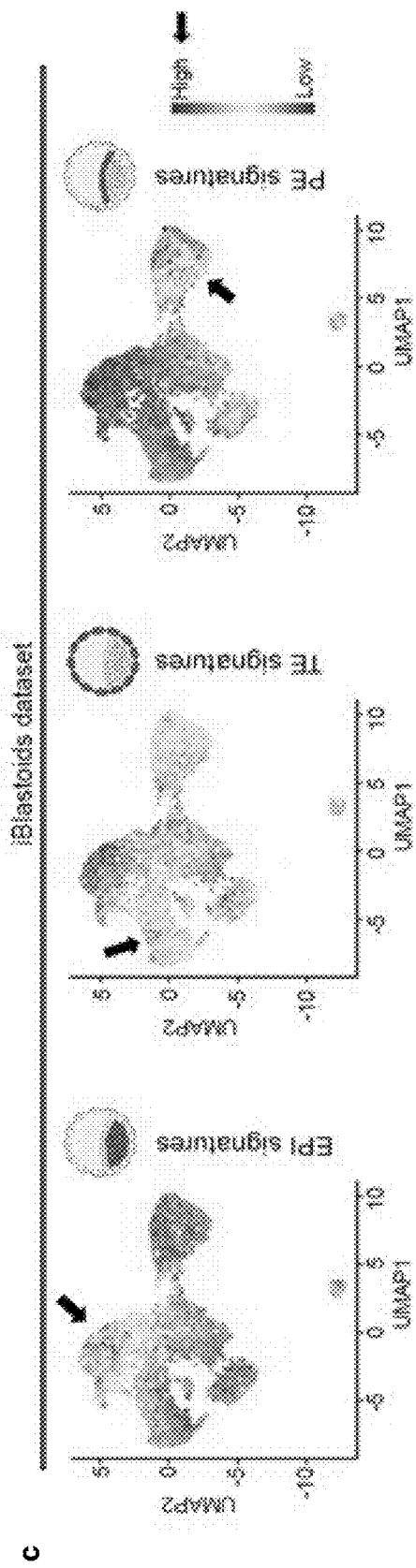
Figure 3:
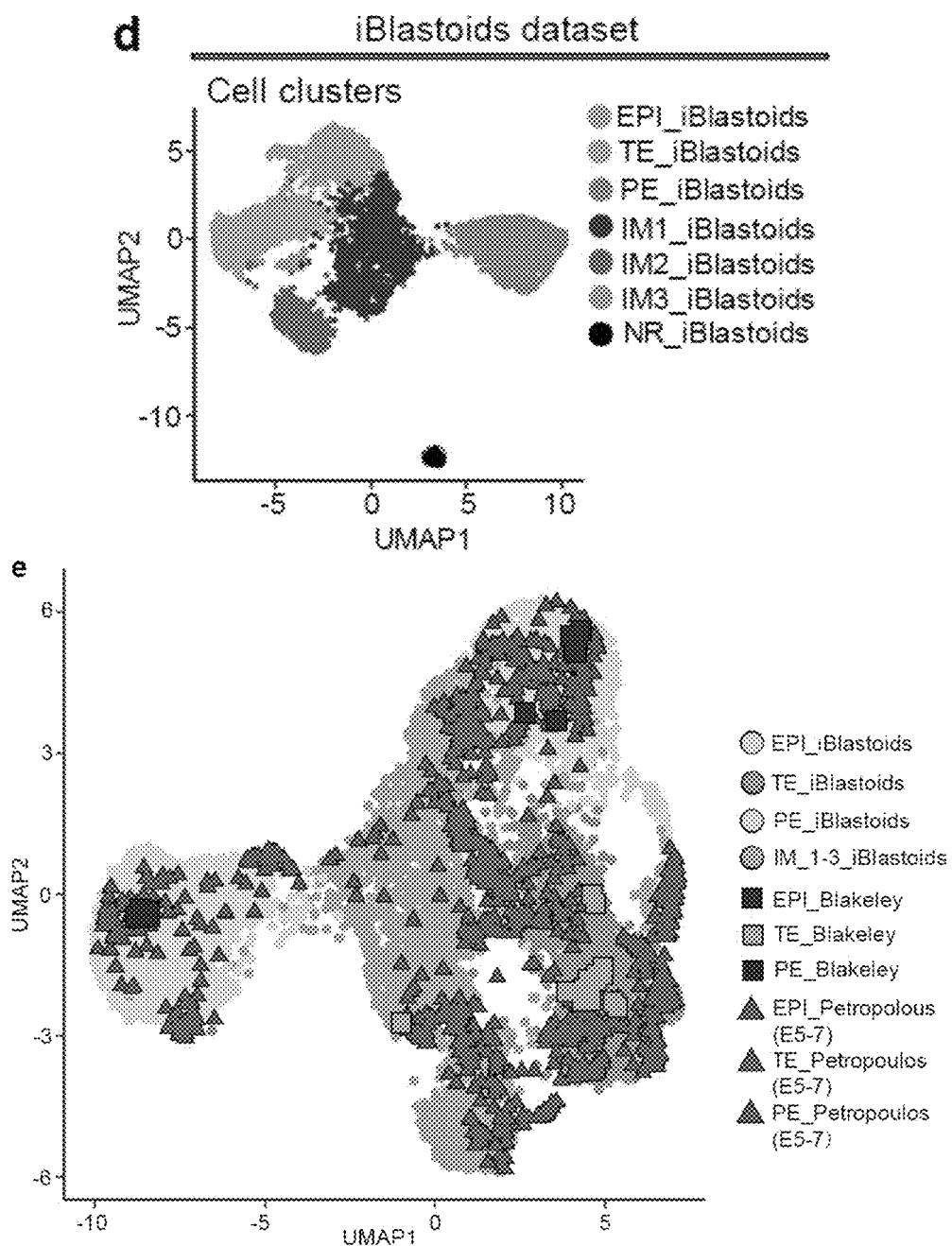
Figure 3:
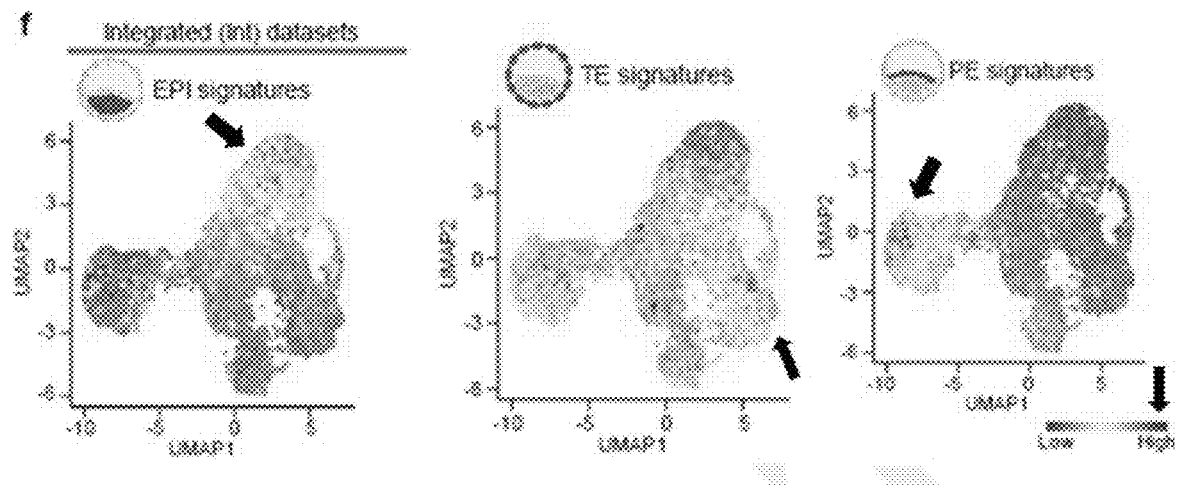
Figure 3:
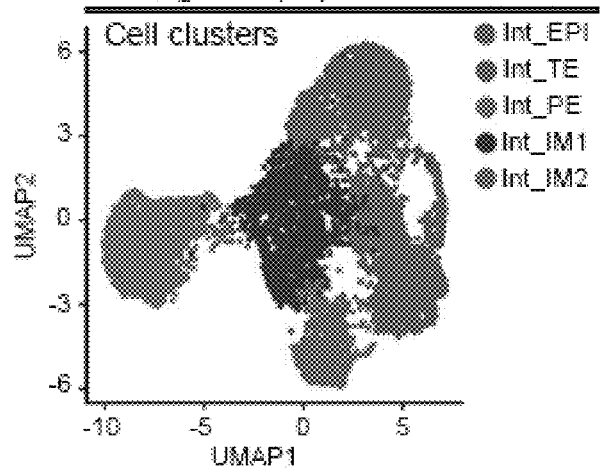
Figure 3:
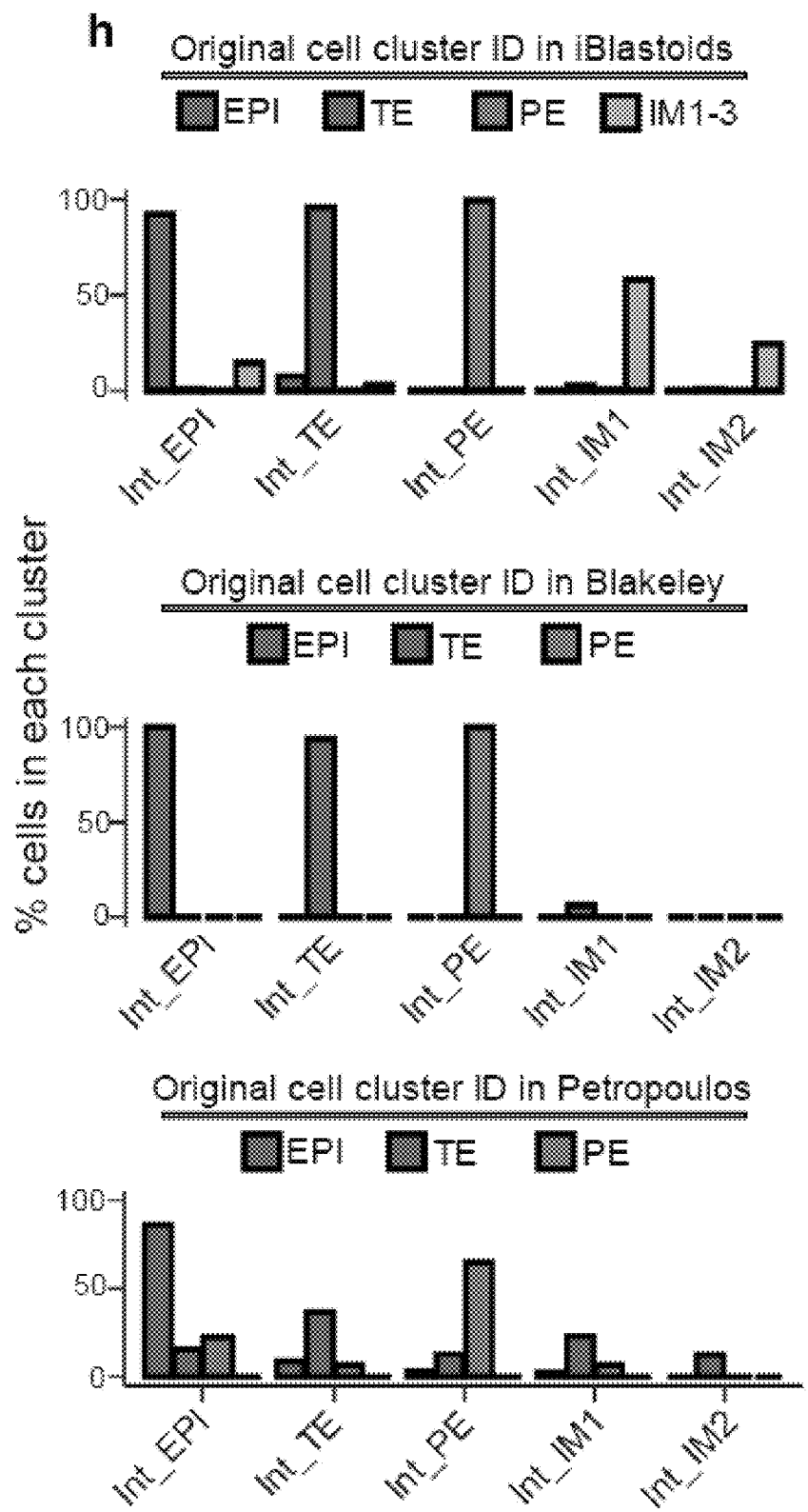
Figure 3:
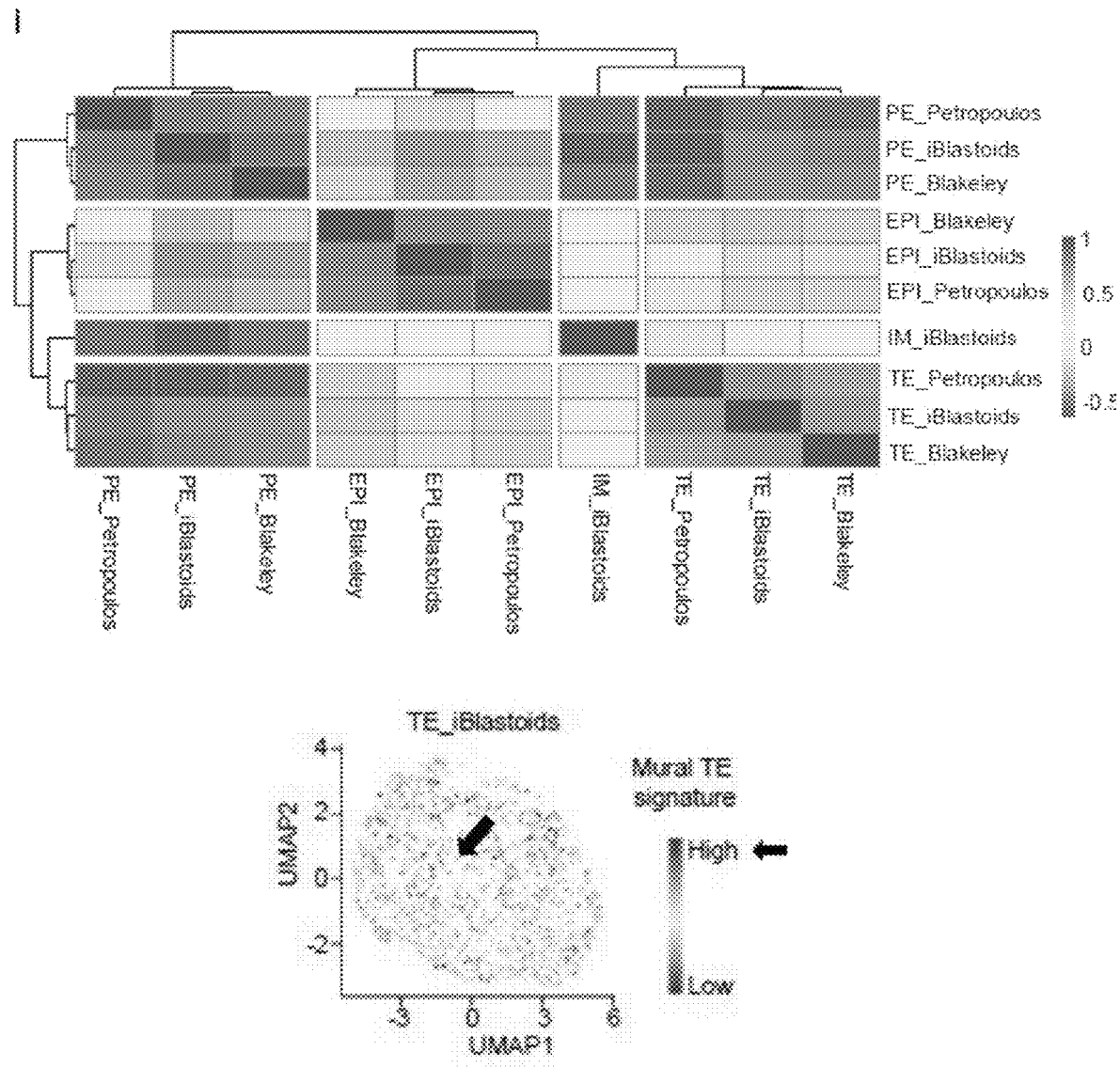
Figure 3:
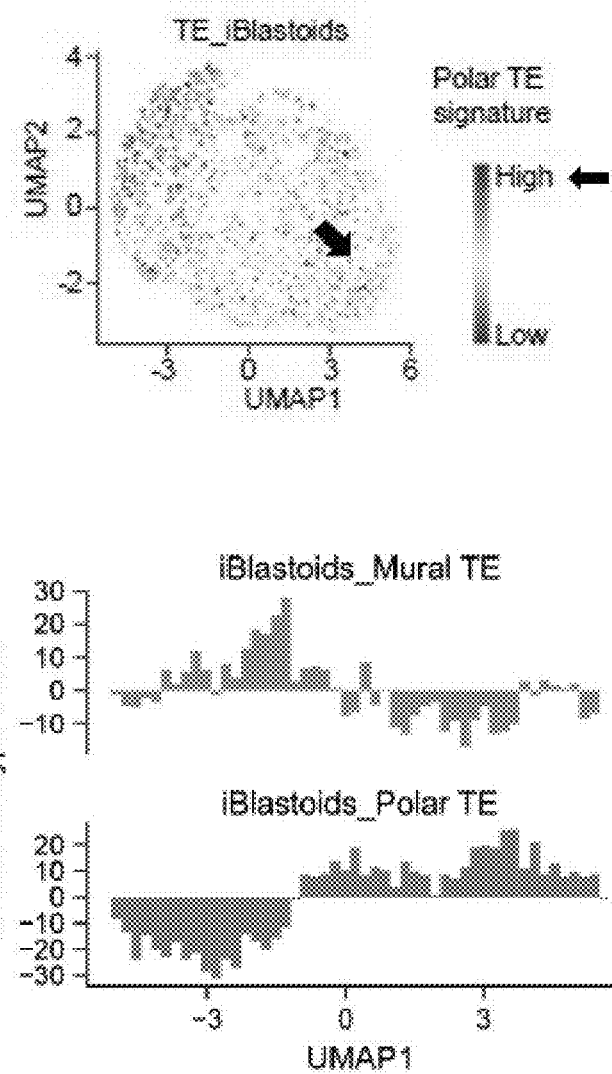
Figure 3:
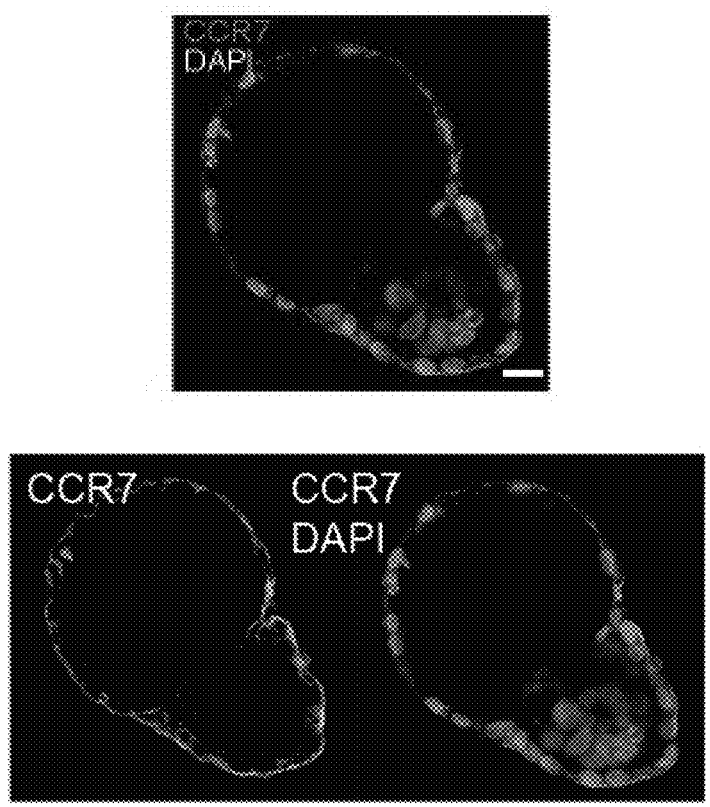
Figure 3:
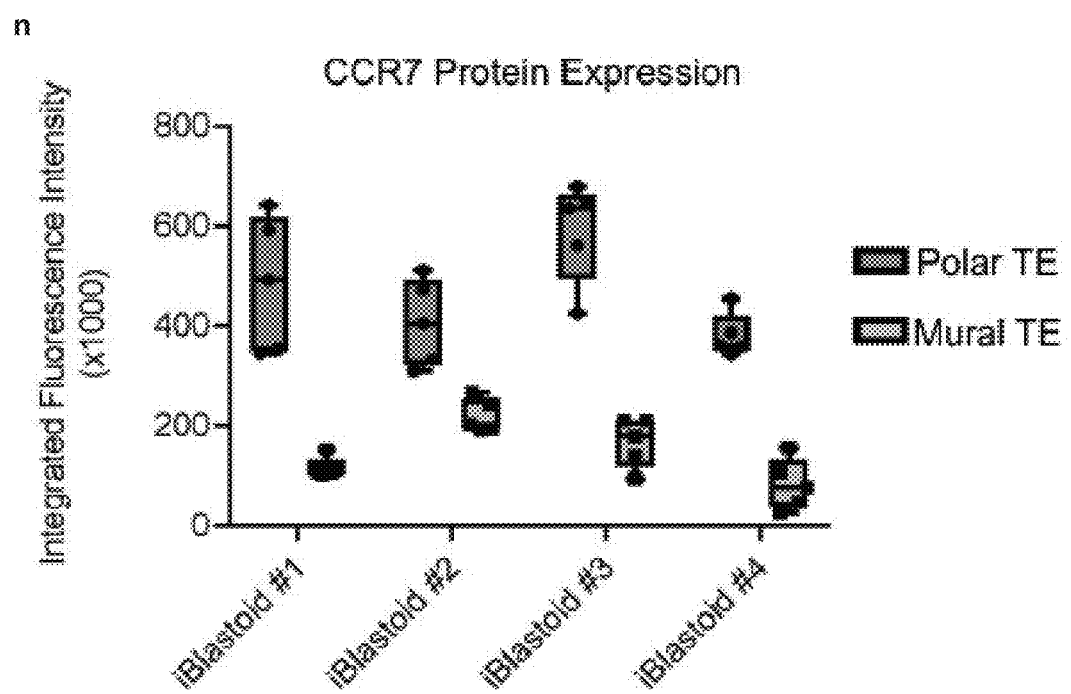
Figure 4:
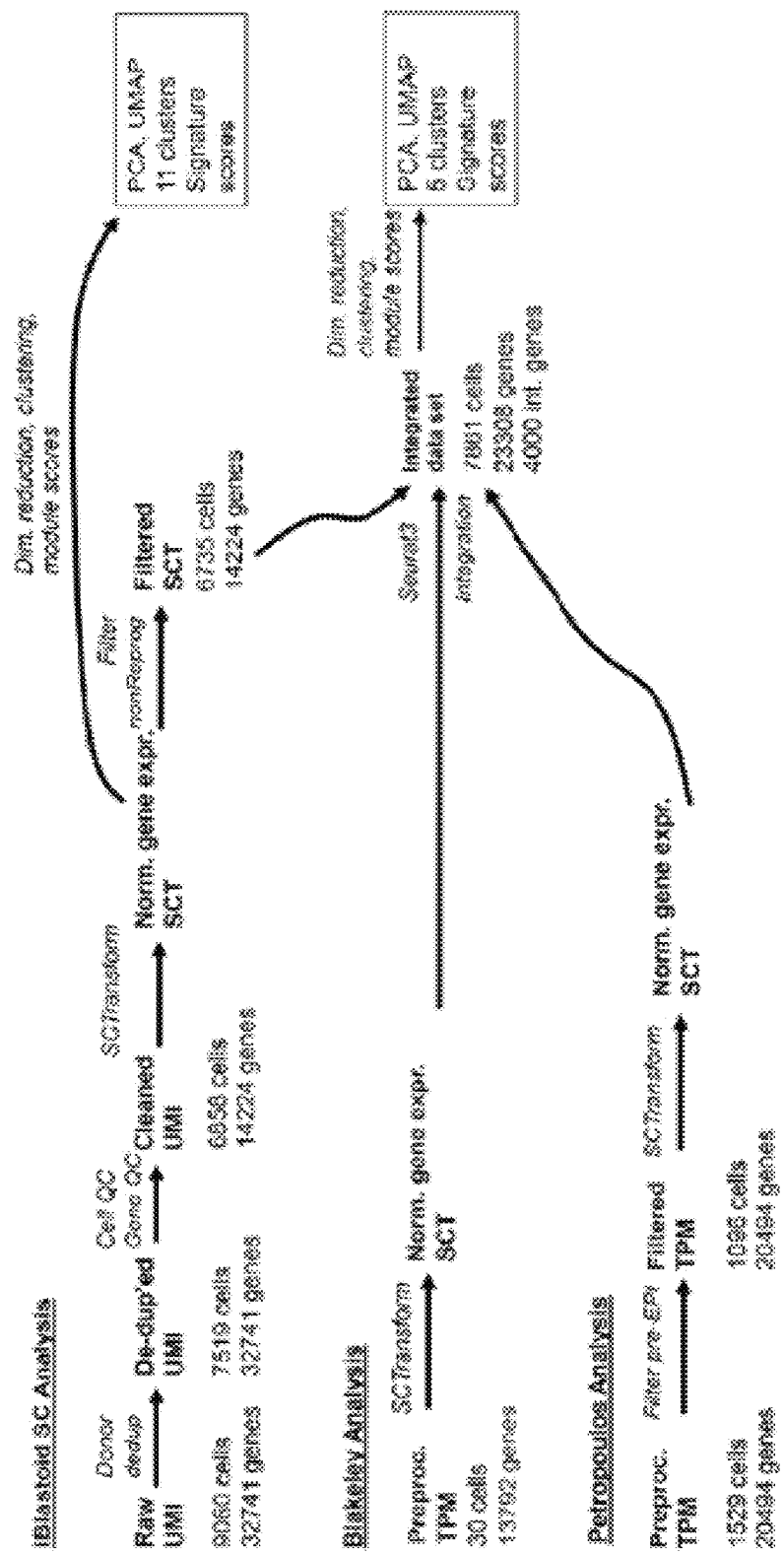
FIG. 4. scRNA-seq pipeline and quality controls. a, scRNA-seq analysis strategy (see Methods for details). b, UMAP representation of donor cell distribution for iBlastoids. c, UMAP representation of the cell cycles for iBlastoids scRNA-seq library. d, Expression of Sendai-KLF4, Sendai-KOS and Sendai-MYC in iBlastoids. e, Expression of EPI markers (POU5F1 and NANOG), TE markers (CDX2 and GATA2), and PE markers (SOX17 and GATA6) for Petropoulos scRNA-seq library (Petropoulos). f, g, Expression of non-reprogramming signature and IFI27 expression on UMAP of iBlastoid dataset.
Figure 4:
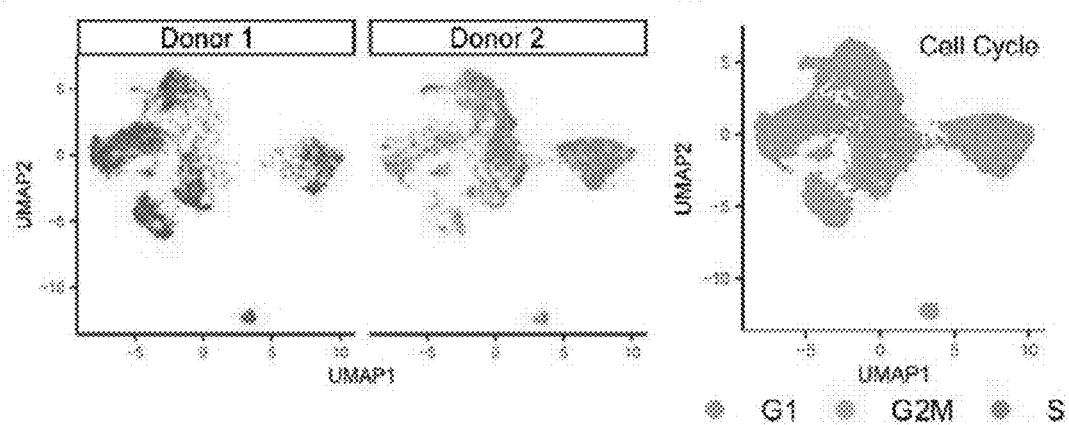
Figure 4:
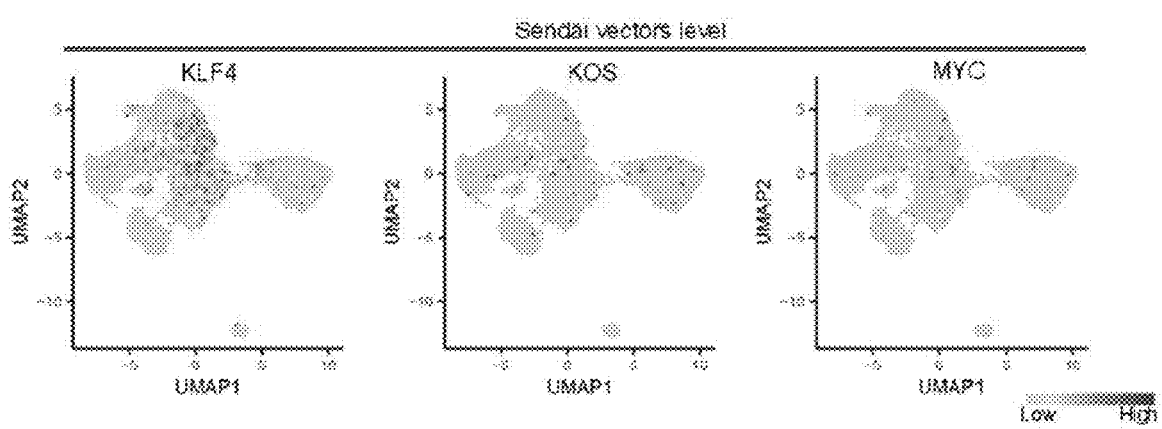
Figure 4:
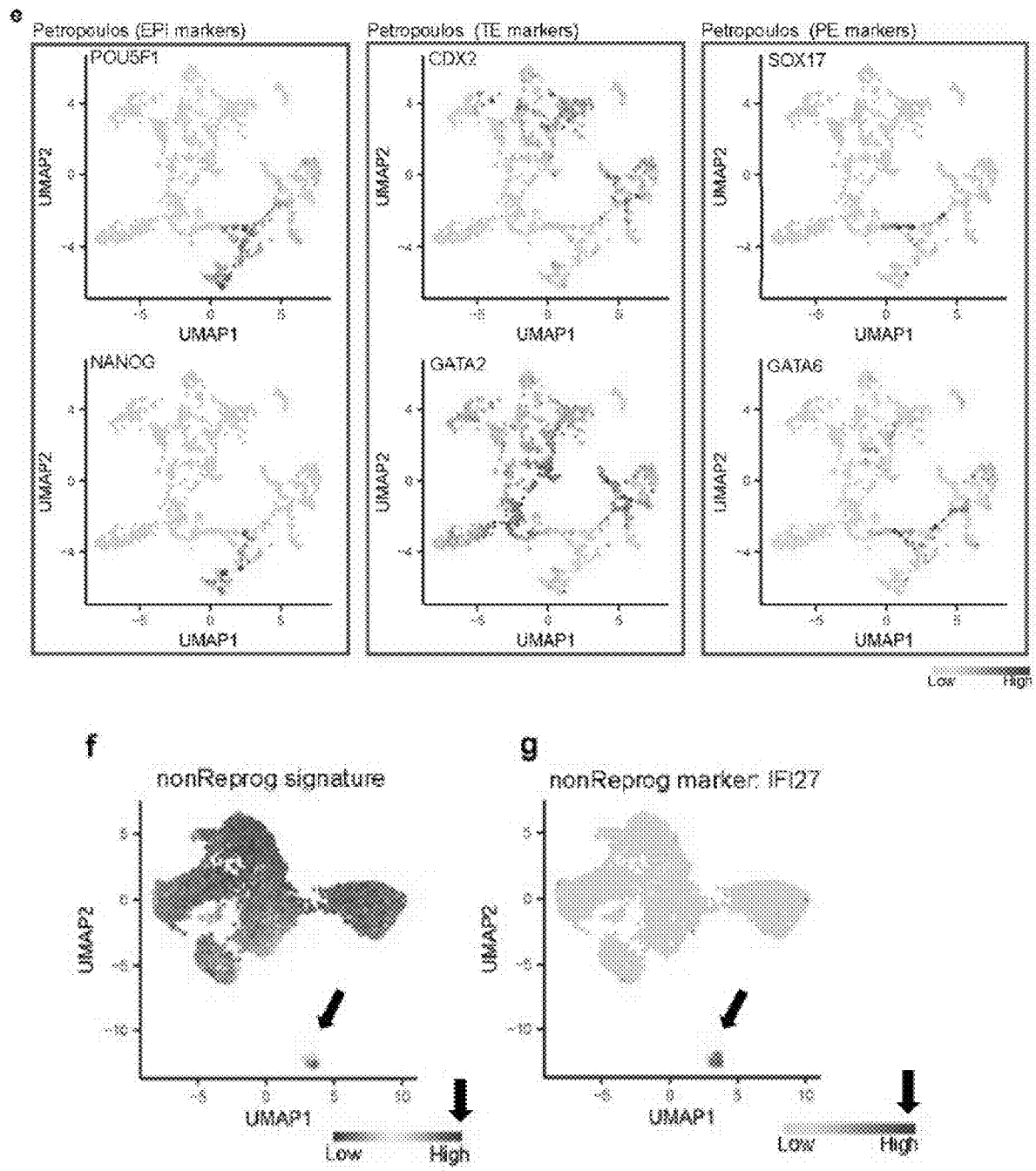

To further characterize the transcriptional makeup of the cells in the iBlastoids, the inventors performed single-cell RNA sequencing (scRNA-seq) using iBlastoids generated from two donors (FIG. 3a). After quality control and stringent filtering, 6858 cells were retained (3249 cells from Donor 1 and 3609 from Donor 2) and a total of 14224 genes were detected for downstream analyses (FIG. 4a). The Uniform Manifold Approximation and Projection (UMAP) analysis of the scRNA-seq data indicated that the cells distributed evenly without clustering based on donor or cell cycle differences (FIG. 4b, c). Although Sendai-KLF4 transcripts could be detected, there was minimal Sendai-KOS and Sendai-MYC expression in the scRNA-seq data (FIG. 4d), indicating that exogenous OCT4 and SOX2 were not expressed, or expressed at very low levels.

To identify the putative EPI, TE, and PE cell clusters on the UMAP, the inventors examined the expression of EPI markers (NANOG and OCT4/POU5F1), TE markers (CDX2 and GATA2), and PE markers (SOX17 and GATA6) in our scRNA-seq iBlastoids dataset. As shown in FIG. 3b, OCT4 and NANOG-expressing cells occupy a distinct region in the UMAP space. On this note, more cells express endogenous OCT4 than NANOG (see Methods), a feature that is observed in human blastocysts (FIG. 4e). SOX17 and GATA6-expressing cells were also found in a defined region on the UMAP while the inventors found a more heterogeneous expression of CDX2 and GATA2, which is similarly observed in the scRNA-seq dataset generated from E5-7 human blastocysts (FIG. 3b, FIG. 4e).

Figure 5:
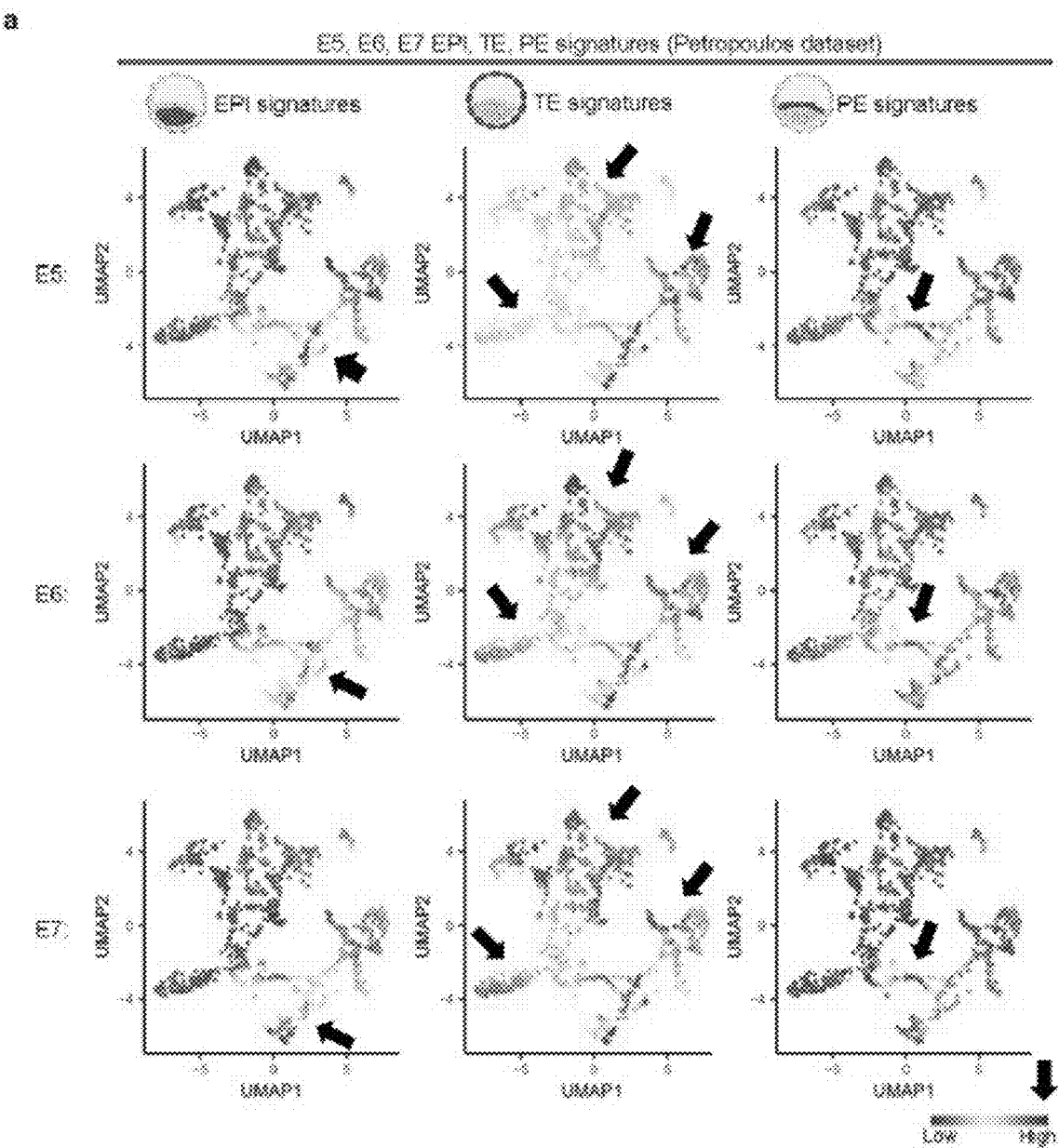
FIG. 5. Scoring of the defined E5-7 EPI, TE, and PE signatures on blastocysts and iBlastoids. a, Defined EPI, TE, and PE signatures for E5, E6, and E7 developmental day on Petropoulos scRNA-seq dataset (Petropoulos). b, Defined EPI, TE, and PE signatures for E5, E6, and E7 developmental day on iBlastoid scRNA-seq dataset.
Figure 5:
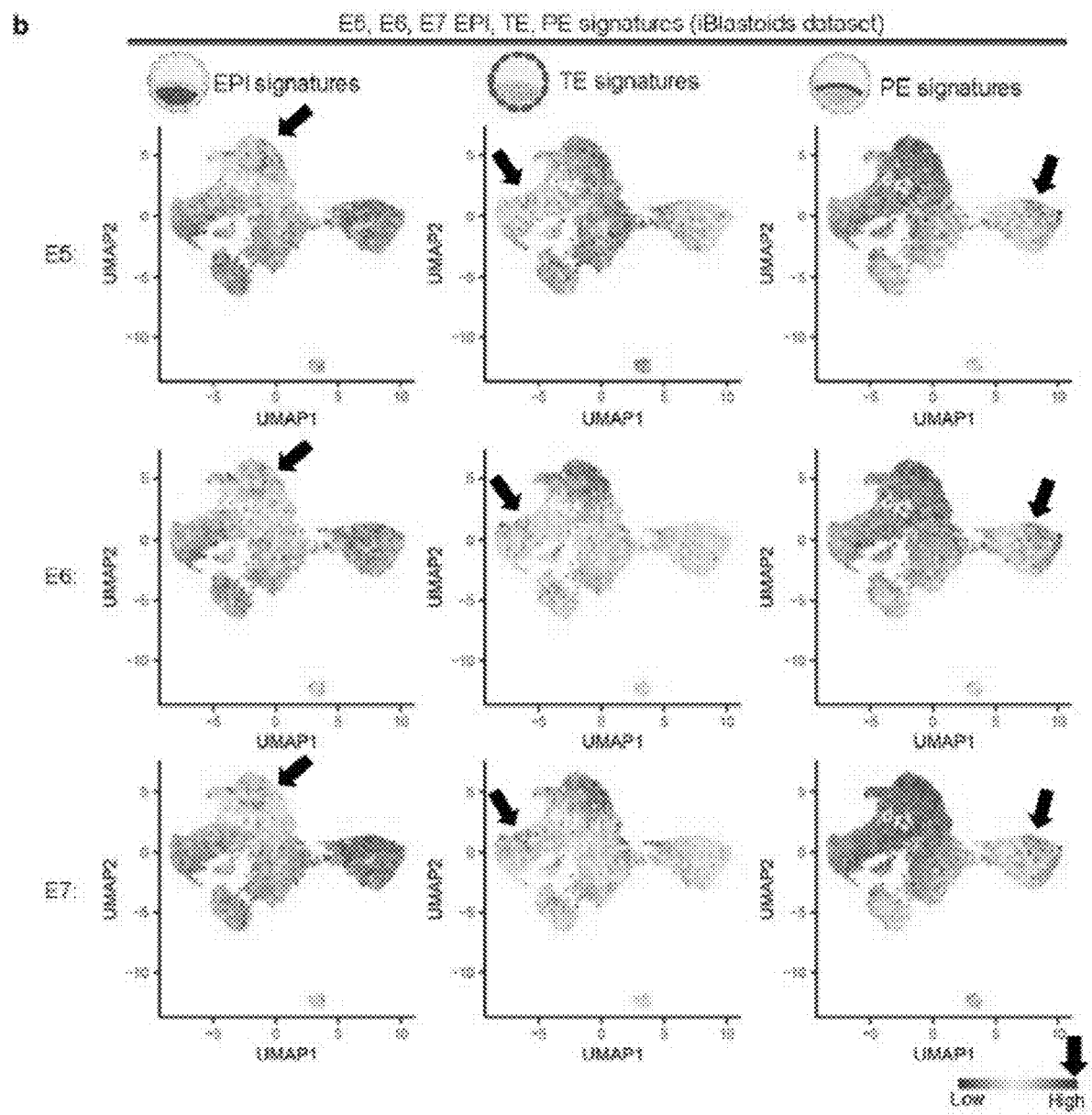

To further confirm cellular identity and the presence of EPI, TE, and PE lineages in the iBlastoids, the inventors applied a scoring system based on a set of EPI, TE, and PE specific gene signatures defined in Petropoulos Supra, using their scRNA-seq of E5-7 human blastocysts (FIG. 3c). Using these defined signatures, the inventors resolved distinct EPI, TE, and PE cell populations on the UMAP of the iBlastoid dataset. Further examination of the defined EPI, TE, and PE signatures separated by E5, E6, and E7 on the iBlastoids and blastocysts scRNA-seq datasets show negligible differences (FIG. 5a-b). Altogether, the results confirm the presence of EPI, TE, and PE-like cells in the iBlastoids.

Example 7—iBlastoids are Transcriptionally Similar to Blastocysts

Figure 6:
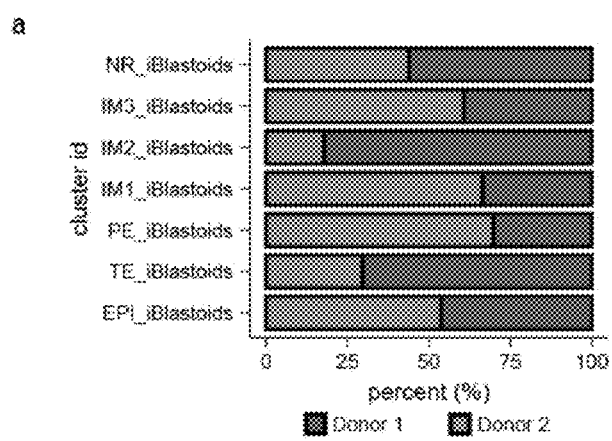
FIG. 6. scRNA-seq analysis of iBlastoids and blastocysts datasets. a, Proportion of cells from each donor across all assigned clusters. b, Heatmap showing gene expression profiles of each assigned cluster (top 10 genes each) in the iBlastoid scRNA-seq dataset. c, UMAP projection showing cell distribution of iBlastoid and blastocysts (Blakeley and Petropoulos) in the integrated dataset. d, Expression of EPI markers (POU5F1 and NANOG), TE markers (CDX2 and GATA2), and PE markers (SOX17 and GATA6) for the integrated dataset of iBlastoids and E5-7 blastocysts (Blakeley and Petropoulos). e, Pearson correlation analysis of iBlastoid EPI, TE, and PE clusters with annotated EPI, TE, and PE clusters from blastocysts (Blakeley and Petropoulos).
Figure 6:
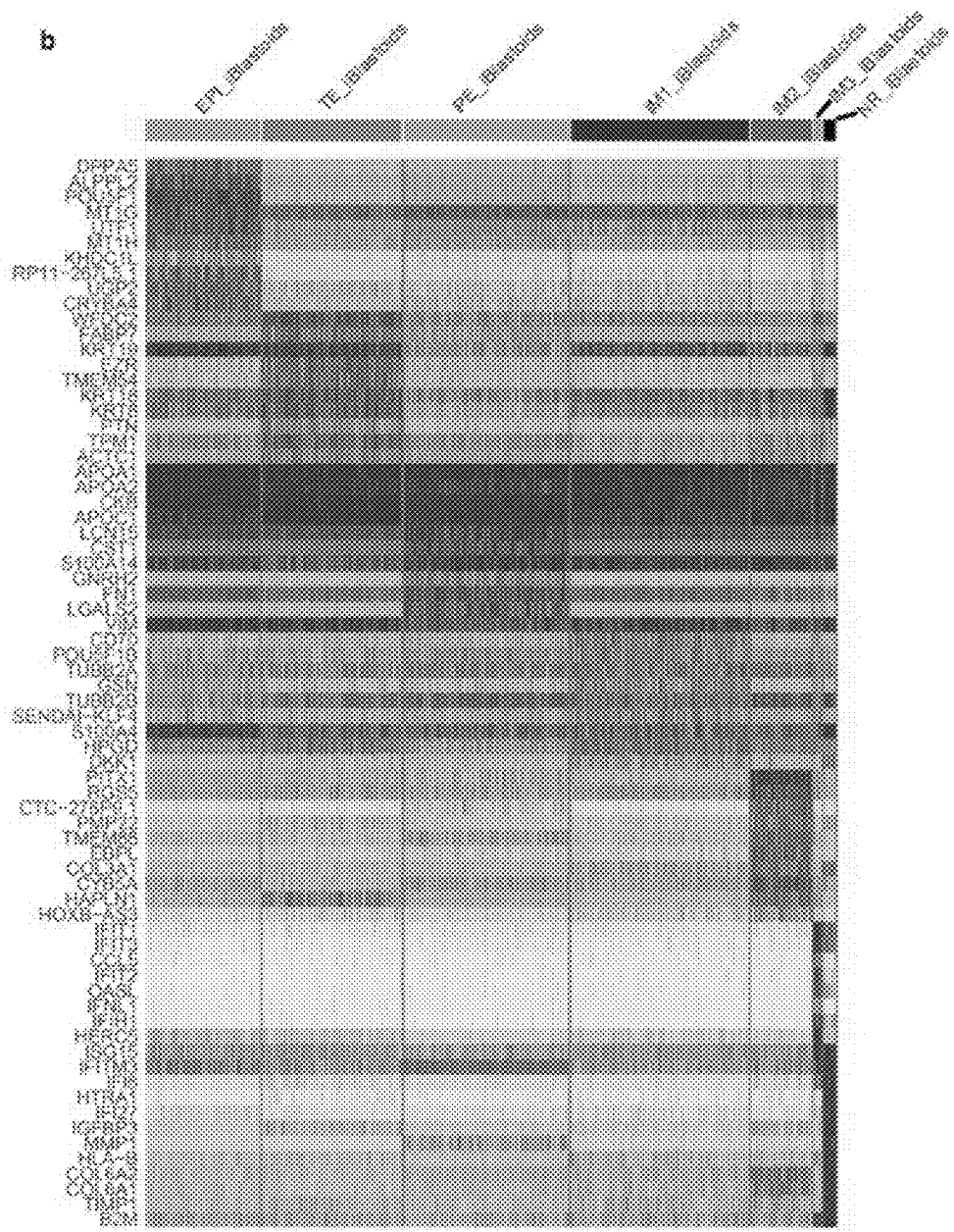
Figure 6:
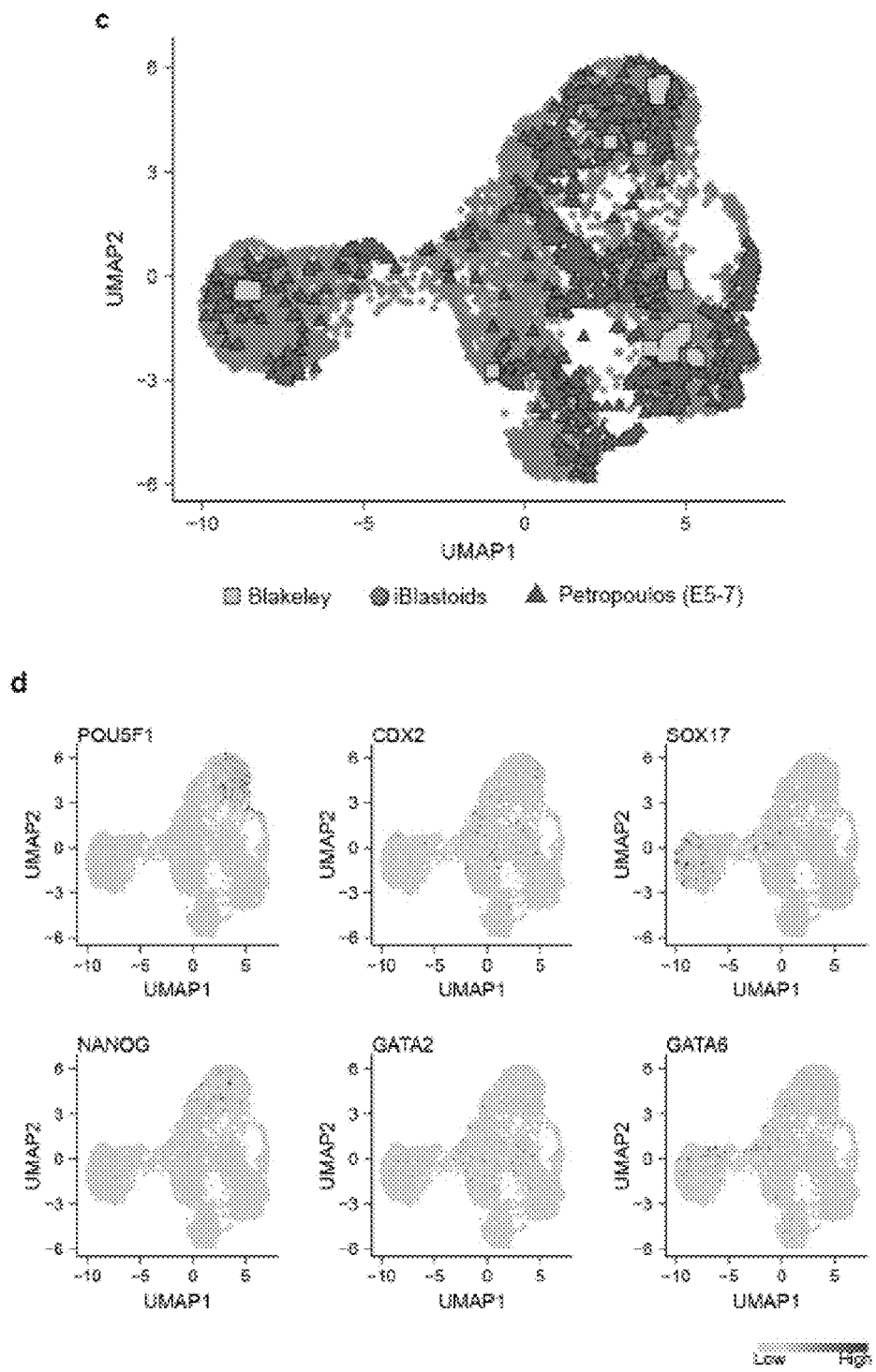
Figure 6:
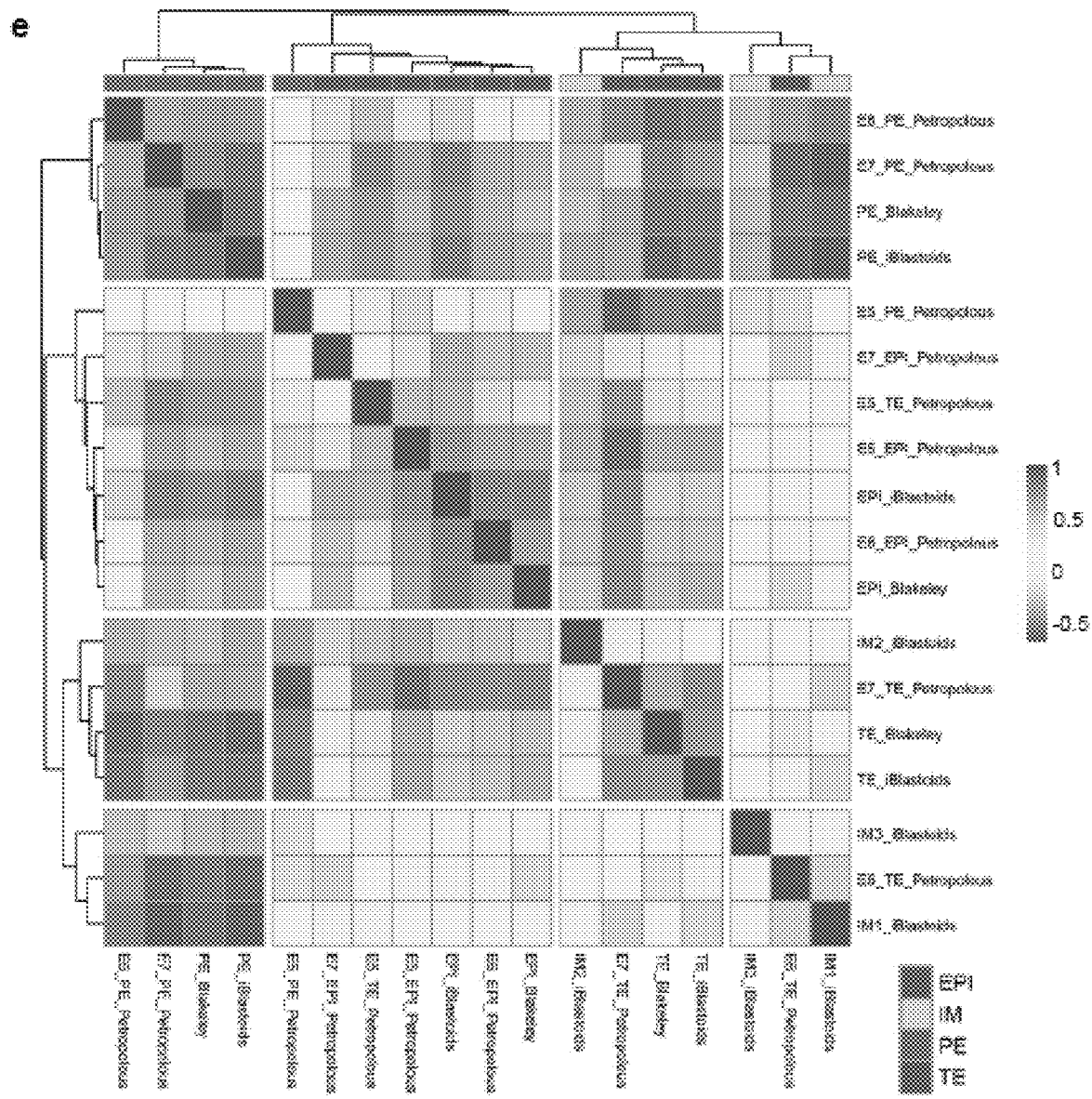

To further resolve the identity of the cells within the iBlastoids, the inventors performed unsupervised clustering analysis, identifying 7 cell clusters (FIG. 3d). Based on the EPI, TE, and PE gene signatures the clusters were assigned as: EPI cluster, TE cluster, or PE cluster. Three remaining clusters did not have a clear identity a priori and seem to have an intermediate signature (Clusters IM1-3) (FIG. 6a-b, FIG. 3d). Interestingly, duster IM1 expresses a high level of CDX2 as well as exogenous KLF4 (FIG. 3b, FIG. 4d), which may suggest that those cells are en route to become TE-like cells. Similarly, mouse blastoids generated from EPSCs have cell clusters with an intermediate or undefined signature as revealed by scRNA-seq transcriptome profiling. The inventors also observed a duster of cells representing non-reprogrammed refractory fibroblasts cells (FIG. 4f, g). On this note, this small fibroblast duster was excluded from downstream analysis.

TE cells of human blastocysts specify into polar and mural TE during embryogenesis. Examination of the polar and mural TE signatures, defined by Petropoulos et al, in the iBlastoids showed that iBlastoids have two distinct populations of TE cells, one expressing a higher polar TE-related signature and another expressing a mural TE signature (FIG. 3 j,k,l). Immunostaining analysis of the polar marker, CCR713 also suggested a higher expression at the polar side of the iBlastoids (FIG. 3 m,n).

To determine how similar cells of the iBlastoids are to the cells of blastocysts generated following IVF, the inventors integrated the iBlastoids scRNA-seq with two additional scRNA-seq datasets obtained of human blastocysts reported previously by the groups of Lanner and Niakan, K. K. & Eggan, K. Dev. Biol. 375, 54-64 (2013)). The dataset from the group of Lanner was generated using Smart-seq2 on triturated cells, with a subset of samples at E5-7 enriched for ICM cells via immunosurgery. For the dataset from the Niakan group, micromanipulation via laser biopsy was used to separate ICM and polar TE from blastocysts, and cDNA from isolated single cells was generated and sequenced. UMAP analyses revealed a high concordance between cells of the blastocysts and iBlastoids (FIG. 3e, f, FIG. 6c, d). Importantly, cells from the EPI-iBlastoids duster, TE-iBlastoids cluster, and PE-iBlastoids cluster overlap with their EPI, PE, and TE counterparts from blastocysts (FIG. 3e). To further characterize these cell populations, unsupervised clustering was performed (FIG. 3g, h), confirming that PE, EPI, and TE-like cells from the iBlastoids share the same clusters as PE, EPI, and TE cells from blastocysts. On this note, the inventors also observed that some blastocyst TE cells clustered together with cells of the IM1-iBlastoids cluster (FIG. 3e). Furthermore, correlation analysis of the iBlastoids EPI, TE, and PE clusters with the annotated EPI, TE, and PE cells from E5-7 blastocysts revealed a high correlation (~0.9) between the iBlastoid clusters and their blastocyst counterparts (FIG. 3i). The inventors correlated the iBlastoid cell clusters with the EPI, TE, and PE cells from from blastocysts at different developmental days (E5, E6, and E7) in the Petropoulos dataset, observing correlation of the iBlastoids clusters with the respective EPI/TE/PE lineages of E5-7 blastocyst stages (FIG. 6e). Hierarchical clustering analysis suggests a better correlation of the iBlastoid EPI cluster with the early blastocyst EPI (E5 and E6). Altogether, this data demonstrates that the cells of the iBlastoids faithfully recapitulate the transcriptional makeup of the three cell lineages present in human blastocysts at E5-6.

Example 8—iBlastoids can Model In Vitro Implantation

To evaluate whether iBlastoids could be used to model the morphological and molecular changes occurring during the peri-implantation and early post-implantation window of human embryonic development in the absence of a uterus, the inventors performed an in vitro attachment assay by modifying the human embryo attachment culture previously published using human blastocysts. Although there is currently no precedent to working with human blastoid models, all experiments were approved by the Institutional Human Research Ethics Committee, in concordance with published recommendations, as well as adhering to the International Consensus for culturing human embryos up to 14 days post-fertilization and/or formation of primitive streak (PS), whichever is first. Given that the "14-day rule" is not applicable to iBlastoids given the starting fibroblasts were derived from adult donors, the inventors focused on culturing the iBlastoids for the minimal time possible, in this case a maximum of 5 additional days (equivalent to ~E11), and terminating the experiments before morphological evidence of PS so as to remain well within international guidelines. To rule out molecular evidence of PS formation, the inventors performed a qRT-PCR 24 hr-time course of several key primitive streak markers during the 5-day embryo attachment culture and did not observe up-regulation of TBXT, EOMES, or MIXL1 or any morphological changes indicative of gastrulation (FIG. 8b). Therefore, with 5-days of iBlastoid attachment culture, the EPI compartment did not progress to the formation of a PS. Nevertheless, by stringently adhering to the above parameters, the inventors performed all subsequent human iBlastoid attachment culture experiments for a total of 4.5 days after iBlastoid formation.

Using the attachment culture model, most of the iBlastoids (>90%) attached within 24 hrs, increased in size, flattened and progressed to form an outgrowth, similar to what has been reported in human blastocysts (FIG. 7a). Following attachment, the number of NANOG and OCT4/SOX2 positive cells increased, indicating expansion of the iBlastoid EPI (FIG. 8c, d), similar to what has been observed when using human blastocysts. Moreover, CDX2 and GATA2 positive cells also spread upon attachment (FIG. 8c, d), which indicated TE outgrowth of the attached iBlastoids. Similar results were also obtained using iBlastoids generated from two additional donors (not shown). Next, the inventors examined the distribution of PE-like cells after attachment. Although many of them still co-stained with TE markers (GATA2 or CDX2), the inventors noticed some SOX17 and GATA6 positive cells localizing to the perimeter of the NANOG or OCT4 positive EPI (FIG. 7b,c, FIG. 8e,f).

It has previously been reported that upon in vitro attachment, EPI cells of human blastocysts polarized and formed a lumen known as the pro-amniotic cavity. F-actin, OCT4, and aPKC immunostaining, indicated a central lumen (marked by F-actin and aPKC) within the EPI compartment of ~20-30% attached iBlastoids surrounded by radially organized OCT4-positive cells (FIG. 7d). The inventors observed the polarization of EPI-like cells and the emergence of a pro-amniotic-like cavity at day 3 of attachment.

The inventors then investigated the possible cell fate transitions of the TE-lineage upon attachment. Remarkably, they found high intensity and filamentous keratin KRT7 (a pan-trophoblast marker) staining of the TE cells in the attached iBlastoids, in contrast to the dull and limited KRT7 staining in the iBlastoids before attachment culture (FIG. 7e). The results suggest a TE cellular state transition to the trophoblast lineage which was also reported when culturing human blastocysts. Importantly, the inventors observed that cells surrounding the EPI-like compartment in the attached iBlastoids had a greater nuclear volume compared to cells of EPI, which is indicative of trophoblast cells (FIG. 7f). Notably, the inventors found some cells that morphologically resembled syncytiotrophoblast (ST) and extravillous cytotrophoblasts (EVT), as demonstrated by the respective multi-nucleated phenotype and spindle-like morphology in the periphery of the attached iBlastoids (FIG. 7f).

To further validate the presence of ST and EVT-like cells, the inventors performed immunostaining using hCG as a ST marker, and MMP2 as an EVT marker (FIG. 7g). The inventors detected a strong and extensive staining for hCG, reflecting the early development of ST; whereas MMP2 was detected in a lower number of cells in agreement with the EVT developing later during the implantation stage (FIG. 7g). In addition, qRT-PCR analysis also revealed the upregulation of the ST marker CSH1 and EVT marker ITGA117 with attachment, indicating the iBlastoid TE cells can differentiate into ST and EVT-like states (FIG. 7h).

Finally, the inventors performed hCG ELISA on the conditioned media collected from the attached iBlastoids, and detected a 10-fold increase in the amount of hCG 4.5 days after attachment (FIG. 7i). Altogether, the results show that iBlastoids can be used to model in vitro implantation similar to blastocysts, highlighting the fact that it is a valuable model system that enables the analysis of the peri-implantation and early post-implantation stages of embryonic development in humans.

Example 9—Establishment of iBlastoid-Derived Cell Lines

Figure 9:
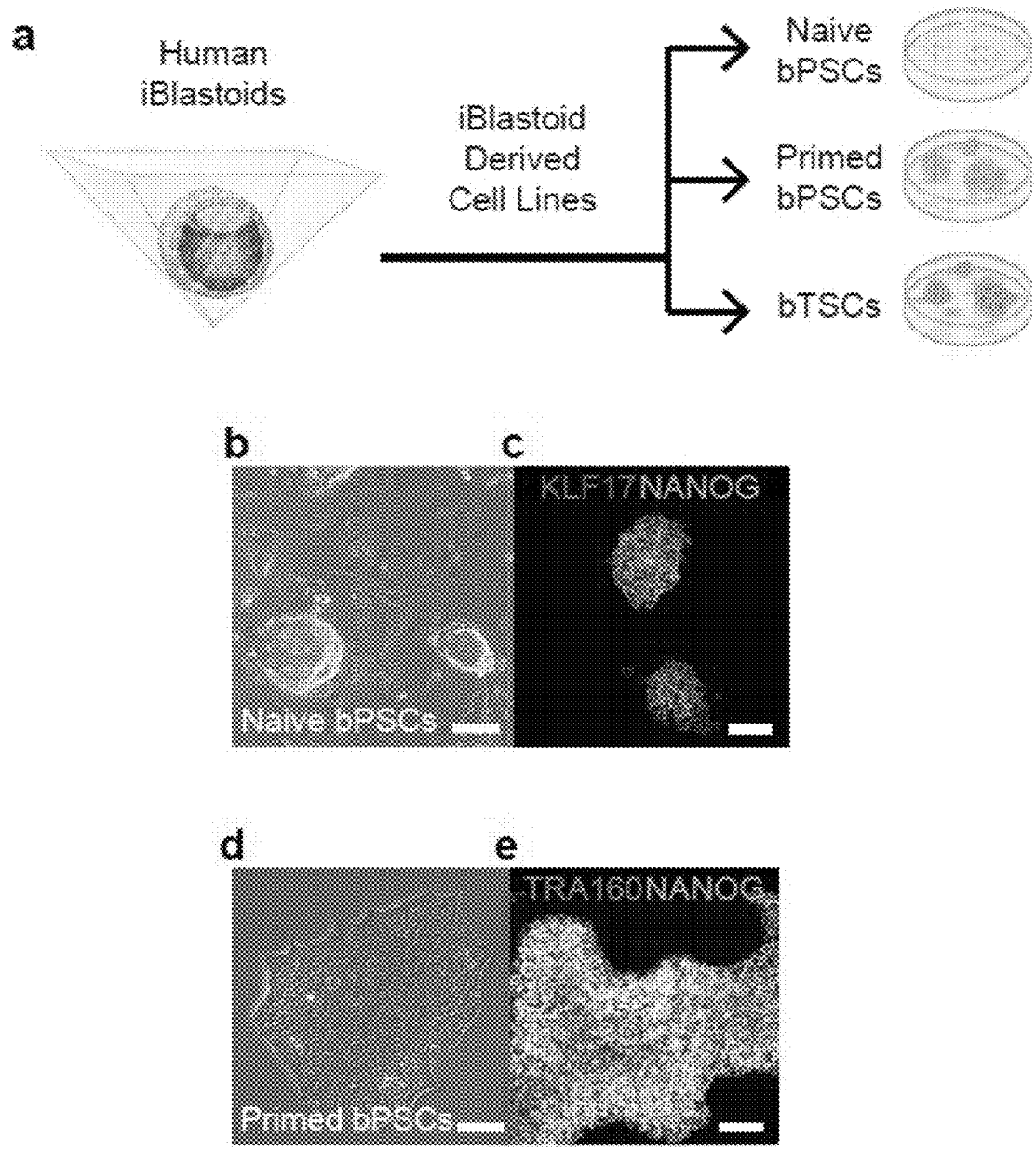
FIG. 9. Derivation of stem cells from iBlastoids. a, Experimental design for derivation of naive bPSCs, primed bPSCs and bTSCs. Phase-contrast and immunostaining analysis of naive bPSCs (b,c), primed bPSCs (d,e) and bTSCs (f,g). n=2. All scale bars, 100 μm.
Figure 9:
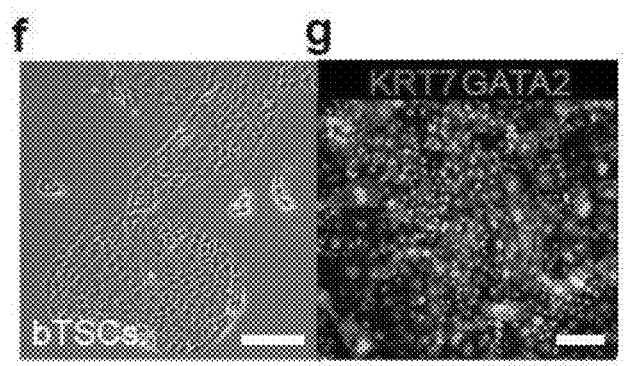

Generation of human iBlastoid was performed as described herein. The iBlastoids collected at day 6 of formation were utilized for the establishment of iBlastoid (B)-derived cell lines including naïve blastoid pluripotent stem cells (naïve bPSCs), primed blastoid pluripotent stem cells (primed bPSCs), blastoid trophoblast stem cells (bTSCs) and blastoid extraembryonic endoderm (bXENs) (FIG. 9a). To derive these cell lines from iBlastoids, the iBlastoids were dissociated into single cells using TrypLE express and seeded into respective culture conditions (FIG. 9a). Briefly, for the derivation of naïve BPSCs, the cells were cultured in t2iLGoY medium (Guo et al. 2016 Stem Cell Reports 6:437-46) on a layer of irradiated mouse embryonic fibroblasts (iMEFs); for the derivation of primed bPSCs, the cells were cultured in Essential 8™ medium (https://www.thermofisher.com/order/catalog/product/A1517001#/A1517001) on vitronectin; for the derivation of bTSCs, the cells were cultured in TSC medium (Okae et al. 2018) on Collagen IV; and for the derivation for bXENs, the cells were cultured in NACL medium (Linneberg-Agertiolm et al. 2019, Development: 146) on a layer of iMEFs. Cells with morphology representative of the respective cell types were observed in 5-10 days and were ready for passaging once achieving a confluency of 60-80% (FIG. 9b, d, f).

The inventors demonstrated that the stem cells derived from iBlastoids could be maintained in culture for more than 25 passages.

Naive bPS cells show a typical dome-shaped morphology, positive staining for KLF17/NANOG and they express naive pluripotency-associated markers (DPPA3, KLF17, DNMT3L, DPPA5, SUSD2, KLF5). Primed bPS cells exhibit flattened epithelial morphology, positive staining for TRA-160/NANOG and these cells express primed pluripotency-associated markers (ZIC2, ZIC3, NLGN4X, OTX2, CD24, SALL2). bTS cells show the expected cobblestone-like morphology and are positive for KRT7 (a pan-trophoblast marker) and GATA2 as well as expressing trophoblast associated genes such as GATA2, GATA3, TFAP2C, KRT7, TP63, and TEAD4 (FIG. 9b-g, FIG. 11 b,c). Importantly, the inventors demonstrated that naïve and primed bPS cells have trilineage differentiation potential (FIG. 11d-h). Moreover, they confirmed the capability of bTS cells to give rise to extravillous cytotrophoblasts (EVTs) and syncytiotrophoblasts (STs) (FIG. 11i-n). Altogether, these results suggest that iBlastoids have the capability to give rise to the major stem cell types derived using blastocysts.

Example 10—Maintenance of iBlastoid-Derived Cell Lines

For the maintenance of naïve bPSCs, the cells were routinely passaged every 6 days at a splitting ratio of 1:10-20. Briefly, naïve bPSCs were dissociated using Accutase for 5 minutes at room temperature. The dissociated cells were seeded onto a layer of iMEFs (prepared one day prior to passaging) in t2iLGoY medium and cultured in a 37° C., $O_2$ and 5% $CO_2$ incubator. Media replacement was performed every day.

For the maintenance of primed bPSCs, the cells were routinely passaged every 6 days at a splitting ratio of 1:20-40. Briefly, primed bPSCs were dissociated using 0.5 mM EDTA for 8 minutes at room temperature. The dissociated cells were seeded onto 5 µg/ml vitronectin-coated plates (coated for at least one hour at room temperature prior to passaging) in Essential 8™ medium and cultured in a 37° C., 5% $O_2$ and 5% $CO_2$ incubator. ROCKi were added at a concentration of 10 µM during passaging to enhance cell attachment and survival. Media replacement was performed every day.

For the maintenance of bTSCs, the cells were routinely passaged every 4-6 days at a splitting ratio of 1:4-1:10. Briefly, BTSCs were dissociated using TrypLE express for 8-10 minutes at 37° C. The dissociated cells were seeded onto 5 µg/ml Collagen IV-coated plates (coated for at least one hour at 37° C. prior to passaging) in TSC medium and cultured in a 37° C., 20% $O_2$ and 5% $CO_2$ incubator. Media replacement was performed every other day.

For the maintenance of bXENs, the cells were routinely passaged every 4-6 days at a splitting ratio of 1:4-1:10. Briefly, bXENs were dissociated using Accutase for 3-5 minutes at room temperature. The dissociated cells were seeded onto a layer of iMEFs (prepared one day prior to passaging) in NACL medium and cultured in a 37° C., 5% $O_2$ and 5% $CO_2$ incubator. ROCKi were added at a concentration of 10 µM during passaging to enhance cell attachment and survival. Media replacement was performed every other day.

Example 11—Exemplary Method for Generation of iTSCs

During reprogramming from fibroblasts to iPSCs, it is possible to capture and stabilise intermediates in TSC medium, allowing for the generating of iTSCs.

Primary adult human dermal fibroblasts (HDFa) were obtained from Life Technologies. HDFa were expanded in medium 106 (Life Technologies) supplemented with LSGS (Gibco) for nuclear reprogramming experiments. The early passage (<P6) fibroblast cells were then seeded into 6-well plates at 50,000-70,000 cells per well before transduction in fibroblast medium containing DMEM (Gibco), 10% FBS (Hyclone), 1% nonessential amino acids (Gibco), 1 mM GlutaMAX (Gibco), 1% Pen-strep (Gibco), 0.1 mM 2-mercaptoethanol (Gibco) and 1 mM sodium pyruvate (Gibco).

48 hours later, cells in one well were trypsinized for counting to determine the volume of viruses required for transduction (MOI). Transduction was performed using CytoTune 2.0 iPSC Sendai Reprogramming Kit (Invitrogen) consisting of four transcription factors, OCT4, SOX2, cMYC, KLF4 (OKSM). 24 hours later, the viruses were removed and media changed every other day.

7 days post-transduction, cells were harvested using TrypLE Express (Life tech) and re-seeded onto a layer of irradiated MEF feeders in fibroblast media. The following day, the media was changed to 1) iTSC media.

Upon culturing in TSC media, once the iTSCs become confluent and evident, iTSCs were passaged every 3-4 days at a 1:2-1:4 ratio. For the initial 4 passages, iTSCs were passaged onto iMEF feeders using TrpLE Express (Life tech) and cultured in a 37° C., 5% $O_2$ and 5% $CO_2$ incubator. Starting from passage 5, iTSCs were passaged onto tissue culture flask that was pre-coated with 5 µg/ml Col IV (Sigma) (for at least one hour at 37° C.) and cultured in a 37° C., 20% $O_2$ and 5% $CO_2$ incubator.

Example 12—Co-Culture of IPSCs and ITSCs in a 3D Culture System

Figure 10:
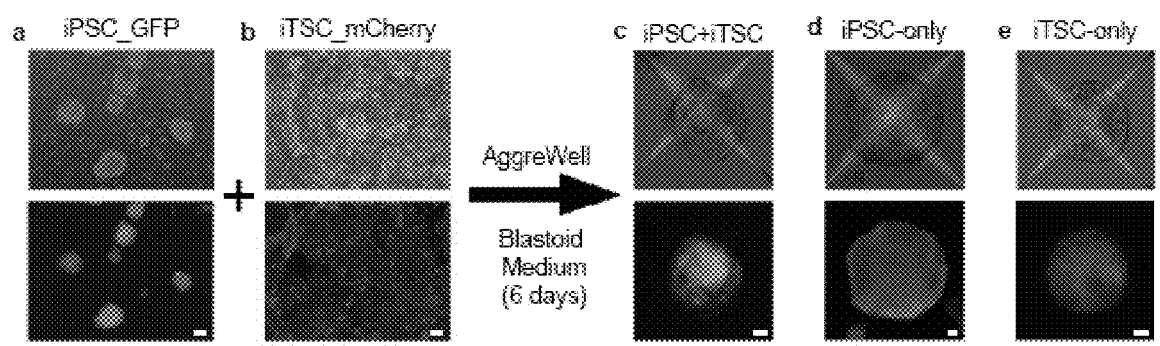
FIG. 10. (a) Naïve iPSCs with GFP reporter. Scale bar: 100 μm. (b): iTSCs with mCherry reporter. Scale bar 100 μm. (c): Assembly of Naïve iPSCs and iTSCs. Scale bar 20 μm. (d): Assembly of naïve iPSCs only. Scale bar: 20 μm. (e): Assembly of iTSCs only. Scale bar: 20 μm. (f): Immunostaining of Naïve iPSCs and iTSCs, naïve iPSCs only and iTSCs only assembled structures using pluripotency marker OCT4 and TSC marker KRT7. Scale bar. 20 μm. (g)
Figure 10:
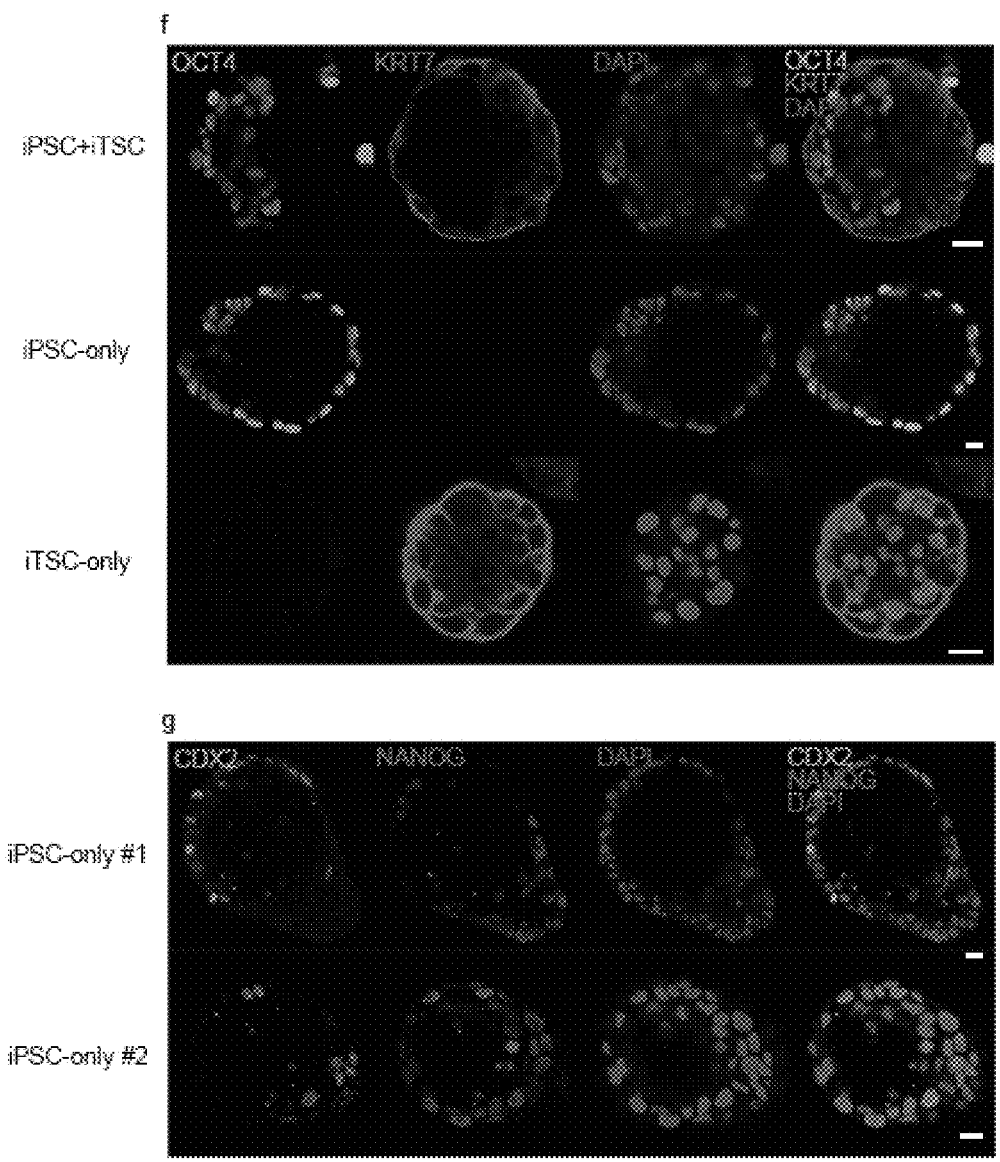

To facilitate the observation of assembly between iPSC and iTSC, iPSC line with GFP-reporter (iPSC-GFP) and iTSC line with mCherry-reporter (iTSC-mCherry) were first generated via lentiviral transduction of GFP and mCherry empty vector construct respectively (FIG. 10a,b). For the co-culture experiment, the dissociated cells were onto a 24-well AggreWell™400 plate in iBlastoid medium at different conditions: (1) iPSC and iTSC at respective 1:2.5 ratio with a total number of $1.2 \times 10^5$ cells per well (FIG. 10c); (2) iPSC-only with a total number of $1.2 \times 10^5$ cells per well (FIG. 10d); (3) iTSC-only with a total number of $1.2 \times 10^5$ cells per well (FIG. 10e). ROCKi were supplemented at the first day of co-culture to enhance cell survival and the cells were cultured for 6 days in the AggreWell system. 3D structures obtained at day 6 of formation were collected for downstream analysis (FIG. 10c-e).

Example 13—Use of Different Media to Generate Reprogramming Intermediates

To explore improvement of the proportion of EPI, TE and PE-like cells at day 21 of reprogramming, different signalling pathways/culture conditions that have been known to regulate the early embryonic and extraembryonic lineages cell fate were assessed. The inventors explored reprogramming in various culture media, such as those listed in Table 4 herein. Specifically, NACL medium was reported to promote PE-like cell fate; PA medium to promote TE-like cell fate; and t2iLGo medium to promote pre-implantation EPI-like cell fate. Based on the immunofluorescence analysis of day 21 reprogrammed cells (FIG. 12), NACL medium promotes expression of GATA6 (PE) and KLF17 (EPI); PA medium promotes upregulation of GATA3 (TE), GATA6 (PE) and KLF17 (EPI) while t2iLGo medium promotes upregulation of KLF17 (EPI). Among the conditions tested, PA medium gave rise to highest amount of TE, PE and EPI-like cells on day 21 reprogramming based on the 3 markers assessed.

Example 14—Reprogramming of Human Fibroblasts Via OKSMNL-mRNA Transfection

Reprogramming of human fibroblasts in this approach is mediated by OCT4, SOX2, KLF4, c-MYC, NANOG and LIN28, collectively known as OKSMNL. For somatic cell reprogramming via the mRNA approach, the experiments were performed according to the manufacturer's instructions of the StemRNA 3rd Gen Reprogramming Kit (StemGent, Cat #00-0076) with modifications. To perform the reprogramming, $1-2 \times 10^4$ human fibroblasts per well of a 12-well plate were seeded in fibroblast medium. After 24 hours (Day 0), cells were transfected with NM-RNA reprogramming transfection complex containing OSKMNL NM-RNA, EKB NM-RNA and NM-microRNAs generated with Opti-MEM (Gibco) and RNAiMAX (Invitrogen) according to manufacturer's instructions. 18 hours later media were renewed with fresh fibroblast medium and the next transfection is performed 6 hours later. The transfection process was repeated for another 3 days (for a 4× transfection regime) or 5 days (for a 6× transfection regime). The cells were cultured in fibroblast medium up to day 21 of reprogramming and were collected for further analysis. Further details of the media used in these experiments is provided in Example 2.

On day 21, cells were immunostained to determine expression of OCT4, GATA6 and CDX2 (FIGS. 13a and c), GATA2, NANOG and SOX17 (FIGS. 13b and d), generated from 4× OKSMNL and 6× OKSMNL mRNA transfection.

The results demonstrate that reprogramming intermediates can be obtained from human fibroblasts when using alternative reprogramming methodologies, and have similar gene expression profiles of markers OCT4, GATA6, CDX2, GATA2, NANOG and SOX17 to those obtained as described in Example 3. The results indicate that reprogramming intermediates generated using alternative methodologies also exhibit epiblast (EPI), trophectoderm (TE), and/or primitive endoderm (PE) transcriptional signatures and indicate that iBlastoids can be derived from reprogramming intermediates obtained via different reprogramming methods, specifically different methods to drive expression of reprogramming transcription factors.

Example 15—Reprogramming of Human Mesenchymal Stem Cells (hMSCs) Via Sendai Virus-Mediated Reprogramming Reprogramming of hMSCs was conducted using Cyto-Tune-iPS 2.0 Sendai reprogramming kit according to the manufacturer's instructions (ThermoFisher, lot #2170052). The hMSCs were seeded at a density of ~$5-10 \times 10^4$ cells in MSC medium. After ~36 hours, the cells were transduced with Sendai viruses in FM at the multiplicity of infection (MOI) as follows, KOS MOI=5, c-MYC MOI=5, KLF4 MOI=6. Media replacement was done every other day starting from day 1 following transduction and every day from day 8 onwards. The reprogrammed cells were collected at day 21 of reprogramming for further analysis. Further details of the media used in these experiments is provided in Example 2.

On day 21, cells were immunostained to determine expression of OCT4, GATA6 and CDX2 (FIG. 14a) or GATA2, NANOG and SOX17 (FIG. 14b).

The results demonstrate that reprogramming intermediates can be obtained from alternative somatic cells, in this case hMSCs, and have similar gene expression profiles of markers OCT4, GATA6, CDX2, GATA2, NANOG and SOX17 to those obtained as described in Example 3. The results indicate that reprogramming intermediates generated using alternative methodologies also exhibit epiblast (EPI), trophectoderm (TE), and/or primitive endoderm (PE) transcriptional signatures and indicate that iBlastoids can be derived from reprogramming intermediates obtained via different reprogramming methods, specifically different methods to drive expression of reprogramming transcription factors.

Example 16—Reprogramming of Human Peripheral Blood Mononuclear Cells (hPBMCs) Via Sendai Virus-Mediated Reprogramming Reprogramming of hPBMCs was conducted using Cyto-Tune-iPS 2.0 Sendai reprogramming kit according to the manufacturer's instructions (ThermoFisher, lot #2170052). To perform the reprogramming, $2.5-5\times10^5$ hPBMCs were counted and transferred into a 12-mL round-bottom tubes. The reprogramming mixture was prepared by adding calculated volumes of the Sendai viruses at the at the multiplicity of infection (MOI) as follows, KOS MOI=5, c-MYC MOI=5, KLF4 MOI=6 into 1 mL of PBMC medium.

After transferring the reprogramming mixture into the hPBMCs-containing round bottom tubes, the cells were centrifuged at 1000×g for 30 minutes at room temperature. Additional 1 mL of PBMC medium was added onto the centrifuged cells and the contents were resuspended and transferred onto 1 well of a 12-well plate for overnight incubation at 37° C. (Day 0). On the next day (Day 1), the medium was replaced with fresh PBMC medium. On Day 3 the cells were plated onto Matrigel-coated plates at a 1:3 ratio in fresh PBMC medium. On day 4 and day 6, medium replacement was performed by removing half of the spent medium and replace with fresh StemPro34 medium (PBMC medium without cytokine). On day 8 of reprogramming, the cells were transitioned into either StemPro34 medium or StemPro34 medium supplemented with 10% FBS with medium replacement performed every other day from this point onwards. Cells were collected at Day 18 and Day 21 for further analysis. Further details of the media used in these experiments is provided in Example 2.

On days 18 and 21, cells were immunostained to determine expression of OCT4, GATA6 and CDX2 (FIG. 15a-c) or GATA2, NANOG and SOX17 (FIG. 15d-f).

The results demonstrate that reprogramming intermediates can be obtained from alternative somatic cells, in this case human peripheral blood mononuclear cells, and have similar gene expression profiles of markers OCT4, GATA6, CDX2, GATA2, NANOG and SOX17 to those obtained as described in Example 3. The results indicate that reprogramming intermediates generated using alternative methodologies also exhibit epiblast (EPI), trophectoderm (TE), and/or primitive endoderm (PE) transcriptional signatures and indicate that iBlastoids can be derived from reprogramming intermediates obtained via different reprogramming methods, specifically different methods to drive expression of reprogramming transcription factors.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A human primed pluripotent stem cell (pPSC) or a cell exhibiting at least one characteristic of a pPSC, wherein the pPSC or cell exhibiting at least one characteristic of a pPSC is produced or isolated from a blastocyst-like structure, wherein the at least one characteristic of a pPSC is selected from:
   an absence of the markers characterising a somatic cell;
   expression of one or more mRNAs of epiblast specific transcription factors;
   expression of one or more of: SFP, OTX2, ZIC2, ZIC3, ZIC5, DNMT3B, KDR, CDH2, CER1, COL2A1, DAZL, TCF7L1, SOX11, SALL2, SOX2, NANOG, KLF4, EPCAM, PRDM14, SSEA-3, SSEA-4, TRA-1-60, TRA-1-81, TRA-2-49/6E, ALP, E-cadherin, UTF-1, OCT4 (POU5F1) and REX1; or
   the cell does not express one or more of the markers: ANPEP, TWIST2, KLF17, KRT7, ITGA2.

2. A method of producing a human primed pluripotent stem cell (pPSC) or a cell exhibiting at least one characteristic of a pPSC, the method comprising:
   culturing single cells dissociated from a blastocyst-like structure on a vitronectin layer in the presence of a culture medium for promoting cells to a pluripotent state,
   wherein the blastocyst-like structure is obtained by a method of aggregating reprogramming intermediates or a method of assembly of iPSCs and iTSCs,
   and wherein the at least one characteristic of a pPSC is selected from:
   an absence of the markers characterising a somatic cell;
   expression of one or more mRNAs of epiblast specific transcription factors;
   expression of one or more of: SFP, OTX2, ZIC2, ZIC3, ZIC5, DNMT3B, KDR, CDH2, CER1, COL2A1, DAZL, TCF7L1, SOX11, SALL2, SOX2, NANOG, KLF4, EPCAM, PRDM14, SSEA-3, SSEA-4, TRA-1-60, TRA-1-81, TRA-2-49/6E, ALP, E-cadherin, UTF-1, OCT4 (POU5F1) and REX1; or
   the cell does not express one or more of the markers: ANPEP, TWIST2, KLF17, KRT7, ITGA2,
   thereby producing the pPSC or a cell exhibiting at least one characteristic of the pPSC.

3. The method of claim 2, further comprising;
   dissociating the blastocyst-like structure into single cells, and
   culturing those single cells on a vitronectin layer in the presence of a culture medium for promoting cells to a primed pluripotent state,
   thereby producing a pPSC or a cell exhibiting at least one characteristic of a pPSC.

4. An isolated pPSC or a cell exhibiting at least one characteristic of a pPSC, produced or isolated from a blastocyst-like structure, obtainable, or obtained by the method of claim 2.

5. The method of claim 2, further comprising the step of expanding the pPSCs or cells exhibiting at least one characteristic of a pPSC to increase the number of pPSCs.

6. The method of claim 2, further comprising the step of differentiating the pPSC, or cell having at least one characteristic of a pPSC, for a sufficient time and under conditions for generating a cell that is not in a pluripotent state.

7. A differentiated cell produced by the method of claim 6.

8. The method of claim 2, wherein the single cells are cultured for a period of at least 1 day.

9. The method of claim 2, wherein the cell retains its undifferentiated state when maintained in subculture.

10. The method of claim 2, wherein the cell retains its undifferentiated state when maintained in subculture for at least 5 or more cell culture passages.

11. The method of claim 3, wherein the step of dissociating the cells comprises contacting the cells with an enzyme or enzyme composition.

12. The isolated pPSC or a cell exhibiting at least one characteristic of a pPSC of claim 1, wherein the pPSC or cell exhibiting at least one characteristic of a pPSC is obtained from a blastocyst-like structure comprising a trophectoderm-like tissue that surrounds a blastocoel and an inner cell mass-like tissue.

13. The isolated pPSC or a cell exhibiting at least one characteristic of a pPSC of claim 1, wherein the pPSC or cell exhibiting at least one characteristic of a pPSC is obtained from a blastocyst-like structure that is an in vitro derived blastocyst-like structure exhibiting the main morphological features of a human blastocyst.

14. The isolated pPSC or a cell exhibiting at least one characteristic of claim 13, wherein the blastocyst-like structure comprises an inner cell layer and an outer cell layer, the inner cell layer comprising cells exhibiting one or more characteristics of cells of the epiblast or the primitive endoderm lineage, and the outer cell layer comprising cells that exhibit one or more characteristics of the trophectoderm.

15. The isolated pPSC or a cell exhibiting at least one characteristic of a pPSC of claim 13, wherein the blastocyst-like structure comprises an inner cell layer and an outer cell layer, the inner cell layer comprising cells that exhibit one or more characteristics of a cell of the epiblast or the primitive endoderm lineage, and the outer cell layer comprises cells that exhibit one or more characteristics of a cell of the trophectoderm, and wherein:

the one or more characteristics of an epiblast cell is present in any one or more of the markers NANOG, OCT4 (also known as POU5F1) or SOX2 the one or more characteristics of an epiblast cell is the morphology of a rounded columnar appearance;

the one or more characteristics of a trophectoderm cell is present in one or more of the markers CDX2 and GATA2s;

the one or more characteristics of a trophectoderm cell is a flattened or elongated epithelial morphology; or the one or more characteristics or a primitive endoderm lineage is the presence of the marker SOX17 or GATA6.

16. The isolated pPSC or a cell exhibiting at least one characteristic of a pPSC of claim 13, wherein the blastocyst-like structure comprises GATA6 positive cells adjacent to OCT4 cells.

17. The isolated pPSC or a cell exhibiting at least one characteristic of a pPSC of claim 13, wherein the main morphological features of a human blastocyst comprise:

a spherical or predominantly spherical layered cell aggregate or structure comprising at least two radially positioned layers, and comprising an inner cell layer and an outer cell layer with a fluid-filled cavity, called the blastocoel, a diameter of approximately 0.1-0.2 mm, about 200-300 cells within the structure, wherein the inner layer comprises cells that exhibit one or more characteristics of the cell of the epiblast or the primitive endoderm lineage, and wherein the outer layer comprises cells that exhibit one or more characteristics of a cell of the trophectoderm.

18. The isolated pPSC or a cell exhibiting at least one characteristic of a pPSC of claim 13, wherein the blastocyst-like structure does not form or comprise a zona pellucida.

* * * * *

SEQUENCE LISTING

<160> NUMBER OF SEQ ID NOS: 12

<210> SEQ ID NO 1
<211> LENGTH: 19
<212> TYPE: DNA
<213> ORGANISM: Artificial Sequence
<220> FEATURE:
<223> OTHER INFORMATION: hGAPDH Forward

<400> SEQUENCE: 1
ctgggctaca ctgagcacc                                                  19

<210> SEQ ID NO 2
<211> LENGTH: 21
<212> TYPE: DNA
<213> ORGANISM: Artificial Sequence
<220> FEATURE:
<223> OTHER INFORMATION: hGAPDH Reverse

<400> SEQUENCE: 2
aagtggtcgt tgagggcaat g                                               21

<210> SEQ ID NO 3
<211> LENGTH: 22
<212> TYPE: DNA
<213> ORGANISM: Artificial Sequence
<220> FEATURE:
<223> OTHER INFORMATION: CSH1 Forward

```
<400> SEQUENCE: 3
catgactccc agacctcctt ct                                              22

<210> SEQ ID NO 4
<211> LENGTH: 22
<212> TYPE: DNA
<213> ORGANISM: Artificial Sequence
<220> FEATURE:
<223> OTHER INFORMATION: CSH1 Reverse

<400> SEQUENCE: 4
atttctgttg cgtttcctcc at                                              22

<210> SEQ ID NO 5
<211> LENGTH: 21
<212> TYPE: DNA
<213> ORGANISM: Artificial Sequence
<220> FEATURE:
<223> OTHER INFORMATION: ITGA1 Forward

<400> SEQUENCE: 5
gctcctcact gttgttctac g                                               21

<210> SEQ ID NO 6
<211> LENGTH: 19
<212> TYPE: DNA
<213> ORGANISM: Artificial Sequence
<220> FEATURE:
<223> OTHER INFORMATION: ITGA1 Reverse

<400> SEQUENCE: 6
cgggccgctg aaagtcatt                                                  19

<210> SEQ ID NO 7
<211> LENGTH: 23
<212> TYPE: DNA
<213> ORGANISM: Artificial Sequence
<220> FEATURE:
<223> OTHER INFORMATION: TBXT Forward

<400> SEQUENCE: 7
tatgagcctc gaatccacat agt                                             23

<210> SEQ ID NO 8
<211> LENGTH: 22
<212> TYPE: DNA
<213> ORGANISM: Artificial Sequence
<220> FEATURE:
<223> OTHER INFORMATION: TBXT Reverse

<400> SEQUENCE: 8
cctcgttctg ataagcagtc ac                                              22

<210> SEQ ID NO 9
<211> LENGTH: 19
<212> TYPE: DNA
<213> ORGANISM: Artificial Sequence
<220> FEATURE:
<223> OTHER INFORMATION: EOMES Forward

<400> SEQUENCE: 9
gtgcccacgt ctacctgtg                                                  19

<210> SEQ ID NO 10
```

```
<211> LENGTH: 21
<212> TYPE: DNA
<213> ORGANISM: Artificial Sequence
<220> FEATURE:
<223> OTHER INFORMATION: EOMES Reverse

<400> SEQUENCE: 10
cctgccctgt ttcgtaatga t                                              21

<210> SEQ ID NO 11
<211> LENGTH: 20
<212> TYPE: DNA
<213> ORGANISM: Artificial Sequence
<220> FEATURE:
<223> OTHER INFORMATION: MIXL1 Forward

<400> SEQUENCE: 11
ggcgtcagag tgggaaatcc                                                20

<210> SEQ ID NO 12
<211> LENGTH: 21
<212> TYPE: DNA
<213> ORGANISM: Artificial Sequence
<220> FEATURE:
<223> OTHER INFORMATION: MIXL1 Reverse

<400> SEQUENCE: 12
ggcaggcagt tcacatctac c                                              21
```